United States Patent
Plasterk

(10) Patent No.: US 12,527,850 B2
(45) Date of Patent: *Jan. 20, 2026

(54) CANCER VACCINES FOR BREAST CANCER

(71) Applicant: CureVac Netherlands B.V., Amsterdam (NL)

(72) Inventor: Ronald Hans Anton Plasterk, Amsterdam (NL)

(73) Assignee: CureVac Netherlands B.V., Amsterdam (NL)

( * ) Notice: Subject to any disclaimer, the term of this patent is extended or adjusted under 35 U.S.C. 154(b) by 296 days.

This patent is subject to a terminal disclaimer.

(21) Appl. No.: 17/262,935

(22) PCT Filed: Jul. 25, 2019

(86) PCT No.: PCT/NL2019/050492
§ 371 (c)(1),
(2) Date: Jan. 25, 2021

(87) PCT Pub. No.: WO2020/022899
PCT Pub. Date: Jan. 30, 2020

(65) Prior Publication Data
US 2021/0162032 A1    Jun. 3, 2021

(30) Foreign Application Priority Data

Jul. 26, 2018 (NL) .................................... 2021400
Jan. 24, 2019 (NL) .................................... 2022447
Apr. 5, 2019 (EP) .................................... 19167595

(51) Int. Cl.
*A61K 39/00* (2006.01)

(52) U.S. Cl.
CPC ................ *A61K 39/0011* (2013.01)

(58) Field of Classification Search
None
See application file for complete search history.

(56) References Cited

U.S. PATENT DOCUMENTS

2007/0083334 A1   4/2007  Mintz et al.
2016/0069895 A1   3/2016  Delamarre et al.
(Continued)

FOREIGN PATENT DOCUMENTS

JP    2015188400 A    11/2015
WO    1995032731 A2   12/1995
(Continued)

OTHER PUBLICATIONS

Duffy et al. ("Mutant p53 in breast cancer: potential as a therapeutic target and biomarker"; 2018; Breast Cancer Res Treat 170, 213-219) (Year: 2018).*

(Continued)

*Primary Examiner* — Joanne Hama
*Assistant Examiner* — Hannah Sunshine
(74) *Attorney, Agent, or Firm* — Verrill Dana, LLP

(57) ABSTRACT

The invention relates to the field of cancer, in particular breast cancer. In particular it relates to the field of immune system directed approaches for tumor reduction and control. Some aspects of the invention relate to vaccines, vaccinations and other means of stimulating an antigen specific immune response against a tumor in individuals. Such vaccines comprise neoantigens resulting from frameshift mutations that bring out-of-frame sequences of the GATA3, CDH1, MAP3K1, RUNX1, and TP53 genes in-frame. Such vaccines are also useful for 'off the shelf' use.

20 Claims, 37 Drawing Sheets

Specification includes a Sequence Listing.

(56) References Cited

U.S. PATENT DOCUMENTS

| | | |
|---|---|---|
| 2016/0101170 A1 | 4/2016 | Hacohen et al. |
| 2017/0028043 A1 | 2/2017 | Benz et al. |
| 2017/0028044 A1 | 2/2017 | Soon-Shiong et al. |
| 2017/0032082 A1 | 2/2017 | Nguyen et al. |
| 2017/0032103 A1 | 2/2017 | Nguyen et al. |
| 2017/0202939 A1 | 7/2017 | Carreno et al. |
| 2017/0312351 A1 | 11/2017 | Niazi et al. |
| 2018/0064793 A1 | 3/2018 | Mcgranahan et al. |
| 2018/0078624 A1 | 3/2018 | Zhou et al. |
| 2018/0078625 A1 | 3/2018 | Moon et al. |
| 2018/0318409 A1 | 11/2018 | Valiante et al. |
| 2018/0340944 A1 | 11/2018 | Han et al. |
| 2019/0022202 A1 | 1/2019 | Granum et al. |
| 2019/0030147 A1 | 1/2019 | Artomov et al. |
| 2019/0060428 A1 | 2/2019 | Fritsch |
| 2019/0083593 A1 | 3/2019 | Sahin et al. |
| 2019/0091316 A1 | 3/2019 | Soon-Shiong et al. |

FOREIGN PATENT DOCUMENTS

| | | |
|---|---|---|
| WO | 20040111075 A2 | 12/2004 |
| WO | 2011143656 A2 | 11/2011 |
| WO | 2012159754 A2 | 11/2012 |
| WO | 2014168874 A2 | 10/2014 |
| WO | 2015095811 A2 | 6/2015 |
| WO | 2016040900 A1 | 3/2016 |
| WO | 2016154544 A1 | 9/2016 |
| WO | 2016172722 A1 | 10/2016 |
| WO | 2016187508 A2 | 11/2016 |
| WO | 2016201049 A2 | 12/2016 |
| WO | 2017020026 A1 | 2/2017 |
| WO | 2017106638 A1 | 6/2017 |
| WO | 2017118702 A1 | 7/2017 |
| WO | 2017139694 A1 | 8/2017 |
| WO | 2017173321 A1 | 10/2017 |
| WO | 2017177207 A1 | 10/2017 |
| WO | 2017194170 A1 | 11/2017 |
| WO | 2017223085 A2 | 12/2017 |
| WO | 2018015433 A2 | 1/2018 |
| WO | 2018026896 A1 | 2/2018 |
| WO | 2018102584 A1 | 6/2018 |
| WO | 2018136664 A1 | 7/2018 |
| WO | 2018144082 A1 | 8/2018 |
| WO | 2018144775 A1 | 8/2018 |
| WO | 2018195357 A1 | 10/2018 |
| WO | 2018200389 A1 | 11/2018 |
| WO | 2018213803 A1 | 11/2018 |
| WO | 2018223092 A1 | 12/2018 |
| WO | 2018223094 A1 | 12/2018 |
| WO | 2018224405 A1 | 12/2018 |
| WO | 2018234516 A2 | 12/2018 |
| WO | 2019008364 A1 | 1/2019 |
| WO | 2019012082 A1 | 1/2019 |
| WO | 2019036043 A2 | 2/2019 |
| WO | 2019126186 A1 | 6/2019 |

OTHER PUBLICATIONS

Carbone et al. ("Immunization with mutant p53- and K-ras-derived peptides in cancer patients: immune response and clinical outcome"; 2015; Journal of Clinical Oncology, 23(22):5099-5107) (Year: 2015).*

Cuzick ("Preventive therapy for cancer", The Lancet Oncology, vol. 18, Issue 8,2017, pp. 472-482) (Year: 2017).*

Orfanelli, T. et al., "Shared tumor antigens in uterine cancers with microsatellite instability: Putative targets for immunotherapeutic approaches", Gynecologic Oncology, Jun. 2019, 154(1):91, DOI: 10.1016/j.ygyno.2019.04.214.

Roudko, V. et al., "Widespread immunogenic poly-epitope frameshift mutations in microsatellite unstable tumors", bioRxiv 2019; doi: https://doi.org/10.1101/662262; pp. 1-53.

Hartmaier, R. et al., "Genomic analysis of 63,220 tumors reveals insights into tumor uniqueness and targeted cancer immunotherapy strategies", Genome Medicine, BioMed Central, vol. 9, Article No. 16 (2017), pp. 1-9.

Batista, M.T. et al., "Abstract 1463: FAST vaccines based on frameshift neoantigens may have advantages over personal vaccines", Proceedings of American Association for Cancer Research Annual Meeting 2019, Mar. 29, 2019, vol. 79, Nr.: 13, pp. 1463-1463.

Zhang, J. et al., "Using Frameshift Peptide Arrays for Cancer Neo-Antigens Screening", Scientific Reports, vol. 8, No. 1, (2018), pp. 1-10.

Koster, J. et al., "A library of Neo Open Reading Frame peptides (NOPs) as a sustainable resource of common neoantigens in up to 50% of cancer patients", Scientific Reports, 2019, vol. 9, Nr: 1.

Schwitalle, Y. et al., "Immunogenic peptides generated by frameshift mutations in DNA mismatch repair-deficient cancer cells", Cancer Immun. 2004 Academy of Cancer Immunology, CH-ISSN 1424-9734, vol. 4, Nr:1, pp. 1-10.

Luhui, S. et al., "Abstract 469: Progress towards developing a universal, prophylactic cancer vaccine.", American Association for Cancer Research; vol. 73, No. 8, Suppl. Apr. 1, 2013 (Apr. 1, 2013).

Linnebacher et al., "Frameshift peptide-derived T-cell epitopes: a source of novel tumor-specific antigens", Int. J. Cancer: 93, pp. 6-11 (2001).

Schumacher et al., "Neoantigens in cancer immunotherapy", Science, 2015, vol. 348, Issue 6230, pp. 69-74.

Rahma et al., "A pilot clinical trial testing mutant von Hippel-Lindau peptide as a novel immune therapy in metastatic Renal Cell Carcinoma", Journal of Translational Medicine, 2010, 8:8, 9 pages.

Hacohen et al., "Getting Personal with Neoantigen-Based Therapeutic Cancer Vaccines", Cancer Immunol. Res., Jul. 2013; 1(1): 11-15, pp. 1-8.

Ito et al., "Cancer Neoantigens: A Promising Source of Immunogens for Cancer Immunotherapy", J Clin Cell Immunol 2015, 6:2, pp. 1-7.

Tomczak et al., "The Cancer Genome Atlas (TCGA): an immeasurable source of knowledge", Contemp Oncol (Pozn). 2015, 19 (1A): A68-A77.

The Cancer Genome Atlas Research Network. "Comprehensive molecular characterization of clear cell renal cell carcinoma", Nature (2013), 499, pp. 43-49.

Pavlopoulou et al., "Human cancer databases (review)", Oncology Reports, 33: pp. 3-18, 2015.

Rammensee, H-G et al., "Cancer Vaccines: Some Basic Considerations", Genomic and Personalized Medicine, 2009, Elsevier, pp. 573-589.

Rajasagi, M. et al., "Systematic identification of personal tumor-specific neoantigens in chronic lymphocytic leukemia", Blood, 2014, ISSN 0006-4971, vol. 124, Nr: 3, pp. 453-462.

* cited by examiner

TP53-NM_001126114
Somatic SNVs

All FS encountered

/data/tmp/plasterk/180802/distributions/_v1l/10/step4_peptide_distr_peptides_10_padd_1_maxsam_minh_2_v1l-flop-gex.txt (size: 1539)

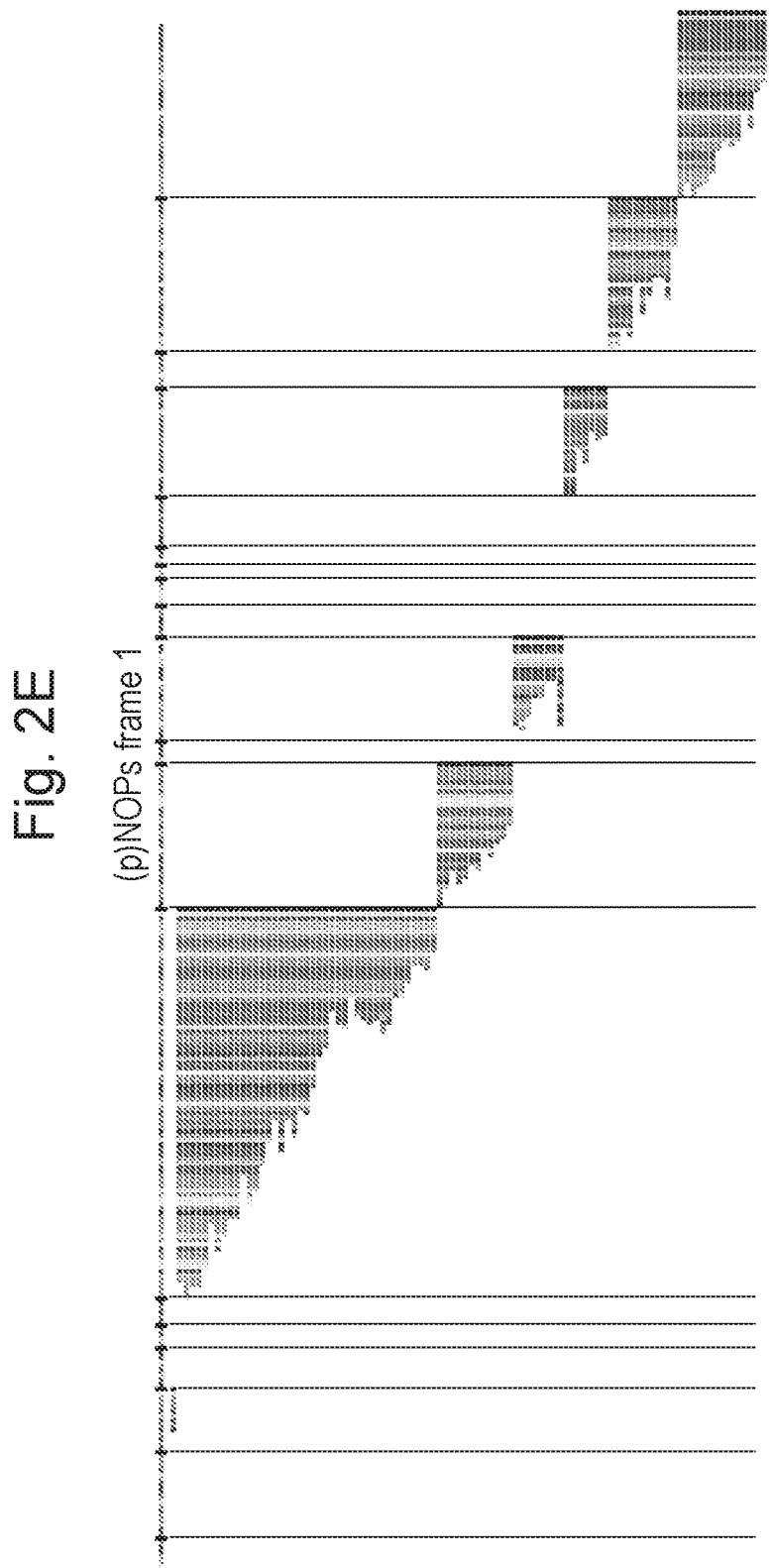

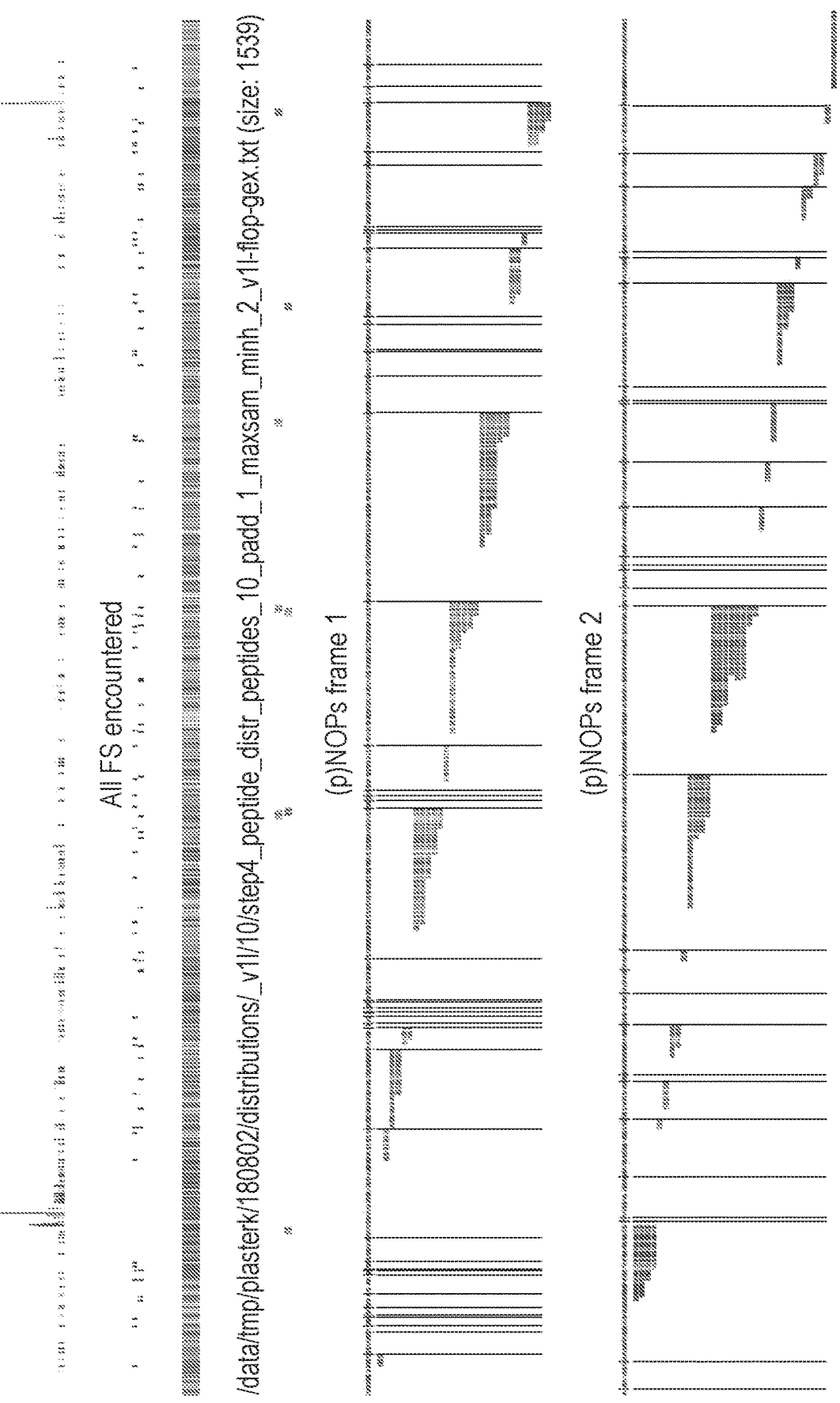

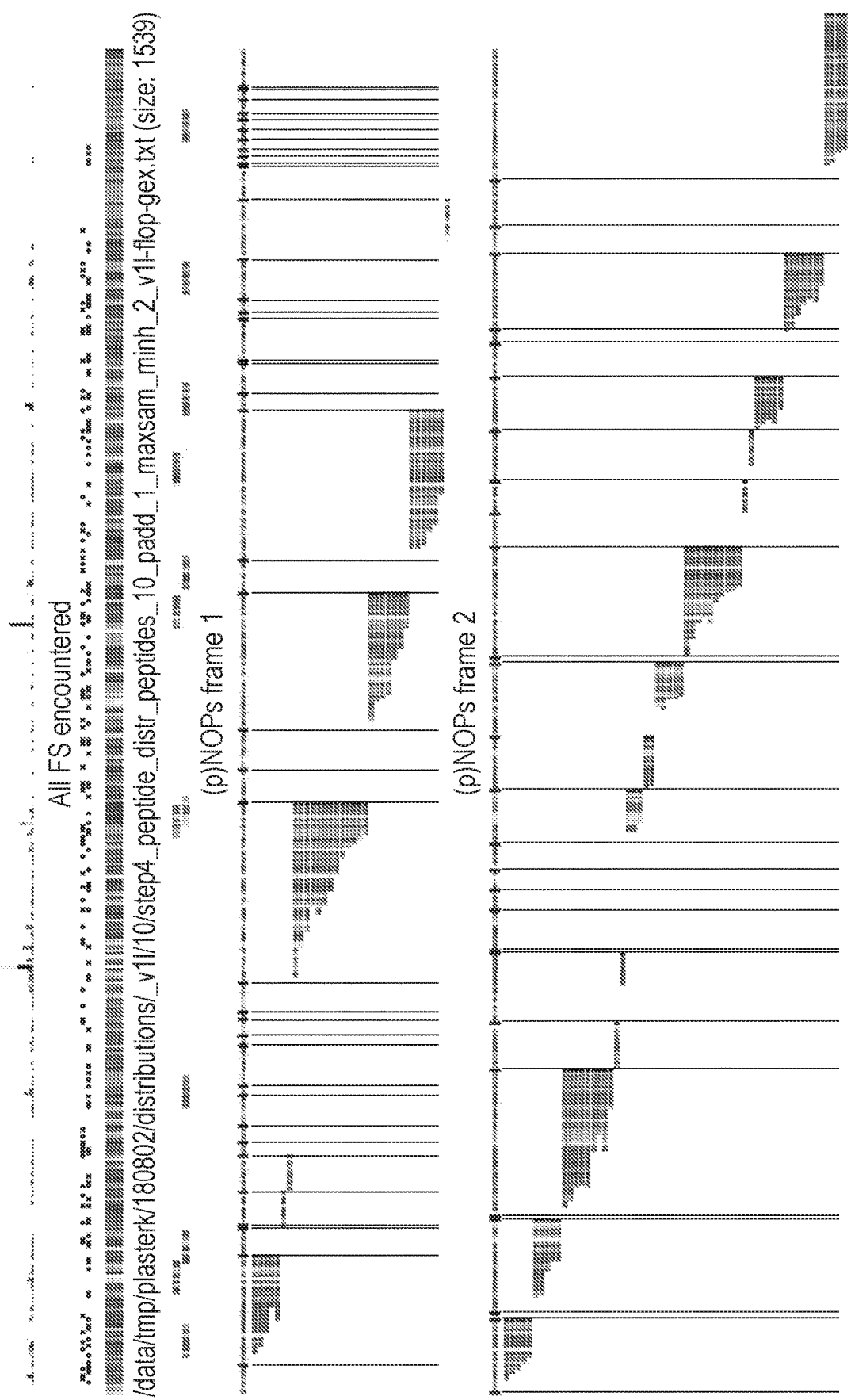

Fig. 8 (Cont. III)

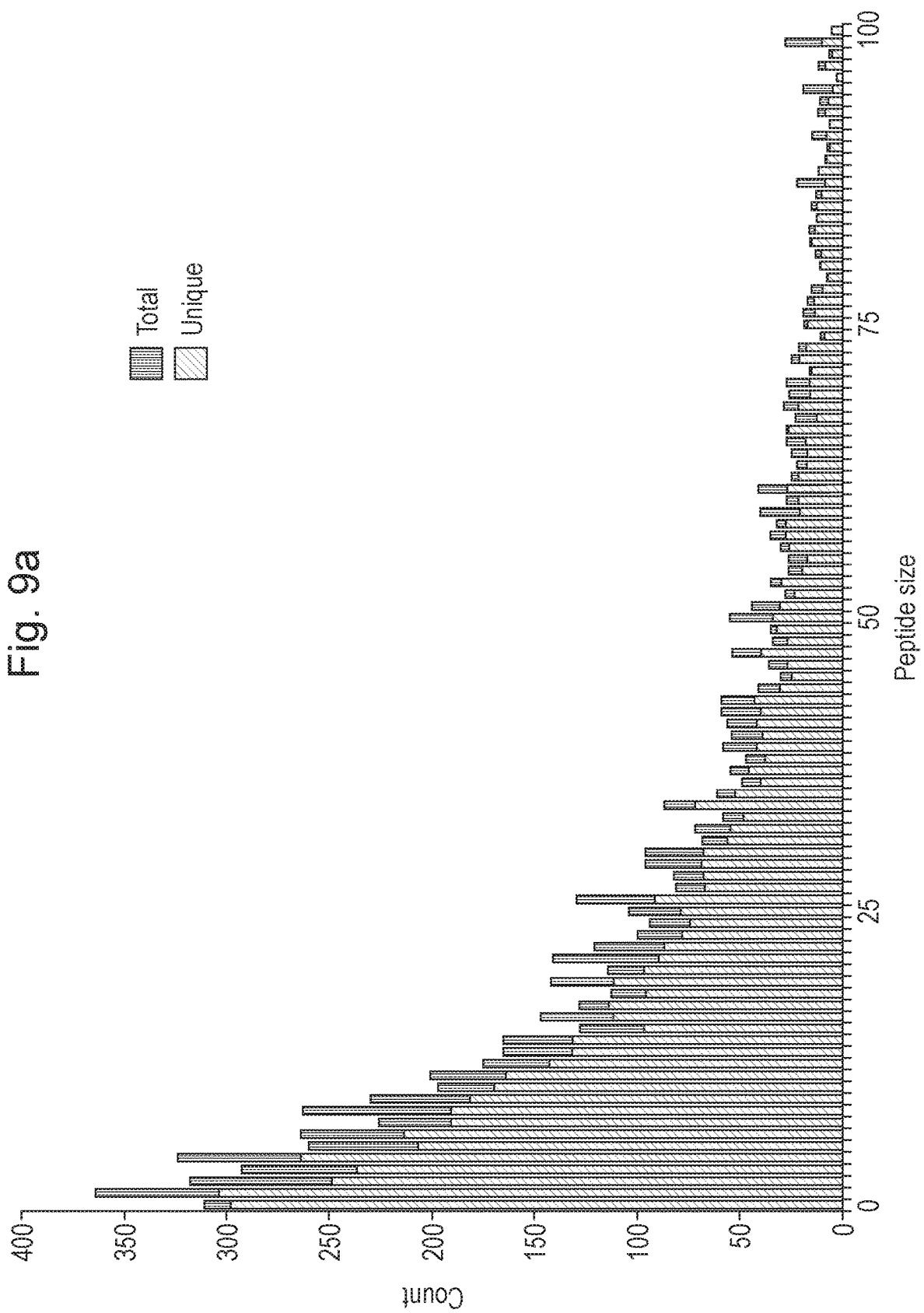

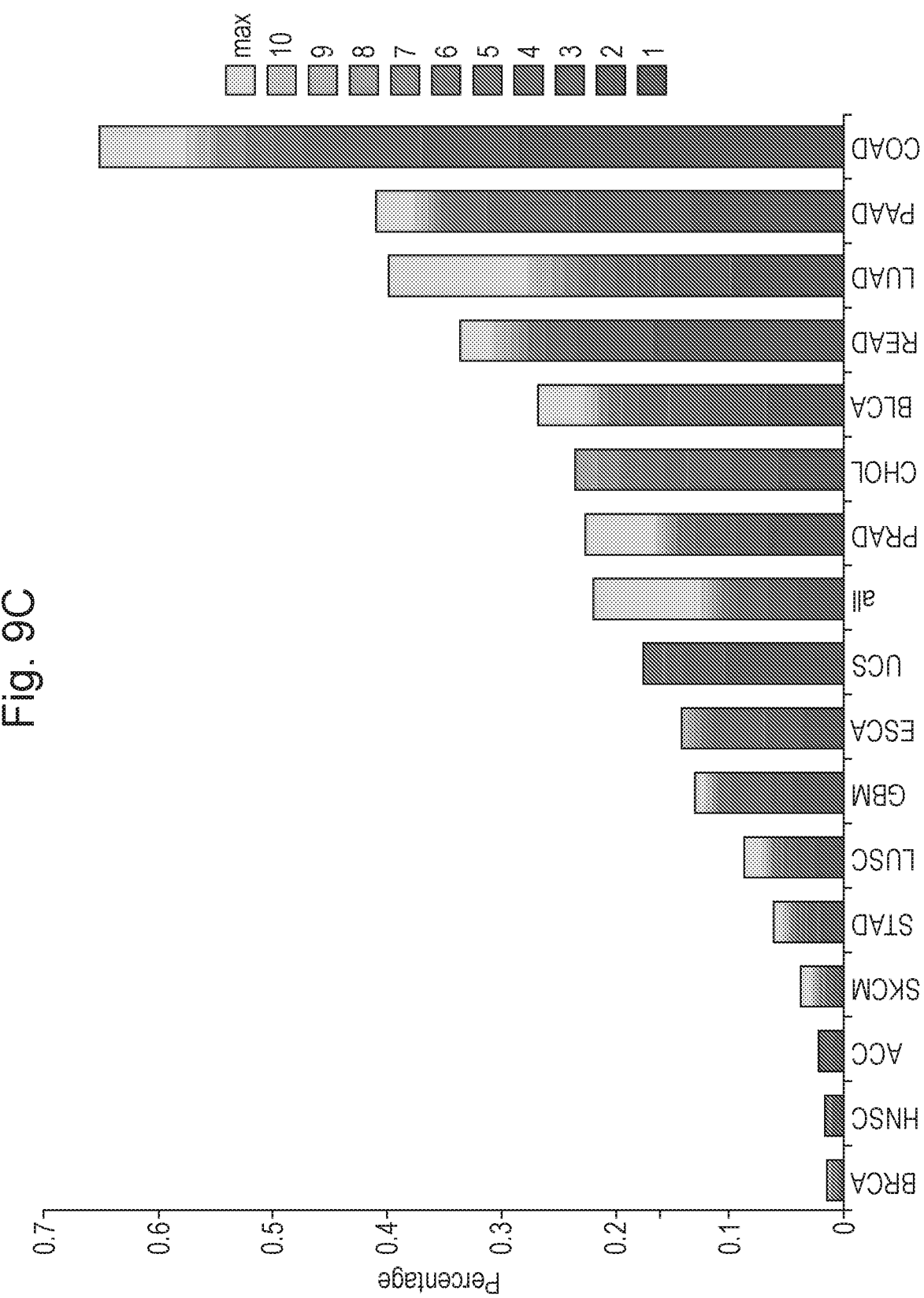

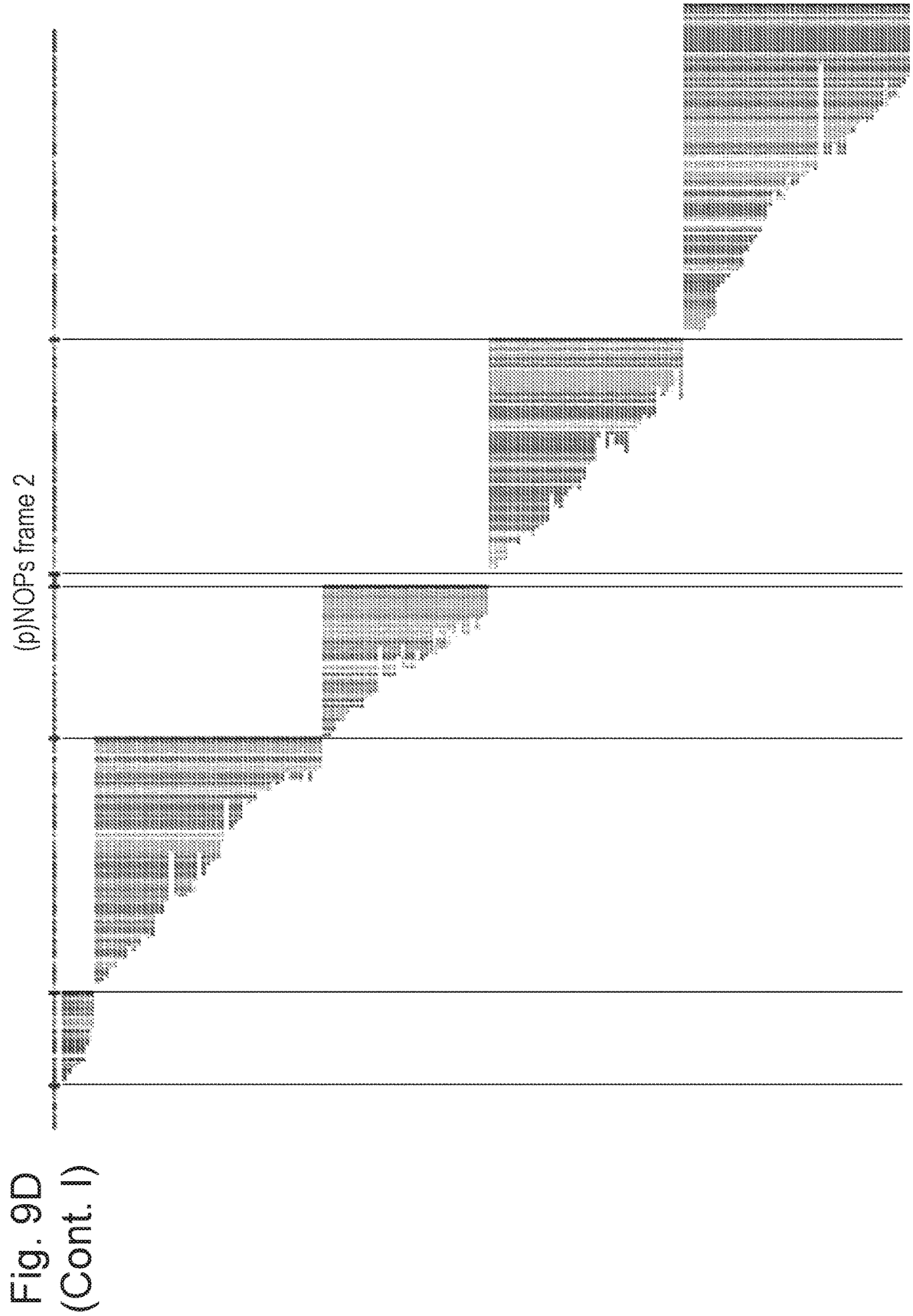
Fig. 9D (Cont. 1)

Fig. 9D. (Cont II)
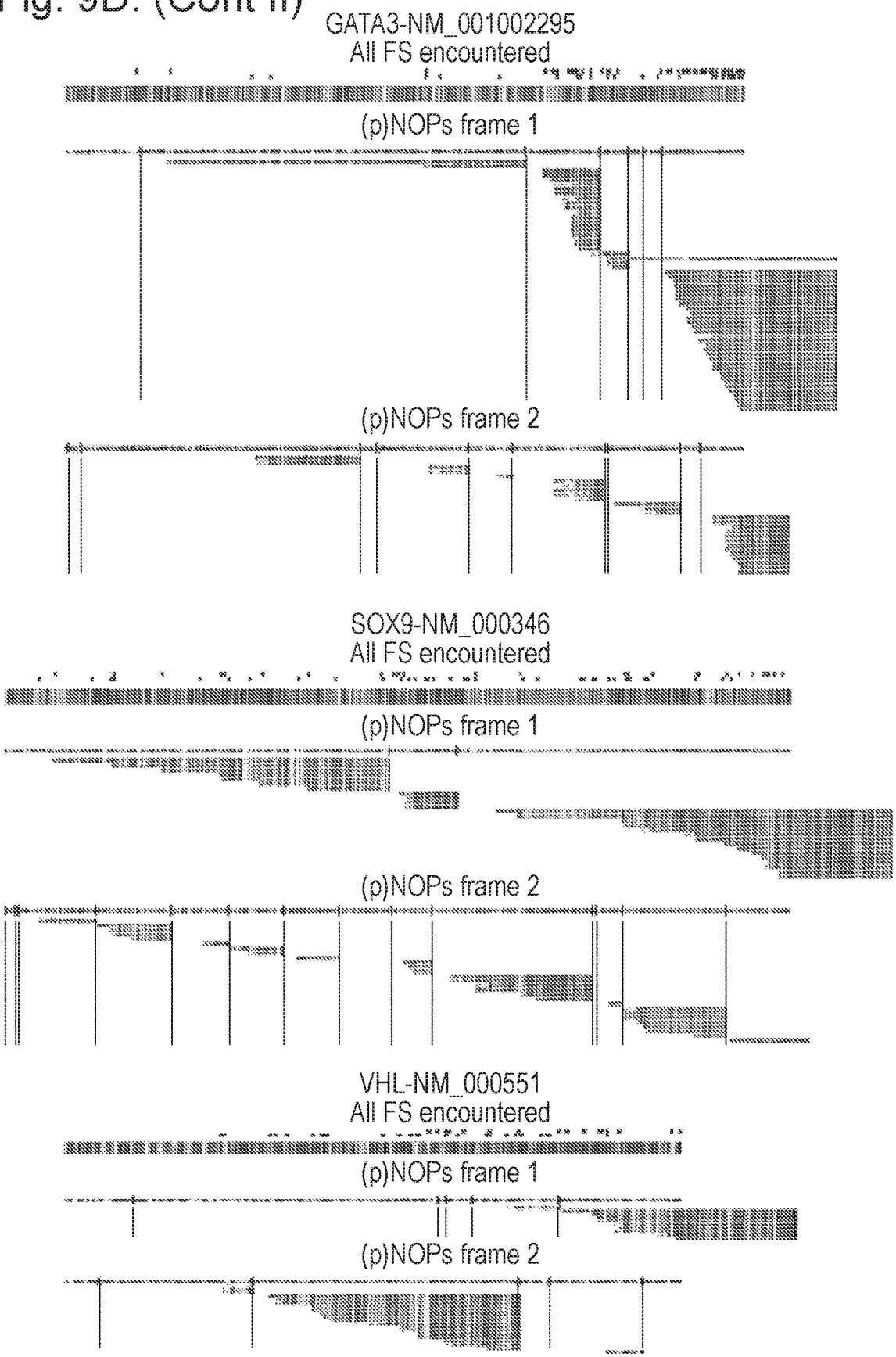

CANCER VACCINES FOR BREAST CANCER

FIELD OF THE INVENTION

The invention relates to the field of cancer, in particular breast cancer. In particular, it relates to the field of immune system directed approaches for tumor reduction and control. Some aspects of the invention relate to vaccines, vaccinations and other means of stimulating an antigen specific immune response against a tumor in individuals. Such vaccines comprise neoantigens resulting from frameshift mutations that bring out-of-frame sequences of the GATA3, CDH1, MAP3K1, RUNX1, and TP53 genes in-frame. Such vaccines are also useful for 'off the shelf use.

BACKGROUND OF THE INVENTION

There are a number of different existing cancer therapies, including ablation techniques (e.g., surgical procedures and radiation) and chemical techniques (e.g., pharmaceutical agents and antibodies), and various combinations of such techniques. Despite intensive research such therapies are still frequently associated with serious risk, adverse or toxic side effects, as well as varying efficacy.

There is a growing interest in cancer therapies that aim to target cancer cells with a patient's own immune system (such as cancer vaccines or checkpoint inhibitors, or T-cell based immunotherapy). Such therapies may indeed eliminate some of the known disadvantages of existing therapies, or be used in addition to the existing therapies for additional therapeutic effect. Cancer vaccines or immunogenic compositions intended to treat an existing cancer by strengthening the body's natural defenses against the cancer and based on tumor-specific neoantigens hold great promise as next-generation of personalized cancer immunotherapy. Evidence shows that such neoantigen-based vaccination can elicit T-cell responses and can cause tumor regression in patients.

Typically the immunogenic compositions/vaccines are composed of tumor antigens (antigenic peptides or nucleic acids encoding them) and may include immune stimulatory molecules like cytokines that work together to induce antigen-specific cytotoxic T-cells that target and destroy tumor cells. Vaccines containing tumor-specific and patient-specific neoantigens require the sequencing of the patients' genome and tumor genome in order to determine whether the neoantigen is tumor specific, followed by the production of personalized compositions. Sequencing, identifying the patient's specific neoantigens and preparing such personalized compositions may require a substantial amount of time, time which may unfortunately not be available to the patient, given that for some tumors the average survival time after diagnosis is short, sometimes around a year or less.

Accordingly, there is a need for improved methods and compositions for providing subject-specific immunogenic compositions/cancer vaccines. In particular it would be desirable to have available a vaccine for use in the treatment of cancer, wherein such vaccine is suitable for treatment of a larger number of patients, and can thus be prepared in advance and provided off the shelf. There is a clear need in the art for personalized vaccines which induce an immune response to tumor specific neoantigens. One of the objects of the present disclosure is to provide personalized therapeutic cancer vaccines that can be provided off the shelf. An additional object of the present disclosure is to provide cancer vaccines that can be provided prophylactically. Such vaccines are especially useful for individuals that are at risk of developing cancer.

SUMMARY OF THE INVENTION

In a preferred embodiment, the disclosure provides a vaccine or collection of vaccines for use in the treatment of breast cancer, said vaccine comprising:
(i) a peptide, or a collection of tiled peptides, having the amino acid sequence selected from SEQ ID NO:1, an amino acid sequence having 90% identity to SEQ ID NO:1, or a fragment thereof comprising at least 10 consecutive amino acids of SEQ ID NO:1; and
a peptide, or a collection of tiled peptides, having the amino acid sequence selected from SEQ ID NO:2, an amino acid sequence having 90% identity to SEQ ID NO:2, or a fragment thereof comprising at least 10 consecutive amino acids of SEQ ID NO:2; preferably also comprising
a peptide, or a collection of tiled peptides, having the amino acid sequence selected from SEQ ID NO:3, an amino acid sequence having 90% identity to SEQ ID NO:3, or a fragment thereof comprising at least 10 consecutive amino acids of SEQ ID NO:3;
(ii) a peptide, or a collection of tiled peptides, having the amino acid sequence selected from SEQ ID NO:17, an amino acid sequence having 90% identity to SEQ ID NO:17, or a fragment thereof comprising at least 10 consecutive amino acids of SEQ ID NO:17; and
a peptide, or a collection of tiled peptides, having the amino acid sequence selected from SEQ ID NO:18, an amino acid sequence having 90% identity to SEQ ID NO:18, or a fragment thereof comprising at least 10 consecutive amino acids of SEQ ID NO:18; preferably also comprising
a peptide, or a collection of tiled peptides, having the amino acid sequence selected from SEQ ID NO:19, an amino acid sequence having 90% identity to SEQ ID NO:19, or a fragment thereof comprising at least 10 consecutive amino acids of SEQ ID NO:19 and/or a peptide having the amino acid sequence selected from SEQ ID NO:20, an amino acid sequence having 90% identity to SEQ ID NO:20, or a fragment thereof comprising at least 10 consecutive amino acids of SEQ ID NO:20; and/or a peptide having the amino acid sequence selected from SEQ ID NO:21, an amino acid sequence having 90% identity to SEQ ID NO:21, or a fragment thereof comprising at least 10 consecutive amino acids of SEQ ID NO:21 and/or a peptide having the amino acid sequence selected from SEQ ID NO:22, an amino acid sequence having 90% identity to SEQ ID NO:22, or a fragment thereof comprising at least 10 consecutive amino acids of SEQ ID NO:22;
(iii) a peptide, or a collection of tiled peptides, having the amino acid sequence selected from SEQ ID NO:45, an amino acid sequence having 90% identity to SEQ ID NO:45, or a fragment thereof comprising at least 10 consecutive amino acids of SEQ ID NO:45; and
a peptide, or a collection of tiled peptides, having the amino acid sequence selected from SEQ ID NO:46, an amino acid sequence having 90% identity to SEQ ID NO:46, or a fragment thereof comprising at least 10 consecutive amino acids of SEQ ID NO:46;
(iv) a peptide, or a collection of tiled peptides, having the amino acid sequence selected from SEQ ID NO:108, an amino acid sequence having 90% identity to SEQ ID NO:108, or a fragment thereof comprising at least 10 consecutive amino acids of SEQ ID NO:108; and a peptide, or a collection of tiled peptides, having the amino acid sequence selected from SEQ ID NOS:109-111, an amino acid sequence having 90% identity to SEQ ID NOS:109-111, or a fragment thereof comprising at least 10 consecutive amino acids of SEQ ID NOS:109-111;

and/or (v) at least two peptides, wherein each peptide, or a collection of tiled peptides, comprises a different amino acid sequence selected from SEQ ID NOS: 200-206, an amino acid sequence having 90% identity to SEQ ID NOS:200-206, or a fragment thereof comprising at least 10 consecutive amino acids of SEQ ID NOS:200-206.

In a preferred embodiment, the disclosure provides a collection of frameshift-mutation peptides comprising:

(i) a peptide, or a collection of tiled peptides, having the amino acid sequence selected from SEQ ID NO:1, an amino acid sequence having 90% identity to SEQ ID NO:1, or a fragment thereof comprising at least 10 consecutive amino acids of SEQ ID NO:1; and a peptide, or a collection of tiled peptides, having the amino acid sequence selected from SEQ ID NO:2, an amino acid sequence having 90% identity to SEQ ID NO:2, or a fragment thereof comprising at least 10 consecutive amino acids of SEQ ID NO:2; preferably also comprising a peptide, or a collection of tiled peptides, having the amino acid sequence selected from SEQ ID NO:3, an amino acid sequence having 90% identity to SEQ ID NO:3, or a fragment thereof comprising at least 10 consecutive amino acids of SEQ ID NO:3;

(ii) a peptide, or a collection of tiled peptides, having the amino acid sequence selected from SEQ ID NO:17, an amino acid sequence having 90% identity to SEQ ID NO:17, or a fragment thereof comprising at least 10 consecutive amino acids of SEQ ID NO:17; and a peptide, or a collection of tiled peptides, having the amino acid sequence selected from SEQ ID NO:18, an amino acid sequence having 90% identity to SEQ ID NO:18, or a fragment thereof comprising at least 10 consecutive amino acids of SEQ ID NO:18; preferably also comprising a peptide, or a collection of tiled peptides, having the amino acid sequence selected from SEQ ID NO:19, an amino acid sequence having 90% identity to SEQ ID NO:19, or a fragment thereof comprising at least 10 consecutive amino acids of SEQ ID NO:19; and/or a peptide having the amino acid sequence selected from SEQ ID NO:20, an amino acid sequence having 90% identity to SEQ ID NO:20, or a fragment thereof comprising at least 10 consecutive amino acids of SEQ ID NO:20; and/or a peptide having the amino acid sequence selected from SEQ ID NO:21, an amino acid sequence having 90% identity to SEQ ID NO:21, or a fragment thereof comprising at least 10 consecutive amino acids of SEQ ID NO:21 and/or a peptide having the amino acid sequence selected from SEQ ID NO:22, an amino acid sequence having 90% identity to SEQ ID NO:22, or a fragment thereof comprising at least 10 consecutive amino acids of SEQ ID NO:22

(iii) a peptide, or a collection of tiled peptides, having the amino acid sequence selected from SEQ ID NO:45, an amino acid sequence having 90% identity to SEQ ID NO:45, or a fragment thereof comprising at least 10 consecutive amino acids of SEQ ID NO:45; and a peptide, or a collection of tiled peptides, having the amino acid sequence selected from SEQ ID NO:46, an amino acid sequence having 90% identity to SEQ ID NO:46, or a fragment thereof comprising at least 10 consecutive amino acids of SEQ ID NO:46;

(iv) a peptide, or a collection of tiled peptides, having the amino acid sequence selected from SEQ ID NO:108, an amino acid sequence having 90% identity to SEQ ID NO:108, or a fragment thereof comprising at least 10 consecutive amino acids of SEQ ID NO:108; and a peptide, or a collection of tiled peptides, having the amino acid sequence selected from SEQ ID NOS:109-111, an amino acid sequence having 90% identity to SEQ ID NOS:109-111, or a fragment thereof comprising at least 10 consecutive amino acids of SEQ ID NOS:109-111;

and/or (v) at least two peptides, wherein each peptide, or a collection of tiled peptides, comprises a different amino acid sequence selected from SEQ ID NOS: 200-206, an amino acid sequence having 90% identity to SEQ ID NOS:200-206, or a fragment thereof comprising at least 10 consecutive amino acids of SEQ ID NOS:200-206.

In a preferred embodiment, a collection of frameshift-mutation peptides comprises a peptide, or a collection of tiled peptides, having the amino acid SEQ ID NO:17, an amino acid sequence having 90% identity to SEQ ID NO:17, or a fragment thereof comprising at least 10 consecutive amino acids of SEQ ID NO:17; and a peptide, or a collection of tiled peptides, having the amino acid SEQ ID NO:18 or 19, an amino acid sequence having 90% identity to SEQ ID NO:18 or 19, or a fragment thereof comprising at least 10 consecutive amino acids of SEQ ID NO:18 or 19. Preferably, the collection comprises a peptide having the SEQ ID NO:17, a peptide having the SEQ ID NO:18, and a peptide having the SEQ ID NO:19 (or a collection of titled peptides, or amino acid sequence having 90% identity to said sequences or a fragment thereof comprising at least 10 consecutive amino acids of said sequences).

In a preferred embodiment, the disclosure provides a peptide, or a collection of tiled peptides, comprising an amino acid sequence selected from the groups:

(i) SEQ ID NOS:1-16 or 231-234, an amino acid sequence having 90% identity to SEQ ID NOS:1-16 or 231-234, or a fragment thereof comprising at least 10 consecutive amino acids of SEQ ID NOS:1-16 or 231-234;

(ii) SEQ ID NOS:17-44, an amino acid sequence having 90% identity to SEQ ID NOS:17-44, or a fragment thereof comprising at least 10 consecutive amino acids of SEQ ID NOS:17-44;

(iii) SEQ ID NOS:45-107, an amino acid sequence having 90% identity to SEQ ID NOS:45-107, or a fragment thereof comprising at least 10 consecutive amino acids of SEQ ID NOS:45-107;

(iv) SEQ ID NOS:108-199, an amino acid sequence having 90% identity to SEQ ID NOS:108-199, or a fragment thereof comprising at least 10 consecutive amino acids of SEQ ID NOS:108-199; and (v) SEQ ID NOS:200-230, an amino acid sequence having 90% identity to SEQ ID NOS:200-230, or a fragment thereof comprising at least 10 consecutive amino acids of SEQ ID NOS:200-230.

Preferred collections comprise SEQ ID NOS:4, 5, and/or 6. For example, a preferred collection comprises SEQ ID NO:4 (an amino acid sequence having 90% identity to SEQ ID NO:4, or a fragment thereof comprising at least 10 consecutive amino acids of SEQ ID NO:4) and SEQ ID NO:1 (an amino acid sequence having 90% identity to SEQ ID NO:1, or a fragment thereof comprising at least 10 consecutive amino acids of SEQ ID NO:1).

In some embodiments of the disclosure, the peptides are linked, preferably wherein said peptides are comprised within the same polypeptide.

In a preferred embodiment, the disclosure provides one more isolated nucleic acid molecules encoding the peptides or collection of peptides as disclosed herein. In a preferred embodiment, the disclosure provides one or more vectors comprising the nucleic acid molecules disclosed herein, preferably wherein the vector is a viral vector. In a preferred embodiment, the disclosure provides a host cell comprising the isolated nucleic acid molecules or the vectors as disclosed herein.

In a preferred embodiment, the disclosure provides a binding molecule or a collection of binding molecules that bind the peptide or collection of peptides disclosed herein, where in the binding molecule is an antibody, a T-cell receptor, or an antigen binding fragment thereof.

In a preferred embodiment, the disclosure provides a chimeric antigen receptor or collection of chimeric antigen receptors each comprising i) a T cell activation molecule; ii) a transmembrane region; and iii) an antigen recognition moiety; wherein said antigen recognition moieties bind the peptide or collection of peptides disclosed herein. In a preferred embodiment, the disclosure provides a host cell or combination of host cells that express the binding molecule or collection of binding molecules, or the chimeric antigen receptor or collection of chimeric antigen receptors as disclosed herein.

In a preferred embodiment, the disclosure provides a vaccine or collection of vaccines comprising the peptide or collection of peptides, the nucleic acid molecules, the vectors, or the host cells as disclosed herein; and a pharmaceutically acceptable excipient and/or adjuvant, preferably an immune-effective amount of adjuvant.

In a preferred embodiment, the disclosure provides the vaccines or collection of vaccines as disclosed herein for use in the treatment of breast cancer in an individual. In a preferred embodiment, the disclosure provides the vaccines as disclosed herein for prophylactic use in the prevention of breast cancer in an individual. In a preferred embodiment, the disclosure provides the vaccines as disclosed herein for use in the preparation of a medicament for treatment of breast cancer in an individual or for prophylactic use. In a preferred embodiment, the disclosure provides methods of treating an individual for breast cancer or reducing the risk of developing said cancer, the method comprising administering to the individual in need thereof a therapeutically effective amount of a vaccine as disclosed herein.

In a preferred embodiment, the individual has breast cancer and one or more cancer cells of the individual:
 (i) expresses a peptide having the amino acid sequence selected from SEQ ID NOS: 1-234, an amino acid sequence having 90% identity to any one of SEQ ID NOS: 1-234, or a fragment thereof comprising at least 10 consecutive amino acids of amino acid sequence selected from SEQ ID NOS:1-234;
 (ii) or comprises a DNA or RNA sequence encoding an amino acid sequences of (i).

In a preferred embodiment, the individual has a germline mutation in the PALB2, CHEK2, BRCA1, and/or BRCA2 gene. In a preferred embodiment, the method, preferably the prophylactic method, further comprises determining whether said individual has a germline mutation in the PALB2, CHEK2, BRCA1, and/or BRCA2 gene. In a preferred embodiment, the individual has a germline mutation in the BRCA1 and/or BRCA2 gene and preferably the individual is provided with a vaccine against TP53, GATA3, and/or RUNX1 novel open reading frames. In some embodiments, the individual prophylactically administered a vaccine as disclosed herein has not been diagnosed with breast cancer.

In a preferred embodiment, the disclosure provides a method of stimulating the proliferation of human T-cells, comprising contacting said T-cells with the peptide or collection of peptides, the nucleic acid molecules, the vectors, the host cell, or the vaccine as disclosed herein.

In a preferred embodiment, the disclosure provides a storage facility for storing vaccines. Preferably the facility stores at least two different cancer vaccines as disclosed herein. Preferably the storing facility stores:
 a vaccine comprising:
  (i) a peptide having the amino acid sequence selected from SEQ ID NO:1, an amino acid sequence having 90% identity to SEQ ID NO:1, or a fragment thereof comprising at least 10 consecutive amino acids of SEQ ID NO:1; and
  a peptide having the amino acid sequence selected from SEQ ID NO:2, an amino acid sequence having 90% identity to SEQ ID NO:2, or a fragment thereof comprising at least 10 consecutive amino acids of SEQ ID NO:2; preferably also comprising
  a peptide having the amino acid sequence selected from SEQ ID NO:3, an amino acid sequence having 90% identity to SEQ ID NO:3, or a fragment thereof comprising at least 10 consecutive amino acids of SEQ ID NO:3;
 and one or more vaccines selected from:
 a vaccine comprising:
  (i) a peptide, or a collection of tiled peptides, having the amino acid sequence selected from SEQ ID NO:1, an amino acid sequence having 90% identity to SEQ ID NO:1, or a fragment thereof comprising at least 10 consecutive amino acids of SEQ ID NO:1; and
  a peptide, or a collection of tiled peptides, having the amino acid sequence selected from SEQ ID NO:2, an amino acid sequence having 90% identity to SEQ ID NO:2, or a fragment thereof comprising at least 10 consecutive amino acids of SEQ ID NO:2; preferably also comprising
  a peptide, or a collection of tiled peptides, having the amino acid sequence selected from SEQ ID NO:3, an amino acid sequence having 90% identity to SEQ ID NO:3, or a fragment thereof comprising at least 10 consecutive amino acids of SEQ ID NO:3;
 and one or more vaccines selected from:
 a vaccine comprising:
  (ii) a peptide, or a collection of tiled peptides, having the amino acid sequence selected from SEQ ID NO:17, an amino acid sequence having 90% identity to SEQ ID NO:17, or a fragment thereof comprising at least 10 consecutive amino acids of SEQ ID NO:17; and
  a peptide, or a collection of tiled peptides, having the amino acid sequence selected from SEQ ID NO:18, an amino acid sequence having 90% identity to SEQ ID NO:18, or a fragment thereof comprising at least 10 consecutive amino acids of SEQ ID NO:18; preferably also comprising a peptide, or a collection of tiled peptides, having the amino acid sequence selected from SEQ ID NO:19, an amino acid sequence having 90% identity to SEQ ID NO:19, or a fragment thereof comprising at least 10 consecutive amino acids of SEQ ID NO:19; and/or a peptide having the amino acid sequence selected from SEQ ID NO:20, an amino acid sequence having 90% identity to SEQ ID NO:20, or a fragment thereof comprising at least 10 consecutive amino acids of SEQ ID NO:20; and/or a peptide having the amino acid sequence selected from SEQ ID NO:21, an amino acid sequence having 90% identity to SEQ ID NO:21, or a fragment thereof comprising at least 10 consecutive amino acids of SEQ ID NO:21 and/or a peptide having the amino acid sequence selected from SEQ ID NO:22, an amino acid sequence having 90% identity to SEQ ID NO:22, or a fragment thereof comprising at least 10 consecutive amino acids of SEQ ID NO:22 a vaccine comprising:
(iii) a peptide, or a collection of tiled peptides, having the amino acid sequence selected from SEQ ID NO:45, an amino acid sequence having 90% identity to SEQ ID NO:45, or a fragment thereof comprising at least 10 consecutive amino acids of SEQ ID NO:45; and
a peptide, or a collection of tiled peptides, having the amino acid sequence selected from SEQ ID NO:46, an amino acid sequence having 90% identity to SEQ ID NO:46, or a fragment thereof comprising at least 10 consecutive amino acids of SEQ ID NO:46;

a vaccine comprising:
(iv) a peptide, or a collection of tiled peptides, having the amino acid sequence selected from SEQ ID NO:108, an amino acid sequence having 90% identity to SEQ ID NO:108, or a fragment thereof comprising at least 10 consecutive amino acids of SEQ ID NO:108; and
a peptide, or a collection of tiled peptides, having the amino acid sequence selected from SEQ ID NOS: 109-111, an amino acid sequence having 90% identity to SEQ ID NOS:109-111, or a fragment thereof comprising at least 10 consecutive amino acids of SEQ ID NOS:109-111; and/or a vaccine comprising:
(v) at least two peptides, wherein each peptide, or a collection of tiled peptides, comprises a different amino acid sequence selected from SEQ ID NOS:200-206, an amino acid sequence having 90% identity to SEQ ID NOS:200-206, or a fragment thereof comprising at least 10 consecutive amino acids of SEQ ID NOS:200-206.

Preferably, the storage facility comprises at least 5, at least 10, or at least 20 vaccines as disclosed herein.

In a preferred embodiment, the disclosure provides a method for providing a vaccine for immunizing a patient against a cancer in said patient comprising determining the sequence of GATA3; TP53; CDH1; MAP3K1 or RUNX1 in cancer cells of said cancer and when the determined sequence comprises a frameshift mutation that produces a neoantigen of SEQ ID NOS:1-234 or a fragment thereof, providing a vaccine comprising said neoantigen or a fragment thereof. Preferably, the vaccine is obtained from a storage facility as disclosed herein.

REFERENCE TO A SEQUENCE LISTING

The Sequence listing, which is a part of the present disclosure, includes a text file comprising amino acid and/or nucleic acid sequences. The subject matter of the Sequence listing is incorporated herein by reference in its entirety. The information recorded in computer readable form is identical to the written Sequence listing In the event of a discrepancy between the sequence listing and the description, e.g., in regard to a sequence or sequence numbering, the description (e.g., Table 1) is leading.

DETAILED DESCRIPTION OF THE DISCLOSED EMBODIMENTS

One issue that may arise when considering personalized cancer vaccines is that once a tumor from a patient has been analysed (e.g. by whole genome or exome sequencing), neoantigens need to be selected and made in a vaccine. This may be a time consuming process, while time is something the cancer patient usually lacks as the disease progresses.

Somatic mutations in cancer can result in neoantigens against which patients can be vaccinated. Unfortunately, the quest for tumor specific neoantigens has yielded no targets that are common to all tumors, yet foreign to healthy cells. Single base pair substitutions (SNVs) at best can alter 1 amino acid which can result in a neoantigen. However, with the exception of rare site-specific oncogenic driver mutations (such as RAS or BRAF) such mutations are private and thus not generalizable.

An "off-the-shelf" solution, where vaccines are available against each potential-neoantigen would be beneficial. The present disclosure is based on the surprising finding that, despite the fact that there are infinite possibilities for frame shift mutations in the human genome, a vaccine can be developed that targets the novel amino acid sequence following a frame shift mutation in a tumor with potential use in a large population of cancer patients.

Neoantigens resulting from frame shift mutations have been previously described as potential cancer vaccines. See, for example, WO95/32731, WO2016172722 (Nantomics), WO2016/187508 (Broad), WO2017/173321 (Neon Therapeutics), US2018340944 (University of Connecticut), and WO2019/012082 (Nouscom), as well as Rahma et al. (Journal of Translational Medicine 2010 8:8) which describes peptides resulting from frame shift mutations in the von Hippel-Lindau tumor suppressor gene (VHL) and Rajasagi et al. (Blood 2014 124 (3): 453-462) which reports the systematic identification of personal tumor specific neoantigens.

The present disclosure provides a unique set of sequences resulting from frame shift mutations and that are shared among breast cancer patients. The finding of shared frame shift sequences is used to define an off-the-shelf breast cancer vaccine that can be used for both therapeutic and prophylactic use in a large number of individuals.

In the present disclosure we provide a source of common neoantigens induced by frame shift mutations, based on analysis of 986 TCGA breast tumor samples and 568 and 1918 breast tumor samples from other resources (see Priestley et al. 2019 at doi.org/10.1101/415133 and Razavi et al. 2018 Cancer Cell 34:427-438, respectively). We find that these frame shift mutations can produce long neoantigens. These neoantigens are typically new to the body, and can be highly immunogenic. The heterogeneity in the mutations that are found in tumors of different organs or tumors from a single organ in different individuals has always hampered the development of specific medicaments directed towards such mutations. The number of possible different tumorigenic mutations, even in a single gene as P53 was regarded prohibitive for the development of specific treatments. In the present disclosure it was found that many of the possible different frame shift mutations in a gene converge to the same small set of 3' neo open reading frame peptides (neopeptides or NOPs). We find a fixed set of only 1,244 neopeptides in as much as 30% of all TCGA cancer patients. For some tumor classes this is higher; e.g. for colon and cervical cancer, peptides derived from only ten genes (saturated at 90 peptides) can be applied to 39% of all patients. 50% of all TCGA patients can be targeted at saturation (using all those peptides in the library found more than once). A pre-fabricated library of vaccines (peptide, RNA or DNA) based on this set can provide off the shelf, quality certified, 'personalized' vaccines within hours, saving months of vaccine preparation. This is important for critically ill cancer patients with short average survival expectancy after diagnosis.

The concept of utilizing the immune system to battle cancer is very attractive and studied extensively. Indeed, neoantigens can result from somatic mutations, against which patients can be vaccinated1-11. Recent evidence suggests that frame shift mutations, that result in peptides which are completely new to the body, can be highly immunogenic12-15. The immune response to neoantigen vaccination, including the possible predictive value of epitope selection has been studied in great detail8, 13, 16-21 and WO2007/101227, and there is no doubt about the promise of neoantigen-directed immunotherapy. Some approaches find subject-specific neoantigens based on alternative reading frames caused by errors in translation/transcription (WO2004/111075). Others identify subject specific neoantigens based on mutational analysis of the subjects tumor that is to be treated (WO1999/058552; WO2011/143656; US20140170178; WO2016/187508; WO2017/173321). The quest for common antigens, however, has been disappointing, since virtually all mutations are private. For SNV-derived amino acid changes, one can derive algorithms that predict likely good epitopes, but still every case is different.

A change of one amino acid in an otherwise wild-type protein may or may not be immunogenic. The antigenicity depends on a number of factors including the degree of fit of the proteasome-produced peptides in the MHC and ultimately on the repertoire of the finite T-cell system of the patient. In regards to both of these points, novel peptide sequences resulting from a frame shift mutation (referred to herein as novel open reading frames or pNOPs) are a priori expected to score much higher. For example, a fifty amino acid long novel open reading frame sequence is as foreign to the body as a viral antigen. In addition, novel open reading frames can be processed by the proteasome in many ways, thus increasing the chance of producing peptides that bind MHC molecules, and increasing the number of epitopes will be seen by T-cell in the body repertoire.

It is has been established that novel proteins/peptides can arise from frameshift mutations[32,36]. Furthermore, tumors with a high load of frameshift mutations (micro-satellite instable tumors) have a high density of tumor infiltrating CD8+ T cells[33]. In fact, it has been shown that neo-antigens derived from frameshift mutations can elicit cytotoxic T cell responses[32,34,33]. A recent study demonstrated that a high load of frameshift indels or other mutation types correlates with response to checkpoint inhibitors[35].

Binding affinity to MHC class-I molecules was systematically predicted for frameshift indel and point mutations derived neoantigens[35]. Based on this analysis, neoantigens derived from frameshifts indels result in 3 times more high-affinity MHC binders compared to point mutation derived neoantigens, consistent with earlier work[31]. Almost all frameshift derived neoantigens are so-called mutant-specific binders, which means that cells with reactive T cell receptors for those frameshift neoantigens are (likely) not cleared by immune tolerance mechanisms[35]. These data are all in favour of neo-peptides from frameshift being superior antigens.

Here we report that frame shift mutations, which are also mostly unique among patients and tumors, nevertheless converge to neo open reading frame peptides (NOPs) from their translation products that surprisingly result in common neoantigens in large groups of cancer patients. The disclosure is based, in part, on the identification of common, tumor specific novel open reading frames resulting from frame shift mutations. Accordingly, the present disclosure provides novel tumor neoantigens and vaccines for the treatment of cancer. In some embodiments, multiple neoantigens corresponding to multiple NOPs can be combined, preferably within a single peptide or a nucleic acid molecule encoding such single peptide. This has the advantage that a large percentage of the patients can be treated with a single vaccine.

While not wishing to be bound by theory, the surprisingly high number of frame shift induced novel open reading frames shared by cancer patients can be explained, at least in part, as follows. Firstly, on the molecular level, different frame shift mutations can lead to the generation of shared novel open reading frames (or sharing at least part of a novel open reading frame). Secondly, the data presented herein suggests that frame shift mutations are strong loss-of-function mutations. This is illustrated in FIG. 2A, where it can be seen that the SNVs in the TCGA database are clustered within the p53 gene, presumably because mutations elsewhere in the gene do not inactive gene function. In contrast, frame shift mutations occur throughout the p53 gene (FIG. 2B). This suggests that frame shift mutations virtually anywhere in the p53 ORF reduce function (splice variants possibly excluded), while not all point mutations in p53 are expected to reduce function. Finally, the process of tumorigenesis naturally selects for loss of function mutations in genes that may suppress tumorigenesis. Interestingly, the present disclosure identifies frame shift mutations in genes that were not previously known as classic tumor suppressors, or that apparently do so only in some tissue tumor types (see, e.g., FIG. 8). These three factors are likely to contribute to the surprisingly high number of frame shift induced novel open reading frames shared by cancer patients; in particular, while frame shift mutations generally represent less than 10% of the mutations in cancer cells, their contribution to neoantigens and potential as vaccines is much higher. The high immunogenic potential of peptides resulting from frameshifts is to a large part attributable to their unique sequence, which is not part of any native protein sequence in humans, and would therefore not be recognised as 'self' by the immune system, which would lead to immune tolerance effects. The high immunogenic potential of out-of-frame peptides has been demonstrated in several recent papers.

Neoantigens are antigens that have at least one alteration that makes them distinct from the corresponding wild-type, parental antigen, e.g., via mutation in a tumor cell. A neoantigen can include a polypeptide sequence or a nucleotide sequence As used herein the term "ORF" refers to an open reading frame. As used herein the term "neoORF" is a tumor-specific ORF (i.e., neoantigen) arising from a frame shift mutation.

Peptides arising from such neo ORFs are also referred to herein as neo open reading frame peptides (NOPs) and neoantigens.

A "frame shift mutation" is a mutation causing a change in the frame of the protein, for example as the consequence of an insertion or deletion mutation (other than insertion or deletion of 3 nucleotides, or multitudes thereof). Such frameshift mutations result in new amino acid sequences in the C-terminal part of the protein. These new amino acid sequences generally do not exist in the absence of the frameshift mutation and thus only exist in cells having the mutation (e.g., in tumor cells and pre-malignant progenitor cells).

FIGS. 3 and 4 and the data discussed above provide the answer to the question: how many cancer patients exhibit in their tumor a frame shift in region x or gene y of the genome. The patterns result from the summation of all cancer patients. The disclosure surprisingly demonstrates that within a single cancer type (i.e. breast cancer), the fraction of patients with a frame shift in a subset of genes is much higher than the fractions identified when looking at all cancer patients. We find that careful analysis of the data shows that frame shift mutations in only five genes together are found in 20% of all breast cancers.

Novel 3' neo open reading frame peptides (i.e., NOPs) of GATA3, CDH1, MAP3K1, RUNX1, and TP53 are depicted in table 1. The NOPs, are defined as the amino acid sequences encoded by the longest neo open reading frame sequence identified. SEQ ID NOS: of these NOPs are represented in table 1 as follows:

GATA3: SEQ ID NOS:1-16, and 231-234; more preferably sequences 1-6.

TP53: SEQ ID NOS:17-44, more preferably sequences 17-30.

CDH1: SEQ ID NOS:45-107, more preferably sequences 45-55.

MAP3K1: SEQ ID NOS:108-199, more preferably sequences 108-117.

RUNX1: SEQ ID NOS:200-230, more preferably sequences 200-212.

The most preferred neoantigens are GATA3 frameshift mutation peptides, followed by TP53 frameshift mutation peptides, followed by CDH1 frameshift mutation peptides, followed by MAP3K1 frameshift mutation peptides, followed by RUNX1 frameshift mutation peptides. The preference for individual neoantigens directly correlates with the frequency of their occurrence in breast cancer patients, with GATA3 frameshift mutation peptides covering 9.2% of breast cancer patients, TP53 frameshift mutation peptides covering 5% of breast cancer patients, CDH1 frameshift mutation peptides covering 3.6% of breast cancer patients, MAP3K1 frameshift mutation peptides covering 3% of breast cancer patients, and RUNX1 frameshift mutation peptides covering 1.7% of breast cancer patients. Frameshift mutation peptides in additional genes cover additional breast cancer patients, such as TBX3 (1.6%), ARID1A (1.5%), PTEN (1%). For example, SEQ ID NOS:1 and 2 or an amino acid sequence having 90% identity to SEQ ID NOS:1 and 2, or a fragment thereof comprising at least 10 consecutive amino acids of SEQ ID NOS:1 and 2 are highly preferred neoantigens. Specifically, the C-terminal (3') part of SEQ ID NOS: 1 and 2 are highly preferred neoantigens, covering 7.5% of all breast cancer patients (see FIG. 10).

TABLE 1

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 1 | pNOP24385 | 113 | PGRPLQTHVLPEPHLALQPLQPHADHAHADAPAIQPVLWTTPPLQHGHRHG LEPCSMLTGPPARVPAVPFDLHFCRSSIMKPKRDGYMFLKAESKIMFATLQRS SLWCLCSNH | GATA3 | 4.58 |
| 2 | pNOP146515 | 48 | AQAKAVCSQESRDVLCELSDHHNHTLEEECQWGPCLQCLWALLQASQY | GATA3 | 2.82 |
| 3 | pNOP111297 | 57 | PRPRRCTRHPACPLDHTTPPAWSPPWVRALLDAHRAPSESPCSPFRLAFLQE QYHEA | GATA3 | 0.89 |
| 4 | pNOP101981 | 60 | TDRTGPSLSPSEGCLQPGEQGRPVRTVRPPQPHSGGGMPMGTLSAMPVGST TSFTILTDP | GATA3 | 0.37 |
| 5 | pNOP481880 | 18 | QTPDYEEGRHPDQKPKNV | GATA3 | 0.23 |
| 6 | pNOP160582 | 46 | RRKASRPETEKCLANPKSAKKCMTHWRTSPRTARLTRPPSPDTCPP | GATA3 | 0.12 |
| 7 | pNOP1989 alt splice a | 250 | HRRSRQPRPALLRKLGQGHGAEVPSDPPREPGVPPASASWIPTLAGRRQSPG QPPHRLPLESQPLLQDVHPPRLPGAPLRLPPGLVLLLVGGPRQPAPLHLPAHP AEGRLPGPIAVHPRLGRLGPAGRERVPQVPGAPARQHEAGVVPLPWQHDRP GWSLLVDPPPHHHLPALRARVQLRTLPPQQPAGRLPHRLRMQVQAQGPVQ HRRQGVCELWGNLDPTVAARWHGTLPVQRLRALSQNERTEPAPH | GATA3 | 0.09 |
| 8 | pNOP2004 alt splice a | 249 | HRRSRQPRPALLRKLGQGHGAEVPSDPPREPGVPPASASWIPTLAGRRQSPG QPPHRLPLESQPLLQDVHPPRLPGAPLRLPPGLVLLLVGGPRQPAPLHLPAHP AEGRLPGPIAVHPRLGRLGPAGRERVPQVPGAPARQHEAGVVPLPWQHDRP GWSLLVDPPPHHHLPALRARVQLRTLPPQQPAGRLPHRLRMQVQAQGPVQ HRQGVCELWGNLDPTVAARWHGTLPVQRLRALSQNERTEPAPH | GATA3 | 0.09 |
| 9 | pNOP104436 aft splice b | 59 | PPWVEPPRRPTTPSPPTRPTCPSTAPDSSPPAACWAAPPPASDASPGPRPGP AQKAGSV | GATA3 | <.01 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 10 | pNOP107768 alt splice b | 58 | PPWVEPPRRPTTPSPPTRPTCPSTAPDSSPPAACWAAPPPASDASPGPRPGPAQAGSV | GATA3 | <.01 |
| 11 | pNOP133723 | 51 | HGGDGGPAALGEPPPPRRAQRAAPGHAPPGPQPLLHGRGAVPAAGGGGCAF | GATA3 | <.01 |
| 12 | pNOP315778 | 28 | TVGQPRPHCGGEMARDTTCATPAGSITK | GATA3 | <.01 |
| 13 | pNOP5779 | 182 | ATTTPPCSTGSTRTRTTRASATPTWTRRSTRCRRRWMCFLTSTVKATTSRPTTETRSGPRCRGTLRPTTGARCAARLCFMDPYPGWTAAKPWAATTPPPPGISAPSPRRPSTTAPRGPSPSTPRPRPPPCRGATPARTSSPSRPPRRRTSPRTHRCPPQARPARPGRTRKSASSTRCPCPTA | GATA3 | <.01 |
| 14 | pNOP621902 | 12 | ATSRPSATPATC | GATA3 | <.01 |
| 15 | pNOP668144 | 11 | LTGGLPQEQLV | GATA3 | <.01 |
| 16 | pNOP716595 | 10 | SWSRPTPVAA | GATA3 | <.01 |
| 17 | pNOP36301 alt splice c | 97 | TGGPSSPSSHWKTPVVIYWDGTALRCVFVPVLGETGAQRKRISARKGSLTTSCPQGALSEHCPTTPAPLPSQRRNHWMENISPFRSVGVSASRCSES | TP53 | 1.07 |
| 18 | pNOP49591 | 85 | SSQNARGCSPRGPCTSSSYTGGPCTSPLLAPVIFCPFPENLPGQLRFPSGLLAFWDSQVCDLHVLPCPQQDVLPTGQDLPCAAVG | TP53 | 1.07 |
| 19 | pNOP31232 alt splice c | 103 | TGGPSSPSSHWKTPVVIYWDGTALRCVFVPVLGETGAQRKRISARKGSLTTSCPQGALSEHCPTTPAPLPSQRRNHWMENISPFRTRPAFKKKIVKESMKMVL | TP53 | 1.01 |
| 20 | pNOP38141 alt splice c | 95 | TGGPSSPSSHWKTPVVIYWDGTALRCVFVPVLGETGAQRKRISARKGSLTTSCPQGALSEHCPTTPAPLPSQRRNHWMENISPFRCYLTYDGVTS | TP53 | 1.01 |
| 21 | pNOP59073 | 78 | CCPRTILNNGSLKTQVQMKLPECQRLLPPWPLHQQLLHRRPLHQPPPGPCHLLSLPRKPTRAATVSVWASCILGQPSL | TP53 | 0.78 |
| 22 | pNOP70126 | 72 | GAAPTMSAAQIAMVWPLLSILSEWKEICVWSIWMTETLFDIVWWCPMSRLRLALTVPPSTTTTCVTVPAWAA | TP53 | 0.63 |
| 23 | pNOP158914 | 46 | LARTPLPSTRCFANWPRPALCSCGLIPHPRPAPASAPWPSTSSHST | TP53 | 0.43 |
| 24 | pNOP272502 | 31 | FHTPARHPRPRHGHLQAVTAHDGGCEALPPP | TP53 | 0.20 |
| 25 | pNOP252394 | 33 | GACLCLSWERPAHRGRESPQERGASPRAAPREH | TP53 | 0.14 |
| 26 | pNOP193414 alt splice d | 40 | ASTAQQHQLLSPAKEETTGWRIFHPSGPDQLSKRKLLKRA | TP53 | 0.12 |
| 27 | pNOP281999 alt splice d | 30 | ASTAQQHQLLSPAKEETTGWRIFHPSDPWA | TP53 | 0.09 |
| 28 | pNOP293143 alt splice d | 29 | ASTAQQHQLLSPAKEETTGWRIFHPSDAT | TP53 | 0.09 |
| 29 | pNOP385655 | 23 | QFLHGRHEPEAHPHHHHTGRLQW | TP53 | 0.09 |
| 30 | pNOP433152 | 20 | HGHLQAVTAHDGGCEALPPP | TP53 | 0.09 |
| 31 | pNOP405064 | 22 | RWSGPSSASYPSGRKFACGVFG | TP53 | 0.06 |
| 32 | pNOP136003 | 51 | SPKRVSLPPAIKNSCSRQKGLTQTDILHFLFPTDSLPPPSLPPLPFWVLGL | TP53 | 0.03 |
| 33 | pNOP316190 | 28 | VRKHFQTYGNYFLKTTFCPPCRPKQWMI | TP53 | 0.03 |
| 34 | pNOP367554 | 24 | MRPWNSRMPRLGRSQGGAGLTPAT | TP53 | 0.03 |
| 35 | pNOP539666 | 15 | DVLPTGQDLPCAAVG | TP53 | 0.03 |
| 36 | pNOP602122 | 13 | KQRSVPLAVPSNG | TP53 | 0.03 |
| 37 | pNOP224126 | 36 | CFANWPRPALCSCGLIPHPRPAPASAPWPSTSSHST | TP53 | <.01 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 38 | pNOP243169 | 34 | GLGTQGCPGWEGARGEQGSLQPPEVQKGSVYLPP | TP53 | <.01 |
| 39 | pNOP445026 | 20 | TRRKLKILSVGVSASRCSES | TP53 | <.01 |
| 40 | pNOP483390 | 18 | RRAPSESGNIFRPMETTS | TP53 | <.01 |
| 41 | pNOP59708 | 78 | LRLTFSTSCSPLTASHPHLSLPCHFGFWVFEPLLAIGVRQKHPGLPFALSRGSTEQVGLHWCFVVGRRMGSRTYQLRF | TP53 | <.01 |
| 42 | pNOP604680 | 13 | LTMVLLPDKLVVS | TP53 | <.01 |
| 43 | pNOP619453 | 13 | WRSRSQILASSPL | TP53 | <.01 |
| 44 | pNOP703537 | 10 | LYHHPLQLHV | TP53 | <.01 |
| 45 | pNOP68931 | 73 | PTDPFLGLRLGLHLQKVFHQSHAEYSGAPPPPPAPSGLRFWNPSRIAHISQLLSWPQKTEERLGYSSHQLPRK | CDH1 | 0.49 |
| 46 | pNOP35899 | 97 | IQWGTTTAPRPIRPPFLESKQNCSHFPTPLLASEDRRETGLFLPSAAQKMKKAHFLKTWFRSNPTKTKKARFSTASLAKELTHPLLVSLLLKEKQDG | CDH1 | 0.40 |
| 47 | pNOP162561 | 45 | CRPSSQYISLHSRTNTRGECQLDHSVQRPNPRIYHFEAKDGLRGG | CDH1 | 0.32 |
| 48 | pNOP163094 | 45 | FCCSCCFFGGERWSKSPYCPQRMTPGTTFITMMKKEAEKRTRTLT | CDH1 | 0.23 |
| 49 | pNOP137662 | 50 | EGTACRSRIANSCHSGDSWRNSCFANSDSAALAVSSEESGGQRALTAPRG | CDH1 | 0.20 |
| 50 | pNOP123893 | 54 | WALGAAASRRCCCCCRSPLGSARSRSPATLALTPRATRSRCPGATWREAASWAE | CDH1 | 0.17 |
| 51 | pNOP164097 | 45 | KESGSVRGLWRGPGNHILHCPGARHIYGTENNISDLERHCQLAGD | CDH1 | 0.14 |
| 52 | pNOP196613 | 40 | MKPPSLCLLKREWKCPRTLAWARKSHPTLPRSQTHLWNRK | CDH1 | 0.12 |
| 53 | pNOP205726 | 39 | RSACVTVKGPLASVGRHSLSKQDCKFLPFWGFLEEFLLC | CDH1 | 0.12 |
| 54 | pNOP359415 | 25 | WWTICRHHKSSEQRWHFENSKGLGF | CDH1 | 0.12 |
| 55 | pNOP441910 | 20 | RRCTNPHECPPVSSPPCQSR | CDH1 | 0.12 |
| 56 | pNOP266995 | 32 | QSLWIENALPHTLSSLTLCHPTGMQLRIQWRF | CDH1 | 0.09 |
| 57 | pNOP312388 | 28 | QEHRSHQCGHHWAGPREFPYVYPGGSSC | CDH1 | 0.09 |
| 58 | pNOP365712 | 24 | KPGSDQIQQRQRRQGFLQHHWPRS | CDH1 | 0.09 |
| 59 | pNOP98858 | 61 | TPTMPPSLTPSSAKILSSLTKICSPLTGTQESSVWSPLGWTERVSLRIPWWFKLLTFKVRG | CDH1 | 0.09 |
| 60 | pNOP254972 | 33 | LQSKGLYGFITHRSISWSTPGTPPTESFPPKSR | CDH1 | 0.06 |
| 61 | pNOP260719 | 32 | AREEQHVHSPNHSYRQWFSSCYWNRDTSADPV | CDH1 | 0.06 |
| 62 | pNOP297360 | 29 | KRLILTPQPRLMILCSCLTMKEAVPKLLV | CDH1 | 0.06 |
| 63 | pNOP311770 | 28 | PIRMTTSPNSPRRSLRGLSWKVLFQEPL | CDH1 | 0.06 |
| 64 | pNOP335653 | 26 | ILKIAPVDKGQPIFPSTPDSKWAQMV | CDH1 | 0.06 |
| 65 | pNOP499804 | 17 | LMLMPPIPQRGRLYTPY | CDH1 | 0.06 |
| 66 | pNOP509630 | 17 | TSLMQTFLPIHLPSQQN | CDH1 | 0.06 |
| 67 | pNOP523454 | 16 | LQTMVLQLLLEQGHFC | CDH1 | 0.06 |
| 68 | pNOP243761 | 34 | HIGFGETLPTGWRLIRTLVPFPLGLSWTGRILST | CDH1 | 0.03 |
| 69 | pNOP247500 | 34 | RLHRSTKDSLFFPRHPIQSGHRWCDYSQKASTVS | CDH1 | 0.03 |
| 70 | pNOP290560 alt splice e | 30 | SQSLTPTIILRSSIPPRAWILRPSSSTFYT | CDH1 | 0.03 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 71 | pNOP302320 alt splice e | 29 | SQSLTPTIILRSSIPPRTRVRCLRTRLTS | CDH1 | 0.03 |
| 72 | pNOP371119 | 24 | RRELHVHGAPAPPGERPRPGQSEF | CDH1 | 0.03 |
| 73 | pNOP383738 | 23 | MTTPPYQNLELYSSVRGIQSLRS | CDH1 | 0.03 |
| 74 | pNOP387003 | 23 | RMWYLLRSLSPPPQPPSPWMCWM | CDH1 | 0.03 |
| 75 | pNOP442322 | 20 | RTHCIHSLLSRCVIQRECS | CDH1 | 0.03 |
| 76 | pNOP472687 | 18 | GLSHHLHSHRHRGCAGCE | CDH1 | 0.03 |
| 77 | pNOP490664 | 17 | CEHLQCRHRLHHPQPRS | CDH1 | 0.03 |
| 78 | pNOP498423 | 17 | KQQRAWILRPSSSTFYT | CDH1 | 0.03 |
| 79 | pNOP538388 | 15 | CPQYPSVGGCIHHIE | CDH1 | 0.03 |
| 80 | pNOP633787 | 12 | LEPAAQGPGRSA | CDH1 | 0.03 |
| 81 | pNOP656416 | 11 | EESKASGHKHH | CDH1 | 0.03 |
| 82 | pNOP202693 | 39 | HVRRRRGRLGDSREAGPRPMCWEMQKSRCWWFFSSLPLR | CDH1 | <.01 |
| 83 | pNOP263306 | 32 | HGPLEPQPLGAAAAAAGLLLALPGAGALPPWL | CDH1 | <.01 |
| 84 | pNOP379760 | 23 | GVCHGRCSSRNLCDGGHSHRRGR | CDH1 | <.01 |
| 85 | pNOP408019 | 22 | VSPGIFPALPIPMKLEILLMKI | CDH1 | <.01 |
| 86 | pNOP414918 | 21 | HTGRVPTGPFSTTTQPKNLSF | CDH1 | <.01 |
| 87 | pNOP462763 | 19 | RWVTTKSISSSWITRIKTK | CDH1 | <.01 |
| 88 | pNOP467296 | 19 | YGTENNISDLERHCQLAGD | CDH1 | <.01 |
| 89 | pNOP494963 | 17 | GQAAVHSTRSSDECGTF | CDH1 | <.01 |
| 90 | pNOP556436 | 15 | SELPELLRVRQRPGL | CDH1 | <.01 |
| 91 | pNOP585380 alt splice f | 14 | SSDLQSHHVQGSGA | CDH1 | <.01 |
| 92 | pNOP597964 | 13 | GSNGDFDHGNRSE | CDH1 | <.01 |
| 93 | pNOP598198 | 13 | GVKHNSNSCDHSH | CDH1 | <.01 |
| 94 | pNOP602266 | 13 | KRNRMAEGDRASG | CDH1 | <.01 |
| 95 | pNOP603708 | 13 | LLERMGQSLQEAG | CDH1 | <.01 |
| 96 | pNOP605229 | 13 | MMMVDNLSSPQIQ | CDH1 | <.01 |
| 97 | pNOP609656 | 13 | QRPHTRTSNYILL | CDH1 | <.01 |
| 98 | pNOP616731 | 13 | TPQSQTKTRTMTT | CDH1 | <.01 |
| 99 | pNOP621664 | 12 | ASCTGAWTLGLK | CDH1 | <.01 |
| 100 | pNOP646263 alt splice f | 12 | SSDLQSHHGLGF | CDH1 | <.01 |
| 101 | pNOP669584 | 11 | NGDFDHGNRSE | CDH1 | <.01 |
| 102 | pNOP676234 | 11 | RPSDHLRGQRV | CDH1 | <.01 |
| 103 | pNOP684840 | 11 | WRSQPQTRTMM | CDH1 | <.01 |
| 104 | pNOP709338 | 10 | QQARIHPGGL | CDH1 | <.01 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 105 | pNOP712539 | 10 | RRRRRRGPGL | CDH1 | <.01 |
| 106 | pNOP714207 | 10 | SGHWCHFHSG | CDH1 | <.01 |
| 107 | pNOP85108 | 66 | TNGAIASRSWLTCTEAARTTRGLERGGPQTHVLGNAEITLLVVFQLPSLEMSF WGKKRDWLVMQLV | CDH1 | <.01 |
| 108 | pNOP80315 | 68 | VSRRGPGKCGFTSFQRPTQSFSWQLPIRSHSEIRISRSKEKKSFPSAFSEWQNH TTPKSPFTRWLLTI | MAP3K1 | 0.37 |
| 109 | pNOP197571 | 40 | QHWSETKNCRFWSCSQVGIKRNWCRRVSGTITGDNCIYGT | MAP3K1 | 0.23 |
| 110 | pNOP31404 | 102 | CFQPCQPULLPHLYQLALQQMSLSIDFRDSFPAEYLLHLLKHSASFLYNSTETVL KTKTQINFPQSLLSQDPCPPVTYTGQSHLDLPQVIQVNREIPQKIA | MAP3K1 | 0.23 |
| 111 | pNOP226356 | 36 | IDCCWNFLLNFILILSVLMFHKLSLLKSGIRSCCPS | MAP3K1 | 0.14 |
| 112 | pNOP120630 | 54 | CQWGPAVGKWGEHWKFWGQQWKCIPEWGSHQWVFPDQYLRRCGGGM LQRSVNGLC | MAP3K1 | 0.12 |
| 113 | pNOP201764 | 39 | FLSCRLKMEKISSLFNRIHQRLYQDIPKQNNRIEKTLNG | MAP3K1 | 0.12 |
| 114 | pNOP360358 | 24 | ARRSSRSTKRRDKNDEPSESSKHH | MAP3K1 | 0.12 |
| 115 | pNOP122927 | 54 | RILRLRVCSRNITVGVAQGSKLHLVTPSRSLFHACQILIHCHHLVLLRLVQKTA | MAP3K1 | 0.09 |
| 116 | pNOP139478 | 50 | PCLQSVRCCFKNIESHAGIYSLPQFSGKNQTSETSPASCRHHPSQMCRCQ | MAP3K1 | 0.09 |
| 117 | pNOP194698 | 40 | GGNCRSHPVGRRHFGWSTGQLLAGICSQQLSGNHREQFP | MAP3K1 | 0.09 |
| 118 | pNOP224982 | 36 | ELQILELQPGWHQKELVQESFRDNYWGQLHLWHLRY | MAP3K1 | 0.09 |
| 119 | pNOP336754 | 26 | KWRRYHHYSTGYTRDSTRTYQSKTTV | MAP3K1 | 0.09 |
| 120 | pNOP367569 | 24 | MSIQSSTPVLRTFLKHLCLQVIQQ | MAP3K1 | 0.09 |
| 121 | pNOP78143 | 69 | YVPFVDLSGDLMISTATSCQVLWIPLLPSELHSSKPYSSSLWLDHEGIKRAILTLLI MELSKSLLLTKI | MAP3K1 | 0.09 |
| 122 | pNOP116733 | 55 | CNYCSIDPFTFVSWFTRCGSSLFRTSTSGQTSIKRATEASSLSYYMVANYADQL Q | MAP3K1 | 0.06 |
| 123 | pNOP121052 | 54 | FPLNGWQTFQKDLLEFCKNGYYSTPCVFKTVRNAECFQFHSLHQDASPFDGY CR | MAP3K1 | 0.06 |
| 124 | pNOP187727 | 41 | GEKEFPQCLFRVAESHHPEEPLHQMASHHIALRKQTAVLTK | MAP3K1 | 0.06 |
| 125 | pNOP194503 | 40 | FLQPRVVKSCGFPFFPQSCTAANRTAAAFGWITKESREQF | MAP3K1 | 0.06 |
| 126 | pNOP212034 | 38 | PHKSAVHINTVGTVQRPSRRVGSWQRNTKSWIHWYWWC | MAP3K1 | 0.06 |
| 127 | pNOP256729 | 33 | QLSLQERSRQVRLHQLPKADAVLLLATPHQVAQ | MAP3K1 | 0.06 |
| 128 | pNOP264595 | 32 | LEETAQTINTGCLLGLRTAAVHVEHSVFICYL | MAP3K1 | 0.06 |
| 129 | pNOP316970 | 28 | YLRLLVQLLLHRSLHICLLVYEMWLFVV | MAP3K1 | 0.06 |
| 130 | pNOP64417 | 75 | ERWPSGVFPMMSVGPCCWQMGRALEILGAAVEAARVGEPPVGLPRPVSQE MWWRHAAAFCQWSVLTLSTKCTLLL | MAP3K1 | 0.06 |
| 131 | pNOP223009 | 37 | VVEKKIMSAQAVSVVVRWRIKKLSKGCTRWMIVQRNE | MAP3K1 | 0.03 |
| 132 | pNOP239116 | 35 | SNVQMPIAAQVSCPYQHCWNCAKAKQESWQLAEKY | MAP3K1 | 0.03 |
| 133 | pNOP244756 | 34 | KTLWMVNRTASCRHLFPTTIWKPQRTVPLSAQSI | MAP3K1 | 0.03 |
| 134 | pNOP253661 | 33 | IIQTSLGCWEPRVRRAITISSLNGWQGDRWLIC | MAP3K1 | 0.03 |
| 135 | pNOP271334 | 31 | CMECWLCYYRNGLCKTTMECRKTLQSSCFDI | MAP3K1 | 0.03 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 136 | pNOP291483 | 30 | TVVPNVMTALAVAAIVVMLLYPVTRQCSPQ | MAP3K1 | 0.03 |
| 137 | pNOP298479 | 29 | MAERSTDRPWSIFFLLSGSRCGNWNFNGC | MAP3K1 | 0.03 |
| 138 | pNOP382700 | 23 | LLSQKLLSCLLKRLKMMIPTKMM | MAP3K1 | 0.03 |
| 139 | pNOP397851 | 22 | IVFLETKLNQTIGKNFLAAFVL | MAP3K1 | 0.03 |
| 140 | pNOP401956 | 22 | PLLCSPLIIPTQWLANFPEGST | MAP3K1 | 0.03 |
| 141 | pNOP468088 | 18 | ALEHFLLVIRLKMWELEL | MAP3K1 | 0.03 |
| 142 | pNOP535310 | 16 | WLLQMRWKLPKPSSWA | MAP3K1 | 0.03 |
| 143 | pNOP594196 | 13 | EAAVPLNLCFAVH | MAP3K1 | 0.03 |
| 144 | pNOP605820 | 13 | NFNLRTDLHQESY | MAP3K1 | 0.03 |
| 145 | pNOP611013 | 13 | RKESNFRDFSSQL | MAP3K1 | 0.03 |
| 146 | pNOP670032 | 11 | NLQTQCYGEKL | MAP3K1 | 0.03 |
| 147 | pNOP692020 | 10 | ETGQHFSRTF | MAP3K1 | 0.03 |
| 148 | pNOP94080 | 62 | FNNNNNNNNRATKANGSNKRQTPQSVFELLSFISSFPINVSSLVNPFFFYPICTSWHCNRCL | MAP3K1 | 0.03 |
| 149 | pNOP119437 | 55 | SIQSFVLHGSQLCRSTTVETGCSTREKKLVGNHIDILLAMMPLNSYERGQWGTLT | MAP3K1 | <.01 |
| 150 | pNOP133585 | 51 | GRRRRSPQGEQRARGCRGTAAGGGQRGPRAGGLAAAAAAQSAECGAGPAA | MAP3K1 | <.01 |
| 151 | pNOP140186 | 50 | RMKRNRCVLFACWACLMKKVLQCVKTAAGTSCTTTACQFGQKSVEEIENL | MAP3K1 | <.01 |
| 152 | pNOP158520 | 46 | IPGVYWASELQLCTWNILYSSAICDAPGVSTRTFRPNVMEKNFKEF | MAP3K1 | <.01 |
| 153 | pNOP282791 | 30 | DLLVQQQQQQQQQSNQSQWFKQKADPTVSV | MAP3K1 | <.01 |
| 154 | pNOP286430 | 30 | LLTTLNSYSVAFRISMKTKSFTEMSKVPIC | MAP3K1 | <.01 |
| 155 | pNOP303263 | 29 | TSGIHSLQNTFCISSNTAQVFSTIPQKLS | MAP3K1 | <.01 |
| 156 | pNOP314934 | 28 | SSRGTNDQGETEGNLYASLEARMVGKEK | MAP3K1 | <.01 |
| 157 | pNOP341052 | 26 | RRRSFSNCHGNVSVSGCPPHSSSAAG | MAP3K1 | <.01 |
| 158 | pNOP358464 | 25 | VHSPFRENWKRIMCYKIECQFRGHF | MAP3K1 | <.01 |
| 159 | pNOP386384 | 23 | RDSVHPSRGEMQIRCQYRAQLQY | MAP3K1 | <.01 |
| 160 | pNOP387248 | 23 | RQPVCQPGSTNGWKGEIGEGLWW | MAP3K1 | <.01 |
| 161 | pNOP400051 | 22 | LSHGFRCLEWNSLAAYFLETGM | MAP3K1 | <.01 |
| 162 | pNOP400858 | 22 | NGGGGGESRLVVGIPGRQGYEP | MAP3K1 | <.01 |
| 163 | pNOP446688 | 20 | WRIKKLSKGCTRWMIVQRNE | MAP3K1 | <.01 |
| 164 | pNOP455806 | 19 | KWLVQNHHGMQKNTPIILL | MAP3K1 | <.01 |
| 165 | pNOP45906 | 87 | AAALPCRLTAGLLDFPVAGARGRSGEWDRLPACGGAAAPRSREPRRRPPYRVGGGAGQRRLESRSGRARGEAGARRRAVSCSGPRRS | MAP3K1 | <.01 |
| 166 | pNOP462198 | 19 | RRLQEQAAPPLHVNLGRRV | MAP3K1 | <.01 |
| 167 | pNOP471366 | 18 | EVNSMEGAVMYGVLAVLL | MAP3K1 | <.01 |
| 168 | pNOP473845 | 18 | HHPEVCFTHVKFSYIVII | MAP3K1 | <.01 |
| 169 | pNOP496746 | 17 | IIIKSAKRRWKLKKKKL | MAP3K1 | <.01 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 170 | pNOP503554 | 17 | PYSLWNSANPSCLQRFS | MAP3K1 | <.01 |
| 171 | pNOP512752 | 16 | AMDSGVWNGTRWLLIF | MAP3K1 | <.01 |
| 172 | pNOP534454 | 16 | VLQEWLLQYPMCFQNC | MAP3K1 | <.01 |
| 173 | pNOP535898 | 16 | YELLQGGGLEWWRKRS | MAP3K1 | <.01 |
| 174 | pNOP544644 | 15 | IKQLARTSWPPLSYR | MAP3K1 | <.01 |
| 175 | pNOP546490 | 15 | KPNHSQRCQRCQFAN | MAP3K1 | <.01 |
| 176 | pNOP553311 | 15 | QSDAGQTVLTAADRA | MAP3K1 | <.01 |
| 177 | pNOP560491 | 15 | VPVQRTFLRDWPAFQ | MAP3K1 | <.01 |
| 178 | pNOP572874 | 14 | KLECERDGPQASFP | MAP3K1 | <.01 |
| 179 | pNOP5767 | 183 | WRRRGIAPRRRDSRAPGLRALRQAAAEEPSRRAARPRLPRDCCGRRAAGAASGRTGGGGSCAKCGVWSWTSCLSSRSSLPPHRRPPRLPRRRSPRTQRGVGPASSLWRCRRPTEPRAAAAPTLPSRWRRRTAAPRVPQRPSPGRSGRPPPSRLLQRPPPVVRWRIKKLSKGCTRWMIVQRNE | MAP3K1 | <.01 |
| 180 | pNOP580223 | 14 | QLPWQCQRLRMPSP | MAP3K1 | <.01 |
| 181 | pNOP586366 | 14 | TFPSLYSVKTLALQ | MAP3K1 | <.01 |
| 182 | pNOP587861 | 14 | VFPVPLTSPGCVAV | MAP3K1 | <.01 |
| 183 | pNOP601588 | 13 | KLDPLVLVVLIMS | MAP3K1 | <.01 |
| 184 | pNOP610732 | 13 | RGTDVSYLLVGHA | MAP3K1 | <.01 |
| 185 | pNOP634633 | 12 | LMSETHLLSKKK | MAP3K1 | <.01 |
| 186 | pNOP635798 | 12 | MDGRGIGGSFAE | MAP3K1 | <.01 |
| 187 | pNOP652895 | 11 | ARACGGKTNPS | MAP3K1 | <.01 |
| 188 | pNOP657154 | 11 | EPCWYILLATV | MAP3K1 | <.01 |
| 189 | pNOP660722 | 11 | GTKRSTVWKEL | MAP3K1 | <.01 |
| 190 | pNOP666179 | 11 | LCLKLYSWKPN | MAP3K1 | <.01 |
| 191 | pNOP666458 | 11 | LFPDWRRQPRQ | MAP3K1 | <.01 |
| 192 | pNOP670307 | 11 | NQSQLKEMDLK | MAP3K1 | <.01 |
| 193 | pNOP675489 | 11 | RKLEKDYVLQN | MAP3K1 | <.01 |
| 194 | pNOP688134 | 10 | CGPDCTYCSR | MAP3K1 | <.01 |
| 195 | pNOP698339 | 10 | IWSLQRISSY | MAP3K1 | <.01 |
| 196 | pNOP711852 | 10 | RNSQRVAQDG | MAP3K1 | <.01 |
| 197 | pNOP717177 | 10 | TGDLCQKHIF | MAP3K1 | <.01 |
| 198 | pNOP717868 | 10 | TPLLYLIIPN | MAP3K1 | <.01 |
| 199 | pNOP718723 | 10 | TVTPWPFVSP | MAP3K1 | <.01 |
| 200 | pNOP685 aft splice g | 338 | PSASESDAGYKADPTIPTVVLRSVLPIPGIHCLSFCAPSNAHFTWTCQRHDNPLCRTFQSTLNGTRPDSVQRPAPVPRAALHLRPPHALSRRLHLLPDAGHLGHRHRHVGHGLGHALPHLPAAALPRLVASAGRPVPSQLALLPPVLRRLGRLLPVLHGGRRALAAAHPAALHQRLHRLRAAQPQPPEPERRGGGRGQPQQLPHQHGALRAPGGGRVEALLRRQAWPGWAPRAAAFASGRAGLLFATSPPGSRALGPATVLGPRAPDGQDLAVGQARAASCAQKPTPPPSAGAPALAEVSEATHLEGVRRPQHPGDALESKQEDSRRETVNASDLAML | RUNX1 | 0.46 |

TABLE 1-continued

Library of NOP sequences
SEQ ID NOS: of NOPs including the percentage of patients identified in the present study with each NOP. The sequences referred to herein correspond to the sequence numbering in the table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 201 | pNOP28179 | 107 | RRPRCQHEPPLHAAFHRAEPRQDERGVAAGRPGRRRCPGRQAEERRPQHG GGAGRPPGRAGAHRQPQLPLLRAAYALALQQDPAHRFQGGGPRGCSRWHS GHCDGWQ | RUNX1 | 0.37 |
| 202 | pNOP135011 | 51 | PQVCRSKWKREKLHSDHHCLHKPTASRHLPQSHQNHSGWAPRTSKTSAETR | RUNX1 | 0.20 |
| 203 | pNOP352298 | 25 | MIRPSPGACPFPSGSVNWSSCGAQP | RUNX1 | 0.14 |
| 204 | pNOP115907 alt splice h | 56 | TTPLPLTLSLRVRCRIQGRSNHPHRGPTISPTNTWDPLPLLLCTQQRPFHLDVP AA | RUNX1 | 0.12 |
| 205 | pNOP142572 | 49 | GAATAAWWRCWPTTRASWCAPTAPTSSAPCCLRTGAATRPCPSLSRWWP QRSATRASSPRCPPSPTPACTIQAPSPTPRRRSPRASASACRPWARPRATTPTC RRPTPARRKRREARSKPARPPTTCTTAPRPAPTSSPWWAASARRRASCRPAPT PPPAPRCSTPASRTRATWWRPRAATATPPPTWRPPRAWRRPCGGPTEAPGL ARLGPAGRRLRLRARGPPVRDKPAGIPGPGPGHRPGAEGARRPGSRCRSGPR SLLRPEAHAAAVCWRPGPRGGVRGDAPRGCPPAPAPRGRAGKQTGRFPEG | RUNX1 | 0.12 |
| 206 | pNOP1630 | 265 | NCECF | RUNX1 | 0.12 |
| 207 | pNOP246619 alt splice j | 34 | PSLSSCITHRKSPPTTEPSKSQWMGPENLEDIGRN | RUNX1 | 0.09 |
| 208 | pNOP269003 | 32 | TGAAAAHSHEGQPTPPSPHAQPSCLPEPLHCL | RUNX1 | 0.06 |
| 209 | pNOP59911 alt splice g | 78 | PSASESDAGGRHSTLEMLRQKSVLLSIPLPSQDRAIFSISSSEETQKKDDSPQNA RYEEGRMWVCNSSVSLLPLCKPS | RUNX1 | 0.03 |
| 210 | pNOP18884 | 124 | NARSTAGTGAGGSGRPHAKPGCQHEPPLHAAFHRAEPRQDERGVAAGRPG RRRCPGROAEERRPQHGGGAGRPPGRAGAHRQPQLPLLRAAYALALQQDP AHRFQGGGPRGCSRWHSGHCDGWQ | RUNX1 | <.01 |
| 211 | pNOP206880 alt splice h | 39 | TTPLPLTLSLRVRCRRKTQHPGDVKAEVSSSVHPSPQPG | RUNX1 | <.01 |
| 212 | pNOP23436 alt splice i | 115 | VISFVPTVLHERCQHEPPLHAAFHRAEPRQDERGVAAGRPGRRRCPGRQAEE RRPQHGGGAGRPPGRAGAHRQPQLPLLRAAYALALQQDPAHRFQGGGPRG CSRWHSGHCDGWQ | RUNX1 | <.01 |
| 213 | pNOP241712 | 34 | CPQHRGDRRRGKRPPAREAGMPARAAASRRLPPR | RUNX1 | <.01 |
| 214 | pNOP26418 | 109 | DAYPRRCQHEPPLHAAFHRAEPRQDERGVAAGRPGRRRCPGRQAEERRPQH GGGAGRPPGRAGAHRQPQLPLLRAAYALALQQDPAHRFQGGGPRGCSRWH SGHCDGWQ | RUNX1 | <.01 |
| 215 | pNOP387672 | 23 | RTRLQDLMTSGLSVEVEEGKASL | RUNX1 | <.01 |
| 216 | pNOP415291 | 21 | ILLETSTMPARAAASRRLPPR | RUNX1 | <.01 |
| 217 | pNOP445668 alt splice i | 20 | VISFVPTVLHERMHTWNESF | RUNX1 | <.01 |
| 218 | pNOP458 | 374 | PQVCRSKWKREKLHSDHHCLHKPTASRHLPQSHQNHSGWAPRTSKYADPTI PTVVLRSVLPIPGIHCLSFCAPSNAHFTWTCQRHDNPLCRTFQSTLNGTRPDSV QRPAPVPRAALHLRPPHALSRRLHLLPDAGHLGHRHRHVGHGLGHALPHLPA AALPRLVASAGRPVPSQLALLPPVLRRLGRLLPVLHGGRRALAAAHPAALHQR LHRLRAAQPQPPEPERRGGGRGQPQQLPHQHGALRAPGGGRVEALLRRQA WPGWAPRAAAFASGRAGLLFATSPPGSRALGPATVLGPRAPDGQDLAVGQ ARAASCAQKPTPPPSAGAPALAEVSEATHLEGVRRPQHPGDALESKQEDSRR ETVNASDLAML | RUNX1 | <.01 |
| 219 | pNOP468446 | 18 | ARRCRWAPRTPALPWPAS | RUNX1 | <.01 |
| 220 | pNOP48701 | 85 | DERGVAAGRPGRRRCPGRQAEERRPQHGGGAGRPPGRAGAHRQPQLPLLR AAYALALQQDPAHRFQGGGPRGCSRWHSGHCDGWQ | RUNX1 | <.01 |
| 221 | pNOP511171 | 17 | WLQTAYLSHFLRTHSAS | RUNX1 | <.01 |
| 222 | pNOP518241 | 16 | GSAHTTQPPRPTLVPP | RUNX1 | <.01 |

TABLE 1-continued

Library of NOP sequences
SEQ ID NOS: of NOPs including the percentage of patients identified in the present study with
each NOP. The sequences referred to herein correspond to the sequence numbering in the
table below. Different predicted alternative splice forms are indicated as "alt splice x".

| SEQ ID NO: | PeptideID | Length (aa) | PeptideSeq | gene | % Breast Cancer Patients |
|---|---|---|---|---|---|
| 223 | pNOP527804 | 16 | QPSLQNFPVDSQRHPT | RUNX1 | <.01 |
| 224 | pNOP536626 | 15 | AEKCYRSHEEPGCKI | RUNX1 | <.01 |
| 225 | pNOP540378 | 15 | EMPARAAASRRLPPR | RUNX1 | <.01 |
| 226 | pNOP576438 | 14 | MPARAAASRRLPPR | RUNX1 | <.01 |
| 227 | pNOP583929 | 14 | SDQARELVLFRAAQ | RUNX1 | <.01 |
| 228 | pNOP684423 | 11 | WLAMMKTTRLS | RUNX1 | <.01 |
| 229 | pNOP694394 | 10 | GMFQMALW5L | RUNX1 | <.01 |
| 230 | pNOP74999 alt splice j | 70 | P5LSSQTHRKSPPTTEPSKSQWMGPENLEIQGR5NHPHRGPTISPTNTWDPL PLLLCTQQRPFHLDVPAA | RUNX1 | <.01 |
| 231 | | 71 | PLQHGHRHGLEPCSMLTGPPARVPAVPFDLHFCRSSIMKPKRDGYMFLKAES KIMFATLQRSSLWCLCSNH | GATA3 | |
| 232 | | 37 | RDVLCELSDHHNHTLEEECQWGPCLQCLWALLQASQY | GATA3 | |
| 233 | | 51 | TRHPACPLDHTTPPAWSPPWVRALLDAHRAPSESPCSPFRLAFLQEQYHEA | GATA3 | |
| 234 | | 40 | GRPVRTVRPPQPHSGGGMPMGTLSAMPVGSTTSFTILTDP | GATA3 | |

In a preferred embodiment the disclosure provides one or more frameshift-mutation peptides (also referred to herein as 'neoantigens') comprising an amino acid sequence selected from the groups:
(i) SEQ ID NOS:1-16 or 231-234, an amino acid sequence having 90% identity to SEQ ID NOS:1-16 or 231-234, or a fragment thereof comprising at least 10 consecutive amino acids of SEQ ID NOS:1-16 or 231-234;
(ii) SEQ ID NOS:17-44, an amino acid sequence having 90% identity to SEQ ID NOS:17-44, or a fragment thereof comprising at least 10 consecutive amino acids of SEQ ID NOS:17-44;
(iii) SEQ ID NOS:45-107, an amino acid sequence having 90% identity to SEQ ID NOS:45-107, or a fragment thereof comprising at least 10 consecutive amino acids of SEQ ID NOS:45-107;
(iv) SEQ ID NOS:108-199, an amino acid sequence having 90% identity to SEQ ID NOS:108-199, or a fragment thereof comprising at least 10 consecutive amino acids of SEQ ID NOS:108-199; and
(v) SEQ ID NOS:200-230, an amino acid sequence having 90% identity to SEQ ID NOS:200-230, or a fragment thereof comprising at least 10 consecutive amino acids of SEQ ID NOS:200-230.

As will be clear to a skilled person, the preferred amino acid sequences may also be provided as a collection of tiled sequences, wherein such a collection comprises two or more peptides that have an overlapping sequence. Such 'tiled' peptides have the advantage that several peptides can be easily synthetically produced, while still covering a large portion of the NOP. In an exemplary embodiment, a collection comprising at least 3, 4, 5, 6, 10, or more tiled peptides each having between 10-50, preferably 12-45, more preferably 15-35 amino acids, is provided. As described further herein, such tiled peptides are preferably directed to the C-terminus of a pNOP. As will be clear to a skilled person, a collection of tiled peptides comprising an amino acid sequence of SEQ ID NO:X, indicates that when aligning the tiled peptides and removing the overlapping sequences, the resulting tiled peptides provide the amino acid sequence of SEQ ID NO:X, albeit present on separate peptides. As is also clear to a skilled person, a collection of tiled peptides comprising a fragment of 10 consecutive amino acids of SEQ ID NO:X, indicates that when aligning the tiled peptides and removing the overlapping sequences, the resulting tiled peptides provide the amino acid sequence of the fragment, albeit present on separate peptides. When providing tiled peptides, the fragment preferably comprises at least 20 consecutive amino acids of a sequence as disclosed herein.

Specific NOP sequences cover a large percentage of breast cancer patients. Preferred NOP sequences, or subsequences of NOP sequence, are those that target the largest percentage of breast cancer patients. Preferred sequences are, preferably in this order of preference, SEQ ID NO:1 (4.6% of breast cancer patients) and SEQ ID NO:2 (2.8% of breast cancer patients), SEQ ID NO:17 (1.1% of breast cancer patients), SEQ ID NO:18 (1.1% of breast cancer patients), SEQ ID NO:3 (0.9% of breast cancer patients), SEQ ID NO:19 (1% of breast cancer patients), SEQ ID NO:20 (1% of breast cancer patients), SEQ ID NO:21 (0.8% of breast cancer patients), SEQ ID NO:22 (0.6% of breast cancer patients), SEQ ID NO:45 (0.5% of breast cancer patients), SEQ ID NO:200 (0.5% of breast cancer patients), SEQ ID NOS:4, 46, 201, 108, 23 (each covering 0.4% of breast cancer patients) and SEQ ID NOS:5-16, 24-44, 47-17, 109-199 and 202-230 (covering less than 0.4% of breast cancer patients).

As discussed further herein, neoantigens also include the nucleic acid molecules (such as DNA and RNA) encoding said amino acid sequences. The preferred sequences listed above are also the preferred sequences for the embodiments described further herein.

Preferably, the neoantigens and vaccines disclosed herein induce an immune response, or rather the neoantigens are immunogenic. Preferably, the neoantigens bind to an antibody or a T-cell receptor. In preferred embodiments, the neoantigens comprise an MHCI or MHCII ligand.

The major histocompatibility complex (MHC) is a set of cell surface molecules encoded by a large gene family in vertebrates. In humans, MHC is also referred to as human leukocyte antigen (HLA). An MHC molecule displays an antigen and presents it to the immune system of the vertebrate. Antigens (also referred to herein as 'MHC ligands') bind MHC molecules via a binding motif specific for the MHC molecule. Such binding motifs have been characterized and can be identified in proteins. See for a review Meydan et al. 2013 BMC Bioinformatics 14:S13.

MHC-class I molecules typically present the antigen to CD8 positive T-cells whereas MHC-class II molecules present the antigen to CD4 positive T-cells. The terms "cellular immune response" and "cellular response" or similar terms refer to an immune response directed to cells characterized by presentation of an antigen with class I or class II MHC involving T cells or T-lymphocytes which act as either "helpers" or "killers". The helper T cells (also termed CD4+ T cells) play a central role by regulating the immune response and the killer cells (also termed cytotoxic T cells, cytolytic T cells, CD8+ T cells or CTLs) kill diseased cells such as cancer cells, preventing the production of more diseased cells.

In preferred embodiments, the present disclosure involves the stimulation of an anti-tumor CTL response against tumor cells expressing one or more tumor-expressed antigens (i.e., NOPs) and preferably presenting such tumor-expressed antigens with class I MHC.

In some embodiments, an entire NOP (e.g., SEQ ID NO:1) may be provided as the neoantigen (i.e., peptide). The length of the NOPs identified herein vary from around 10 to around 374 amino acids. Preferred NOPs are at least 20 amino acids in length, more preferably at least 30 amino acids, and most preferably at least 50 amino acids in length. While not wishing to be bound by theory, it is believed that neoantigens longer than 10 amino acids can be processed into shorter peptides, e.g., by antigen presenting cells, which then bind to MHC molecules.

In some embodiments, fragments of a NOP can also be presented as the neoantigen. The fragments comprise at least 8 consecutive amino acids of the NOP, preferably at least 10 consecutive amino acids, and more preferably at least 20 consecutive amino acids, and most preferably at least 30 amino acids. In some embodiments, the fragments can be about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 60, about 70, about 80, about 90, about 100, about 110, or about 120 amino acids or greater. Preferably, the fragment is between 8-50, between 8-30, or between 10-20 amino acids. As will be understood by the skilled person, fragments greater than about 10 amino acids can be processed to shorter peptides, e.g., by antigen presenting cells. A preferred fragment of SEQ ID NO:1 is SEQ ID NO:231; a preferred fragment of SEQ ID NO:2 is SEQ ID NO:232 a preferred fragment of SEQ ID NO:3 is SEQ ID NO:233; and a preferred fragment of SEQ ID NO:5 is SEQ ID NO:234.

The specific mutations resulting in the generation of a neo open reading frame may differ between individuals resulting in differing NOP lengths. However, as depicted in, e.g., FIG. 2, such individuals share common NOP sequences, in particular at the C-terminus of an NOP. While suitable fragments for use as neoantigens may be located at any position along the length of an NOP, fragments located near the C-terminus are preferred as they are expected to benefit a larger number of patients. Preferably, fragments of a NOP correspond to the C-terminal (3') portion of the NOP, preferably the C-terminal 10 consecutive amino acids, more preferably the C-terminal 20 consecutive amino acids, more preferably the C-terminal 30 consecutive amino acids, more preferably the C-terminal 40 consecutive amino acids, more preferably the C-terminal 50 consecutive amino acids, more preferably the C-terminal 60 consecutive amino acids, more preferably the C-terminal 70 consecutive amino acids, more preferably the C-terminal 80 consecutive amino acids, more preferably the C-terminal 90 consecutive amino acids, and most preferably the C-terminal 100 or more consecutive amino acids. In some embodiments a subsequence of the preferred C-terminal portion of the NOP may be highly preferred for reasons of manufacturability, solubility and MHC binding strength.

Suitable fragments for use as neoantigens can be readily determined. The NOPs disclosed herein may be analysed by known means in the art in order to identify potential MHC binding peptides (i.e., MHC ligands). Suitable methods are described herein in the examples and include in silico prediction methods (e.g., ANNPRED, BIMAS, EPIMHC, HLABIND, IEDB, KISS, MULTIPRED, NetMHC, PEP-VAC, POPI, PREDEP, RANKPEP, SVMHC, SVRMHC, and SYFFPEITHI, see Lundegaard 2010 130:309-318 for a review). MHC binding predictions depend on HLA genotypes, furthermore it is well known in the art that different MHC binding prediction programs predict different MHC affinities for a given epitope. While not wishing to be limited by such predictions, at least 60% of NOP sequences as defined herein, contain one or more predicted high affinity MHC class I binding epitope of 10 amino acids, based on allele HLA-A0201 and using NetMHC4.0.

A skilled person will appreciate that natural variations may occur in the genome resulting in variations in the sequence of an NOP. Accordingly, a neoantigen of the disclosure may comprise minor sequence variations, including, e.g., conservative amino acid substitutions. Conservative substitutions are well known in the art and refer to the substitution of one or more amino acids by similar amino acids. For example, a conservative substitution can be the substitution of an amino acid for another amino acid within the same general class (e.g., an acidic amino acid, a basic amino acid, or a neutral amino acid). A skilled person can readily determine whether such variants retain their immunogenicity, e.g., by determining their ability to bind MHC molecules.

Preferably, a neoantigen has at least 90% sequence identity to the NOPs disclosed herein. Preferably, the neoantigen has at least 95% or 98% sequence identity. The term "% sequence identity" is defined herein as the percentage of nucleotides in a nucleic acid sequence, or amino acids in an amino acid sequence, that are identical with the nucleotides, resp. amino acids, in a nucleic acid or amino acid sequence of interest, after aligning the sequences and optionally introducing gaps, if necessary, to achieve the maximum percent sequence identity. The skilled person understands that consecutive amino acid residues in one amino acid sequence are compared to consecutive amino acid residues in another amino acid sequence. Methods and computer programs for alignments are well known in the art. SEQ ID NO:identity is calculated over substantially the whole length, preferably the whole (full) length, of a sequence of interest.

The disclosure also provides at least two frameshift-mutation derived peptides (i.e., neoantigens), also referred to herein as a 'collection' of peptides. Preferably the collection comprises at least 3, at least 4, at least 5, at least 10, at least 15, or at least 20, or at least 50 neoantigens. In some embodiments, the collections comprise less than 20, preferably less than 15 neoantigens. Preferably, the collections comprise the top 20, more preferably the top 15 most frequently occurring neoantigens in cancer patients. The neoantigens are selected from:
(i) SEQ ID NOS:1-16, an amino acid sequence having 90% identity to SEQ ID NOS: 1-16 or 231-234, or a fragment thereof comprising at least 10 consecutive amino acids of SEQ ID NOS:1-16 or 231-234;
(ii) SEQ ID NOS:17-44, an amino acid sequence having 90% identity to SEQ ID NOS: 17-44, or a fragment thereof comprising at least 10 consecutive amino acids of SEQ ID NOS:17-44;
(iii) SEQ ID NOS:45-107, an amino acid sequence having 90% identity to SEQ ID NOS: 45-107, or a fragment thereof comprising at least 10 consecutive amino acids of SEQ ID NOS:45-107;
(iv) SEQ ID NOS:108-199, an amino acid sequence having 90% identity to SEQ ID NOS: 108-199, or a fragment thereof comprising at least 10 consecutive amino acids of SEQ ID NOS:108-199; and
(v) SEQ ID NOS:200-230, an amino acid sequence having 90% identity to SEQ ID NOS: 200-230, or a fragment thereof comprising at least 10 consecutive amino acids of SEQ ID NOS:200-230.

Preferably, the collection comprises at least two frameshift-mutation derived peptides corresponding to the same gene. Preferably, a collection is provided comprising:
(i) at least two frameshift-mutation derived peptides, wherein each peptide, or collection of tiled peptides, comprises a different amino acid sequence selected from SEQ ID NOS:1-16, an amino acid sequence having 90% identity to SEQ ID NOS: 1-16 or 231-234, or a fragment thereof comprising at least 10 consecutive amino acids of SEQ ID NOS:1-16 or 231-234;
(ii) at least two frameshift-mutation derived peptides, wherein each peptide, or collection of tiled peptides, comprises a different amino acid sequence selected from SEQ ID NOS:17-44, an amino acid sequence having 90% identity to SEQ ID NOS: 17-44, or a fragment thereof comprising at least 10 consecutive amino acids of SEQ ID NOS:17-44;
(iii) at least two frameshift-mutation derived peptides, wherein each peptide, or collection of tiled peptides, comprises a different amino acid sequence selected from SEQ ID NOS:45-107, an amino acid sequence having 90% identity to SEQ ID NOS:45-107, or a fragment thereof comprising at least 10 consecutive amino acids of SEQ ID NOS:45-107;
(iv) at least two frameshift-mutation derived peptides, wherein each peptide, or collection of tiled peptides, comprises a different amino acid sequence selected from SEQ ID NOS:108-199, an amino acid sequence having 90% identity to SEQ ID NOS:108-199, or a fragment thereof comprising at least 10 consecutive amino acids of SEQ ID NOS:108-199; or
(v) at least two frameshift-mutation derived peptides, wherein each peptide, or collection of tiled peptides, comprises a different amino acid sequence selected from SEQ ID NOS:200-230, an amino acid sequence having 90% identity to SEQ ID NOS: 200-230, or a fragment thereof comprising at least 10 consecutive amino acids of SEQ ID NOS:200-230.

In some embodiments, the collection comprises two or more neoantigens corresponding to the same NOP. For example, the collection may comprise two (or more) fragments of SEQ ID NO:1 or the collection may comprise a peptide having SEQ ID NO:1 and a peptide having 95% identity to SEQ ID NO:1.

Preferably, the collection comprises two or more neoantigens corresponding to different NOPs. In some embodiments, the collection comprises two or more neoantigens corresponding to different NOPs of the same gene. For example the peptide may comprise the amino acid sequence of SEQ ID NO:1 (or a fragment or collection of tiled fragments thereof) and the amino acid sequence of SEQ ID NO:2 (or a fragment or collection of tiled fragments thereof).

Preferably, the collection comprises SEQ ID NOS:1-4, preferably 1-6 (or a fragment or collection of tiled fragments thereof).

Preferably, the collection comprises SEQ ID NOS:17-20, preferably 17-24, more preferably 17-30 (or a fragment or collection of tiled fragments thereof).

Preferably, the collection comprises SEQ ID NOS:45-49, preferably 45-53, more preferably 45-55 (or a fragment or collection of tiled fragments thereof).

Preferably, the collection comprises SEQ ID NOS:108-112, preferably 108-117 (or a fragment or collection of tiled fragments thereof).

Preferably, the collection comprises SEQ ID NOS:200-206, preferably 200-212 (or a fragment or collection of tiled fragments thereof).

In some embodiments, the collection comprises two or more neoantigens corresponding to different NOPs of different genes. For example the collection may comprise a peptide having the amino acid sequence of SEQ ID NO:1 (or a fragment or collection of tiled fragments thereof) and a peptide having the amino acid sequence of SEQ ID NO:17 (or a fragment or collection of tiled fragments thereof). Preferably, the collection comprises at least one neoantigen from group (i) and at least one neoantigen from group (ii); at least one neoantigen from group (i) and at least one neoantigen from group (iii); at least one neoantigen from group (i) and at least one neoantigen from group (iv); at least one neoantigen from group (i) and at least one neoantigen from group (v); at least one neoantigen from group (ii) and at least one neoantigen from group (iii); at least one neoantigen from group (ii) and at least one neoantigen from group (iv); at least one neoantigen from group (ii) and at least one neoantigen from group (v); at least one neoantigen from group (iii) and at least one neoantigen from group (iv); at least one neoantigen from group (iii) and at least one neoantigen from group (v); or at least one neoantigen from group (iv) and at least one neoantigen from group (v). Preferably, the collection comprises at least one neoantigen from group (i), at least one neoantigen from group (ii), and at least one neoantigen from group (iii). Preferably, the collection comprises at least one neoantigen from each of groups (i) to (iv). Preferably, the collection comprises at least one neoantigen from each of groups (i) to (v).

In a preferred embodiment, the collections disclosed herein include SEQ ID NO:1, SEQ ID NO:2, and SEQ ID NO:17 (or a variant or fragment or collection of tiled fragments thereof as disclosed herein). In some embodiments, the collection further includes SEQ ID NO:18, SEQ ID NO:19, SEQ ID NO:20, and SEQ ID NO:3 (or a variant or fragment or collection of tiled fragments thereof as disclosed herein). In some embodiments, the collection further includes, SEQ ID NO:21, SEQ ID NO:22, SEQ ID NO:45, SEQ ID NO:200 and SEQ ID NO:23 (or a variant or fragment or collection of tiled fragments thereof as disclosed herein). In some embodiments, the collection even further includes SEQ ID NOS:46, 4, 108, 201 and 47 (or a variant or fragment or collection of tiled fragments thereof as disclosed herein). In some embodiments, the collection even further includes SEQ ID NOS:5, 48, 109, 110, 24, 49, 202 (or a variant or fragment or collection of tiled fragments thereof as disclosed herein); preferably, the collection further includes SEQ ID NOS: 50, 25, 51, 111, 203, 6, 26, 52, 53, 54, 55, 112, 113, 114, 204, 205, 206 (or a variant or fragment or collection of tiled fragments thereof as disclosed herein). In some embodiments, the collections includes all SEQ ID NOS:1-234 (or a variant or fragment or collection of tiled fragments thereof as disclosed herein).

Such collections comprising multiple neoantigens have the advantage that a single collection (e.g, when used as a vaccine) can benefit a larger group of patients having different frameshift mutations. This makes it feasible to construct and/or test the vaccine in advance and have the vaccine available for off-the-shelf use. This also greatly reduces the time from screening a tumor from a patient to administering a potential vaccine for said tumor to the patient, as it eliminates the time of production, testing and approval. In addition, a single collection consisting of multiple neoantigens corresponding to different genes will limit possible resistance mechanisms of the tumor, e.g. by losing one or more of the targeted neoantigens.

In some embodiments, the neoantigens (i.e., peptides) are directly linked. Preferably, the neoantigens are linked by peptide bonds, or rather, the neoantigens are present in a single polypeptide. Accordingly, the disclosure provides polypeptides comprising at least two peptides (i.e., neoantigens) as disclosed herein. In some embodiments, the polypeptide comprises 3, 4, 5, 6, 7, 8, 9, 10 or more peptides as disclosed herein (i.e., neoantigens). Such polypeptides are also referred to herein as 'polyNOPs'. A collection of peptides can have one or more peptides and one or more polypeptides comprising the respective neoantigens.

In an exemplary embodiment, a polypeptide of the disclosure may comprise 10 different neoantigens, each neoantigen having between 10-400 amino acids.

Thus, the polypeptide of the disclosure may comprise between 100-4000 amino acids, or more. As is clear to a skilled person, the final length of the polypeptide is determined by the number of neoantigens selected and their respective lengths. A collection may comprise two or more polypeptides comprising the neoantigens which can be used to reduce the size of each of the polypeptides.

In some embodiments, the amino acid sequences of the neoantigens are located directly adjacent to each other in the polypeptide. For example, a nucleic acid molecule may be provided that encodes multiple neoantigens in the same reading frame. In some embodiments, a linker amino acid sequence may be present. Preferably a linker has a length of 1, 2, 3, 4 or 5, or more amino acids. The use of linker may be beneficial, for example for introducing, among others, signal peptides or cleavage sites. In some embodiments at least one, preferably all of the linker amino acid sequences have the amino acid sequence VDD.

As will be appreciated by the skilled person, the peptides and polypeptides disclosed herein may contain additional amino acids, for example at the N- or C-terminus. Such additional amino acids include, e.g., purification or affinity tags or hydrophilic amino acids in order to decrease the hydrophobicity of the peptide. In some embodiments, the neoantigens may comprise amino acids corresponding to the adjacent, wild-type amino acid sequences of the relevant gene, i.e., amino acid sequences located 5' to the frame shift mutation that results in the neo open reading frame. Preferably, each neoantigen comprises no more than 20, more preferably no more than 10, and most preferably no more than 5 of such wild-type amino acid sequences.

In preferred embodiments, the peptides and polypeptides disclosed herein have a sequence depicted as follows:

A-B-C-(D-E)$_n$, wherein

A, C, and E are independently 0-100 amino acids

B and D are amino acid sequences as disclosed herein and selected from sequences 1-234, or an amino acid sequence having 90% identity to SEQ ID NOS:1-234, or a fragment thereof comprising at least 10 consecutive amino acids of SEQ ID NOS:1-234, n is an integer from 0 to 500.

Preferably, B and D are different amino acid sequences. Preferably, n is an integer from 0-200. Preferably A, C, and E are independently 0-50 amino acids, more preferably independently 0-20 amino acids.

The peptides and polypeptides disclosed herein can be produced by any method known to a skilled person. In some embodiments, the peptides and polypeptide are chemically synthesized. The peptides and polypeptide can also be produced using molecular genetic techniques, such as by inserting a nucleic acid into an expression vector, introducing the expression vector into a host cell, and expressing the peptide. Preferably, such peptides and polypeptide are isolated, or rather, substantially isolated from other polypeptides, cellular components, or impurities. The peptide and polypeptide can be isolated from other (poly)peptides as a result of solid phase protein synthesis, for example. Alternatively, the peptides and polypeptide can be substantially isolated from other proteins after cell lysis from recombinant production (e.g., using HPLC).

The disclosure further provides nucleic acid molecules encoding the peptides and polypeptide disclosed herein. Based on the genetic code, a skilled person can determine the nucleic acid sequences which encode the (poly)peptides disclosed herein. Based on the degeneracy of the genetic code, sixty-four codons may be used to encode twenty amino acids and translation termination signal.

In a preferred embodiment, the nucleic acid molecules are codon optimized. As is known to a skilled person, codon usage bias in different organisms can effect gene expression level. Various computational tools are available to the skilled person in order to optimize codon usage depending on which organism the desired nucleic acid will be expressed. Preferably, the nucleic acid molecules are optimized for expression in mammalian cells, preferably in human cells. Table 2 lists for each acid amino acid (and the stop codon) the most frequently used codon as encountered in the human exome.

TABLE 2 most frequently used codon for each amino acid and most frequently used stop codon.

| | |
|---|---|
| A | GCC |
| C | TGC |
| D | GAC |
| E | GAG |
| F | TTC |
| G | GGC |
| H | CAC |
| I | ATC |
| K | AAG |
| L | CTG |
| M | ATG |
| N | AAC |
| P | CCC |
| Q | CAG |
| R | CGG |
| S | AGC |
| T | ACC |
| V | GTG |
| W | TGG |
| Y | TAC |
| Stop | TGA |

In some embodiments, at least 50%, 60%, 70%, 80%, 90%, or 100% of the amino acids are encoded by a codon corresponding to a codon presented in Table 2.

In some embodiments, the nucleic acid molecule encodes for a linker amino acid sequence in the peptide. Preferably, the nucleic acid sequence encoding the linker comprises at least one codon triplet that codes for a stop codon when a frameshift occurs. Preferably, said codon triplet is chosen from the group consisting of: ATA, CTA, GTA, TTA, ATG, CTG, GTG, TTG, AAA, AAC, AAG, AAT, AGA, AGC, AGG, AGT, GAA, GAC, GAG, and GAT. These codons do not code for a stop codon, but could create a stop codon in case of a frame shift, such as when read in the +1, +2, +4, +, 5, etc. reading frame. For example, two amino acid encoding sequences are linked by a linker amino acid encoding sequence as follows (linker amino acid encoding sequence in bold):

CTATACAGGCGAATGAGATTATG

Resulting in the following amino acid sequence (amino acid linker sequence in bold):

LYRRMRL

In case of a +1 frame shift, the following sequence is encoded:

YTGE[stop]DY

This embodiment has the advantage that if a frame shift occurs in the nucleotide sequence encoding the peptide, the nucleic acid sequence encoding the linker will terminate translation, thereby preventing expression of (part of) the native protein sequence for the gene related to peptide sequence encoded by the nucleotide sequence.

In some preferred embodiments, the linker amino acid sequences are encoded by the nucleotide sequence GTA-GATGAC. This linker has the advantage that it contains two out of frame stop codons (TAG and TGA), one in the +1 and one in the −1 reading frame. The amino acid sequence encoded by this nucleotide sequence is VDD. The added advantage of using a nucleotide sequence encoding for this linker amino acid sequence is that any frame shift will result in a stop codon.

The disclosure also provides binding molecules and a collection of binding molecules that bind the neoantigens disclosed herein and or a neoantigen/MHC complex. In some embodiments the binding molecule is an antibody, a T-cell receptor, or an antigen binding fragment thereof. In some embodiments the binding molecule is a chimeric antigen receptor comprising i) a T cell activation molecule; ii) a transmembrane region; and iii) an antigen recognition moiety; wherein said antigen recognition moieties bind the neoantigens disclosed herein and or a neoantigen/MHC complex.

The term "antibody" as used herein refers to an immunoglobulin molecule that is typically composed of two identical pairs of polypeptide chains, each pair of chains consisting of one "heavy" chain with one "light" chain. The human light chains are classified as kappa and lambda. The heavy chains comprise different classes namely: mu, delta, gamma, alpha or epsilon. These classes define the isotype of the antibody, such as IgM, IgD, IgG IgA and IgE, respectively. These classes are important for the function of the antibody and help to regulate the immune response. Both the heavy chain and the light chain comprise a variable domain and a constant region. Each heavy chain variable region (VH) and light chain variable region (VL) comprises complementary determining regions (CDR) interspersed by framework regions (FR). The variable region has in total four FRs and three CDRs. These are arranged from the amino-to the carboxyl-terminus as follows: FR1. CDR1, FR2, CDR2, FR3, CDR3, FR4. The variable regions of the light and heavy chain together form the antibody binding site and define the specificity for the epitope.

The term "antibody" encompasses murine, humanized, deimmunized, human, and chimeric antibodies, and an antibody that is a multimeric form of antibodies, such as dimers, trimers, or higher-order multimers of monomeric antibodies. The term antibody also encompasses monospecific, bispecific or multi-specific antibodies, and any other modified configuration of the immunoglobulin molecule that comprises an antigen recognition site of the required specificity.

Preferably, an antibody or antigen binding fragment thereof as disclosed herein is a humanized antibody or antigen binding fragment thereof. The term "humanized antibody" refers to an antibody that contains some or all of the CDRs from a non-human animal antibody while the framework and constant regions of the antibody contain amino acid residues derived from human antibody sequences. Humanized antibodies are typically produced by grafting CDRs from a mouse antibody into human framework sequences followed by back substitution of certain human framework residues for the corresponding mouse residues from the source antibody. The term "deimmunized antibody" also refers to an antibody of non-human origin in which, typically in one or more variable regions, one or more epitopes have been removed, that have a high propensity of constituting a human T-cell and/or B-cell epitope, for purposes of reducing immunogenicity. The amino acid sequence of the epitope can be removed in full or in part. However, typically the amino acid sequence is altered by substituting one or more of the amino acids constituting the epitope for one or more other amino acids, thereby changing the amino acid sequence into a sequence that does not constitute a human T-cell and/or B-cell epitope. The amino acids are substituted by amino acids that are present at the corresponding position(s) in a corresponding human variable heavy or variable light chain as the case may be.

In some embodiments, an antibody or antigen binding fragment thereof as disclosed herein is a human antibody or antigen binding fragment thereof. The term "human antibody" refers to an antibody consisting of amino acid sequences of human immunoglobulin sequences only. Human antibodies may be prepared in a variety of ways known in the art.

As used herein, antigen-binding fragments include Fab, F(ab'), F(ab')2, complementarity determining region (CDR) fragments, single-chain antibodies (scFv), bivalent single-chain antibodies, and other antigen recognizing immunoglobulin fragments.

In some embodiments, the antibody or antigen binding fragment thereof is an isolated antibody or antigen binding fragment thereof. The term "isolated", as used herein, refer to material which is substantially or essentially free from components which normally accompany it in nature.

In some embodiments, the antibody or antigen binding fragment thereof is linked or attached to a non-antibody moiety. In preferred embodiments, the non-antibody moiety is a cytotoxic moiety such as auristatins, maytanasines, calicheasmicins, duocarymycins, a-amanitin, doxorubicin, and centanamycin. Other suitable cytotoxins and methods for preparing such antibody drug conjugates are known in the art; see, e.g., WO2013085925A1 and WO2016133927A1.

Antibodies which bind a particular epitope can be generated by methods known in the art. For example, polyclonal antibodies can be made by the conventional method of immunizing a mammal (e.g., rabbits, mice, rats, sheep, goats). Polyclonal antibodies are then contained in the sera of the immunized animals and can be isolated using standard procedures (e.g., affinity chromatography, immunoprecipitation, size exclusion chromatography, and ion exchange chromatography). Monoclonal antibodies can be made by the conventional method of immunization of a mammal, followed by isolation of plasma B cells producing the monoclonal antibodies of interest and fusion with a myeloma cell (see, e.g., Mishell, B. B., et al., Selected Methods In Cellular Immunology, (W.H. Freeman, ed.) San Francisco (1980)). Peptides corresponding to the neoantiens disclosed herein may be used for immunization in order to produce antibodies which recognize a particular epitope. Screening for recognition of the epitope can be performed using standard immunoassay methods including ELISA techniques, radioimmunoassays, immunofluorescence, immunohistochemistry, and Western blotting. See, Short Protocols in Molecular Biology, Chapter 11, Green Publishing Associates and John Wiley & Sons, Edited by Ausubel, F. M et al., 1992. In vitro methods of antibody selection, such as antibody phage display, may also be used to generate antibodies recognizing the neoantigens disclosed herein (see, e.g., Schirrmann et al. Molecules 2011 16:412-426).

T-cell receptors (TCRs) are expressed on the surface of T-cells and consist of an α chain and a β chain. TCRs recognize antigens bound to MHC molecules expressed on the surface of antigen-presenting cells. The T-cell receptor (TCR) is a heterodimeric protein, in the majority of cases (95%) consisting of a variable alpha (α) and beta (β) chain, and is expressed on the plasma membrane of T-cells. The TCR is subdivided in three domains: an extracellular domain, a transmembrane domain and a short intracellular domain. The extracellular domain of both α and B chains have an immunoglobulin-like structure, containing a variable and a constant region. The variable region recognizes processed peptides, among which neoantigens, presented by major histocompatibility complex (MHC) molecules, and is highly variable. The intracellular domain of the TCR is very short, and needs to interact with CD3ζ to allow for signal propagation upon ligation of the extracellular domain.

With the focus of cancer treatment shifted towards more targeted therapies, among which immunotherapy, the potential of therapeutic application of tumor-directed T-cells is increasingly explored. One such application is adoptive T-cell therapy (ATCT) using genetically modified T-cells that carry chimeric antigen receptors (CARs) recognizing a particular epitope (Ref Gomes-Silva 2018). The extracellular domain of the CAR is commonly formed by the antigen-specific subunit of (scFv) of a monoclonal antibody that recognizes a tumor-antigen (Ref Abate-Daga 2016). This enables the CAR T-cell to recognize epitopes independent of MHC-molecules, thus widely applicable, as their functionality is not restricted to individuals expressing the specific MHC-molecule recognized by the TCR. Methods for engineering TCRs that bind a particular epitope are known to a skilled person. See, for example, US20100009863A1, which describes methods of modifying one or more structural loop regions. The intracellular domain of the CAR can be a TCR intracellular domain or a modified peptide to enable induction of a signaling cascade without the need for interaction with accessory proteins. This is accomplished by inclusion of the CD33-signalling domain, often in combination with one or more co-stimulatory domains, such as CD28 and 4-1BB, which further enhance CAR T-cell functioning and persistence (Ref Abate-Daga 2016).

The engineering of the extracellular domain towards an scFv limits CAR T-cell to the recognition of molecules that are expressed on the cell-surface. Peptides derived from proteins that are expressed intracellularly can be recognized upon their presentation on the plasma membrane by MHC molecules, of which human form is called human leukocyte antigen (HLA). The HLA-haplotype generally differs among individuals, but some HLA types, like HLA-A*02:01, are globally common. Engineering of CAR T-cell extracellular domains recognizing tumor-derived peptides or neoantigens presented by a commonly shared HLA molecule enables recognition of tumor antigens that remain intracellular. Indeed CAR T-cells expressing a CAR with a TCR-like extracellular domain have been shown to be able to recognize tumor-derived antigens in the context of HLA-A*02:01 (Refs Zhang 2014, Ma 2016, Liu 2017).

In some embodiments, the binding molecules are monospecific, or rather they bind one of the neoantigens disclosed herein. In some embodiments, the binding molecules are bispecific, e.g., bispecific antibodies and bispecific chimeric antigen receptors.

In some embodiments, the disclosure provides a first antigen binding domain that binds a first neoantigen described herein and a second antigen binding domain that binds a second neoantigen described herein. The first and second antigen binding domains may be part of a single molecule, e.g., as a bispecific antibody or bispecific chimeric antigen receptor or they may be provided on separate molecules, e.g., as a collection of antibodies, T-cell receptors, or chimeric antigen receptors. In some embodiments, 3, 4, 5 or more antigen binding domains are provided each binding a different neoantigen disclosed herein. As used herein, an antigen binding domain includes the variable (antigen binding) domain of a T-cell receptor and the variable domain of an antibody (e.g., comprising a light chain variable region and a heavy chain variable region).

The disclosure further provides nucleic acid molecules encoding the antibodies, TCRs, and CARs disclosed herein. In a preferred embodiment, the nucleic acid molecules are codon optimized as disclosed herein.

The disclosure further provides vectors comprising the nucleic acids molecules disclosed herein. A "vector" is a recombinant nucleic acid construct, such as plasmid, phase genome, virus genome, cosmid, or artificial chromosome, to which another nucleic acid segment may be attached. The term "vector" includes both viral and non-viral means for introducing the nucleic acid into a cell in vitro, ex vivo or in vivo. The disclosure contemplates both DNA and RNA vectors. The disclosure further includes self-replicating RNA with (virus-derived) replicons, including but not limited to mRNA molecules derived from mRNA molecules from alphavirus genomes, such as the Sindbis, Semliki Forest and Venezuelan equine encephalitis viruses.

Vectors, including plasmid vectors, eukaryotic viral vectors and expression vectors are known to the skilled person. Vectors may be used to express a recombinant gene construct in eukaryotic cells depending on the preference and judgment of the skilled practitioner (see, for example, Sambrook et al., Chapter 16). For example, many viral vectors are known in the art including, for example, retroviruses, adeno-associated viruses, and adenoviruses. Other viruses useful for introduction of a gene into a cell include, but a not limited to, arenavirus, herpes virus, mumps virus, poliovirus, Sindbis virus, and vaccinia virus, such as, canary pox virus. The methods for producing replication-deficient viral particles and for manipulating the viral genomes are well known. In some embodiments, the vaccine comprises an attenuated or inactivated viral vector comprising a nucleic acid disclosed herein.

Preferred vectors are expression vectors. It is within the purview of a skilled person to prepare suitable expression vectors for expressing the inhibitors disclosed hereon. An "expression vector" is generally a DNA element, often of circular structure, having the ability to replicate autonomously in a desired host cell, or to integrate into a host cell genome and also possessing certain well-known features which, for example, permit expression of a coding DNA inserted into the vector sequence at the proper site and in proper orientation. Such features can include, but are not limited to, one or more promoter sequences to direct transcription initiation of the coding DNA and other DNA elements such as enhancers, polyadenylation sites and the like, all as well known in the art. Suitable regulatory sequences including enhancers, promoters, translation initiation signals, and polyadenylation signals may be included. Additionally, depending on the host cell chosen and the vector employed, other sequences, such as an origin of replication, additional DNA restriction sites, enhancers, and sequences conferring inducibility of transcription may be incorporated into the expression vector. The expression vectors may also contain a selectable marker gene which facilitates the selection of host cells transformed or transfected. Examples of selectable marker genes are genes encoding a protein such as G418 and hygromycin which confer resistance to certain drugs,-galactosidase, chloramphenicol acetyltransferase, and firefly luciferase.

The expression vector can also be an RNA element that contains the sequences required to initiate translation in the desired reading frame, and possibly additional elements that are known to stabilize or contribute to replicate the RNA molecules after administration. Therefore when used herein the term DNA when referring to an isolated nucleic acid encoding the peptide according to the invention should be interpreted as referring to DNA from which the peptide can be transcribed or RNA molecules from which the peptide can be translated.

Also provided for is a host cell comprising an nucleic acid molecule or a vector as disclosed herein. The nucleic acid molecule may be introduced into a cell (prokaryotic or eukaryotic) by standard methods. As used herein, the terms "transformation" and "transfection" are intended to refer to a variety of art recognized techniques to introduce a DNA into a host cell. Such methods include, for example, transfection, including, but not limited to, liposome-polybrene, DEAE dextran-mediated transfection, electroporation, calcium phosphate precipitation, microinjection, or velocity driven microprojectiles ("biolistics"). Such techniques are well known by one skilled in the art. See, Sambrook et al. (1989) Molecular Cloning: A Laboratory Manaual (2 ed. Cold Spring Harbor Lab Press, Plainview, N.Y.). Alternatively, one could use a system that delivers the DNA construct in a gene delivery vehicle. The gene delivery vehicle may be viral or chemical. Various viral gene delivery vehicles can be used with the present invention. In general, viral vectors are composed of viral particles derived from naturally occurring viruses. The naturally occurring virus has been genetically modified to be replication defective and does not generate additional infectious viruses, or it may be a virus that is known to be attenuated and does not have unacceptable side effects.

Preferably, the host cell is a mammalian cell, such as MRC5 cells (human cell line derived from lung tissue), HuH7 cells (human liver cell line), CHO-cells (Chinese Hamster Ovary), COS-cells (derived from monkey kidney (African green monkey), Vero-cells (kidney epithelial cells extracted from African green monkey), Hela-cells (human cell line), BHK-cells (baby hamster kidney cells, HEK-cells (Human Embryonic Kidney), NSO-cells (Murine myeloma cell line), C127-cells (nontumorigenic mouse cell line), PerC6®-cells (human cell line, Crucell), and Madin-Darby Canine Kidney (MDCK) cells. In some embodiments, the disclosure comprises an in vitro cell culture of mammalian cells expressing the neoantigens disclosed herein. Such cultures are useful, for example, in the production of cell-based vaccines, such as viral vectors expressing the neoantigens disclosed herein.

In some embodiments the host cells express the antibodies, TCRs, or CARs as disclosed herein. As will be clear to a skilled person, individual polypeptide chains (e.g., immunoglobulin heavy and light chains) may be provided on the same or different nucleic acid molecules and expressed by the same or different vectors. For example, in some embodiments, a host cell is transfected with a nucleic acid encoding an α-TCR polypeptide chain and a nucleic acid encoding a β-polypeptide chain.

In preferred embodiments, the disclosure provides T-cells expressing a TCR or CAR as disclosed herein. T cells may be obtained from, e.g., peripheral blood mononuclear cells, bone marrow, lymph node tissue, cord blood, thymus tissue, spleen tissue, and tumors. Preferably, the T-cells are obtained from the individual to be treated (autologous T-cells). T-cells may also be obtained from healthy donors (allogenic T-cells). Isolated T-cells are expanded in vitro using established methods, such as stimulation with cytokines (IL-2). Methods for obtaining and expanding T-cells for adoptive therapy are well known in the art and are also described, e.g., in EP2872533A1.

The disclosure also provides vaccines comprising one or more neoantigens as disclosed herein. In particular, the vaccine comprises one or more (poly)peptides, antibodies or antigen binding fragments thereof, TCRs, CARS, nucleic acid molecules, vectors, or cells (or cell cultures) as disclosed herein.

The vaccine may be prepared so that the selection, number and/or amount of neoantigens (e.g., peptides or nucleic acids encoding said peptides) present in the composition is patient-specific. Selection of one or more neoantigens may be based on sequencing information from the tumor of the patient. For any frame shift mutation found, a corresponding NOP is selected. Preferably, the vaccine comprises more than one neoantigen corresponding to the NOP selected. In case multiple frame shift mutations (multiple NOPs) are found, multiple neoantigens corresponding to each NOP may be selected for the vaccine.

The selection may also be dependent on the specific type of cancer, the status of the disease, earlier treatment regimens, the immune status of the patient, and, HLA-haplotype of the patient. Furthermore, the vaccine can contain individualized components, according to personal needs of the particular patient.

As is clear to a skilled person, if multiple neoantigens are used, they may be provided in a single vaccine composition or in several different vaccines to make up a vaccine collection. The disclosure thus provides vaccine collections comprising a collection of tiled peptides, collection of peptides as disclosed herein, as well as nucleic acid molecules, vectors, or host cells as disclosed herein. As is clear to a skilled person, such vaccine collections may be administered to an individual simultaneously or consecutively (e.g., on the same day) or they may be administered several days or weeks apart.

Various known methods may be used to administer the vaccines to an individual in need thereof. For instance, one or more neoantigens can be provided as a nucleic acid molecule directly, as "naked DNA". Neoantigens can also be expressed by attenuated viral hosts, such as vaccinia or fowlpox. This approach involves the use of a virus as a vector to express nucleotide sequences that encode the neoantigen. Upon introduction into the individual, the recombinant virus expresses the neoantigen peptide, and thereby elicits a host CTL response. Vaccination using viral vectors is well-known to a skilled person and vaccinia vectors and methods useful in immunization protocols are described in, e.g., U.S. Pat. No. 4,722,848. Another vector is BCG (Bacille Calmette Guerin) as described in Stover et al. (Nature 351:456-460 (1991)).

Preferably, the vaccine comprises a pharmaceutically acceptable excipient and/or an adjuvant. The compositions may contain pharmaceutically acceptable auxiliary substances as required to approximate physiological conditions, such as pH adjusting and buffering agents, tonicity adjusting agents, wetting agents and the like. Suitable adjuvants are well-known in the art and include, aluminum (or a salt thereof, e.g., aluminium phosphate and aluminium hydroxide), monophosphoryl lipid A, squalene (e.g., MF59), and cytosine phosphoguanine (CpG), montanide, liposomes (e.g. CAF adjuvants, cationic adjuvant formulations and variations thereof), lipoprotein conjugates (e.g. Amplivant), Resiquimod, Iscomatrix, hiltonol, poly-ICLC (polyriboinosinic-polyribocytidylic acid-polylysine carboxymethylcellulose). A skilled person is able to determine the appropriate adjuvant, if necessary, and an immune-effective amount thereof. As used herein, an immune-effective amount of adjuvant refers to the amount needed to increase the vaccine's immunogenicity in order to achieve the desired effect.

The disclosure also provides the use of the neoantigens disclosed herein for the treatment of disease, in particular for the treatment of breast cancer in an individual. In some embodiments, the breast cancer is ductal carcinoma or lobular carcinoma. Preferably, the cancer is breast invasive carcinoma (BRCA). It is within the purview of a skilled person to diagnose an individual with as having breast cancer.

As used herein, the terms "treatment," "treat," and "treating" refer to reversing, alleviating, or inhibiting the progress of a disease, or reversing, alleviating, delaying the onset of, or inhibiting one or more symptoms thereof. Treatment includes, e.g., slowing the growth of a tumor, reducing the size of a tumor, and/or slowing or preventing tumor metastasis.

The term 'individual' includes mammals, both humans and non-humans and includes but is not limited to humans, non-human primates, canines, felines, murines, bovines, equines, and porcines. Preferably, the human is a mammal.

As used herein, administration or administering in the context of treatment or therapy of a subject is preferably in a "therapeutically effective amount", this being sufficient to show benefit to the individual. The actual amount administered, and rate and time-course of administration, will depend on the nature and severity of the disease being treated. Prescription of treatment, e.g. decisions on dosage etc., is within the responsibility of general practitioners and other medical doctors, and typically takes account of the disorder to be treated, the condition of the individual patient, the site of delivery, the method of administration and other factors known to practitioners.

The optimum amount of each neoantigen to be included in the vaccine composition and the optimum dosing regimen can be determined by one skilled in the art without undue experimentation. The composition may be prepared for injection of the peptide, nucleic acid molecule encoding the peptide, or any other carrier comprising such (such as a virus or liposomes). For example, doses of between 1 and 500 mg 50 µg and 1.5 mg, preferably 125 µg to 500 µg, of peptide or DNA may be given and will depend from the respective peptide or DNA. Other methods of administration are known to the skilled person. Preferably, the vaccines may be administered parenterally, e.g., intravenously, subcutaneously, intradermally, intramuscularly, or otherwise.

In preferred embodiments, the vaccines disclosed herein may be provided as a neoadjuvant therapy, e.g., prior to the removal of tumors or prior to treatment, e.g., with radiation or chemotherapy. Neoadjuvant therapy is intended to reduce the size of the tumor before more radical treatment is used. For that reason being able to provide the vaccine off-the-shelf or in a short period of time is very important.

In preferred embodiments, the vaccines disclosed herein may be provided shortly after the surgical removal of tumors. This can be followed by boosting doses until at least symptoms are substantially abated and for a period thereafter.

Also disclosed herein, the vaccine is capable of initiating a specific T-cell response. It is within the purview of a skilled person to measure such T-cell responses either in vivo or in vitro, e.g. by analyzing IFN-γ production or tumor killing by T-cells. In therapeutic applications, vaccines are administered to a patient in an amount sufficient to elicit an effective CTL response to the tumor antigen and to cure or at least partially arrest symptoms and/or complications.

In preferred embodiments, the vaccines disclosed herein may be provided in combination with other therapeutic agents. The therapeutic agent is for example, a chemotherapeutic agent, radiation, or immunotherapy, including but not limited to checkpoint inhibitors, such as nivolumab, ipilimumab, pembrolizumab, or the like. Any suitable therapeutic treatment for a particular, cancer may be administered.

The term "chemotherapeutic agent" refers to a compound that inhibits or prevents the viability and/or function of cells, and/or causes destruction of cells (cell death), and/or exerts anti-tumor/anti-proliferative effects. The term also includes agents that cause a cytostatic effect only and not a mere cytotoxic effect. Examples of chemotherapeutic agents include, but are not limited to bleomycin, capecitabine, carboplatin, cisplatin, cyclophosphamide, docetaxel, doxorubicin, etoposide, interferon alpha, irinotecan, lansoprazole, levamisole, methotrexate, metoclopramide, mitomycin, omeprazole, ondansetron, paclitaxel, pilocarpine, rituxitnab, tamoxifen, taxol, trastuzumab, vinblastine, and vinorelbine tartrate.

Preferably, the other therapeutic agent is an anti-immunosuppressive/immunostimulatory agent, such as anti-CTLA antibody or anti-PD-1 or anti-PD-L1. Blockade of CTLA-4 or PD-L1 by antibodies can enhance the immune response to cancerous cells. In particular, CTLA-4 blockade has been shown effective when following a vaccination protocol.

As is understood by a skilled person the vaccine and other therapeutic agents may be provided simultaneously, separately, or sequentially. In some embodiments, the vaccine may be provided several days or several weeks prior to or following treatment with one or more other therapeutic agents. The combination therapy may result in an additive or synergistic therapeutic effect.

As disclosed herein, the present disclosure provides vaccines which can be prepared as off-the-shelf vaccines. As used herein "off-the-shelf" means a vaccine as disclosed herein that is available and ready for administration to a patient. For example, when a certain frame shift mutation is identified in a patient, the term "off-the-shelf" would refer to a vaccine according to the disclosure that is ready for use in the treatment of the patient, meaning that, if the vaccine is peptide based, the corresponding polyNOP peptide may, for example already be expressed and for example stored with the required excipients and stored appropriately, for example at −20° C. or −80° C. Preferably the term "off-the-shelf" also means that the vaccine has been tested, for example for safety or toxicity. More preferably the term also means that the vaccine has also been approved for use in the treatment or prevention in a patient. Accordingly, the disclosure also provides a storage facility for storing the vaccines disclosed herein. Depending on the final formulation, the vaccines may be stored frozen or at room temperature, e.g., as dried preparations. Preferably, the storage facility stores at least 20 or at least 50 different vaccines, each recognizing a neoantigen disclosed herein.

The present disclosure also contemplates methods which include determining the presence of NOPs in a tumor sample. In a preferred embodiment, a tumor of a patient can be screened for the presence of frame shift mutations and an NOP can be identified that results from such a frame shift mutation. Based on the NOP(s) identified in the tumor, a vaccine comprising the relevant NOP(s) can be provided to immunize the patient, so the immune system of the patient will target the tumor cells expressing the neoantigen. An exemplary workflow for providing a neoantigen as disclosed herein is as follows. When a patient is diagnosed with a cancer, a biopsy may be taken from the tumor or a sample set is taken of the tumor after resection. The genome, exome and/or transcriptome is sequenced by any method known to a skilled person. The outcome is compared, for example using a web interface or software, to the library of NOPs disclosed herein. A patient whose tumor expresses one of the NOPs disclosed herein is thus a candidate for a vaccine comprising the NOP (or a fragment thereof).

Accordingly, the disclosure provides a method for determining a therapeutic treatment for an individual afflicted with cancer, said method comprising determining the presence of a frame shift mutation which results in the expression of an NOP selected from sequences 1-234. Identification of the expression of an NOP indicates that said individual should be treated with a vaccine corresponding to the identified NOP. For example, if it is determined that tumor cells from an individual express SEQ ID NO:1, then a vaccine comprising SEQ ID NO:1 or a fragment thereof is indicated as a treatment for said individual.

Accordingly, the disclosure provides a method for determining a therapeutic treatment for an individual afflicted with cancer, said method comprising
  a. performing complete, targeted or partial genome, exome, ORFeome, or transcriptome sequencing of at least one tumor sample obtained from the individual to obtain a set of sequences of the subject-specific tumor genome, exome, ORFeome, or transcriptome;
  b. comparing at least one sequence or portion thereof from the set of sequences with one or more sequences selected from:
    (i) SEQ ID NOS:1-16;
    (ii) SEQ ID NOS:17-44;
    (iii) SEQ ID NOS:45-107;
    (iv) SEQ ID NOS:108-199; and
    (v) SEQ ID NOS:200-230;
  c. identifying a match between the at least one sequence or portion thereof from the set of sequences and a sequence from groups (i) to (v) when the sequences have a string in common representative of at least 8 amino acids to identify a neoantigen encoded by a frameshift mutation;
    wherein a match indicates that said individual is to be treated with the vaccine as disclosed herein.

As used herein the term "sequence" can refer to a peptide sequence, DNA sequence or RNA sequence. The term "sequence" will be understood by the skilled person to mean either or any of these, and will be clear in the context provided. For example, when comparing sequences to identify a match, the comparison may be between DNA sequences, RNA sequences or peptide sequences, but also between DNA sequences and peptide sequences. In the latter case the skilled person is capable of first converting such DNA sequence or such peptide sequence into, respectively, a peptide sequence and a DNA sequence in order to make the comparison and to identify the match. As is clear to a skilled person, when sequences are obtained from the genome or exome, the DNA sequences are preferably converted to the predicted peptide sequences. In this way, neo open reading frame peptides are identified.

As used herein the term "exome" is a subset of the genome that codes for proteins. An exome can be the collective exons of a genome, or also refer to a subset of the exons in a genome, for example all exons of known cancer genes.

As used herein the term "transcriptome" is the set of all RNA molecules is a cell or population of cells. In a preferred embodiment the transcriptome refers to all mRNA.

In some preferred embodiments the genome is sequenced. In some preferred embodiments the exome is sequenced. In some preferred embodiments the transcriptome is sequenced. In some preferred embodiments a panel of genes is sequenced, for example TP53, GATA3, CDH1, RUNX1, MAP3K1. In some preferred embodiments a single gene is sequenced. Preferably the transcriptome is sequenced, in particular the mRNA present in a sample from a tumor of the patient. The transcriptome is representative of genes and neo open reading frame peptides as defined herein being expressed in the tumor in the patient.

As used herein the term "sample" can include a single cell or multiple cells or fragments of cells or an aliquot of body fluid, taken from an individual, by means including venipuncture, excretion, ejaculation, massage, biopsy, needle aspirate, lavage sample, scraping, surgical incision, or intervention or other means known in the art. The DNA and/or RNA for sequencing is preferably obtained by taking a sample from a tumor of the patient. The skilled person knows how to obtain samples from a tumor of a patient and depending on the nature, for example location or size, of the tumor. Preferably the tumor is a breast tumor. Preferably the sample is obtained from the patient by biopsy or resection. The sample is obtained in such manner that is allows for sequencing of the genetic material obtained therein. In order to prevent a less accurate identification of at least one antigen, preferably the sequence of the tumor sample obtained from the patient is compared to the sequence of other non-tumor tissue of the patient, usually blood, obtained by known techniques (e.g. venipuncture).

Identification of frame shift mutations can be done by sequencing of RNA or DNA using methods known to the skilled person. Sequencing of the genome, exome, ORFeome, or transcriptome may be complete, targeted or partial. In some embodiments the sequencing is complete (whole sequencing). In some embodiments the sequencing is targeted. With targeted sequencing is meant that purposively certain region or portion of the genome, exome, ORFeome or transcriptome are sequenced. For example targeted sequencing may be directed to only sequencing for sequences in the set of sequences obtained from the cancer patient that would provide for a match with one or more of the sequences in the sequence listing, for example by using specific primers. In some embodiment only portion of the genome, exome, ORFeome or transcriptome is sequenced. The skilled person is well-aware of methods that allow for whole, targeted or partial sequencing of the genome, exome, ORFeome or transcriptome of a tumor sample of a patient. For example any suitable sequencing-by-synthesis platform can be used including the Genome Sequencers from Illumina/Solexa, the Ion Torrent system from Applied BioSystems, and the RSII or Sequel systems from Pacific Biosciences. Alternatively Nanopore sequencing may be used, such as the MinION, GridION or PromethION platform offered by Oxford Nanopore Technologies. The method of sequencing the genome, exome, ORFeome or transcriptome is not in particular limited within the context of the present invention.

SEQ ID NO:comparison can be performed by any suitable means available to the skilled person. Indeed the skilled person is well equipped with methods to perform such comparison, for example using software tools like BLAST and the like, or specific software to align short or long sequence reads, accurate or noisy sequence reads to a reference genome, e.g. the human reference genome GRCh37 or GRCh38. A match is identified when a sequence identified in the patients material and a sequence as disclosed herein have a string, i.e. a peptide sequence (or RNA or DNA sequence encoding such peptide (sequence) in case the comparison is on the level of RNA or DNA) in common representative of at least 8, preferably at least 10 adjacent amino acids. Furthermore, sequence reads derived from a patients cancer genome (or transcriptome) can partially match the genomic DNA sequences encoding the amino acid sequences as disclosed herein, for example if such sequence reads are derived from exon/intron boundaries or exon/exon junctions, or if part of the sequence aligns upstream (to the 5' end of the gene) of the position of a frameshift mutation. Analysis of sequence reads and identification of frameshift mutations will occur through standard methods in the field. For sequence alignment, aligners specific for short or long reads can be used, e.g. BWA (Li and Durbin, Bioinformatics. 2009 Jul. 15; 25 (14): 1754-60) or Minimap2 (Li, Bioinformatics. 2018 Sep. 15; 34 (18): 3094-3100). Subsequently, frameshift mutations can be derived from the read alignments and their comparison to a reference genome sequence (e.g. the human reference genome GRCh37) using variant calling tools, for example Genome Analysis ToolKit (GATK), and the like (McKenna et al. Genome Res. 2010 September; 20 (9): 1297-303).

A match between an individual patient's tumor sample genome or transcriptome sequence and one or more NOPs disclosed herein indicates that said tumor expresses said NOP and that said patient would likely benefit from treatment with a vaccine comprising said NOP (or a fragment thereof). More specifically, a match occurs if a frameshift mutation is identified in said patient's tumor genome sequence and said frameshift leads to a novel reading frame (+1 or −1 with respect to the native reading from of a gene). In such instance, the predicted out-of-frame peptide derived from the frameshift mutation matches any of the sequences 1-230 as disclosed herein. In some embodiments, said patient is administered said NOP (e.g., by administering the peptides, nucleic acid molecules, vectors, host cells or vaccines as disclosed herein).

In some embodiments, the methods further comprise sequencing the genome, exome, ORFeome, or transcriptome (or a part thereof) from a normal, non-tumor sample from said individual and determining whether there is a match with one or more NOPs identified in the tumor sample. Although the neoantigens disclosed herein appear to be specific to tumors, such methods may be employed to confirm that the neoantigen is tumor specific and not, e.g., a germline mutation.

The disclosure further provides the use of the neoantigens and vaccines disclosed herein in prophylactic methods from preventing or delaying the onset of breast cancer. Approximately 1 in 10 women will develop breast cancer and the neo open reading frames disclosed herein occur in approximately 20% of breast cancer patients. Prophylactic vaccination based on frameshift resulting peptides disclosed herein would thus provide possible protection to approximately 2% of the general population. The vaccine may be specifically used in a prophylactic setting for women that have an increased risk of developing breast cancer. For example, prophylactic vaccination based on the peptides disclosed herein is expected to provide possible protection to around 29% of women having a germline predisposition mutation in BRCA1 and/or BRCA2, and who will obtain breast cancer as a result of their predisposing mutation. In some embodiments, the prophylactic methods are useful for individuals who are genetically related to individuals afflicted with breast cancer. In some embodiments, the prophylactic methods are useful for the general population.

In some embodiments, the individual is at risk of developing cancer. It is understood to a skilled person that being at risk of developing cancer indicates that the individual has a higher risk of developing cancer than the general population; or rather the individual has an increased risk over the average of developing cancer. Such risk factors are known to a skilled person and include being a woman; being 50 years or older; previously being afflicted with breast cancer, atypical hyperplasia or lobular carcinoma in situ; previously having radiation therapy to the chests or breast, having received hormone replacement therapy, having a family history of breast cancer, and having a mutation in a gene that predisposes an individual to breast cancer.

In some embodiments, said individual has a germline mutation in a gene that increases the chance that the individual will develop breast cancer, preferably the mutation is in the PALB2, CHEK2, BRCA1, and/or BRCA2 gene. Predisposing mutations in the PALB2, CHEK2, BRCA1, and BRCA2 genes are known to a skilled person and such mutations can be identified in individuals. Preferably, the prophylactic methods disclosed herein comprise determining the presence of a predisposing mutation in one or more of the PALB2, CHEK2, BRCA1, and BRCA2 genes and prophylactically administering the vaccine disclosed herein to an individual having said predisposing mutation in one or more of the PALB2, CHEK2, BRCA1, and BRCA2 genes, or other genes with known predisposing mutations as described in Frey et al. Plast Reconstr Surg Glob Open 2017; 5e1564.

As used herein, "to comprise" and its conjugations is used in its non-limiting sense to mean that items following the word are included, but items not specifically mentioned are not excluded. In addition, the verb "to consist" may be replaced by "to consist essentially of" meaning that a compound or adjunct compound as defined herein may comprise additional component(s) than the ones specifically identified, said additional component(s) not altering the unique characteristic of the invention.

The articles "a" and "an" are used herein to refer to one or more than one (i.e., to at least one) of the grammatical object of the article. By way of example, "an element" means one element or more than one element.

The word "approximately" or "about" when used in association with a numerical value (approximately 10, about 10) preferably means that the value may be the given value of 10 more or less 1% of the value.

All patent and literature references cited in the present specification are hereby incorporated by reference in their entirety.

For the purpose of clarity and a concise description features are described herein as part of the same or separate embodiments, however, it will be appreciated that the scope of the invention may include embodiments having combinations of all or some of the features described.

EXAMPLES

Figure 1A:
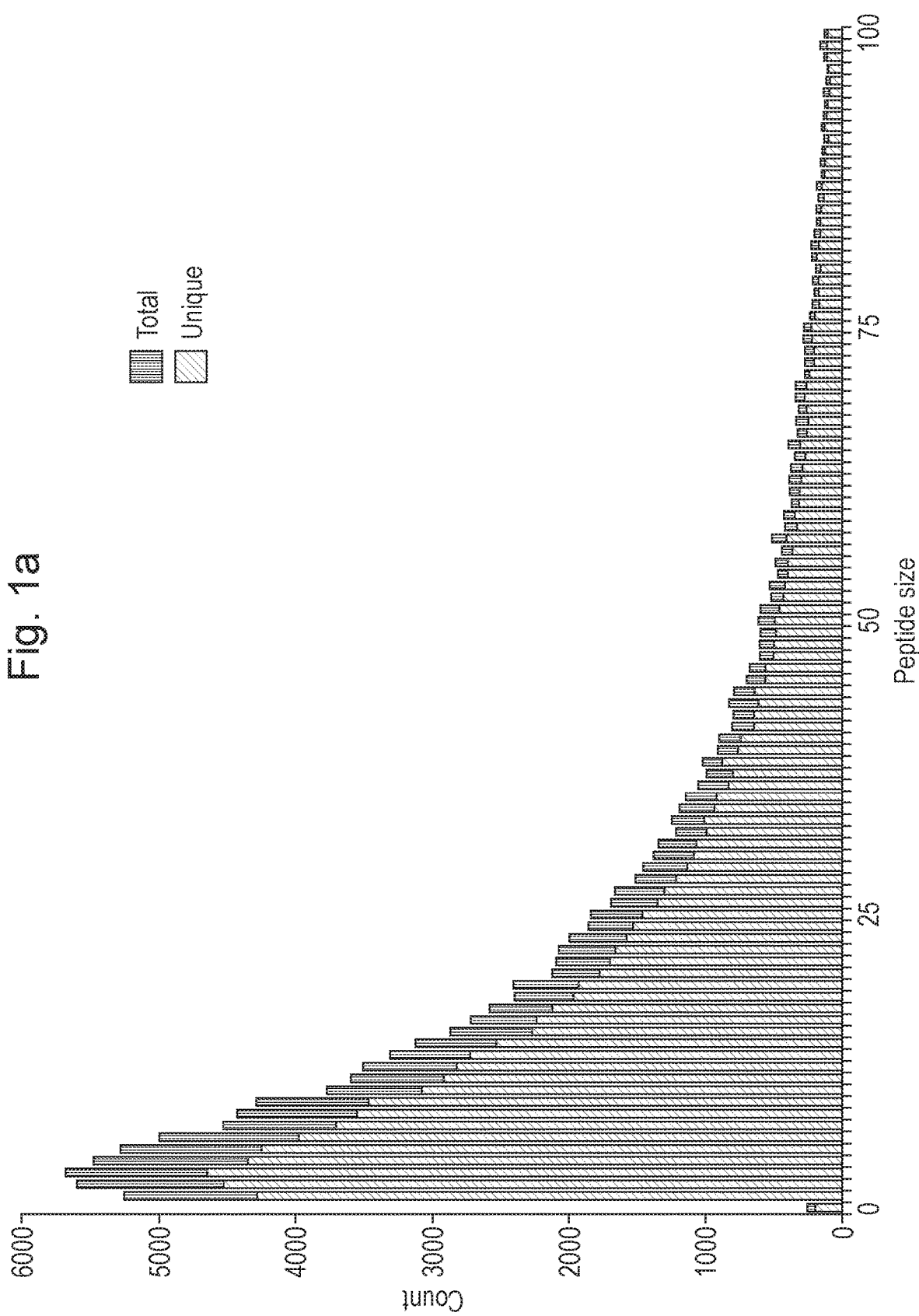
FIG. 1 Frame shift initiated translation in the TCGA (n=10,186) cohort is of sufficient size for immune presentation. A. Peptide length distribution of frame shift mutation initiated translation up to the first encountered stop codon. Dark shades are unique peptide sequences derived from frameshift mutations, light shade indicates the total sum (unique peptides derived from frameshifts multiplied by number of patients containing that frameshift). B. Gene distribution of peptides with length 10 or longer and encountered in up to 10 patients.
Figure 1B:
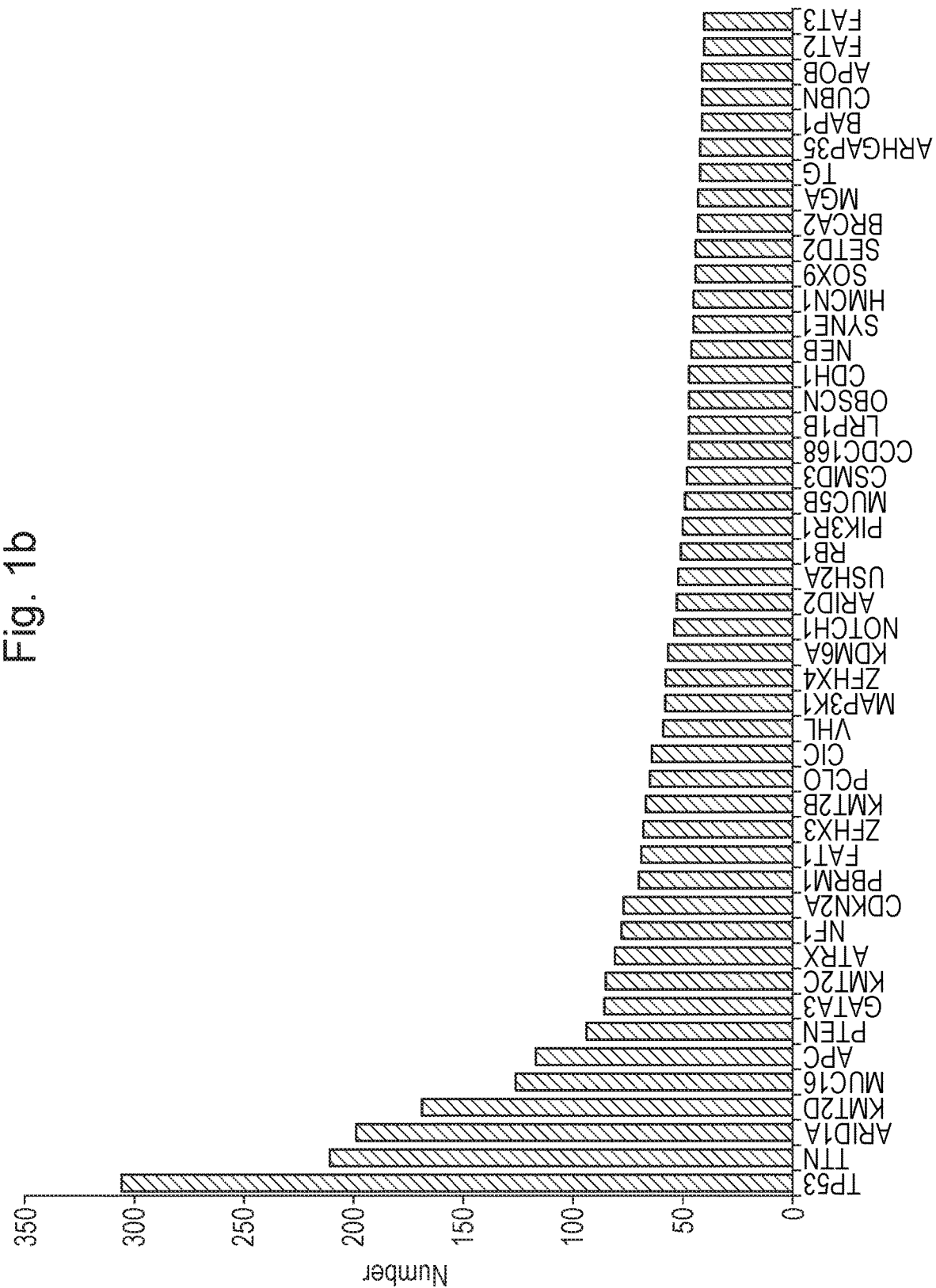
Figure 2A:
FIG. 2 Neo open reading frame peptides (TCGA cohort) converge on common peptide sequences. Graphical representation in an isoform of TP53, where amino acids are colored distinctly. A. somatic single nucleotide variants, B. positions of frame shift mutations on the −1 and the +1 frame. C. amino acid sequence of TP53. D. Peptide (10 aa) library (n=1,000) selection. Peptides belonging to −1 or +1 frame are separated vertically E, F pNOPs for the different frames followed by all encountered frame shift mutations (rows), translated to a stop codon (lines) colored by amino acid.
Figure 2B:
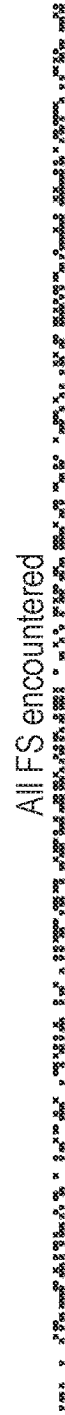
Figure 2C:
Figure 2D:
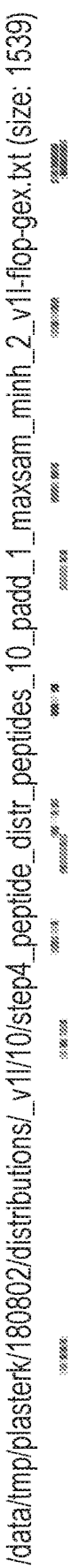
Figure 2F:
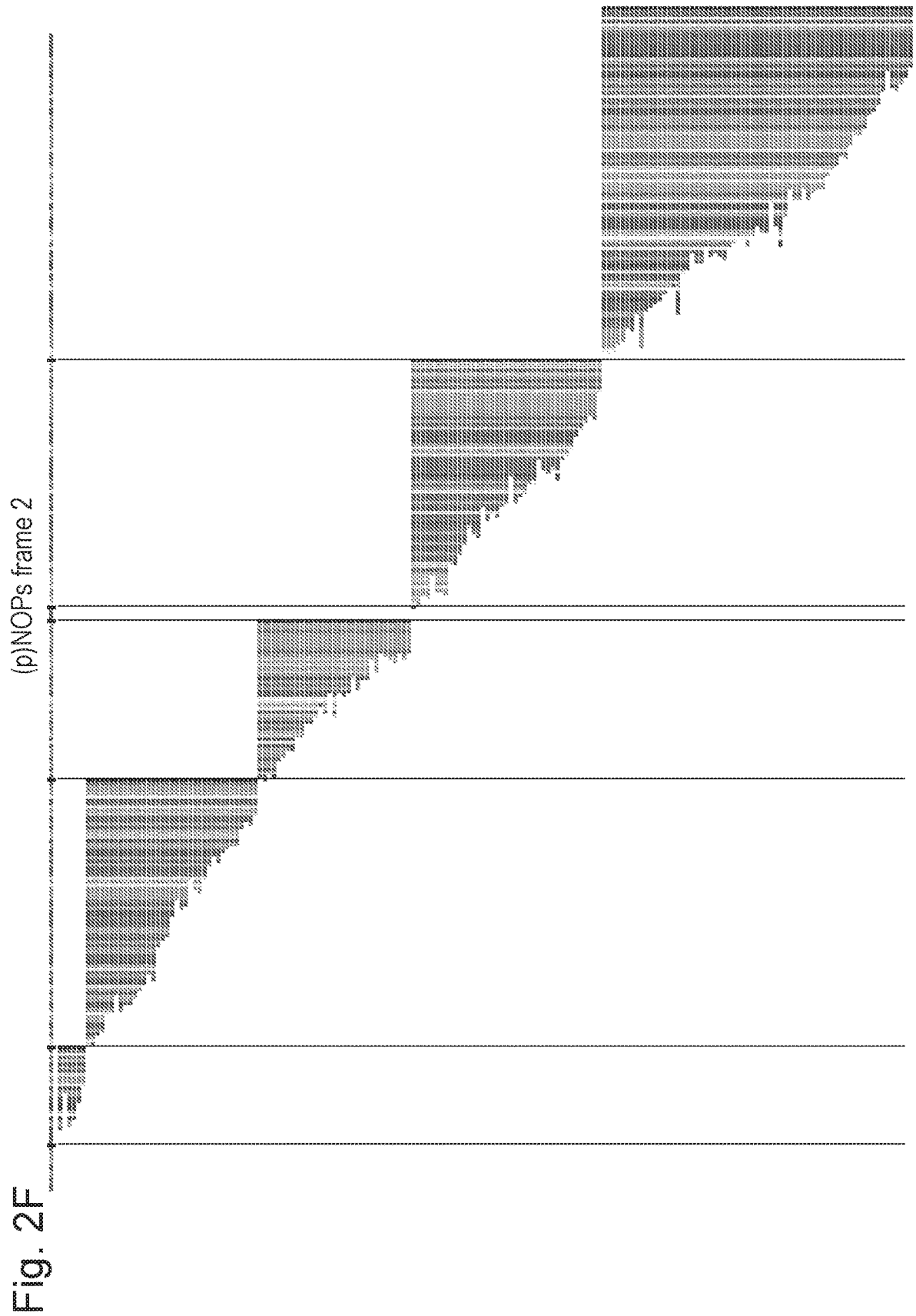
Figure 6A:
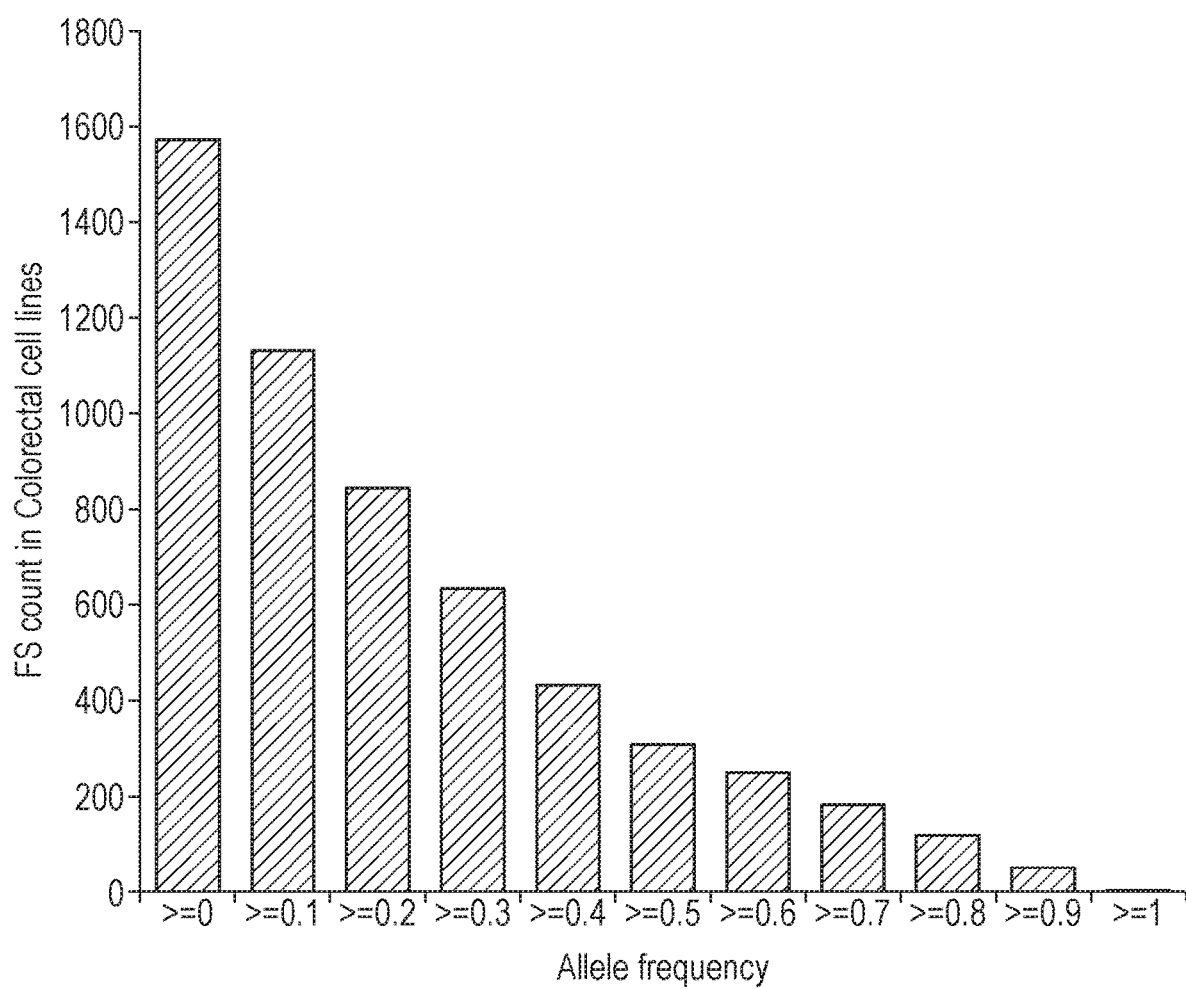
FIG. 6 Frame shift presence in mRNA from 58 CCLE colorectal cancer cell lines.
a. Cumulative counting of RNAseq allele frequency (Samtools mpileup (XO:1/all)) at the genomic position of DNA detected frame shift mutations.
b. IGV examples of frame shift mutations in the BAM files of CCLE cell lines.
Figure 6B:
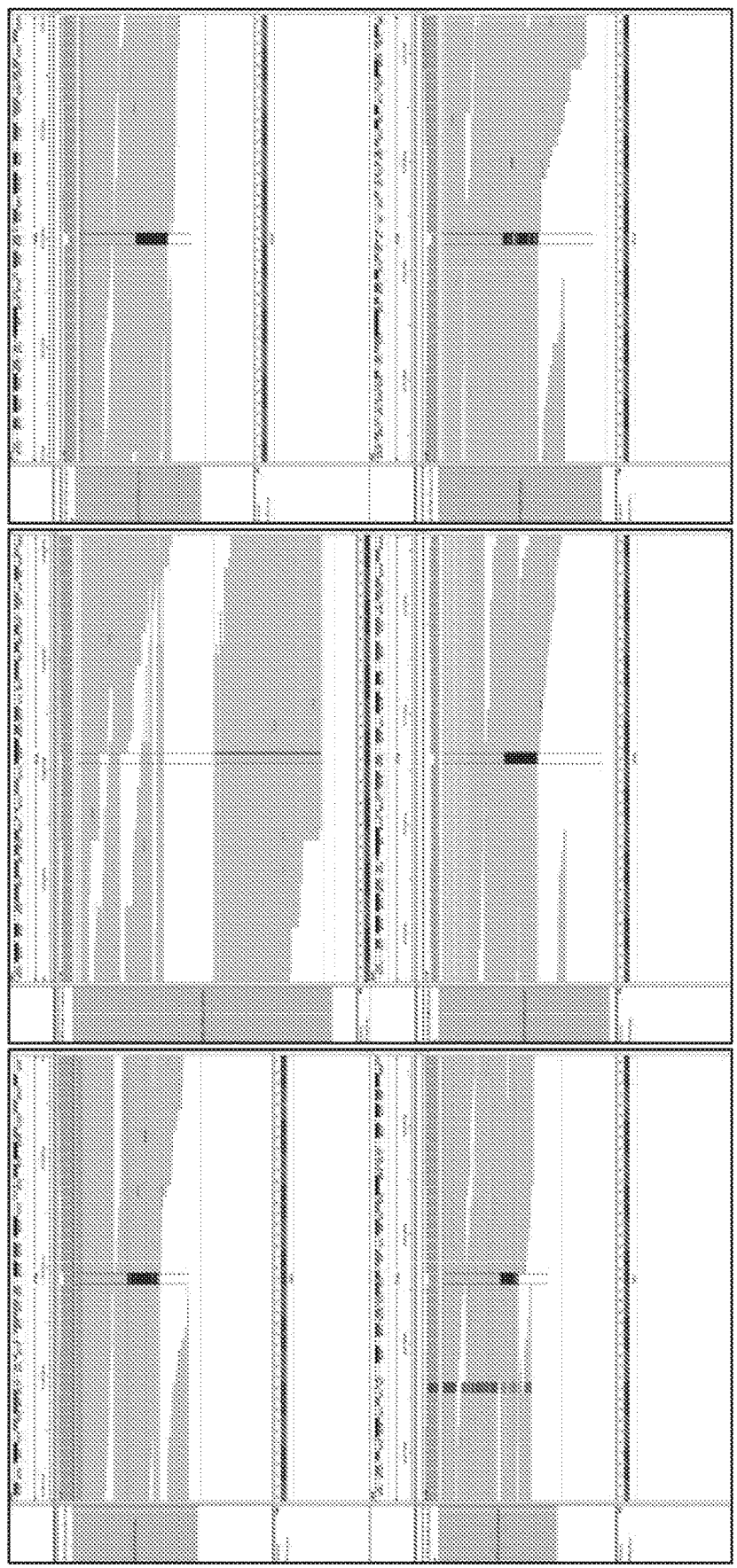

We have analyzed 10,186 cancer genomes from 33 tumor types of the 40 TCGA (The Cancer Genome Atlas22) and focused on the 143,444 frame shift mutations represented in this cohort. Translation of these mutations after re-annotation to a RefSeq annotation, starting in the protein reading frame, can lead to 70,439 unique peptides that are 10 or more amino acids in length (a cut off we have set at a size sufficient to shape a distinct epitope in the context of MHC (FIG. 1a). The list of genes most commonly represented in the cohort and containing such frame shift mutations is headed nearly exclusively by tumor driver genes, such as NF1, RB, BRCA2 (FIG. 1b) whose whole or partial loss of function apparently contributes to tumorigenesis. Note that a priori frame shift mutations are expected to result in loss of gene function more than a random SNV, and more independent of the precise position. NOPs initiated from a frameshift mutation and of a significant size are prevalent in tumors, and are enriched in cancer driver genes. Alignment of the translated NOP products onto the protein sequence reveals that a wide array of different frame shift mutations translate in a common downstream stretch of neo open reading frame peptides ('NOPs'), as dictated by the −1 and +1 alternative reading frames. While we initially screened for NOPs of ten or more amino acids, their open reading frame in the out-of-frame genome often extends far beyond that search window. As a result we see (FIG. 2) that hundreds of different frame shift mutations all at different sites in the gene nevertheless converge on only a handful of NOPs. Similar patterns are found in other common driver genes (FIG. 5). FIG. 2 illustrates that the precise location of a frame shift does not seem to matter much; the more or less straight slope of the series of mutations found in these 10,186 tumors indicates that it is not relevant for the biological effect (presumably reduction/loss of gene function) where the precise frame shift is, as long as translation stalls in the gene before the downstream remainder of the protein is expressed. As can also be seen in FIG. 2, all frame shift mutations alter the reading frame to one of the two alternative frames. Therefore, for potential immunogenicity the relevant information is the sequence of the alternative ORFs and more precisely, the encoded peptide sequence between 2 stop codons. We term these peptides 'proto Neo Open Reading Frame peptides' or pNOPs, and generated a full list of all thus defined out of frame protein encoding regions in the human genome, of 10 amino acids or longer. We refer to the total sum of all Neo-ORFs as the Neo-ORFeome. The Neo-ORFeome contains all the peptide potential that the human genome can generate after simple frame-shift induced mutations. The size of the Neo-ORFeome is 46.6 Mb. To investigate whether or not Nonsense Mediated Decay would wipe out frame shift mRNAs, we turned to a public repository containing read coverage for a large collection of cell lines (CCLE). We processed the data in a similar fashion as for the TCGA, identified the locations of frame shifts and subsequently found that, in line with the previous literature[23-25], at least a large proportion of expressed genes also contained the frame shift mutation within the expressed mRNAs (FIG. 6). On the mRNA level, NOPs can be detected in RNAseq data. We next investigated how the number of patients relates to the number of NOPs.

Figure 3:
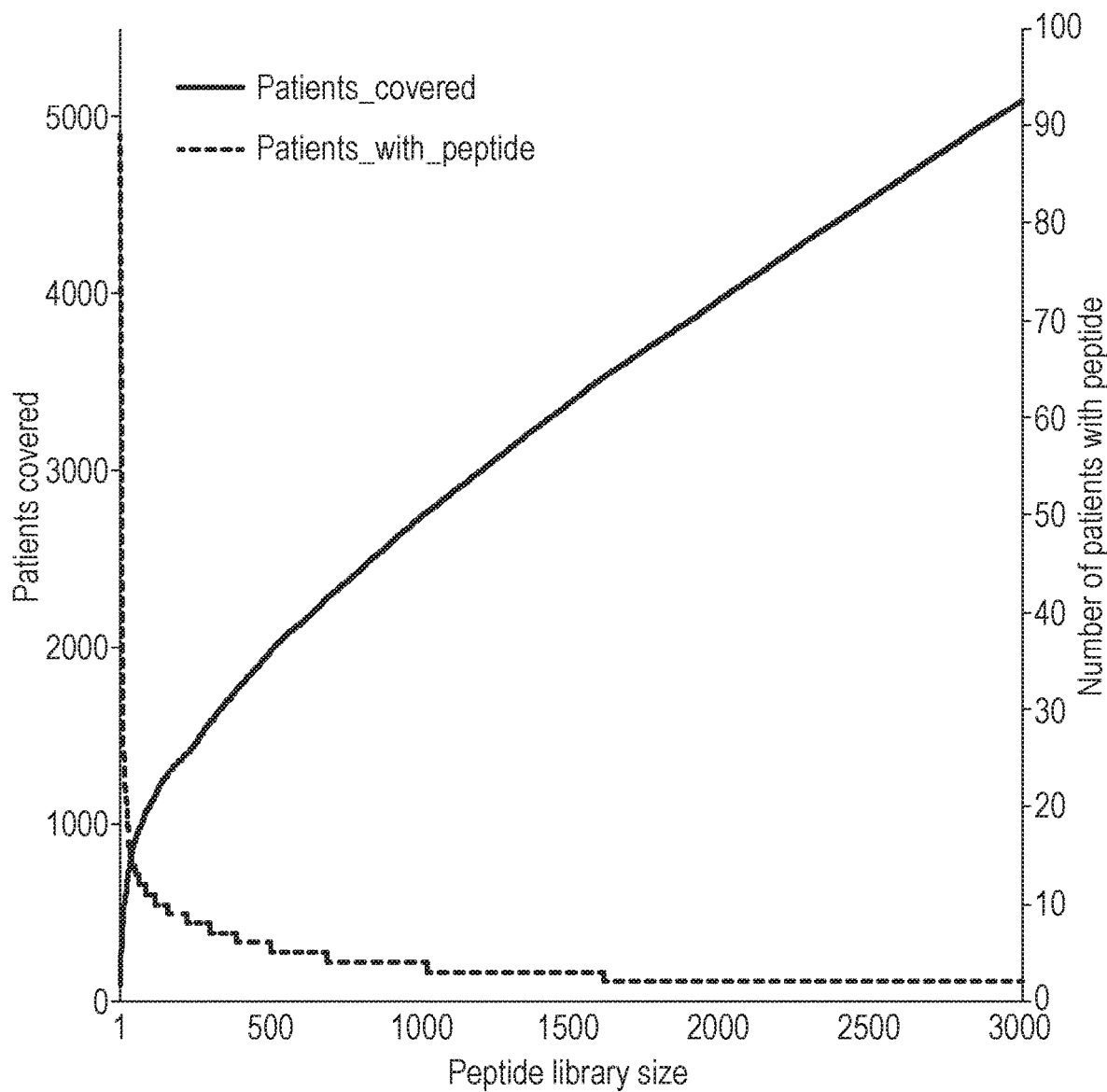
FIG. 3 A recurrent peptide selection procedure can generate a 'fixed' library to cover up to 50% of the TCGA cohort. Graph depicts the number of unique patients from the TCGA cohort (10, 186 patients) accommodated by a growing library of 10-mer peptides, picked in descending order of the number patients with that sequence in their NOPs. A peptide is only added if it adds a new patient from the TCGA cohort. The dark blue line shows that an increasing number of 10-mer peptides covers an increasing number of patients from the TCGA cohort (up to 50% if using 3000 unique 10-mer peptides). Light shaded blue line depicts the number of patients containing the peptide that was included (right Y-axis). The best peptide covers 89 additional patients from the TCGA cohort (left side of the blue line), the worst peptide includes only 1 additional patient (right side of the blue line).
Figure 4:
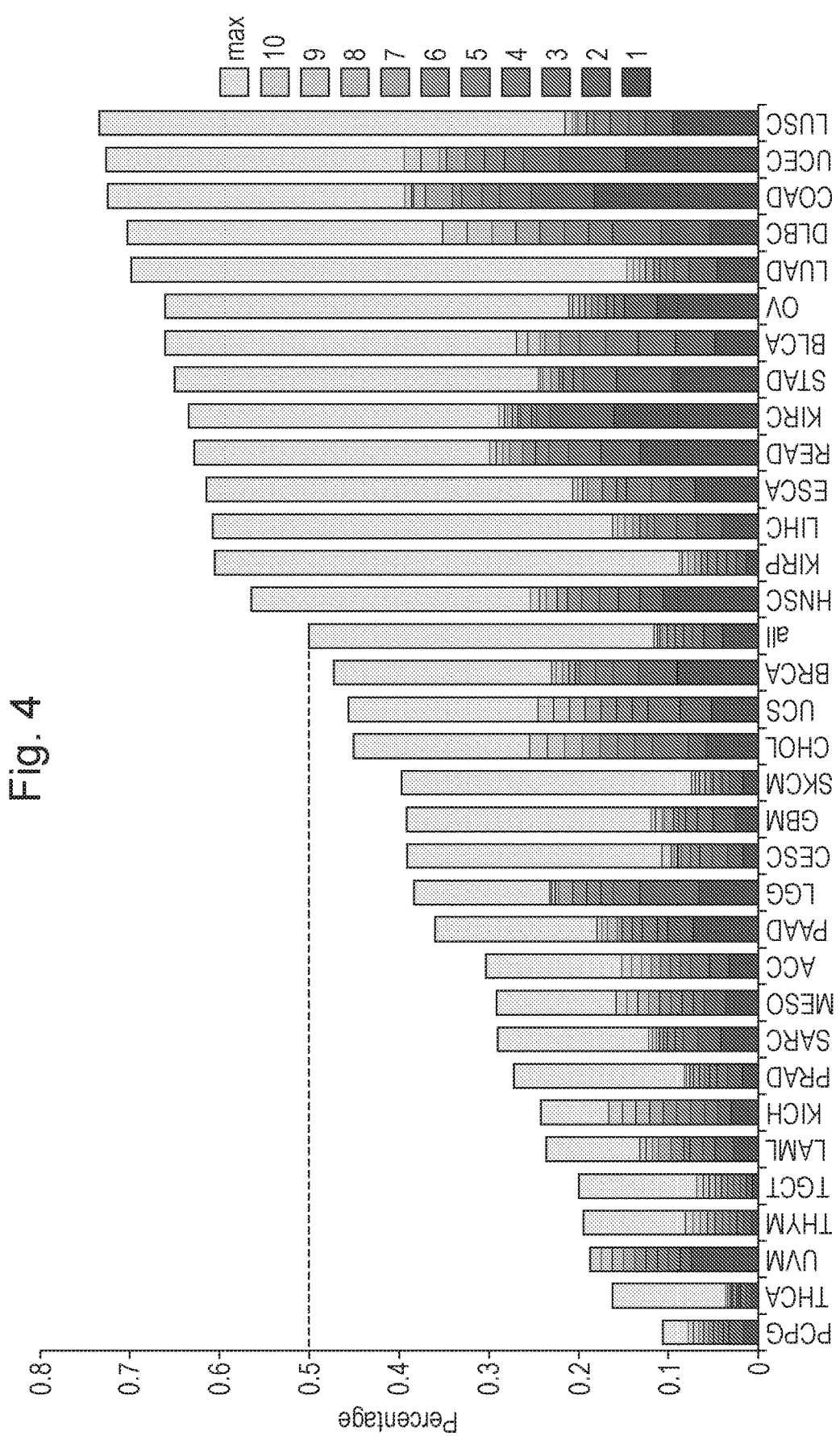
FIG. 4 For some cancers up to 70% of patients contain a recurrent NOP. TCGA cohort ratio of patients separated by tumor type that could be 'helped' using optimally selected peptides for genes encountered most often within a cancer. Coloring represents the ratio, using 1, 2 . . . 10 genes, or using all encountered genes (lightest shade)
Figure 5A:
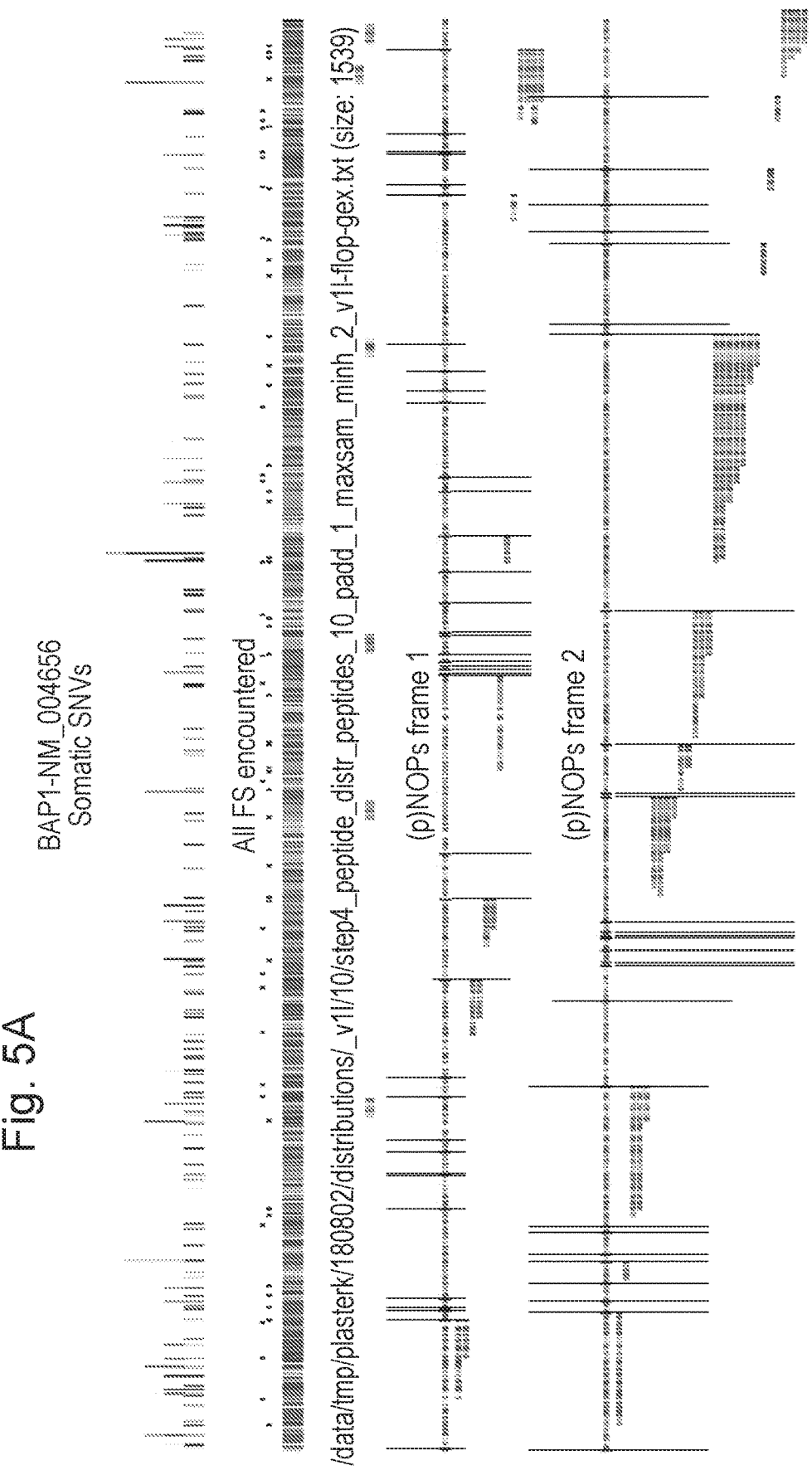
FIG. 5 Examples of NOPs. Selection of genes containing NOPs of 10 or more amino acids.
Figure 5C:
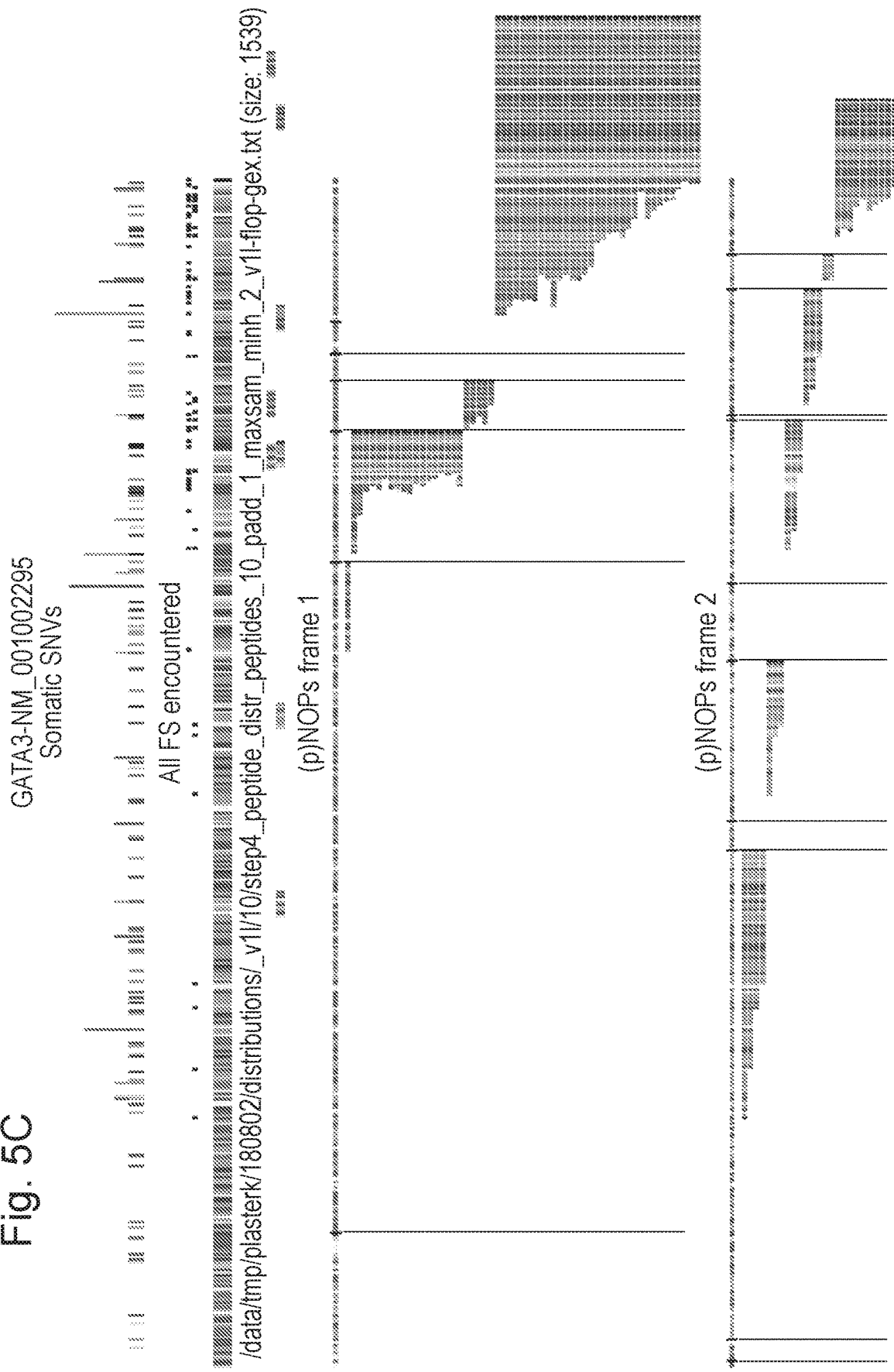
Figure 5D:
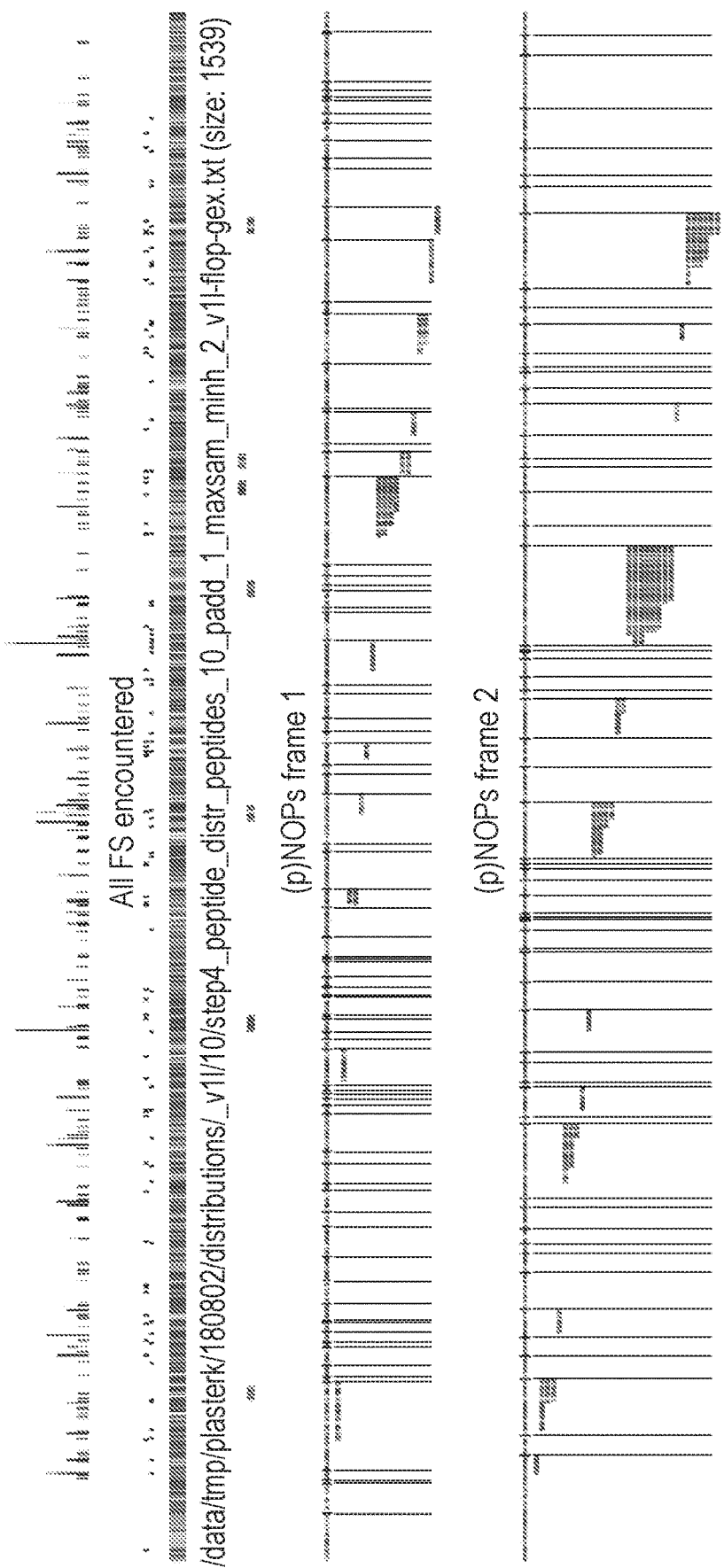
Figure 5E:
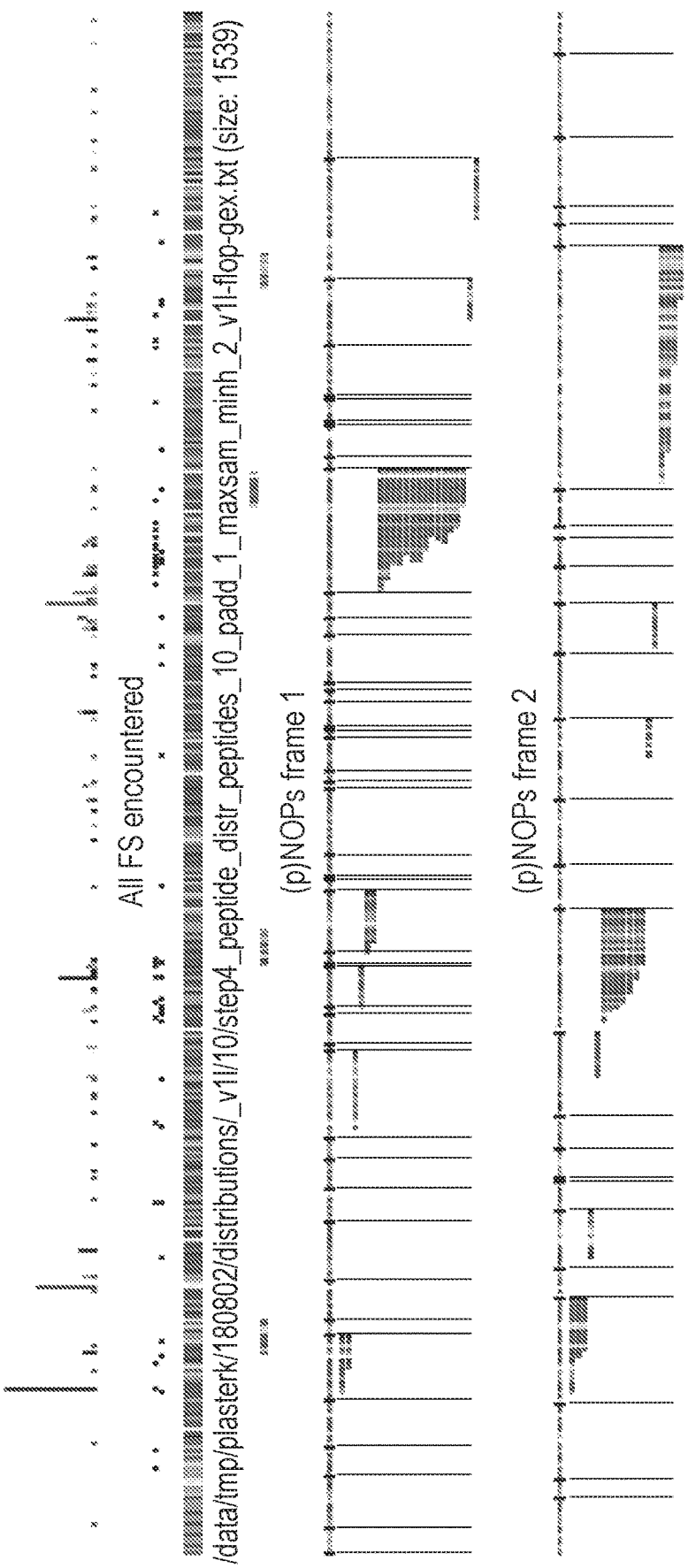
Figure 5G:
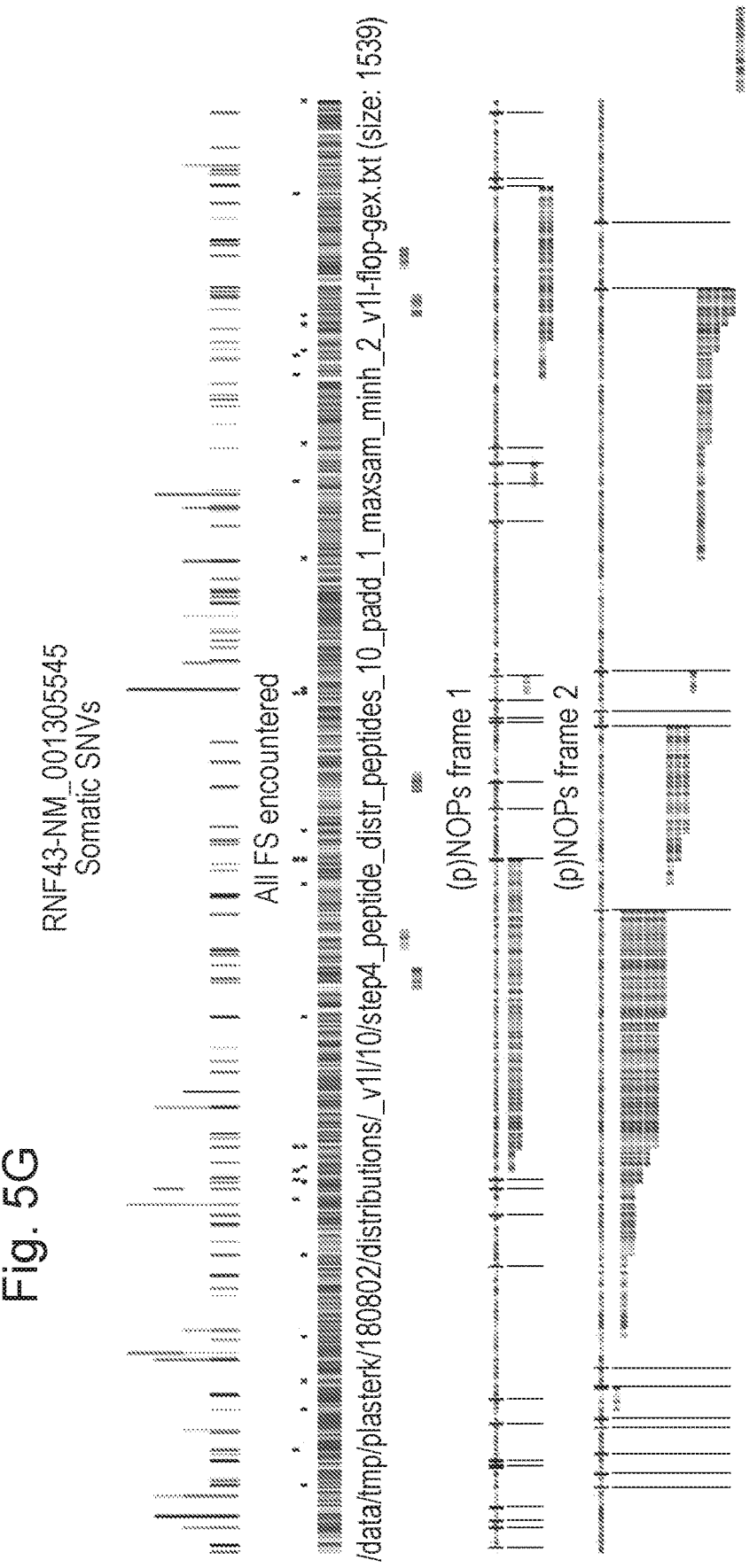
Figure 5H:
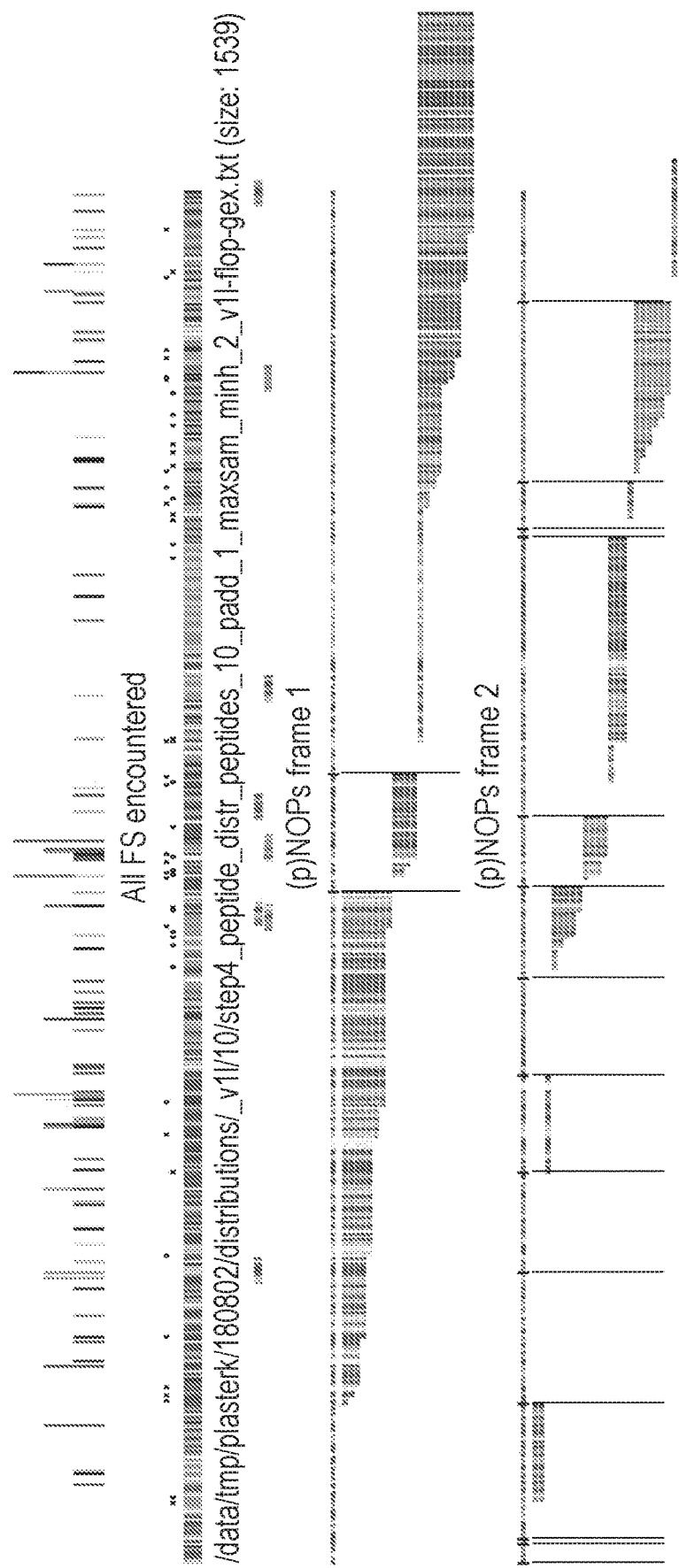
Figure 5I:
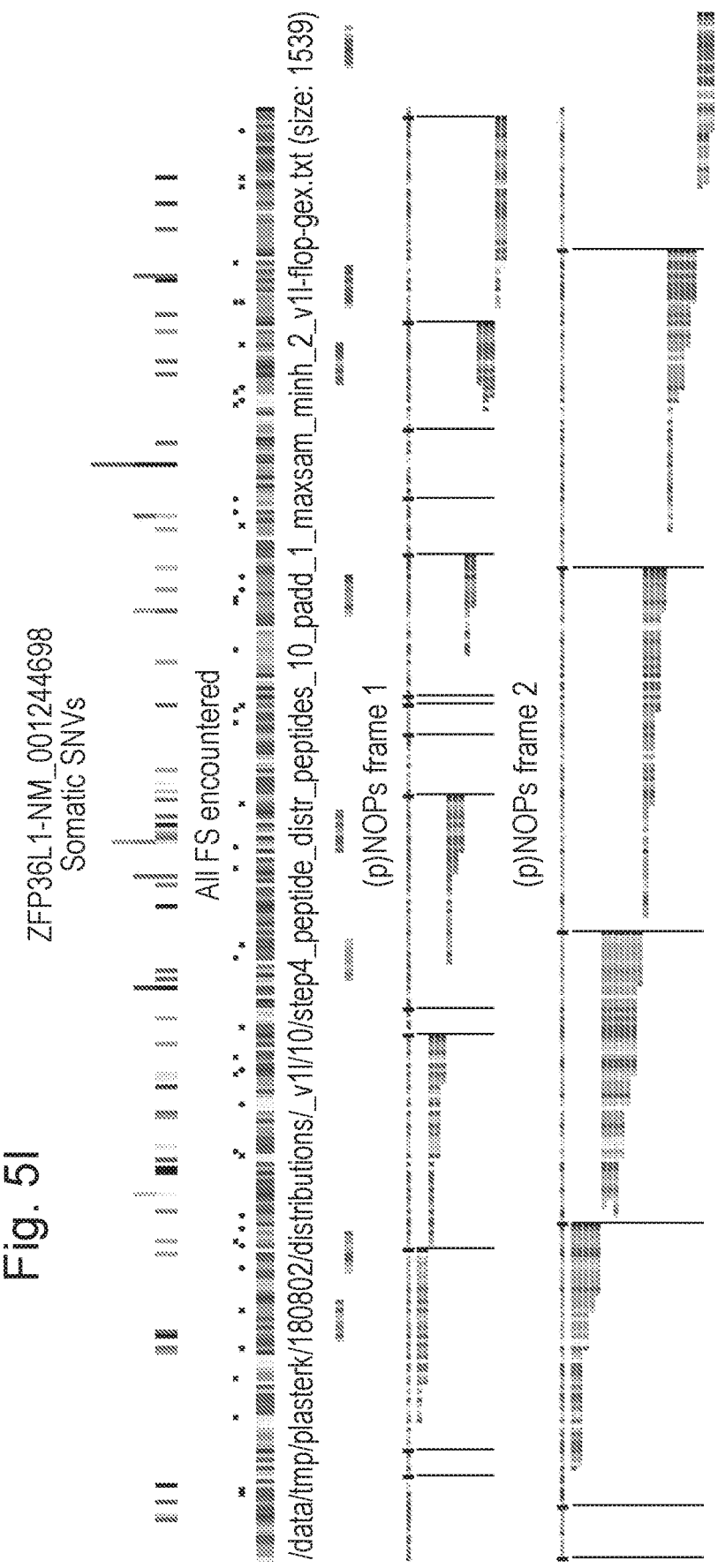
Figure 5J:
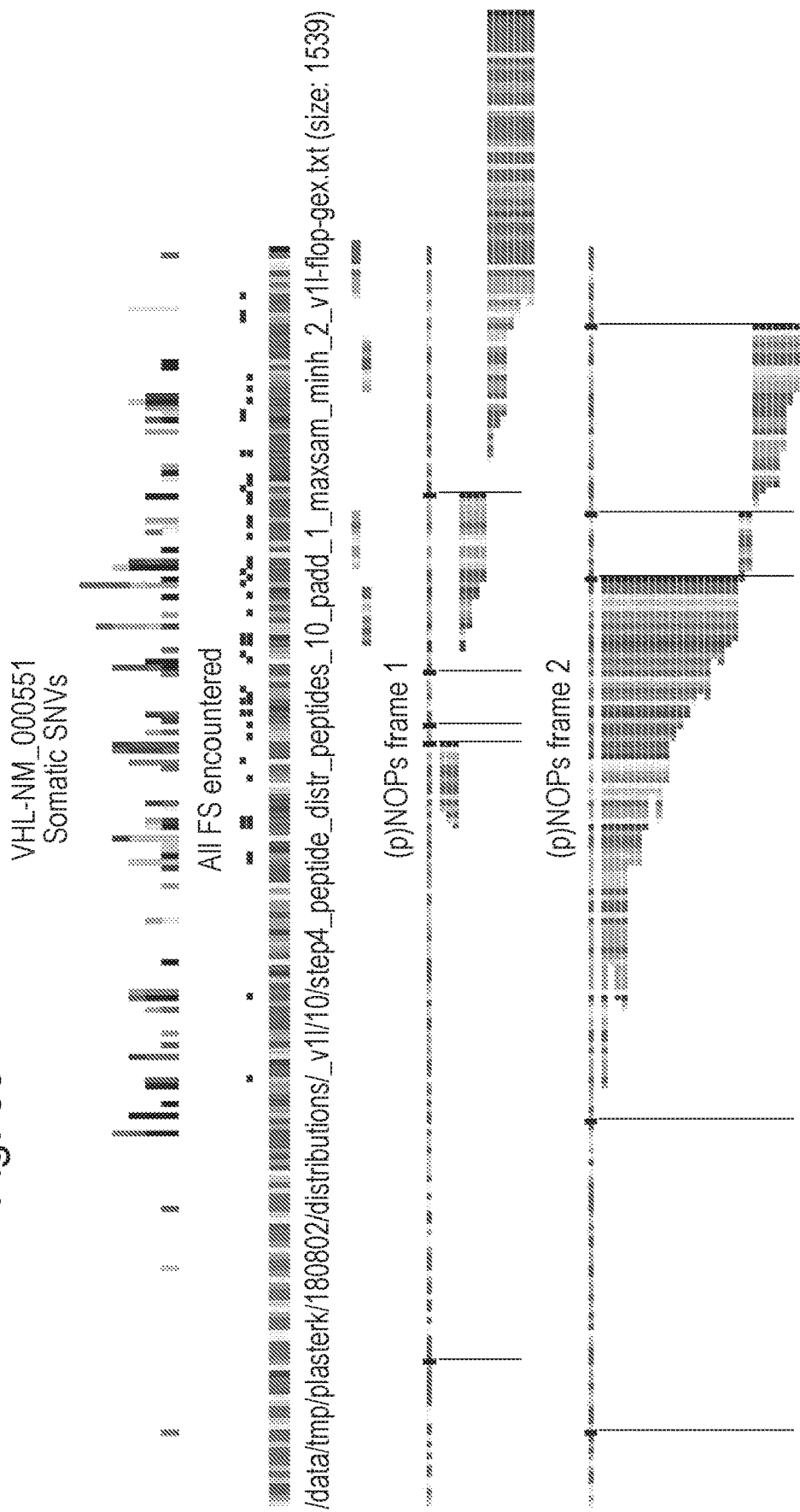
Figure 5K:
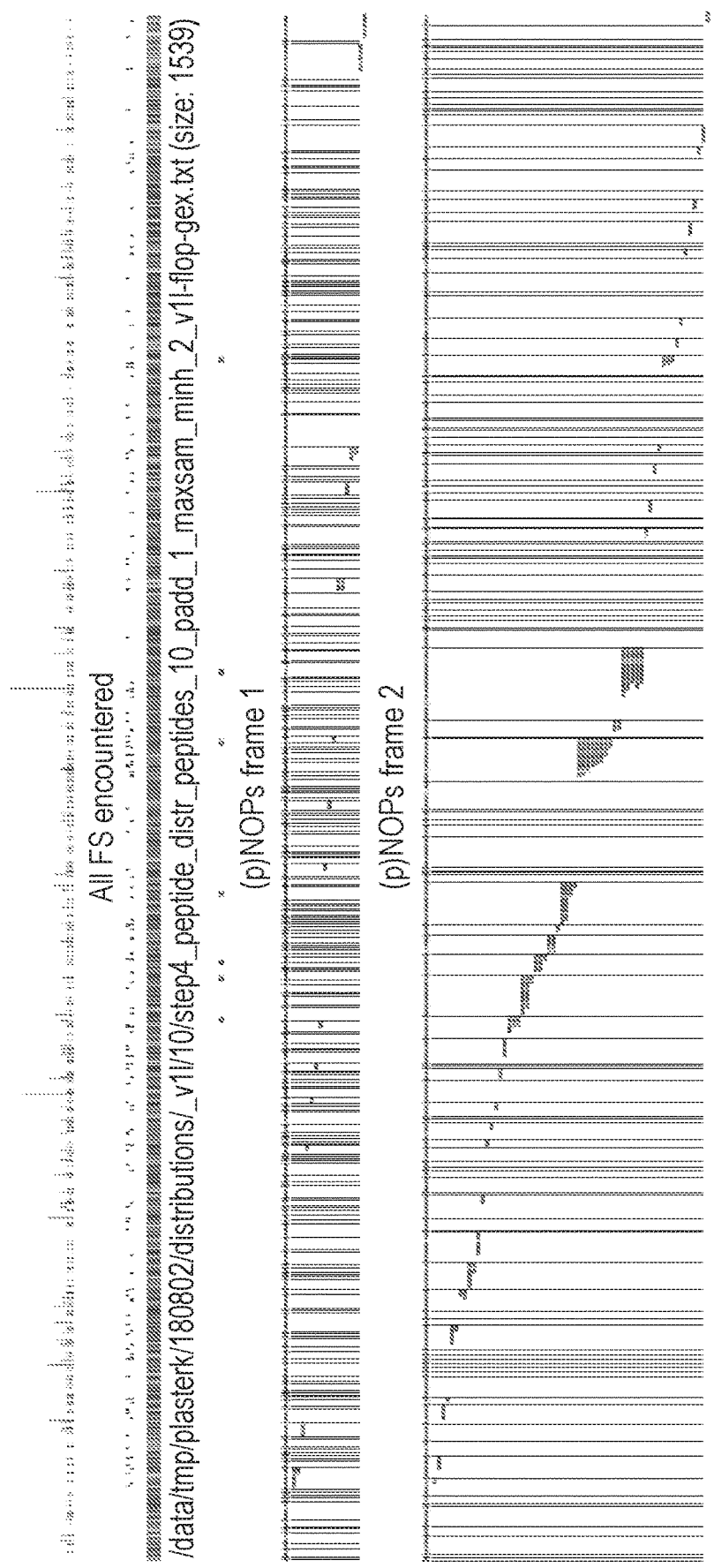
Figure 7:
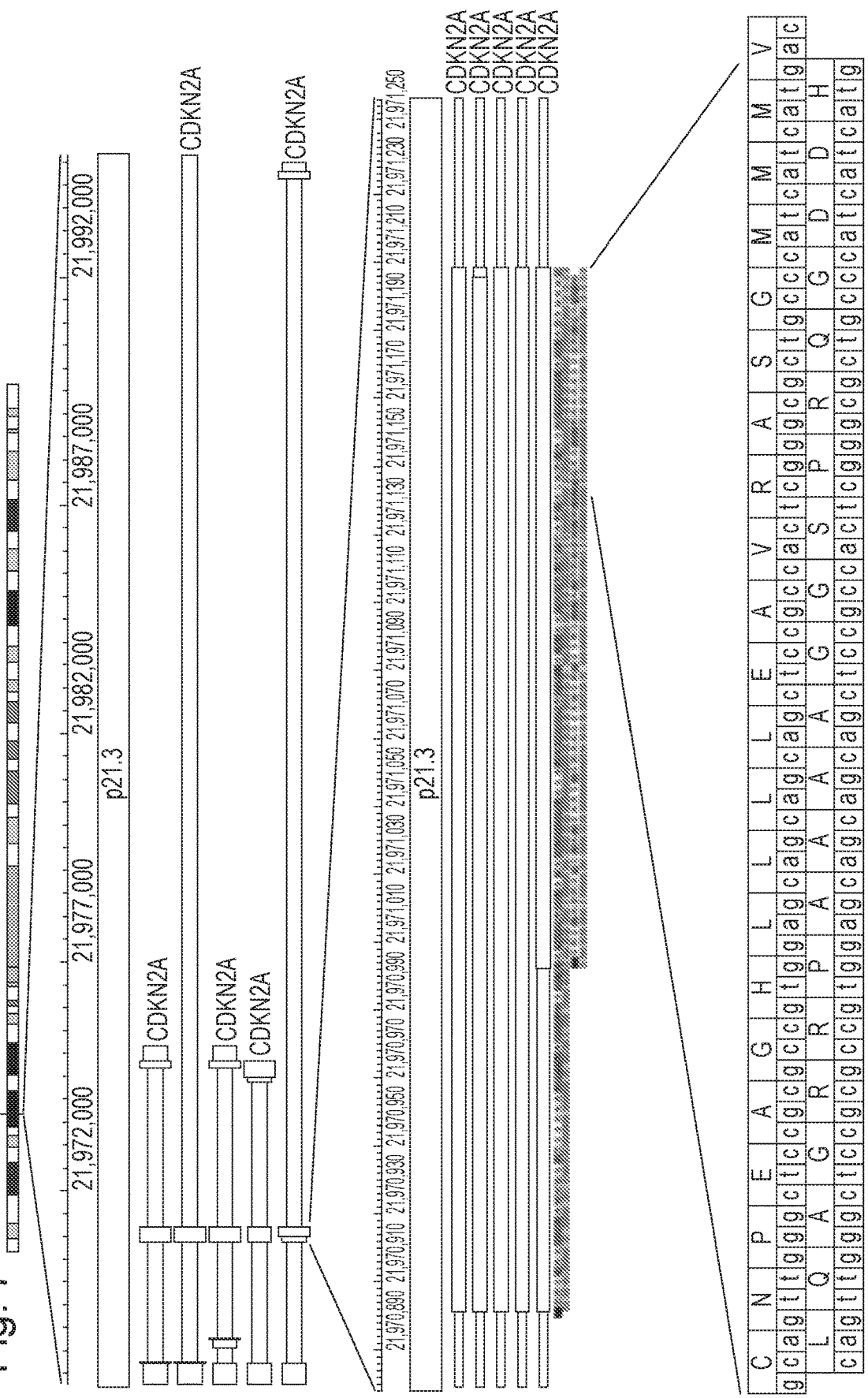
FIG. 7 Example of normal isoforms, using shifted frame. Genome model of CDKN2A with the different isoforms are shown on the minus strand of the genome. Zoom of the middle exon depicts the 2 reading frames that are encountered in the different isoforms.
Figure 8:
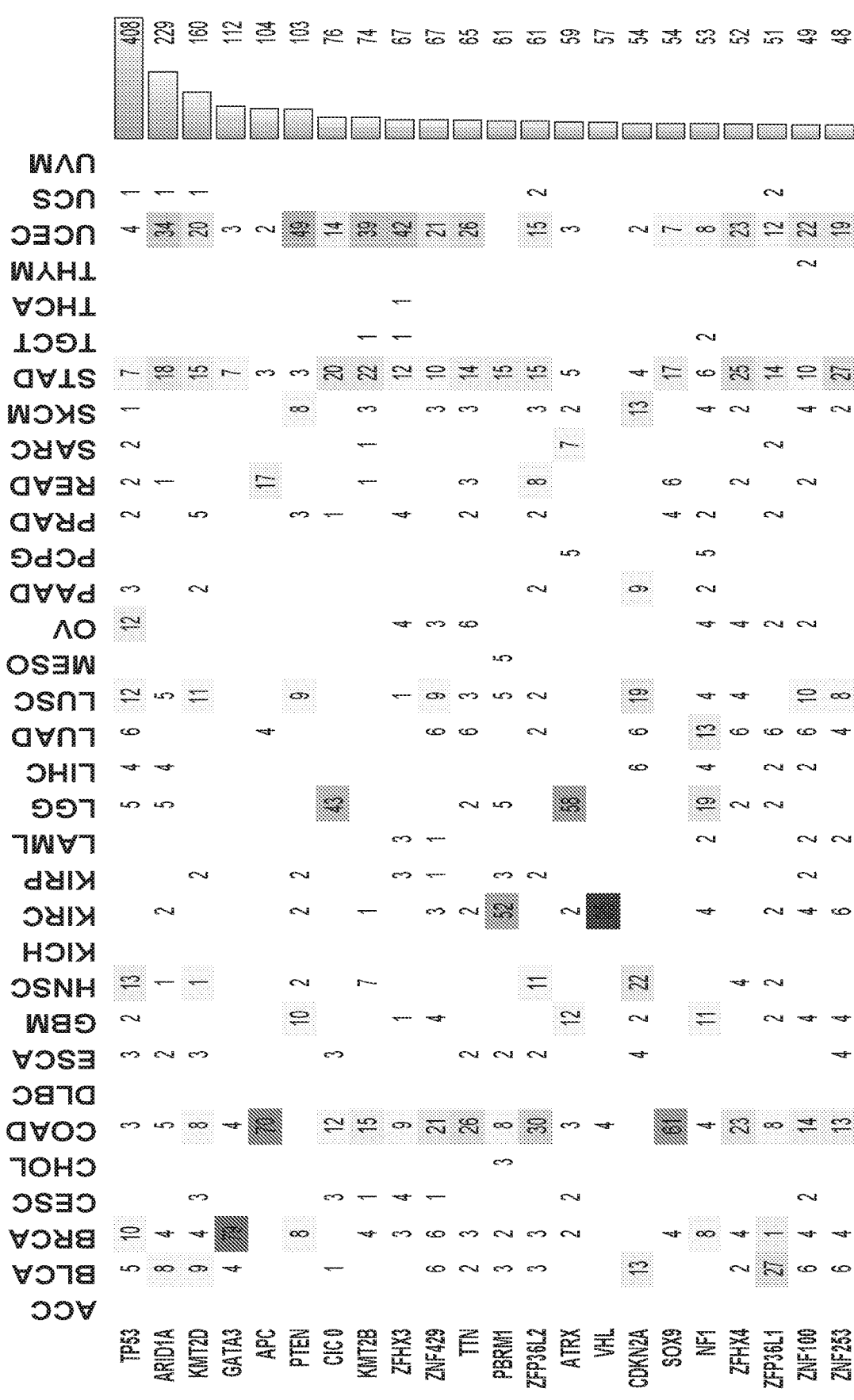
FIG. 8 Gene prevalence vs Cancer type.
Percentage of frameshift mutations (resulting in peptides of 10 aa or longer), assessed by the type of cancer in the TCGA cohort. Genes where 50% or more of the frameshifts occur within a single tumor type are indicated in bold. Cancer type abbreviations are as follows:
LAML Acute Myeloid Leukemia
ACC Adrenocortical carcinoma
BLCA Bladder Urothelial Carcinoma
LGG Brain Lower Grade Glioma
BRCA Breast invasive carcinoma CESC Cervical squamous cell carcinoma and endocervical adenocarcinoma
CHOL Cholangiocarcinoma
LCML Chronic Myelogenous Leukemia
COAD Colon adenocarcinoma
CNTL Controls
ESCA Esophageal carcinoma
GBM Glioblastoma multiforme
HNSC Head and Neck squamous cell carcinoma
KICH Kidney Chromophobe
KIRC Kidney renal clear cell carcinoma
KIRP Kidney renal papillary cell carcinoma
LIHC Liver hepatocellular carcinoma
LUAD Lung adenocarcinoma
LUSC Lung squamous cell carcinoma
DLBC Lymphoid Neoplasm Diffuse Large B-cell Lymphoma
MESO Mesothelioma
MISC Miscellaneous
OV Ovarian serous cystadenocarcinoma
PAAD Pancreatic adenocarcinoma
PCPG Pheochromocytoma and Paraganglioma
PRAD Prostate adenocarcinoma
READ Rectum adenocarcinoma
SARC Sarcoma
SKCM Skin Cutaneous Melanoma
STAD Stomach adenocarcinoma
TGCT Testicular Germ Cell Tumors
THYM Thymoma
THCA Thyroid carcinoma
UCS Uterine Carcinosarcoma
UCEC Uterine Corpus Endometrial Carcinoma
UVM Uveal Melanoma FIG. 9 NOPs in the MSK-IMPACT study Frame shift analysis in the targeted sequencing panel of the MSK-IMPACT study, covering up to 410 genes in more 10,129 patients (with at least 1 somatic mutation). a. FS peptide length distribution, b. Gene count of patients containing NOPs of 10 or more amino acids. c. Ratio of patients separated by tumor type that possess a neo epitope using optimally selected peptides for genes encountered most often within a cancer. Coloring represents the ratio, using 1, 2 . . . 10 genes, or using all encountered genes (lightest shade) d. Examples of NOPs for 4 genes.
Figure 9B:
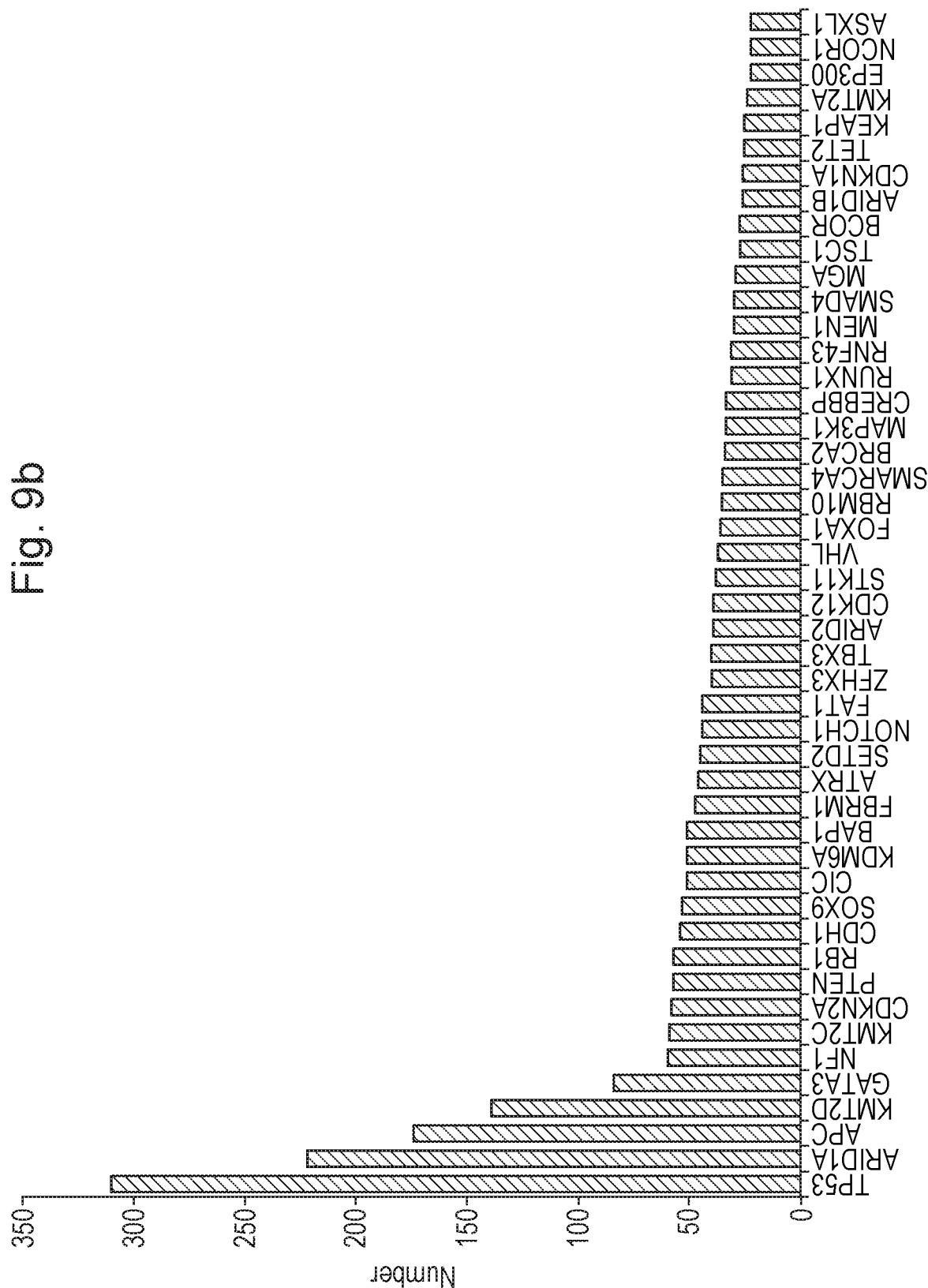
Figure 9D:
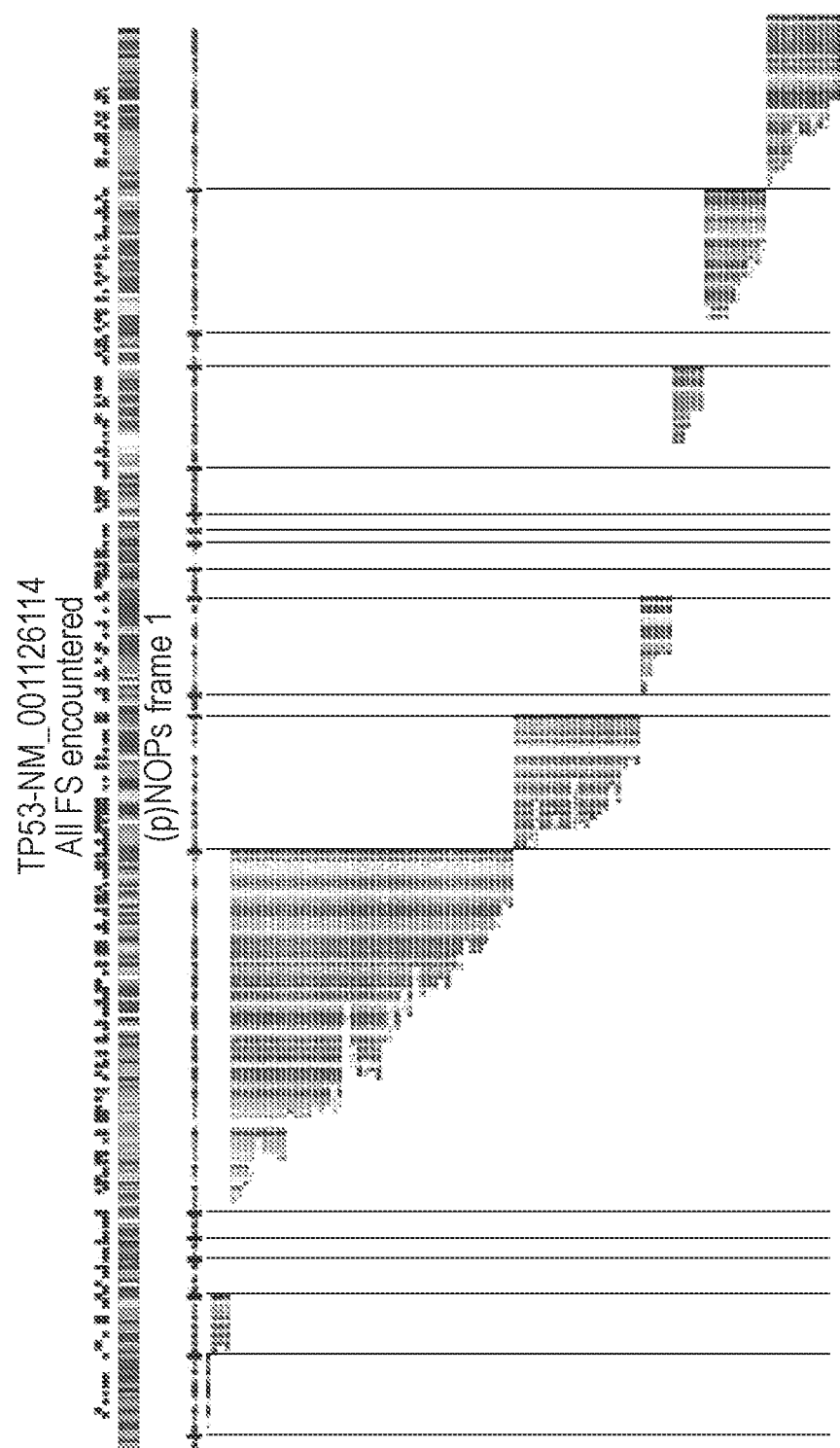
Figure 10:
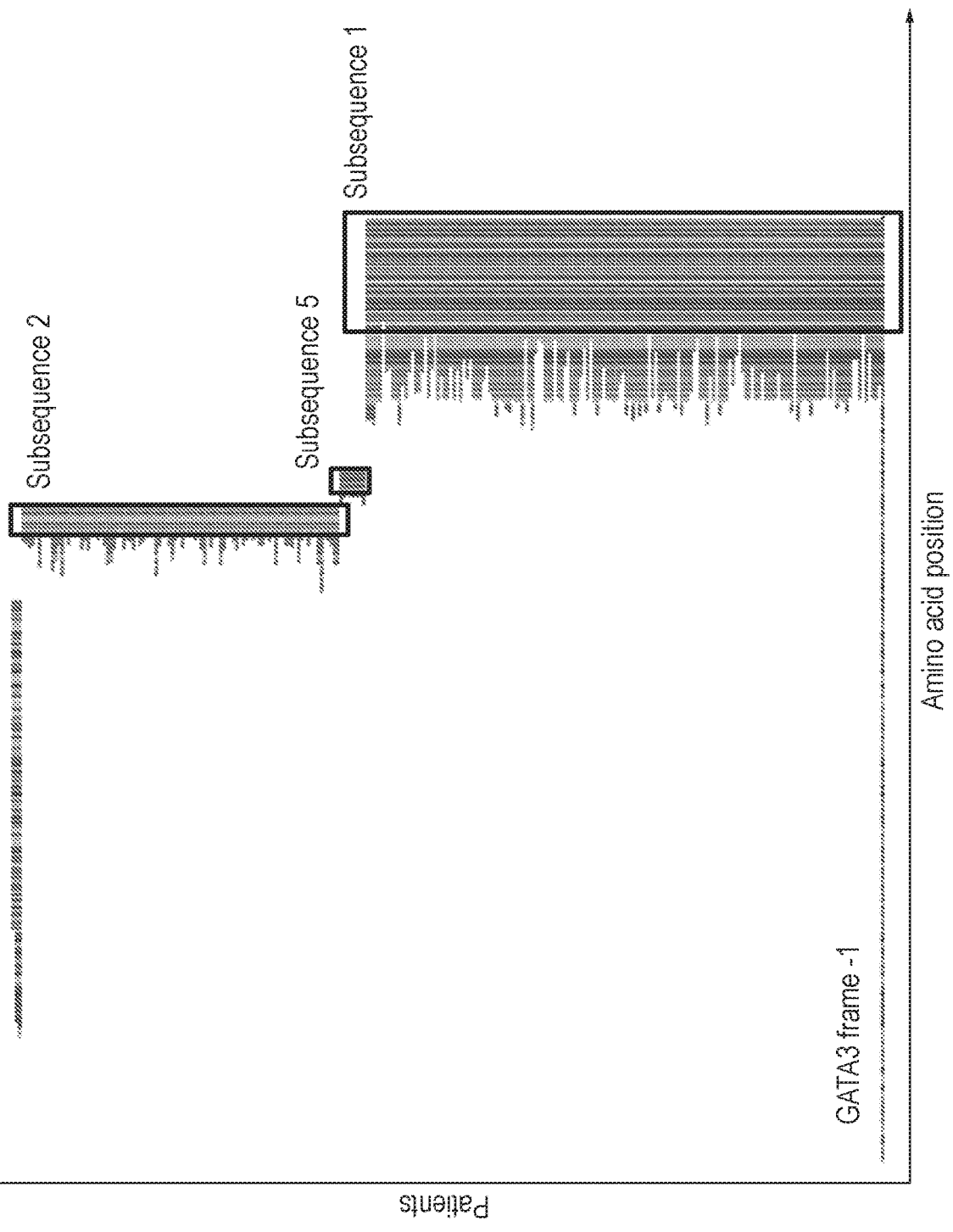
FIG. 10 GATA3 out-of-frame peptide sequences based on frameshift mutations in breast cancer patients. Data are obtained from TCGA (986 patients), Hartwig Medical Foundation (568 patients; Priestley et al, 2018, biorxiv.org), and Memorial Sloan Kettering (1918; Razavi et al, 2018, Cancer Cell). Stacks of recurrent out-of-frame peptide subsequences are indicated with red boxes.
Figure 10:
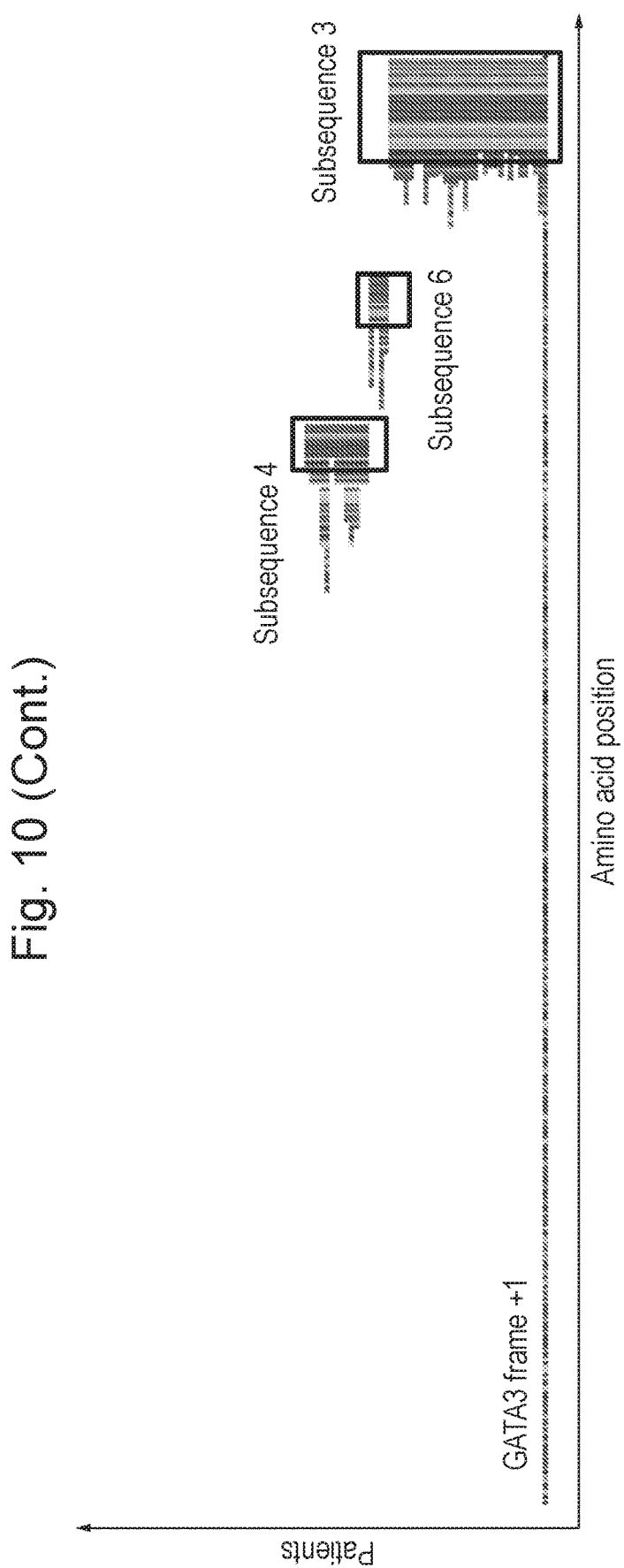

We sorted 10-mer peptides from NOPs by the number of new patients that contain the queried peptide. Assessed per tumor type, frame shift mutations in genes with very low to absent mRNA expression were removed to avoid overestimation. Of note NOP sequences are sometimes also encountered in the normal ORFeome, presumably as result of naturally occurring isoforms (e,g, FIG. 7). Also these peptides were excluded. We can create a library of possible 'vaccines' that is optimally geared towards covering the TCGA cohort, a cohort large enough that, also looking at the data presented here, it is representative of future patients (FIG. 10). Using this strategy 30% of all patients can be covered with a fixed collection of only 1,244 peptides of length 10 (FIG. 3). Since tumors will regularly have more than 1 frame shift mutation, one can use a 'cocktail' of different NOPs to optimally attack a tumor. Indeed, given a library of 1,244 peptides, 27% of the covered TCGA patients contain 2 or more 'vaccine' candidates. In conclusion, using a limited pool with optimal patient inclusion of vaccines, a large proportion of patients is covered. Strikingly, using only 6 genes (TP53, ARID1A, KMT2D, GATA3, APC, PTEN), already 10% of the complete TCGA cohort is covered. Separating this by the various tumor types, we find that for some cancers (like Pheochromocytoma and Paraganglioma (PCPG) or Thyroid carcinoma (THCA)) the hit rate is low, while for others up to 39% can be covered even with only 10 genes (Colon adenocarcinoma (COAD) using 60 peptides, Uterine Corpus Endometrial Carcinoma (UCEC) using 90 peptides), FIG. 4. At saturation (using all peptides encountered more than once) 50% of TCGA is covered and more than 70% can be achieved for specific cancer types (COAD, UCEC, Lung squamous cell carcinoma (LUSC) 72%, 73%, 73% respectively). As could be expected, these roughly follow the mutational load in the respective cancer types. In addition some frame shifted genes are highly enriched in specific tumor types (e.g. VHL, GATA3. FIG. 8). We conclude that at saturating peptide coverage, using only very limited set of genes, a large cohort of patients can be provided with off the shelf vaccines. To validate the presence of NOPs, we used the targeted sequencing data on 10,129 patients from the MSK-IMPACT cohort 26. For the 341-410 genes assessed in this cohort, we obtained strikingly similar results in terms of genes frequently affected by frame shifts and the NOPs that they create (FIG. 9). Even within this limited set of genes, 86% of the library peptides (in genes targeted by MSK-IMPACT) were encountered in the patient set. Since some cancers, like glioblastoma or pancreatic cancer, show survival expectancies after diagnosis measured in months rather than years (e.g. see 27), it is of importance to move as much of the work load and time line to the moment before diagnosis. Since the time of whole exome sequencing after biopsy is currently technically days, and since the scan of a resulting sequence against a public database describing these NOPs takes seconds, and the shipment of a peptide of choice days, a vaccination can be done theoretically within days and practically within a few weeks after biopsy. This makes it attractive to generate a stored and quality controlled peptide vaccine library based on the data presented here, possibly with replicates stored on several locations in the world. The synthesis in advance will-by economics of scale-reduce costs, allow for proper regulatory oversight, and can be quality certified, in addition to saving the patient time and thus provide chances. The present invention will likely not replace other therapies, but be an additional option in the treatment repertoire. The advantages of scale also apply to other means of vaccination against these common neoantigens, by RNA- or DNA— based approaches (e.g. 28), or recombinant bacteria (e.g. 29). The present invention also provides neoantigen directed application of the CAR-T therapy (For recent review see 30, and references therein), where the T-cells are directed not against a cell-type specific antigens (such as CD19 or CD20), but against a tumor specific neoantigen as provided herein. E.g. once one functional T-cell against any of the common p53 NOPs (FIG. 2) is identified, the recognition domains can be engineered into T-cells for any future patient with such a NOP, and the constructs could similarly be deposited in an off-the-shelf library. In the present invention, we have identified that various frame shift mutations can result in a source for common neo open reading frame peptides, suitable as pre-synthesized vaccines. This may be combined with immune response stimulating measures such as but not limited checkpoint inhibition to help instruct our own immune system to defeat cancer.

It is estimated that around 20% of breast cancers can arise as a result of germline mutations in breast cancer predisposition genes, amongst which BRCA1, BRCA2, PALB2 and CHEK2 (ref: www.ncbi.nlm.nih.gov/pmc/articles/PMC5732672/). Individuals which are known to carry such mutations (particularly BRCA1 and BRCA2 mutations) have a very high risk (~70%) of developing breast cancer. Somewhat lower expectancies have been reported for PALB2 (33%) and CHEK2 (22-44%).

Thus, there is an opportunity for prophylactic vaccination to reduce the risk of breast cancer in individuals with predisposition mutations in these genes. A prophylactic vaccine would be of highest efficacy if it vaccinates against (i) strongly immunogenic antigens, and (ii) antigens that are expected to be present in a large proportion of breast tumors observed in patients with predisposition mutations in any of the BRCA1, BRCA2, PALB2 and CHEK2 genes.

We exploited a recent data source from the Hartwig Medical Foundation (HMF) (Priestley et al. 2019 at doi.org/10.1101/415133) for the presence of targetable neoantigens in breast tumors in patients with germline mutations a range of (breast) cancer predisposition genes.

Figure 11:
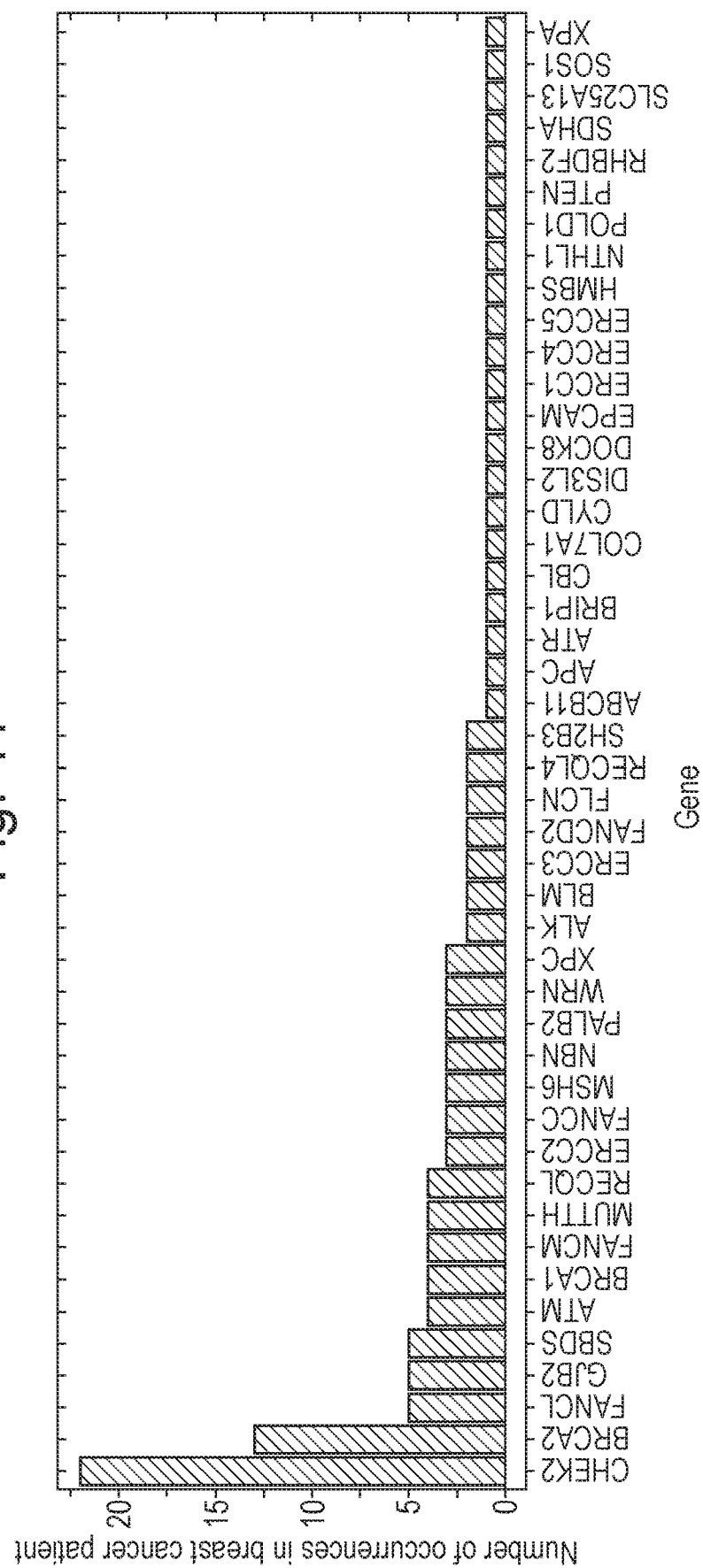
FIG. 11 Number of mutations in cancer susceptibility genes observed in patients with breast cancer from the cancer sequencing resource described in Priestley et al. 2019 at doi.org/10.1101/415133.

Amongst 568 individuals with breast tumors, we observed that 112 (19.7%) of the patients have a mutation in one or more possible predisposition genes (FIG. 11). As can be seen in FIG. 11, germline predisposing mutations in CHEK2 and BRCA2 are most frequently observed (22 and 13, respectively) in the HMF breast cancer cohort.

Figure 12:
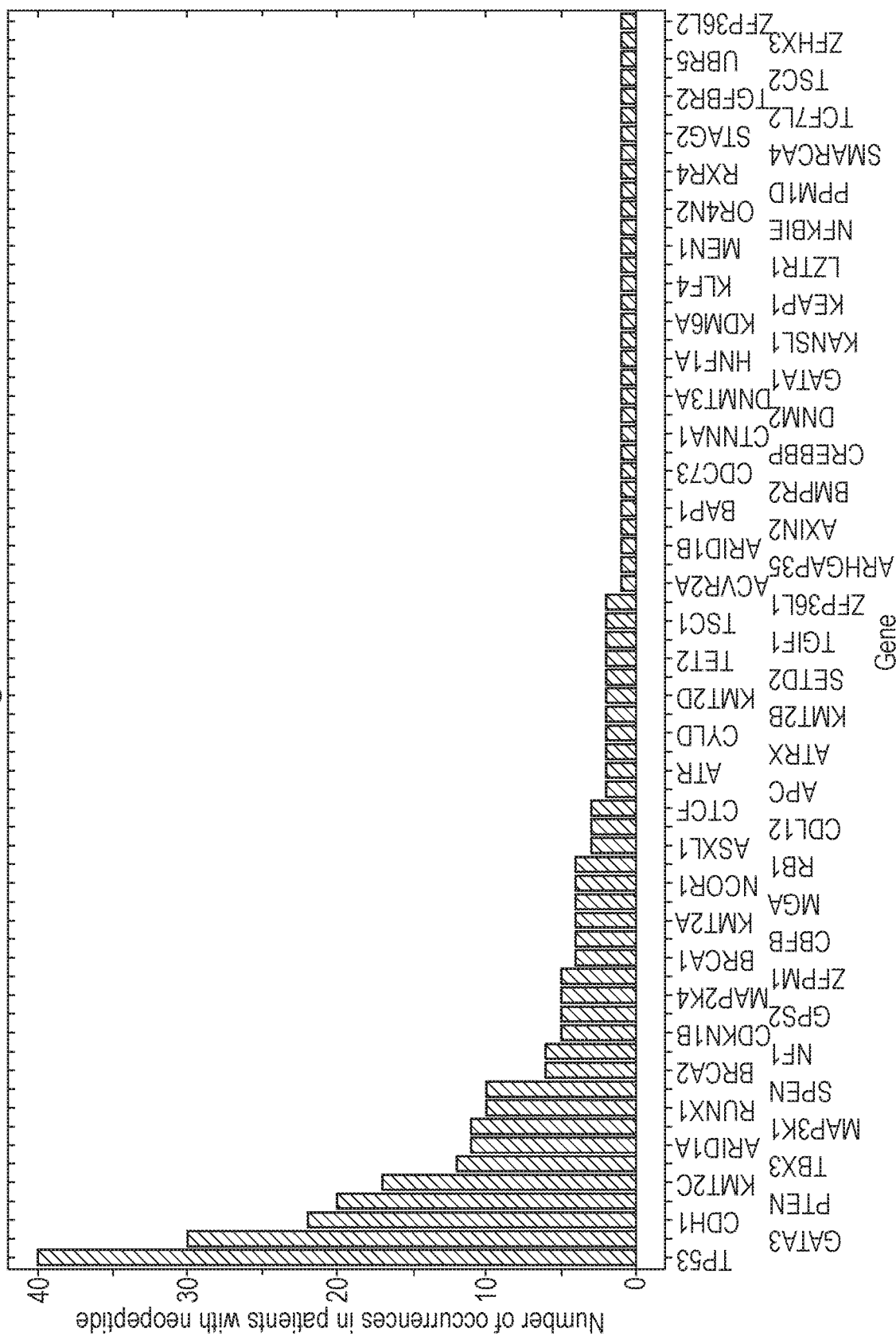
FIG. 12 Number of breast cancer patients with frameshift mutations per gene leading to neo-peptides >=10 amino acids, as based on the cancer genome sequencing resource described in Razavi et al. 2018 Cancer Cell 34:427-438.

Next, we explored the idea of using neo-open reading frame peptides, resulting from somatic frameshift mutations, as an attractive source of neoantigens in human cancers. Therefore, we calculated the number of breast cancer patients in the HMF data resource with frameshift mutations leading to possible out of frame neo-peptides (FIG. 12). Neo-peptides larger than or equal to 10 amino acids are most frequently found in TP53 (40/568; 7%), GATA3 (30/568; 5.2%) and CDH1 (22/568; 3.9%) in the total group of breast cancer patients.

Figure 13:
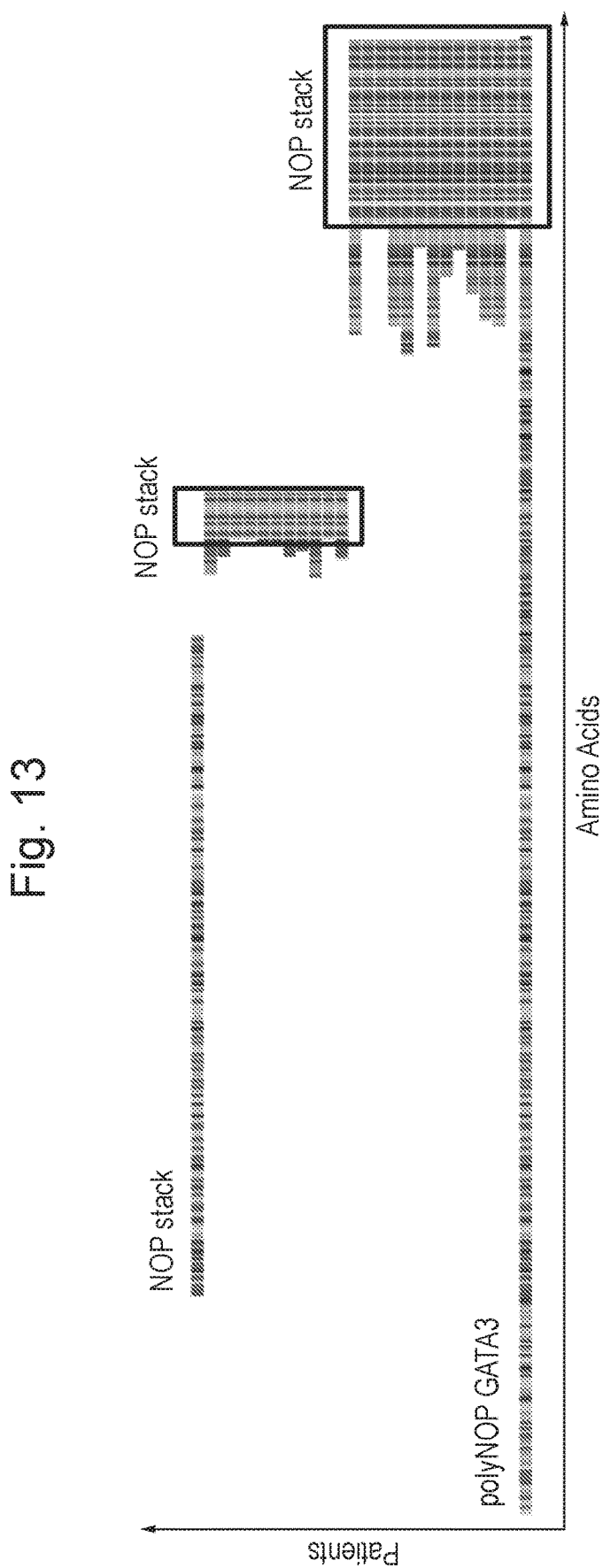
FIG. 13 Neo-peptide sequences predicted based on somatic frameshifts in GATA3 in breast cancer patients in the cancer genome sequencing resource described in Priestley et al. 2019 at doi.org/10.1101/415133. Two blocks of overlapping sequences can be observed, all derived from the −1 shifted frame of GATA3. For the +1 shifted frame of GATA3 smaller blocks of overlapping sequences are observed in this data resource (not shown).

Analyzing the sequences of the neo-peptides resulting from the frameshifts of the HMF data resource confirmed again that many of these sequences converge on a specific set of out-of-frame sequences. E.g. for GATA3, the C-terminal portion of the gene frequently contains frameshifts, leading to overlapping neo-peptides (See FIG. 13).

To explore the possibility for prophylactic vaccination of individuals at risk of breast cancer based on germline predisposing mutations, we determined the out-of-frame peptide sequences in 5 genes that are most often hit by frameshifts that result in neo-peptides (>=10 amino acids), namely: GATA3, TP53, RUNX1, MAP3K1, CDH1.

Figure 14:
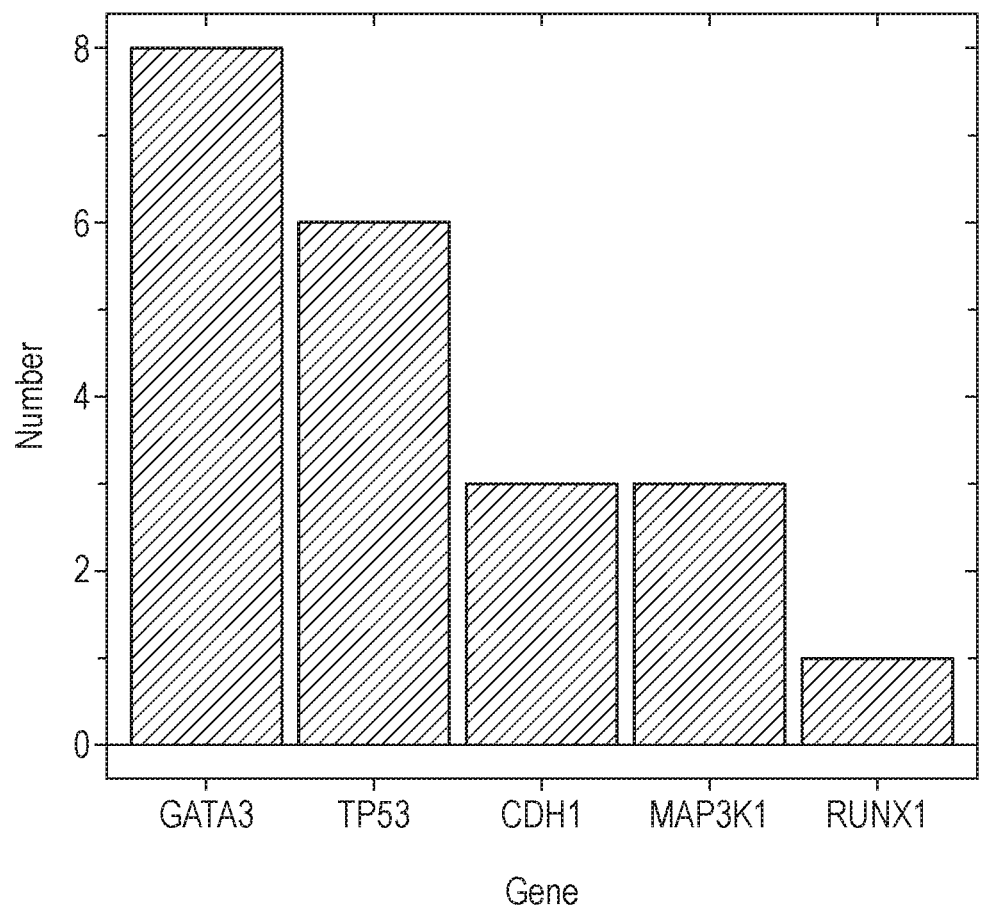
FIG. 14 Number of breast cancer patients with germline predisposition mutation, that carry a cancer specific (i.e. somatic) frameshift mutation leading to a neo-peptide (>=10 amino acids) in the indicated genes (x-axis).

Out of 112 breast cancer patients with presumed germline predisposition mutations, we found 21 (19%) patients that have tumors with a frameshift mutation in one the genes GATA3, TP53, RUNX1, MAP3K1, CDH1 leading to the formation of a neoantigen (FIG. 14).

When limiting the list to breast cancer patients with BRCA1, BRCA2, CHEK2 or PALB2 germline mutations. A total of 41 different patients have a predisposing mutation in any of these four genes (one patient has two different predisposing mutations). Out of these 41 patients, 8 (20%) have a neo-peptide in either TP53 (3), CDH1 (1), RUNX1 (1), GATA3 (2), MAP3K1 (1).

When limited to patients with a BRCA1 and/or BRCA2 predisposing germline mutation (17), we observed 5 (29%) that developed breast cancer with a neo-peptide in TP53 (3), GATA3 (1) and RUNX1 (1). Surprisingly, 10 of the 17 breast cancer patients with a BRCA1 and/or BRCA2 predisposing germline mutation have a neo-peptide resulting from a frameshift mutation in one or more genes (if not limiting to TP53, GATA3, RUNX1, CDH1, MAP3K1). The top genes recurrently hit by somatic frameshifts in breast tumors of BRCA1/BRCA2 germline mutation carriers are: TP53 (3), CDKN1B (2) and SPEN (2).

We conclude that a considerable fraction of breast cancer patients with predisposing germline mutations, may benefit from vaccination against frameshift-induced neopeptides. With a peptide vaccine covering only 5 genes (TP53, MAP3K1, GATA3, CDH1, RUNX1), for 29% of patients with BRCA1/BRCA2 germline mutations, cancer development can possibly be prevented.

Methods:

TCGA frameshift mutations-Frame shift mutations were retrieved from Varscan and mutect files per tumor type via portal.gdc.cancer.gov/. Frame shift mutations contained within these files were extracted using custom perl scripts and used for the further processing steps using HG38 as reference genome build.

CCLE frameshift mutations—For the CCLE cell line cohort, somatic mutations were retrieved from www.broadinstitute.org/ccle/data/ browseData?conversationPropagation=begin (CCLE_hybrid_capture1650_hg19_NoCommonSNPs_NoNeutralVariants_CDS_201 2.02.20.maf). Frame shift mutations were extracted using custom perl scripts using hg19 as reference genome.

Refseq annotation-To have full control over the sequences used within our analyses, we downloaded the reference sequences from the NCBI website (2018-02-27) and extracted mRNA and coding sequences from the gbff files using custom perl scripts. Subsequently, mRNA and every exon defined within the mRNA sequences were aligned to the genome (hg19 and hg38) using the BLAT suite. The best mapping locations from the psl files were subsequently used to place every mRNA on the genome, using the separate exons to perform fine placement of the exonic borders. Using this procedure we also keep track of the offsets to enable placement of the amino acid sequences onto the genome.

Mapping genome coordinate onto Refseq-To assess the effect of every mentioned frame shift mutation within the cohorts (CCLE or TCGA), we used the genome coordinates of the frameshifts to obtain the exact protein position on our reference sequence database, which were aligned to the genome builds. This step was performed using custom perl scripts taking into account the codon offsets and strand orientation, necessary for the translation step described below.

Translation of FS peptides—Using the reference sequence annotation and the positions on the genome where a frame shift mutation was identified, the frame shift mutations were used to translate peptides until a stop codon was encountered. The NOP sequences were recorded and used in downstream analyses as described in the text.

Verification of FS mRNA expression in the CCLE colorectal cancer cell lines—For a set of 59 colorectal cancer cell lines, the HG19 mapped bam files were downloaded from portal.gdc.cancer.gov/. Furthermore, the locations of FS mutations were retrieved from CCLE_hybrid_capture1650_hg19_NoCommonSNPs_NoNeutralVariants_CDS_201 2.02.20.maf (www.broadinstitute.org/ccle/data/browseData?conversationPropagation=begin), by selection only frameshift entries. Entries were processed similarly to the TCGA data, but this time based on a HG19 reference genome. To get a rough indication that a particular location in the genome indeed contains an indel in the RNAseq data, we first extracted the count at the location of a frameshift by making use of the pileup function in samtools. Next we used the special tag XO:1 to isolate reads that contain an indel in it. On those bam files we again used the pileup function to count the number of reads containing an indel (assuming that the indel would primarily be found at the frameshift instructed location). Comparison of those 2 values can then be interpreted as a percentage of indel at that particular location. To reduce spurious results, at least 10 reads needed to be detected at the FS location in the original bam file.

Defining peptide library—To define peptide libraries that are maximized on performance (covering as many patients with the least amount of peptides) we followed the following procedure. From the complete TCGA cohort, FS translated peptides of size 10 or more (up to the encountering of a stop codon) were cut to produce any possible 10-mer. Then in descending order of patients containing a 10-mer, a library was constructed. A new peptide was added only if an additional patient in the cohort was included. peptides were only considered if they were seen 2 or more times in the TCGA cohort, if they were not filtered for low expression (see Filtering for low expression section), and if the peptide was not encountered in the orfeome (see Filtering for peptide presence orfeome). In addition, since we expect frame shift mutations to occur randomly and be composed of a large array of events (insertions and deletions of any non triplet combination), frame shift mutations being encountered in more than 10 patients were omitted to avoid focusing on potential artefacts. Manual inspection indicated that these were cases with e.g. long stretches of Cs, where sequencing errors are common.

Filtering for low expression—Frameshift mutations within genes that are not expressed are not likely to result in the expression of a peptide. To take this into account we calculated the average expression of all genes per TCGA entity and arbitrarily defined a cutoff of 2 log 2 units as a minimal expression. Any frameshift mutation where the average expression within that particular entity was below the cutoff was excluded from the library. This strategy was followed, since mRNA gene expression data was not available for every TCGA sample that was represented in the sequencing data set. Expression data (RNASEQ v2) was pooled and downloaded from the R2 platform (r2.amc.nl). In current sequencing of new tumors with the goal of neoantigen identification such mRNA expression studies are routine and allow routine verification of presence of mutant alleles in the mRNA pool.

Filtering for peptide presence orfeome-Since for a small percentage of genes, different isoforms can actually make use of the shifted reading frame, or by chance a 10-mer could be present in any other gene, we verified the absence of any picked peptide from peptides that can be defined in any entry of the reference sequence collection, once converted to a collection of tiled 10-mers.

Generation of cohort coverage by all peptides per gene To generate overviews of the proportion of patients harboring exhaustive FS peptides starting from the most mentioned gene, we first pooled all peptides of size 10 by gene and recorded the largest group of patients per tumor entity. Subsequently we picked peptides identified in the largest set of patients and kept on adding a new peptide in descending order, but only when at least 1 new patient was added. Once all patients containing a peptide in the first gene was covered, we progressed to the next gene and repeated the procedure until no patient with FS mutations leading to a peptide of size 10 was left.

proto-NOP (pNOP) and Neo-ORFeome proto-NOPs are those peptide products that result from the translation of the gene products when the reading frame is shifted by $-1$ or $+1$ base (so out of frame). Collectively, these pNOPs form the Neo-Orfeome. As such we generated a pNOP reference base of any peptide with length of 10 or more amino acids, from the RefSeq collection of sequences. Two notes: the minimal length of 10 amino acids is a choice; if one were to set the minimal window at 8 amino acids the total numbers go up a bit, e.g. the 30% patient covery of the library goes up. On a second note: we limited our definition to ORFs that can become in frame after a single insertion deletion on that location; this includes obviously also longer insertion or deletion stretches than $+1$ or $-1$. The definition has not taken account more complex events that get an out-of-frame ORF in frame, such as mutations creating or deleting splice sites, or a combination of two frame shifts at different sites that result in bypass of a natural stop codon; these events may and will occur, but counting those in will make the definition of the Neo-ORFeome less well defined. For the magnitude of the numbers these rare events do not matter much.

Visualizing nops—Visualization of the nops was performed using custom perl scripts, which were assembled such that they can accept all the necessary input data structures such as protein sequence, frameshifted protein sequences, somatic mutation data, library definitions, and the peptide products from frameshift translations.

Detection of frameshift resulting neopeptides in breast cancer patients with cancer predisposition mutations—Somatic and germline mutation data were downloaded from the supplementary files attached to the manuscript posted here: www.biorxiv.org/content/biorxiv/early/2019/01/16/415133.full.pdf.

Frameshift mutations were selected from the somatic mutation files and out-of-frame peptides were predicted using custom Perl and Python scripts, based on the human reference genome GRCh37. Out-of-frame peptides were selected based on their length ($>=10$ amino acids) and mapped against out of frame peptide sequences for each possible alternative transcript for genes present in the human genome, based on Ensembl annotation (ensembl.org).

REFERENCES

1 Schumacher T. N., & Schreiber R. D. Neoantigens in cancer immunotherapy. *Science.* 348, 69-74 (2015).
2 Gubin M. M., Artyomov M. N., Mardis E. R., & Schreiber R. D. Tumor neoantigens: building a framework for personalized cancer immunotherapy. *J Clin Invest.* 125, 3413-21 (2015).
3 Ward J. P., Gubin M. M., & Schreiber R. D. The Role of Neoantigens in Naturally Occurring and Therapeutically Induced Immune Responses to Cancer. *Adv Immunol.* 130, 25-74 (2016).
4 DeWeerdt S. Calling cancer's bluff with neoantigen vaccines. *Nature.* 552, S76-S77 (2017).
5 Guo C., et al. Therapeutic cancer vaccines: past, present, and future. *Adv Cancer Res.* 119, 421-75 (2013).
6 Overwijk W. W., Wang E., Marincola F. M., Rammensee H. G., & Restifo N. P. Mining the mutanome: developing highly personalized Immunotherapies based on mutational analysis of tumors. *J Immunother Cancer.* 1, 11 (2013).
7 Yamada A., Sasada T., Noguchi M., & Itoh K. Next-generation peptide vaccines for advanced cancer. *Cancer Sci.* 104, 15-21 (2013).
8 Ott P. A., et al. An immunogenic personal neoantigen vaccine for patients with melanoma. *Nature.* 547, 217-221 (2017).
9 Wirth T. C., & Kuhnel F. Neoantigen Targeting-Dawn of a New Era in Cancer Immunotherapy? *Front Immunol.* 8, 1848 (2017).
10 Yarchoan M., Hopkins A., & Jaffee E. M. Tumor Mutational Burden and Response Rate to PD-1 Inhibition. *N Engl J Med.* 377, 2500-2501 (2017).
11 Sahin U., et al. Personalized RNA mutanome vaccines mobilize poly-specific therapeutic immunity against cancer. *Nature.* 547, 222-226 (2017).
12 Linnebacher M., et al. Frameshift peptide-derived T-cell epitopes: a source of novel tumor-specific antigens. *Int J Cancer.* 93, 6-11 (2001).
13 Sonntag K., et al. Immune monitoring and TCR sequencing of CD4 T cells in a long term responsive patient with metastasized pancreatic ductal carcinoma treated with individualized, neoepitope derived multipeptide vaccines: a case report. *J Transl Med.* 16, 23 (2018).
14 MacArthur D. G., et al. A systematic survey of loss-of-function variants in human protein-coding genes. *Science.* 335, 823-8 (2012).
15 Turajlic S., et al. Insertion-and-deletion-derived tumour-specific neoantigens and the immunogenic phenotype: a pan-cancer analysis. *Lancet Oncol.* 18, 1009-1021 (2017).
16 Rammensee H., Bachmann J., Emmerich N. P., Bachor O. A., & Stevanovic S. SYFPEITHI: database for MHC ligands and peptide motifs. Immunogenetics. 50, 213-9 (1999).
17 Alvarez B., Barra C., Nielsen M., & Andreatta M. Computational Tools for the Identification and Interpretation of Sequence Motifs in Immunopeptidomes. *Proteomics.* 18, e1700252 (2018).
18 Andreatta M., et al. Accurate pan-specific prediction of peptide-MHC class II binding affinity with improved binding core identification. *Immunogenetics.* 67, 641-50 (2015).
19 Rizvi N. A., et al. Cancer immunology. Mutational landscape determines sensitivity to PD-1 blockade in non-small cell lung cancer. *Science.* 348, 124-8 (2015).
20 Prickett T. D., et al. Durable Complete Response from Metastatic Melanoma after Transfer of Autologous T Cells Recognizing 10 Mutated Tumor Antigens. *Cancer Immunol Res.* 4, 669-78 (2016).
21 Liu R., et al. H7N9 T-cell epitopes that mimic human sequences are less immunogenic and may induce Treg-mediated tolerance. *Hum Vaccin Immunother.* 11, 2241-52 (2015).
22 Weinstein J. N., et al. The Cancer Genome Atlas Pan-Cancer analysis project. *Nat Genet.* 45, 1113-20 (2013).

23 Lindeboom R. G., Supek F., & Lehner B. The rules and impact of nonsense-mediated mRNA decay in human cancers. *Nat Genet.* 48, 1112-8 (2016).

24 Longman D., Plasterk R. H., Johnstone I. L., & Caceres J. F. Mechanistic insights and identification of two novel factors in the *C. elegans* NMD pathway. *Genes Dev.* 21, 1075-85 (2007).

25 Nguyen L. S., Wilkinson M. F., & Gecz J. Nonsense-mediated mRNA decay: inter-individual variability and human disease. *Neurosci Biobehav Rev.* 46 Pt 2, 175-86 (2014).

26 Zehir A., et al. Mutational landscape of metastatic cancer revealed from prospective clinical sequencing of 10,000 patients. *Nat Med.* 23, 703-713 (2017).

27 Fest J., et al. Underestimation of pancreatic cancer in the national cancer registry *Eur J Cancer.* 72, 186-191 (2017).

28 Boisguerin V., et al. Translation of genomics-guided RNA-based personalised cancer vaccines: towards the bedside. *Br J Cancer.* 111, 1469-75 (2014).

29 Keenan B. P., et al. A *Listeria* vaccine and depletion of T-regulatory cells activate immunity against early stage pancreatic intraepithelial neoplasms and prolong survival of mice. *Gastroenterology.* 146, 1784-94.e6 (2014).

30 Ramello M. C., Haura E. B., & Abate-Daga D. CAR-T cells and combination therapies: What's next in the immunotherapy revolution? *Pharmacol Res.* 129, 194-203 (2018).

31 Giannakis, Marios, et al. "Genomic Correlates of Immune-Cell Infiltrates in Colorectal Carcinoma." Cell Reports, vol. 17, no. 4, October 2016, p. 1206.

32 Linnebacher, M., et al. "Frameshift Peptide-Derived T-Cell Epitopes: A Source of Novel Tumor-Specific Antigens." International Journal of Cancer. Journal International Du Cancer, vol. 93, no. 1, July 2001, pp. 6-11.

33 Maby, Pauline, et al. "Correlation between Density of CD8+ T-Cell Infiltrate in Microsatellite Unstable Colorectal Cancers and Frameshift Mutations: A Rationale for Personalized Immunotherapy." Cancer Research, vol. 75, no. 17, September 2015, pp. 3446-55.

34 Saeterdal, I., et al. "A TGF betaRII Frameshift-Mutation-Derived CTL Epitope Recognised by HLA-A2-Restricted CD8+ T Cells." Cancer Immunology, Immunotherapy: CII, vol. 50, no. 9, November 2001, pp. 469-76.

35 Turajlic, Samra, et al. "Insertion-and-Deletion-Derived Tumour-Specific Neoantigens and the Immunogenic Phenotype: A Pan-Cancer Analysis." The Lancet Oncology, vol. 18, no. 8, August 2017, pp. 1009-21.

36 Williams, David S., et al. "Nonsense Mediated Decay Resistant Mutations Are a Source of Expressed Mutant Proteins in Colon Cancer Cell Lines with Microsatellite Instability." PloS One, vol. 5, no. 12, December 2010, p. e1601.

---

The invention claimed is:

1. A vaccine or collection of vaccines for treating breast cancer comprising:
    (i) a first nucleic acid molecule encoding a first polypeptide, the first polypeptide having an amino acid sequence at least 90% identical to SEQ ID NO:19, wherein the first nucleic acid molecule is comprised in a vector; and
    (ii) a second polypeptide, or a nucleic acid molecule encoding the second polypeptide, having an amino acid sequence at least 90% identical to SEQ ID NO:17, 18, 20, 21, 22 or 23, or an amino acid sequence comprising at least 10 consecutive amino acids of SEQ ID NO:17, 18, 20, 21, 22 or 23.

2. The vaccine or collection of vaccines of claim 1, wherein said vector is a viral vector.

3. The vaccine or collection of vaccines of claim 1, further comprising a pharmaceutically acceptable excipient, an adjuvant, or a therapeutic agent.

4. The vaccine or collection of vaccines of claim 3, wherein the therapeutic agent is a checkpoint inhibitor, a chemotherapeutic agent, or an antibody.

5. The vaccine or collection of vaccines of claim 3, further comprising an immune-effective amount of adjuvant.

6. A method for providing a vaccine for immunizing a patient against a cancer in said patient comprising determining the sequence of TP53 in cancer cells of said cancer and when the determined sequence comprises a frameshift mutation that produces a neoantigen of SEQ ID NO:19 or a fragment thereof, providing a vaccine selected from the vaccine or collection of vaccines of claim 1.

7. A method of treating an individual for breast cancer, the method comprising administering to the individual in need thereof a vaccine selected from a vaccine or collection of vaccines comprising:
    (i) a first polypeptide, or a nucleic acid molecule encoding the first polypeptide, having an amino acid sequence at least 90% identical to SEQ ID NO:19; and
    (ii) a second polypeptide, or a nucleic acid molecule encoding the second polypeptide, having an amino acid sequence at least 90% identical to SEQ ID NO:17, 18, 20, 21, 22 or 23, or an amino acid sequence comprising at least 10 consecutive amino acids of SEQ ID NO:17, 18, 20, 21, 22 or 23.

8. The vaccine or collection of vaccines of claim 1, comprising a first nucleic acid molecule encoding the first polypeptide, wherein:
    (a) the first nucleic acid molecule further comprises a sequence encoding the second polypeptide; or
    (b) the vaccine or collection of vaccines further comprises a second nucleic acid molecule encoding the second polypeptide.

9. The vaccine or collection of vaccines of claim 8, wherein the first nucleic acid molecule is an RNA molecule.

10. The vaccine or collection of vaccines of claim 9, wherein the RNA molecule is an mRNA.

11. The vaccine or collection of vaccines of claim 9, wherein the RNA molecule is an RNA replicon.

12. The vaccine or collection of vaccines of claim 8, wherein the second nucleic acid molecule is an RNA molecule.

13. The vaccine or collection of vaccines of claim 12, wherein the RNA molecule is an mRNA.

14. The vaccine or collection of vaccines of claim 12, wherein the RNA molecule is an RNA replicon.

15. The method of treating of claim 7, wherein the first nucleic acid molecule is an RNA molecule.

16. The method of treating of claim 15, wherein the RNA molecule is an mRNA.

17. The method of treating of claim 15, wherein the RNA molecule is an RNA replicon.

18. The method of treating of claim 7, wherein the second nucleic acid molecule is an RNA molecule.

19. The method of treating of claim 18, wherein the RNA molecule is an mRNA.

20. The method of treating of claim 18, wherein the RNA molecule is an RNA replicon.

\* \* \* \* \*

SEQUENCE LISTING

```
<160> NUMBER OF SEQ ID NOS: 242

<210> SEQ ID NO 1
<211> LENGTH: 113
<212> TYPE: PRT
<213> ORGANISM: Artificial Sequence
<220> FEATURE:
<223> OTHER INFORMATION: pNOP24385

<400> SEQUENCE: 1

Pro Gly Arg Pro Leu Gln Thr His Val Leu Pro Glu Pro His Leu Ala
1               5                   10                  15

Leu Gln Pro Leu Gln Pro His Ala Asp His Ala His Ala Asp Ala Pro
            20                  25                  30

Ala Ile Gln Pro Val Leu Trp Thr Thr Pro Pro Leu Gln His Gly His
        35                  40                  45

Arg His Gly Leu Glu Pro Cys Ser Met Leu Thr Gly Pro Pro Ala Arg
    50                  55                  60

Val Pro Ala Val Pro Phe Asp Leu His Phe Cys Arg Ser Ser Ile Met
65                  70                  75                  80

Lys Pro Lys Arg Asp Gly Tyr Met Phe Leu Lys Ala Glu Ser Lys Ile
                85                  90                  95

Met Phe Ala Thr Leu Gln Arg Ser Ser Leu Trp Cys Leu Cys Ser Asn
            100                 105                 110

His

<210> SEQ ID NO 2
<211> LENGTH: 48
<212> TYPE: PRT
<213> ORGANISM: Artificial Sequence
<220> FEATURE:
<223> OTHER INFORMATION: pNOP146515
```

-continued

```
<400> SEQUENCE: 2

Ala Gln Ala Lys Ala Val Cys Ser Gln Glu Ser Arg Asp Val Leu Cys
1               5                   10                  15

Glu Leu Ser Asp His His Asn His Thr Leu Glu Glu Glu Cys Gln Trp
            20                  25                  30

Gly Pro Cys Leu Gln Cys Leu Trp Ala Leu Leu Gln Ala Ser Gln Tyr
        35                  40                  45

<210> SEQ ID NO 3
<211> LENGTH: 57
<212> TYPE: PRT
<213> ORGANISM: Artificial Sequence
<220> FEATURE:
<223> OTHER INFORMATION: pNOP111297

<400> SEQUENCE: 3

Pro Arg Pro Arg Arg Cys Thr Arg His Pro Ala Cys Pro Leu Asp His
1               5                   10                  15

Thr Thr Pro Pro Ala Trp Ser Pro Pro Trp Val Arg Ala Leu Leu Asp
            20                  25                  30

Ala His Arg Ala Pro Ser Glu Ser Pro Cys Ser Pro Phe Arg Leu Ala
        35                  40                  45

Phe Leu Gln Glu Gln Tyr His Glu Ala
    50                  55

<210> SEQ ID NO 4
<211> LENGTH: 60
<212> TYPE: PRT
<213> ORGANISM: Artificial Sequence
<220> FEATURE:
<223> OTHER INFORMATION: pNOP101981

<400> SEQUENCE: 4

Thr Asp Arg Thr Gly Pro Ser Leu Ser Pro Ser Glu Gly Cys Leu Gln
1               5                   10                  15

Pro Gly Glu Gln Gly Arg Pro Val Arg Thr Val Arg Pro Pro Gln Pro
            20                  25                  30

His Ser Gly Gly Gly Met Pro Met Gly Thr Leu Ser Ala Met Pro Val
        35                  40                  45

Gly Ser Thr Thr Ser Phe Thr Ile Leu Thr Asp Pro
    50                  55                  60

<210> SEQ ID NO 5
<211> LENGTH: 18
<212> TYPE: PRT
<213> ORGANISM: Artificial Sequence
<220> FEATURE:
<223> OTHER INFORMATION: pNOP481880

<400> SEQUENCE: 5

Gln Thr Pro Asp Tyr Glu Glu Gly Arg His Pro Asp Gln Lys Pro Lys
1               5                   10                  15

Asn Val

<210> SEQ ID NO 6
<211> LENGTH: 46
<212> TYPE: PRT
<213> ORGANISM: Artificial Sequence
<220> FEATURE:
<223> OTHER INFORMATION: pNOP160582
```

<400> SEQUENCE: 6

Arg Arg Lys Ala Ser Arg Pro Glu Thr Glu Lys Cys Leu Ala Asn Pro
1               5                   10                  15

Lys Ser Ala Lys Lys Cys Met Thr His Trp Arg Thr Ser Pro Arg Thr
            20                  25                  30

Ala Arg Leu Thr Arg Pro Pro Ser Pro Asp Thr Cys Pro Pro
        35                  40                  45

<210> SEQ ID NO 7
<211> LENGTH: 250
<212> TYPE: PRT
<213> ORGANISM: Artificial Sequence
<220> FEATURE:
<223> OTHER INFORMATION: pNOP1989 alt splice a

<400> SEQUENCE: 7

His Arg Arg Ser Arg Gln Pro Arg Pro Ala Leu Leu Arg Lys Leu Gly
1               5                   10                  15

Gln Gly His Gly Ala Glu Val Pro Ser Asp Pro Arg Glu Pro Gly
            20                  25                  30

Val Pro Pro Ala Ser Ala Ser Trp Ile Pro Thr Leu Ala Gly Arg Arg
        35                  40                  45

Gln Ser Pro Gly Gln Pro Pro His Arg Leu Pro Leu Glu Ser Gln Pro
    50                  55                  60

Leu Leu Gln Asp Val His Pro Pro Arg Leu Pro Gly Ala Pro Leu Arg
65                  70                  75                  80

Leu Pro Pro Gly Leu Val Leu Leu Val Gly Gly Pro Arg Gln Pro
                85                  90                  95

Ala Pro Leu His Leu Pro Ala His Pro Ala Glu Gly Arg Leu Pro Gly
            100                 105                 110

Pro Ile Ala Val His Pro Arg Leu Gly Arg Leu Gly Pro Ala Gly Arg
        115                 120                 125

Glu Arg Val Pro Gln Val Pro Gly Ala Pro Ala Arg Gln His Glu Ala
130                 135                 140

Gly Val Val Pro Leu Pro Trp Gln His Asp Arg Pro Gly Trp Ser Leu
145                 150                 155                 160

Leu Val Asp Pro Pro His His Leu Pro Ala Leu Arg Ala Arg
                165                 170                 175

Val Gln Leu Arg Thr Leu Pro Pro Gln Gln Pro Ala Gly Arg Leu Pro
            180                 185                 190

His Arg Leu Arg Met Gln Val Gln Ala Gln Gly Pro Val Gln His Arg
        195                 200                 205

Arg Gln Gly Val Cys Glu Leu Trp Gly Asn Leu Asp Pro Thr Val Ala
210                 215                 220

Ala Arg Trp His Gly Thr Leu Pro Val Gln Arg Leu Arg Ala Leu Ser
225                 230                 235                 240

Gln Asn Glu Arg Thr Glu Pro Ala Pro His
                245                 250

<210> SEQ ID NO 8
<211> LENGTH: 249
<212> TYPE: PRT
<213> ORGANISM: Artificial Sequence
<220> FEATURE:
<223> OTHER INFORMATION: pNOP2004 alt splice a

```
<400> SEQUENCE: 8

His Arg Arg Ser Arg Gln Pro Arg Pro Ala Leu Leu Arg Lys Leu Gly
1               5                   10                  15

Gln Gly His Gly Ala Glu Val Pro Ser Asp Pro Pro Arg Glu Pro Gly
            20                  25                  30

Val Pro Pro Ala Ser Ala Ser Trp Ile Pro Thr Leu Ala Gly Arg Arg
        35                  40                  45

Gln Ser Pro Gly Gln Pro His Arg Leu Pro Leu Glu Ser Gln Pro
    50                  55                  60

Leu Leu Gln Asp Val His Pro Arg Leu Pro Gly Ala Pro Leu Arg
65              70                  75                  80

Leu Pro Pro Gly Leu Val Leu Leu Val Gly Gly Pro Arg Gln Pro
            85                  90                  95

Ala Pro Leu His Leu Pro Ala His Pro Ala Glu Gly Arg Leu Pro Gly
            100                 105                 110

Pro Ile Ala Val His Pro Arg Leu Gly Arg Leu Gly Pro Ala Gly Arg
            115                 120                 125

Glu Arg Val Pro Gln Val Pro Gly Ala Pro Ala Arg Gln His Glu Ala
130                 135                 140

Gly Val Val Pro Leu Pro Trp Gln His Asp Arg Pro Gly Trp Ser Leu
145                 150                 155                 160

Leu Val Asp Pro Pro His His His Leu Pro Ala Leu Arg Ala Arg
            165                 170                 175

Val Gln Leu Arg Thr Leu Pro Pro Gln Gln Pro Ala Gly Arg Leu Pro
            180                 185                 190

His Arg Leu Arg Met Gln Val Gln Ala Gln Gly Pro Val Gln His Arg
            195                 200                 205

Gln Gly Val Cys Glu Leu Trp Gly Asn Leu Asp Pro Thr Val Ala Ala
210                 215                 220

Arg Trp His Gly Thr Leu Pro Val Gln Arg Leu Arg Ala Leu Ser Gln
225                 230                 235                 240

Asn Glu Arg Thr Glu Pro Ala Pro His
                245

<210> SEQ ID NO 9
<211> LENGTH: 59
<212> TYPE: PRT
<213> ORGANISM: Artificial Sequence
<220> FEATURE:
<223> OTHER INFORMATION: pNOP104436 alt splice b

<400> SEQUENCE: 9

Pro Pro Trp Val Glu Pro Pro Arg Arg Pro Thr Thr Pro Ser Pro Pro
1               5                   10                  15

Thr Arg Pro Thr Cys Pro Ser Thr Ala Pro Asp Ser Ser Pro Pro Ala
            20                  25                  30

Ala Cys Trp Ala Ala Pro Pro Pro Ala Ser Asp Ala Ser Pro Gly Pro
        35                  40                  45

Arg Pro Gly Pro Ala Gln Lys Ala Gly Ser Val
    50                  55

<210> SEQ ID NO 10
<211> LENGTH: 58
<212> TYPE: PRT
<213> ORGANISM: Artificial Sequence
<220> FEATURE:
```

<223> OTHER INFORMATION: pNOP107768 alt splice b

<400> SEQUENCE: 10

Pro Pro Trp Val Glu Pro Arg Arg Pro Thr Thr Pro Ser Pro Pro
1               5                   10                  15

Thr Arg Pro Thr Cys Pro Ser Thr Ala Pro Asp Ser Pro Pro Ala
            20                  25                  30

Ala Cys Trp Ala Ala Pro Pro Ala Ser Asp Ala Ser Pro Gly Pro
            35                  40                  45

Arg Pro Gly Pro Ala Gln Ala Gly Ser Val
        50                  55

<210> SEQ ID NO 11
<211> LENGTH: 51
<212> TYPE: PRT
<213> ORGANISM: Artificial Sequence
<220> FEATURE:
<223> OTHER INFORMATION: pNOP133723

<400> SEQUENCE: 11

His Gly Gly Asp Gly Gly Pro Ala Ala Leu Gly Glu Pro Pro Pro
1               5                   10                  15

Arg Arg Ala Gln Arg Ala Ala Pro Gly His Ala Pro Pro Gly Pro Gln
            20                  25                  30

Pro Leu Leu His Gly Arg Gly Ala Val Pro Ala Ala Gly Gly Gly
            35                  40                  45

Cys Ala Phe
        50

<210> SEQ ID NO 12
<211> LENGTH: 28
<212> TYPE: PRT
<213> ORGANISM: Artificial Sequence
<220> FEATURE:
<223> OTHER INFORMATION: pNOP315778

<400> SEQUENCE: 12

Thr Val Gly Gln Pro Arg Pro His Cys Gly Gly Glu Met Ala Arg Asp
1               5                   10                  15

Thr Thr Cys Ala Thr Pro Ala Gly Ser Ile Thr Lys
            20                  25

<210> SEQ ID NO 13
<211> LENGTH: 182
<212> TYPE: PRT
<213> ORGANISM: Artificial Sequence
<220> FEATURE:
<223> OTHER INFORMATION: pNOP5779

<400> SEQUENCE: 13

Ala Thr Thr Thr Pro Pro Cys Ser Thr Gly Ser Thr Arg Thr Arg Thr
1               5                   10                  15

Thr Arg Ala Ser Ala Thr Pro Thr Trp Thr Arg Arg Ser Thr Arg Cys
            20                  25                  30

Arg Arg Arg Trp Met Cys Phe Leu Thr Ser Thr Val Lys Ala Thr Thr
            35                  40                  45

Ser Arg Pro Thr Thr Glu Thr Arg Ser Gly Pro Arg Cys Arg Gly Thr
        50                  55                  60

Leu Arg Pro Thr Thr Gly Ala Arg Cys Ala Ala Arg Leu Cys Phe Met
65              70                  75                  80

```
Asp Pro Tyr Pro Gly Trp Thr Ala Ala Lys Pro Trp Ala Ala Thr Thr
                 85                  90                  95

Pro Pro Pro Pro Gly Ile Ser Ala Pro Ser Pro Arg Arg Pro Ser Thr
            100                 105                 110

Thr Ala Pro Arg Gly Pro Ser Pro Ser Thr Pro Arg Pro Arg Pro Pro
        115                 120                 125

Pro Cys Arg Gly Ala Thr Pro Ala Arg Thr Ser Ser Pro Ser Arg Pro
    130                 135                 140

Pro Arg Arg Arg Thr Ser Pro Arg Thr His Arg Cys Pro Pro Gln Ala
145                 150                 155                 160

Arg Pro Ala Arg Pro Gly Arg Thr Arg Lys Ser Ala Ser Ser Thr Arg
                165                 170                 175

Cys Pro Cys Pro Thr Ala
            180
```

<210> SEQ ID NO 14
<211> LENGTH: 12
<212> TYPE: PRT
<213> ORGANISM: Artificial Sequence
<220> FEATURE:
<223> OTHER INFORMATION: pNOP621902

<400> SEQUENCE: 14

```
Ala Thr Ser Arg Pro Ser Ala Thr Pro Ala Thr Cys
1               5                   10
```

<210> SEQ ID NO 15
<211> LENGTH: 11
<212> TYPE: PRT
<213> ORGANISM: Artificial Sequence
<220> FEATURE:
<223> OTHER INFORMATION: pNOP668144

<400> SEQUENCE: 15

```
Leu Thr Gly Gly Leu Pro Gln Glu Gln Leu Val
1               5                   10
```

<210> SEQ ID NO 16
<211> LENGTH: 10
<212> TYPE: PRT
<213> ORGANISM: Artificial Sequence
<220> FEATURE:
<223> OTHER INFORMATION: pNOP716595

<400> SEQUENCE: 16

```
Ser Trp Ser Arg Pro Thr Pro Val Ala Ala
1               5                   10
```

<210> SEQ ID NO 17
<211> LENGTH: 97
<212> TYPE: PRT
<213> ORGANISM: Artificial Sequence
<220> FEATURE:
<223> OTHER INFORMATION: pNOP36301 alt splice c

<400> SEQUENCE: 17

```
Thr Gly Gly Pro Ser Ser Pro Ser Ser His Trp Lys Thr Pro Val Val
1               5                   10                  15

Ile Tyr Trp Asp Gly Thr Ala Leu Arg Cys Val Phe Val Pro Val Leu
            20                  25                  30

Gly Glu Thr Gly Ala Gln Arg Lys Arg Ile Ser Ala Arg Lys Gly Ser
        35                  40                  45
```

-continued

Leu Thr Thr Ser Cys Pro Gln Gly Ala Leu Ser Glu His Cys Pro Thr
        50                  55                  60

Thr Pro Ala Pro Leu Pro Ser Gln Arg Arg Asn His Trp Met Glu Asn
65                  70                  75                  80

Ile Ser Pro Phe Arg Ser Val Gly Val Ser Ala Ser Arg Cys Ser Glu
                85                  90                  95

Ser

<210> SEQ ID NO 18
<211> LENGTH: 85
<212> TYPE: PRT
<213> ORGANISM: Artificial Sequence
<220> FEATURE:
<223> OTHER INFORMATION: pNOP49591

<400> SEQUENCE: 18

Ser Ser Gln Asn Ala Arg Gly Cys Ser Pro Arg Gly Pro Cys Thr Ser
1               5                   10                  15

Ser Ser Tyr Thr Gly Gly Pro Cys Thr Ser Pro Leu Leu Ala Pro Val
            20                  25                  30

Ile Phe Cys Pro Phe Pro Glu Asn Leu Pro Gly Gln Leu Arg Phe Pro
        35                  40                  45

Ser Gly Leu Leu Ala Phe Trp Asp Ser Gln Val Cys Asp Leu His Val
    50                  55                  60

Leu Pro Cys Pro Gln Gln Asp Val Leu Pro Thr Gly Asp Leu Pro
65                  70                  75                  80

Cys Ala Ala Val Gly
                85

<210> SEQ ID NO 19
<211> LENGTH: 103
<212> TYPE: PRT
<213> ORGANISM: Artificial Sequence
<220> FEATURE:
<223> OTHER INFORMATION: pNOP31232 alt splice c

<400> SEQUENCE: 19

Thr Gly Gly Pro Ser Pro Ser Ser His Trp Lys Thr Pro Val Val
1               5                   10                  15

Ile Tyr Trp Asp Gly Thr Ala Leu Arg Cys Val Phe Val Pro Val Leu
            20                  25                  30

Gly Glu Thr Gly Ala Gln Arg Lys Arg Ile Ser Ala Arg Lys Gly Ser
        35                  40                  45

Leu Thr Thr Ser Cys Pro Gln Gly Ala Leu Ser Glu His Cys Pro Thr
    50                  55                  60

Thr Pro Ala Pro Leu Pro Ser Gln Arg Arg Asn His Trp Met Glu Asn
65                  70                  75                  80

Ile Ser Pro Phe Arg Thr Arg Pro Ala Phe Lys Lys Lys Ile Val Lys
                85                  90                  95

Glu Ser Met Lys Met Val Leu
            100

<210> SEQ ID NO 20
<211> LENGTH: 95
<212> TYPE: PRT
<213> ORGANISM: Artificial Sequence
<220> FEATURE:
<223> OTHER INFORMATION: pNOP38141 alt splice c

<400> SEQUENCE: 20

Thr Gly Gly Pro Ser Ser Pro Ser Ser His Trp Lys Thr Pro Val Val
1               5                   10                  15

Ile Tyr Trp Asp Gly Thr Ala Leu Arg Cys Val Phe Val Pro Val Leu
            20                  25                  30

Gly Glu Thr Gly Ala Gln Arg Lys Arg Ile Ser Ala Arg Lys Gly Ser
        35                  40                  45

Leu Thr Thr Ser Cys Pro Gln Gly Ala Leu Ser Glu His Cys Pro Thr
    50                  55                  60

Thr Pro Ala Pro Leu Pro Ser Gln Arg Arg Asn His Trp Met Glu Asn
65                  70                  75                  80

Ile Ser Pro Phe Arg Cys Tyr Leu Thr Tyr Asp Gly Val Thr Ser
                85                  90                  95

<210> SEQ ID NO 21
<211> LENGTH: 78
<212> TYPE: PRT
<213> ORGANISM: Artificial Sequence
<220> FEATURE:
<223> OTHER INFORMATION: pNOP59073

<400> SEQUENCE: 21

Cys Cys Pro Arg Thr Ile Leu Asn Asn Gly Ser Leu Lys Thr Gln Val
1               5                   10                  15

Gln Met Lys Leu Pro Glu Cys Gln Arg Leu Leu Pro Pro Trp Pro Leu
            20                  25                  30

His Gln Gln Leu Leu His Arg Arg Pro Leu His Gln Pro Pro Gly
        35                  40                  45

Pro Cys His Leu Leu Ser Leu Pro Arg Lys Pro Thr Arg Ala Ala Thr
    50                  55                  60

Val Ser Val Trp Ala Ser Cys Ile Leu Gly Gln Pro Ser Leu
65                  70                  75

<210> SEQ ID NO 22
<211> LENGTH: 72
<212> TYPE: PRT
<213> ORGANISM: Artificial Sequence
<220> FEATURE:
<223> OTHER INFORMATION: pNOP70126

<400> SEQUENCE: 22

Gly Ala Ala Pro Thr Met Ser Ala Ala Gln Ile Ala Met Val Trp Pro
1               5                   10                  15

Leu Leu Ser Ile Leu Ser Glu Trp Lys Glu Ile Cys Val Trp Ser Ile
            20                  25                  30

Trp Met Thr Glu Thr Leu Phe Asp Ile Val Trp Trp Cys Pro Met Ser
        35                  40                  45

Arg Leu Arg Leu Ala Leu Thr Val Pro Pro Ser Thr Thr Thr Cys
    50                  55                  60

Val Thr Val Pro Ala Trp Ala Ala
65                  70

<210> SEQ ID NO 23
<211> LENGTH: 46
<212> TYPE: PRT
<213> ORGANISM: Artificial Sequence
<220> FEATURE:
<223> OTHER INFORMATION: pNOP158914

-continued

```
<400> SEQUENCE: 23

Leu Ala Arg Thr Pro Leu Pro Ser Thr Arg Cys Phe Ala Asn Trp Pro
1               5                   10                  15

Arg Pro Ala Leu Cys Ser Cys Gly Leu Ile Pro His Pro Arg Pro Ala
            20                  25                  30

Pro Ala Ser Ala Pro Trp Pro Ser Thr Ser Ser His Ser Thr
        35                  40                  45

<210> SEQ ID NO 24
<211> LENGTH: 31
<212> TYPE: PRT
<213> ORGANISM: Artificial Sequence
<220> FEATURE:
<223> OTHER INFORMATION: pNOP272502

<400> SEQUENCE: 24

Phe His Thr Pro Ala Arg His Pro Arg Pro Arg His Gly His Leu Gln
1               5                   10                  15

Ala Val Thr Ala His Asp Gly Gly Cys Glu Ala Leu Pro Pro Pro
            20                  25                  30

<210> SEQ ID NO 25
<211> LENGTH: 33
<212> TYPE: PRT
<213> ORGANISM: Artificial Sequence
<220> FEATURE:
<223> OTHER INFORMATION: pNOP252394

<400> SEQUENCE: 25

Gly Ala Cys Leu Cys Leu Ser Trp Glu Arg Pro Ala His Arg Gly Arg
1               5                   10                  15

Glu Ser Pro Gln Glu Arg Gly Ala Ser Pro Arg Ala Ala Pro Arg Glu
            20                  25                  30

His

<210> SEQ ID NO 26
<211> LENGTH: 40
<212> TYPE: PRT
<213> ORGANISM: Artificial Sequence
<220> FEATURE:
<223> OTHER INFORMATION: pNOP193414 alt splice d

<400> SEQUENCE: 26

Ala Ser Thr Ala Gln Gln His Gln Leu Leu Ser Pro Ala Lys Glu Glu
1               5                   10                  15

Thr Thr Gly Trp Arg Ile Phe His Pro Ser Gly Pro Asp Gln Leu Ser
            20                  25                  30

Lys Arg Lys Leu Leu Lys Arg Ala
        35                  40

<210> SEQ ID NO 27
<211> LENGTH: 30
<212> TYPE: PRT
<213> ORGANISM: Artificial Sequence
<220> FEATURE:
<223> OTHER INFORMATION: pNOP281999 alt splice d

<400> SEQUENCE: 27

Ala Ser Thr Ala Gln Gln His Gln Leu Leu Ser Pro Ala Lys Glu Glu
1               5                   10                  15

Thr Thr Gly Trp Arg Ile Phe His Pro Ser Asp Pro Trp Ala
            20                  25                  30
```

```
<210> SEQ ID NO 28
<211> LENGTH: 29
<212> TYPE: PRT
<213> ORGANISM: Artificial Sequence
<220> FEATURE:
<223> OTHER INFORMATION: pNOP293143 alt splice d

<400> SEQUENCE: 28

Ala Ser Thr Ala Gln Gln His Gln Leu Leu Ser Pro Ala Lys Glu Glu
1               5                   10                  15

Thr Thr Gly Trp Arg Ile Phe His Pro Ser Asp Ala Thr
            20                  25

<210> SEQ ID NO 29
<211> LENGTH: 23
<212> TYPE: PRT
<213> ORGANISM: Artificial Sequence
<220> FEATURE:
<223> OTHER INFORMATION: pNOP385655

<400> SEQUENCE: 29

Gln Phe Leu His Gly Arg His Glu Pro Glu Ala His Pro His His His
1               5                   10                  15

His Thr Gly Arg Leu Gln Trp
            20

<210> SEQ ID NO 30
<211> LENGTH: 20
<212> TYPE: PRT
<213> ORGANISM: Artificial Sequence
<220> FEATURE:
<223> OTHER INFORMATION: pNOP433152

<400> SEQUENCE: 30

His Gly His Leu Gln Ala Val Thr Ala His Asp Gly Gly Cys Glu Ala
1               5                   10                  15

Leu Pro Pro Pro
            20

<210> SEQ ID NO 31
<211> LENGTH: 22
<212> TYPE: PRT
<213> ORGANISM: Artificial Sequence
<220> FEATURE:
<223> OTHER INFORMATION: pNOP405064

<400> SEQUENCE: 31

Arg Trp Ser Gly Pro Ser Ser Ala Ser Tyr Pro Ser Gly Arg Lys Phe
1               5                   10                  15

Ala Cys Gly Val Phe Gly
            20

<210> SEQ ID NO 32
<211> LENGTH: 51
<212> TYPE: PRT
<213> ORGANISM: Artificial Sequence
<220> FEATURE:
<223> OTHER INFORMATION: pNOP136003

<400> SEQUENCE: 32

Ser Pro Lys Arg Val Ser Leu Pro Pro Ala Ile Lys Asn Ser Cys Ser
1               5                   10                  15
```

```
Arg Gln Lys Gly Leu Thr Gln Thr Asp Ile Leu His Phe Leu Phe Pro
            20                  25                  30

Thr Asp Ser Leu Pro Pro Pro Ser Leu Pro Pro Leu Pro Phe Trp Val
        35                  40                  45

Leu Gly Leu
    50

<210> SEQ ID NO 33
<211> LENGTH: 28
<212> TYPE: PRT
<213> ORGANISM: Artificial Sequence
<220> FEATURE:
<223> OTHER INFORMATION: pNOP316190

<400> SEQUENCE: 33

Val Arg Lys His Phe Gln Thr Tyr Gly Asn Tyr Phe Leu Lys Thr Thr
1               5                   10                  15

Phe Cys Pro Pro Cys Arg Pro Lys Gln Trp Met Ile
            20                  25

<210> SEQ ID NO 34
<211> LENGTH: 24
<212> TYPE: PRT
<213> ORGANISM: Artificial Sequence
<220> FEATURE:
<223> OTHER INFORMATION: pNOP367554

<400> SEQUENCE: 34

Met Arg Pro Trp Asn Ser Arg Met Pro Arg Leu Gly Arg Ser Gln Gly
1               5                   10                  15

Gly Ala Gly Leu Thr Pro Ala Thr
            20

<210> SEQ ID NO 35
<211> LENGTH: 15
<212> TYPE: PRT
<213> ORGANISM: Artificial Sequence
<220> FEATURE:
<223> OTHER INFORMATION: pNOP539666

<400> SEQUENCE: 35

Asp Val Leu Pro Thr Gly Gln Asp Leu Pro Cys Ala Ala Val Gly
1               5                   10                  15

<210> SEQ ID NO 36
<211> LENGTH: 13
<212> TYPE: PRT
<213> ORGANISM: Artificial Sequence
<220> FEATURE:
<223> OTHER INFORMATION: pNOP602122

<400> SEQUENCE: 36

Lys Gln Arg Ser Val Pro Leu Ala Val Pro Ser Asn Gly
1               5                   10

<210> SEQ ID NO 37
<211> LENGTH: 36
<212> TYPE: PRT
<213> ORGANISM: Artificial Sequence
<220> FEATURE:
<223> OTHER INFORMATION: pNOP224126
```

<400> SEQUENCE: 37

Cys Phe Ala Asn Trp Pro Arg Pro Ala Leu Cys Ser Cys Gly Leu Ile
1               5                   10                  15

Pro His Pro Arg Pro Ala Pro Ala Ser Ala Pro Trp Pro Ser Thr Ser
            20                  25                  30

Ser His Ser Thr
        35

<210> SEQ ID NO 38
<211> LENGTH: 34
<212> TYPE: PRT
<213> ORGANISM: Artificial Sequence
<220> FEATURE:
<223> OTHER INFORMATION: pNOP243169

<400> SEQUENCE: 38

Gly Leu Gly Thr Gln Gly Cys Pro Gly Trp Glu Gly Ala Arg Gly Glu
1               5                   10                  15

Gln Gly Ser Leu Gln Pro Pro Glu Val Gln Lys Gly Ser Val Tyr Leu
            20                  25                  30

Pro Pro

<210> SEQ ID NO 39
<211> LENGTH: 20
<212> TYPE: PRT
<213> ORGANISM: Artificial Sequence
<220> FEATURE:
<223> OTHER INFORMATION: pNOP445026

<400> SEQUENCE: 39

Thr Arg Arg Lys Leu Lys Ile Leu Ser Val Gly Val Ser Ala Ser Arg
1               5                   10                  15

Cys Ser Glu Ser
            20

<210> SEQ ID NO 40
<211> LENGTH: 18
<212> TYPE: PRT
<213> ORGANISM: Artificial Sequence
<220> FEATURE:
<223> OTHER INFORMATION: pNOP483390

<400> SEQUENCE: 40

Arg Arg Ala Pro Ser Glu Ser Gly Asn Ile Phe Arg Pro Met Glu Thr
1               5                   10                  15

Thr Ser

<210> SEQ ID NO 41
<211> LENGTH: 78
<212> TYPE: PRT
<213> ORGANISM: Artificial Sequence
<220> FEATURE:
<223> OTHER INFORMATION: pNOP59708

<400> SEQUENCE: 41

Leu Arg Leu Thr Phe Ser Thr Cys Ser Pro Leu Thr Ala Ser His
1               5                   10                  15

Pro His Leu Ser Leu Pro Cys His Phe Gly Phe Trp Val Phe Glu Pro
            20                  25                  30

Leu Leu Ala Ile Gly Val Arg Gln Lys His Pro Gly Leu Pro Phe Ala
        35                  40                  45

```
Leu Ser Arg Gly Ser Thr Glu Gln Val Gly Leu His Trp Cys Phe Val
        50                  55                  60
Val Gly Arg Arg Met Gly Ser Arg Thr Tyr Gln Leu Arg Phe
65                  70                  75
```

<210> SEQ ID NO 42
<211> LENGTH: 13
<212> TYPE: PRT
<213> ORGANISM: Artificial Sequence
<220> FEATURE:
<223> OTHER INFORMATION: pNOP604680

<400> SEQUENCE: 42

```
Leu Thr Met Val Leu Leu Pro Asp Lys Leu Val Val Ser
1               5                   10
```

<210> SEQ ID NO 43
<211> LENGTH: 13
<212> TYPE: PRT
<213> ORGANISM: Artificial Sequence
<220> FEATURE:
<223> OTHER INFORMATION: pNOP619453

<400> SEQUENCE: 43

```
Trp Arg Ser Arg Ser Gln Ile Leu Ala Ser Ser Pro Leu
1               5                   10
```

<210> SEQ ID NO 44
<211> LENGTH: 10
<212> TYPE: PRT
<213> ORGANISM: Artificial Sequence
<220> FEATURE:
<223> OTHER INFORMATION: pNOP703537

<400> SEQUENCE: 44

```
Leu Tyr His His Pro Leu Gln Leu His Val
1               5                   10
```

<210> SEQ ID NO 45
<211> LENGTH: 73
<212> TYPE: PRT
<213> ORGANISM: Artificial Sequence
<220> FEATURE:
<223> OTHER INFORMATION: pNOP68931

<400> SEQUENCE: 45

```
Pro Thr Asp Pro Phe Leu Gly Leu Arg Leu Gly Leu His Leu Gln Lys
1               5                   10                  15
Val Phe His Gln Ser His Ala Glu Tyr Ser Gly Ala Pro Pro Pro Pro
                20                  25                  30
Pro Ala Pro Ser Gly Leu Arg Phe Trp Asn Pro Ser Arg Ile Ala His
            35                  40                  45
Ile Ser Gln Leu Leu Ser Trp Pro Gln Lys Thr Glu Glu Arg Leu Gly
        50                  55                  60
Tyr Ser Ser His Gln Leu Pro Arg Lys
65                  70
```

<210> SEQ ID NO 46
<211> LENGTH: 97
<212> TYPE: PRT
<213> ORGANISM: Artificial Sequence
<220> FEATURE:
<223> OTHER INFORMATION: pNOP35899

```
<400> SEQUENCE: 46

Ile Gln Trp Gly Thr Thr Thr Ala Pro Arg Pro Ile Arg Pro Pro Phe
1               5                   10                  15

Leu Glu Ser Lys Gln Asn Cys Ser His Phe Pro Thr Pro Leu Leu Ala
            20                  25                  30

Ser Glu Asp Arg Arg Glu Thr Gly Leu Phe Leu Pro Ser Ala Ala Gln
        35                  40                  45

Lys Met Lys Lys Ala His Phe Leu Lys Thr Trp Phe Arg Ser Asn Pro
    50                  55                  60

Thr Lys Thr Lys Lys Ala Arg Phe Ser Thr Ala Ser Leu Ala Lys Glu
65                  70                  75                  80

Leu Thr His Pro Leu Leu Val Ser Leu Leu Lys Glu Lys Gln Asp
                85                  90                  95

Gly

<210> SEQ ID NO 47
<211> LENGTH: 45
<212> TYPE: PRT
<213> ORGANISM: Artificial Sequence
<220> FEATURE:
<223> OTHER INFORMATION: pNOP162561

<400> SEQUENCE: 47

Cys Arg Pro Ser Ser Gln Tyr Ile Ser Leu His Ser Arg Thr Asn Thr
1               5                   10                  15

Arg Gly Glu Cys Gln Leu Asp His Ser Val Gln Arg Pro Asn Pro Arg
            20                  25                  30

Ile Tyr His Phe Glu Ala Lys Asp Gly Leu Arg Gly Gly
        35                  40                  45

<210> SEQ ID NO 48
<211> LENGTH: 45
<212> TYPE: PRT
<213> ORGANISM: Artificial Sequence
<220> FEATURE:
<223> OTHER INFORMATION: pNOP163094

<400> SEQUENCE: 48

Phe Cys Cys Ser Cys Cys Phe Phe Gly Gly Glu Arg Trp Ser Lys Ser
1               5                   10                  15

Pro Tyr Cys Pro Gln Arg Met Thr Pro Gly Thr Thr Phe Ile Thr Met
            20                  25                  30

Met Lys Lys Glu Ala Gly Lys Arg Thr Arg Thr Leu Thr
        35                  40                  45

<210> SEQ ID NO 49
<211> LENGTH: 50
<212> TYPE: PRT
<213> ORGANISM: Artificial Sequence
<220> FEATURE:
<223> OTHER INFORMATION: pNOP137662

<400> SEQUENCE: 49

Glu Gly Thr Ala Cys Arg Ser Arg Ile Ala Asn Ser Cys His Ser Gly
1               5                   10                  15

Asp Ser Trp Arg Asn Ser Cys Phe Ala Asn Ser Asp Ser Ala Ala Leu
            20                  25                  30

Ala Val Ser Ser Glu Glu Ser Gly Gly Gln Arg Ala Leu Thr Ala Pro
        35                  40                  45
```

Arg Gly
    50

<210> SEQ ID NO 50
<211> LENGTH: 54
<212> TYPE: PRT
<213> ORGANISM: Artificial Sequence
<220> FEATURE:
<223> OTHER INFORMATION: pNOP123893

<400> SEQUENCE: 50

Trp Ala Leu Gly Ala Ala Ala Ser Arg Arg Cys Cys Cys Cys Cys Arg
1               5                   10                  15

Ser Pro Leu Gly Ser Ala Arg Ser Arg Ser Pro Ala Thr Leu Ala Leu
            20                  25                  30

Thr Pro Arg Ala Thr Arg Ser Arg Cys Pro Gly Ala Thr Trp Arg Glu
        35                  40                  45

Ala Ala Ser Trp Ala Glu
    50

<210> SEQ ID NO 51
<211> LENGTH: 45
<212> TYPE: PRT
<213> ORGANISM: Artificial Sequence
<220> FEATURE:
<223> OTHER INFORMATION: pNOP164097

<400> SEQUENCE: 51

Lys Glu Ser Gly Ser Val Arg Gly Leu Trp Arg Gly Pro Gly Asn His
1               5                   10                  15

Ile Leu His Cys Pro Gly Ala Arg His Ile Tyr Gly Thr Glu Asn Asn
            20                  25                  30

Ile Ser Asp Leu Glu Arg His Cys Gln Leu Ala Gly Asp
        35                  40                  45

<210> SEQ ID NO 52
<211> LENGTH: 40
<212> TYPE: PRT
<213> ORGANISM: Artificial Sequence
<220> FEATURE:
<223> OTHER INFORMATION: pNOP196613

<400> SEQUENCE: 52

Met Lys Pro Pro Ser Leu Cys Leu Leu Lys Arg Glu Trp Lys Cys Pro
1               5                   10                  15

Arg Thr Leu Ala Trp Ala Arg Lys Ser His Pro Thr Leu Pro Arg Ser
            20                  25                  30

Gln Thr His Leu Trp Asn Arg Lys
        35                  40

<210> SEQ ID NO 53
<211> LENGTH: 39
<212> TYPE: PRT
<213> ORGANISM: Artificial Sequence
<220> FEATURE:
<223> OTHER INFORMATION: pNOP205726

<400> SEQUENCE: 53

Arg Ser Ala Cys Val Thr Val Lys Gly Pro Leu Ala Ser Val Gly Arg
1               5                   10                  15

His Ser Leu Ser Lys Gln Asp Cys Lys Phe Leu Pro Phe Trp Gly Phe
            20                  25                  30

```
Leu Glu Glu Phe Leu Leu Cys
        35
```

```
<210> SEQ ID NO 54
<211> LENGTH: 25
<212> TYPE: PRT
<213> ORGANISM: Artificial Sequence
<220> FEATURE:
<223> OTHER INFORMATION: pNOP359415

<400> SEQUENCE: 54

Trp Trp Thr Ile Cys Arg His His Lys Ser Ser Glu Gln Arg Trp His
1               5                   10                  15

Phe Glu Asn Ser Lys Gly Leu Gly Phe
            20                  25
```

```
<210> SEQ ID NO 55
<211> LENGTH: 20
<212> TYPE: PRT
<213> ORGANISM: Artificial Sequence
<220> FEATURE:
<223> OTHER INFORMATION: pNOP441910

<400> SEQUENCE: 55

Arg Arg Cys Thr Asn Pro His Glu Cys Pro Pro Val Ser Ser Pro Pro
1               5                   10                  15

Cys Gln Ser Arg
            20
```

```
<210> SEQ ID NO 56
<211> LENGTH: 32
<212> TYPE: PRT
<213> ORGANISM: Artificial Sequence
<220> FEATURE:
<223> OTHER INFORMATION: pNOP266995

<400> SEQUENCE: 56

Gln Ser Leu Trp Ile Glu Asn Ala Leu Pro His Thr Leu Ser Ser Leu
1               5                   10                  15

Thr Leu Cys His Pro Thr Gly Met Gln Leu Arg Ile Gln Trp Arg Phe
            20                  25                  30
```

```
<210> SEQ ID NO 57
<211> LENGTH: 28
<212> TYPE: PRT
<213> ORGANISM: Artificial Sequence
<220> FEATURE:
<223> OTHER INFORMATION: pNOP312388

<400> SEQUENCE: 57

Gln Glu His Arg Ser His Gln Cys Gly His His Trp Ala Gly Pro Arg
1               5                   10                  15

Glu Phe Pro Tyr Val Tyr Pro Gly Gly Ser Ser Cys
            20                  25
```

```
<210> SEQ ID NO 58
<211> LENGTH: 24
<212> TYPE: PRT
<213> ORGANISM: Artificial Sequence
<220> FEATURE:
<223> OTHER INFORMATION: pNOP365712

<400> SEQUENCE: 58

Lys Pro Gly Ser Asp Gln Ile Gln Gln Arg Gln Arg Arg Gln Gly Phe
1               5                   10                  15
```

Leu Gln His His Trp Pro Arg Ser
            20

<210> SEQ ID NO 59
<211> LENGTH: 61
<212> TYPE: PRT
<213> ORGANISM: Artificial Sequence
<220> FEATURE:
<223> OTHER INFORMATION: pNOP98858

<400> SEQUENCE: 59

Thr Pro Thr Met Pro Pro Ser Leu Thr Pro Ser Ser Ala Lys Ile Leu
1               5                   10                  15

Ser Ser Leu Thr Lys Ile Cys Ser Pro Leu Thr Gly Thr Gln Glu Ser
            20                  25                  30

Ser Val Trp Ser Pro Leu Gly Trp Thr Glu Arg Val Ser Leu Arg Ile
        35                  40                  45

Pro Trp Trp Phe Lys Leu Leu Thr Phe Lys Val Arg Gly
    50                  55                  60

<210> SEQ ID NO 60
<211> LENGTH: 33
<212> TYPE: PRT
<213> ORGANISM: Artificial Sequence
<220> FEATURE:
<223> OTHER INFORMATION: pNOP254972

<400> SEQUENCE: 60

Leu Gln Ser Lys Gly Leu Tyr Gly Phe Ile Thr His Arg Ser Ile Ser
1               5                   10                  15

Trp Ser Thr Pro Gly Thr Pro Pro Thr Glu Ser Phe Pro Pro Lys Ser
            20                  25                  30

Arg

<210> SEQ ID NO 61
<211> LENGTH: 32
<212> TYPE: PRT
<213> ORGANISM: Artificial Sequence
<220> FEATURE:
<223> OTHER INFORMATION: pNOP260719

<400> SEQUENCE: 61

Ala Arg Glu Glu Gln His Val His Ser Pro Asn His Ser Tyr Arg Gln
1               5                   10                  15

Trp Phe Ser Ser Cys Tyr Trp Asn Arg Asp Thr Ser Ala Asp Pro Val
            20                  25                  30

<210> SEQ ID NO 62
<211> LENGTH: 29
<212> TYPE: PRT
<213> ORGANISM: Artificial Sequence
<220> FEATURE:
<223> OTHER INFORMATION: pNOP297360

<400> SEQUENCE: 62

Lys Arg Leu Ile Leu Thr Pro Gln Pro Arg Leu Met Ile Leu Cys Ser
1               5                   10                  15

Cys Leu Thr Met Lys Glu Ala Val Pro Lys Leu Leu Val
            20                  25

<210> SEQ ID NO 63
<211> LENGTH: 28

<212> TYPE: PRT
<213> ORGANISM: Artificial Sequence
<220> FEATURE:
<223> OTHER INFORMATION: pNOP311770

<400> SEQUENCE: 63

Pro Ile Arg Met Thr Thr Ser Pro Asn Ser Pro Arg Arg Ser Leu Arg
1               5                   10                  15

Gly Leu Ser Trp Lys Val Leu Phe Gln Glu Pro Leu
            20                  25

<210> SEQ ID NO 64
<211> LENGTH: 26
<212> TYPE: PRT
<213> ORGANISM: Artificial Sequence
<220> FEATURE:
<223> OTHER INFORMATION: pNOP335653

<400> SEQUENCE: 64

Ile Leu Lys Ile Ala Pro Val Asp Lys Gly Gln Pro Ile Phe Pro Ser
1               5                   10                  15

Thr Pro Asp Ser Lys Trp Ala Gln Met Val
            20                  25

<210> SEQ ID NO 65
<211> LENGTH: 17
<212> TYPE: PRT
<213> ORGANISM: Artificial Sequence
<220> FEATURE:
<223> OTHER INFORMATION: pNOP499804

<400> SEQUENCE: 65

Leu Met Leu Met Pro Pro Ile Pro Gln Arg Gly Arg Leu Tyr Thr Pro
1               5                   10                  15

Tyr

<210> SEQ ID NO 66
<211> LENGTH: 17
<212> TYPE: PRT
<213> ORGANISM: Artificial Sequence
<220> FEATURE:
<223> OTHER INFORMATION: pNOP509630

<400> SEQUENCE: 66

Thr Ser Leu Met Gln Thr Phe Leu Pro Ile His Leu Pro Ser Gln Gln
1               5                   10                  15

Asn

<210> SEQ ID NO 67
<211> LENGTH: 16
<212> TYPE: PRT
<213> ORGANISM: Artificial Sequence
<220> FEATURE:
<223> OTHER INFORMATION: pNOP523454

<400> SEQUENCE: 67

Leu Gln Thr Met Val Leu Gln Leu Leu Leu Glu Gln Gly His Phe Cys
1               5                   10                  15

<210> SEQ ID NO 68
<211> LENGTH: 34
<212> TYPE: PRT
<213> ORGANISM: Artificial Sequence
<220> FEATURE:
<223> OTHER INFORMATION: pNOP243761

<400> SEQUENCE: 68

His Ile Gly Phe Gly Glu Thr Leu Pro Thr Gly Trp Arg Leu Ile Arg
1               5                   10                  15

Thr Leu Val Pro Phe Pro Leu Gly Leu Ser Trp Thr Gly Arg Ile Leu
            20                  25                  30

Ser Thr

<210> SEQ ID NO 69
<211> LENGTH: 34
<212> TYPE: PRT
<213> ORGANISM: Artificial Sequence
<220> FEATURE:
<223> OTHER INFORMATION: pNOP247500

<400> SEQUENCE: 69

Arg Leu His Arg Ser Thr Lys Asp Ser Leu Phe Phe Pro Arg His Pro
1               5                   10                  15

Ile Gln Ser Gly His Arg Trp Cys Asp Tyr Ser Gln Lys Ala Ser Thr
            20                  25                  30

Val Ser

<210> SEQ ID NO 70
<211> LENGTH: 30
<212> TYPE: PRT
<213> ORGANISM: Artificial Sequence
<220> FEATURE:
<223> OTHER INFORMATION: pNOP290560 alt splice e

<400> SEQUENCE: 70

Ser Gln Ser Leu Thr Pro Thr Ile Ile Leu Arg Ser Ser Ile Pro Pro
1               5                   10                  15

Arg Ala Trp Ile Leu Arg Pro Ser Ser Ser Thr Phe Tyr Thr
            20                  25                  30

<210> SEQ ID NO 71
<211> LENGTH: 29
<212> TYPE: PRT
<213> ORGANISM: Artificial Sequence
<220> FEATURE:
<223> OTHER INFORMATION: pNOP302320 alt splice e

<400> SEQUENCE: 71

Ser Gln Ser Leu Thr Pro Thr Ile Ile Leu Arg Ser Ser Ile Pro Pro
1               5                   10                  15

Arg Thr Arg Val Arg Cys Leu Arg Thr Arg Leu Thr Ser
            20                  25

<210> SEQ ID NO 72
<211> LENGTH: 24
<212> TYPE: PRT
<213> ORGANISM: Artificial Sequence
<220> FEATURE:
<223> OTHER INFORMATION: pNOP371119

<400> SEQUENCE: 72

Arg Arg Glu Leu His Val His Gly Ala Pro Ala Pro Pro Gly Glu Arg
1               5                   10                  15

Pro Arg Pro Gly Gln Ser Glu Phe
            20

<210> SEQ ID NO 73

```
<211> LENGTH: 23
<212> TYPE: PRT
<213> ORGANISM: Artificial Sequence
<220> FEATURE:
<223> OTHER INFORMATION: pNOP383738

<400> SEQUENCE: 73

Met Thr Thr Pro Pro Tyr Gln Asn Leu Glu Leu Tyr Ser Ser Val Arg
1               5                   10                  15

Gly Ile Gln Ser Leu Arg Ser
            20

<210> SEQ ID NO 74
<211> LENGTH: 23
<212> TYPE: PRT
<213> ORGANISM: Artificial Sequence
<220> FEATURE:
<223> OTHER INFORMATION: pNOP387003

<400> SEQUENCE: 74

Arg Met Trp Tyr Leu Leu Arg Ser Leu Ser Pro Pro Gln Pro Pro
1               5                   10                  15

Ser Pro Trp Met Cys Trp Met
            20

<210> SEQ ID NO 75
<211> LENGTH: 20
<212> TYPE: PRT
<213> ORGANISM: Artificial Sequence
<220> FEATURE:
<223> OTHER INFORMATION: pNOP442322

<400> SEQUENCE: 75

Arg Thr His Cys His Ile His Ser Leu Leu Ser Arg Cys Val Ile Gln
1               5                   10                  15

Arg Glu Cys Ser
            20

<210> SEQ ID NO 76
<211> LENGTH: 18
<212> TYPE: PRT
<213> ORGANISM: Artificial Sequence
<220> FEATURE:
<223> OTHER INFORMATION: pNOP472687

<400> SEQUENCE: 76

Gly Leu Ser His His Leu His Ser His Arg His Arg Gly Cys Ala Gly
1               5                   10                  15

Cys Glu

<210> SEQ ID NO 77
<211> LENGTH: 17
<212> TYPE: PRT
<213> ORGANISM: Artificial Sequence
<220> FEATURE:
<223> OTHER INFORMATION: pNOP490664

<400> SEQUENCE: 77

Cys Glu His Leu Gln Cys Arg His Arg Leu His Pro Gln Pro Arg
1               5                   10                  15

Ser

<210> SEQ ID NO 78
<211> LENGTH: 17
```

```
<212> TYPE: PRT
<213> ORGANISM: Artificial Sequence
<220> FEATURE:
<223> OTHER INFORMATION: pNOP498423

<400> SEQUENCE: 78

Lys Gln Gln Arg Ala Trp Ile Leu Arg Pro Ser Ser Thr Phe Tyr
1               5                   10                  15

Thr

<210> SEQ ID NO 79
<211> LENGTH: 15
<212> TYPE: PRT
<213> ORGANISM: Artificial Sequence
<220> FEATURE:
<223> OTHER INFORMATION: pNOP538388

<400> SEQUENCE: 79

Cys Pro Gln Tyr Pro Ser Val Gly Gly Cys Ile His His Ile Glu
1               5                   10                  15

<210> SEQ ID NO 80
<211> LENGTH: 12
<212> TYPE: PRT
<213> ORGANISM: Artificial Sequence
<220> FEATURE:
<223> OTHER INFORMATION: pNOP633787

<400> SEQUENCE: 80

Leu Glu Pro Ala Ala Gln Gly Pro Gly Arg Ser Ala
1               5                   10

<210> SEQ ID NO 81
<211> LENGTH: 11
<212> TYPE: PRT
<213> ORGANISM: Artificial Sequence
<220> FEATURE:
<223> OTHER INFORMATION: pNOP656416

<400> SEQUENCE: 81

Glu Glu Ser Lys Ala Ser Gly His Lys His His
1               5                   10

<210> SEQ ID NO 82
<211> LENGTH: 39
<212> TYPE: PRT
<213> ORGANISM: Artificial Sequence
<220> FEATURE:
<223> OTHER INFORMATION: pNOP202693

<400> SEQUENCE: 82

His Val Arg Arg Arg Arg Gly Arg Leu Gly Asp Ser Arg Glu Ala Gly
1               5                   10                  15

Pro Arg Pro Met Cys Trp Glu Met Gln Lys Ser Arg Cys Trp Trp Phe
            20                  25                  30

Phe Ser Ser Leu Pro Leu Arg
        35

<210> SEQ ID NO 83
<211> LENGTH: 32
<212> TYPE: PRT
<213> ORGANISM: Artificial Sequence
<220> FEATURE:
<223> OTHER INFORMATION: pNOP263306
```

<400> SEQUENCE: 83

His Gly Pro Leu Glu Pro Gln Pro Leu Gly Ala Ala Ala Ala Ala
1               5                   10                  15

Gly Leu Leu Leu Ala Leu Pro Gly Ala Gly Ala Leu Pro Pro Trp Leu
            20                  25                  30

<210> SEQ ID NO 84
<211> LENGTH: 23
<212> TYPE: PRT
<213> ORGANISM: Artificial Sequence
<220> FEATURE:
<223> OTHER INFORMATION: pNOP379760

<400> SEQUENCE: 84

Gly Val Cys His Gly Arg Cys Ser Ser Arg Asn Leu Cys Asp Gly Gly
1               5                   10                  15

His Ser His Arg Arg Gly Arg
            20

<210> SEQ ID NO 85
<211> LENGTH: 22
<212> TYPE: PRT
<213> ORGANISM: Artificial Sequence
<220> FEATURE:
<223> OTHER INFORMATION: pNOP408019

<400> SEQUENCE: 85

Val Ser Pro Gly Ile Phe Pro Ala Leu Pro Ile Pro Met Lys Leu Glu
1               5                   10                  15

Ile Leu Leu Met Lys Ile
            20

<210> SEQ ID NO 86
<211> LENGTH: 21
<212> TYPE: PRT
<213> ORGANISM: Artificial Sequence
<220> FEATURE:
<223> OTHER INFORMATION: pNOP414918

<400> SEQUENCE: 86

His Thr Gly Arg Val Pro Thr Gly Pro Phe Ser Thr Thr Thr Gln Pro
1               5                   10                  15

Lys Asn Leu Ser Phe
            20

<210> SEQ ID NO 87
<211> LENGTH: 19
<212> TYPE: PRT
<213> ORGANISM: Artificial Sequence
<220> FEATURE:
<223> OTHER INFORMATION: pNOP462763

<400> SEQUENCE: 87

Arg Trp Val Thr Thr Lys Ser Ile Ser Ser Ser Trp Ile Thr Arg Ile
1               5                   10                  15

Lys Thr Lys

<210> SEQ ID NO 88
<211> LENGTH: 19
<212> TYPE: PRT
<213> ORGANISM: Artificial Sequence
<220> FEATURE:
<223> OTHER INFORMATION: pNOP467296

```
<400> SEQUENCE: 88

Tyr Gly Thr Glu Asn Asn Ile Ser Asp Leu Glu Arg His Cys Gln Leu
1               5                   10                  15

Ala Gly Asp

<210> SEQ ID NO 89
<211> LENGTH: 17
<212> TYPE: PRT
<213> ORGANISM: Artificial Sequence
<220> FEATURE:
<223> OTHER INFORMATION: pNOP494963

<400> SEQUENCE: 89

Gly Gln Ala Ala Val His Ser Thr Arg Ser Ser Asp Glu Cys Gly Thr
1               5                   10                  15

Phe

<210> SEQ ID NO 90
<211> LENGTH: 15
<212> TYPE: PRT
<213> ORGANISM: Artificial Sequence
<220> FEATURE:
<223> OTHER INFORMATION: pNOP556436

<400> SEQUENCE: 90

Ser Glu Leu Pro Glu Leu Leu Arg Val Arg Gln Arg Pro Gly Leu
1               5                   10                  15

<210> SEQ ID NO 91
<211> LENGTH: 14
<212> TYPE: PRT
<213> ORGANISM: Artificial Sequence
<220> FEATURE:
<223> OTHER INFORMATION: pNOP585380 alt splice f

<400> SEQUENCE: 91

Ser Ser Asp Leu Gln Ser His His Val Gln Gly Ser Gly Ala
1               5                   10

<210> SEQ ID NO 92
<211> LENGTH: 13
<212> TYPE: PRT
<213> ORGANISM: Artificial Sequence
<220> FEATURE:
<223> OTHER INFORMATION: pNOP597964

<400> SEQUENCE: 92

Gly Ser Asn Gly Asp Phe Asp His Gly Asn Arg Ser Glu
1               5                   10

<210> SEQ ID NO 93
<211> LENGTH: 13
<212> TYPE: PRT
<213> ORGANISM: Artificial Sequence
<220> FEATURE:
<223> OTHER INFORMATION: pNOP598198

<400> SEQUENCE: 93

Gly Val Lys His Asn Ser Asn Ser Cys Asp His Ser His
1               5                   10

<210> SEQ ID NO 94
<211> LENGTH: 13
<212> TYPE: PRT
```

```
<213> ORGANISM: Artificial Sequence
<220> FEATURE:
<223> OTHER INFORMATION: pNOP602266

<400> SEQUENCE: 94

Lys Arg Asn Arg Met Ala Glu Gly Asp Arg Ala Ser Gly
1               5                   10

<210> SEQ ID NO 95
<211> LENGTH: 13
<212> TYPE: PRT
<213> ORGANISM: Artificial Sequence
<220> FEATURE:
<223> OTHER INFORMATION: pNOP603708

<400> SEQUENCE: 95

Leu Leu Glu Arg Met Gly Gln Ser Leu Gln Glu Ala Gly
1               5                   10

<210> SEQ ID NO 96
<211> LENGTH: 13
<212> TYPE: PRT
<213> ORGANISM: Artificial Sequence
<220> FEATURE:
<223> OTHER INFORMATION: pNOP605229

<400> SEQUENCE: 96

Met Met Met Val Asp Asn Leu Ser Ser Pro Gln Ile Gln
1               5                   10

<210> SEQ ID NO 97
<211> LENGTH: 13
<212> TYPE: PRT
<213> ORGANISM: Artificial Sequence
<220> FEATURE:
<223> OTHER INFORMATION: pNOP609656

<400> SEQUENCE: 97

Gln Arg Pro His Thr Arg Thr Ser Asn Tyr Ile Leu Leu
1               5                   10

<210> SEQ ID NO 98
<211> LENGTH: 13
<212> TYPE: PRT
<213> ORGANISM: Artificial Sequence
<220> FEATURE:
<223> OTHER INFORMATION: pNOP616731

<400> SEQUENCE: 98

Thr Pro Gln Ser Gln Thr Lys Thr Arg Thr Met Thr Thr
1               5                   10

<210> SEQ ID NO 99
<211> LENGTH: 12
<212> TYPE: PRT
<213> ORGANISM: Artificial Sequence
<220> FEATURE:
<223> OTHER INFORMATION: pNOP621664

<400> SEQUENCE: 99

Ala Ser Cys Thr Gly Ala Trp Thr Leu Gly Leu Lys
1               5                   10

<210> SEQ ID NO 100
<211> LENGTH: 12
<212> TYPE: PRT
<213> ORGANISM: Artificial Sequence
```

```
<220> FEATURE:
<223> OTHER INFORMATION: pNOP646263 alt splice f

<400> SEQUENCE: 100

Ser Ser Asp Leu Gln Ser His His Gly Leu Gly Phe
1               5                   10

<210> SEQ ID NO 101
<211> LENGTH: 11
<212> TYPE: PRT
<213> ORGANISM: Artificial Sequence
<220> FEATURE:
<223> OTHER INFORMATION: pNOP669584

<400> SEQUENCE: 101

Asn Gly Asp Phe Asp His Gly Asn Arg Ser Glu
1               5                   10

<210> SEQ ID NO 102
<211> LENGTH: 11
<212> TYPE: PRT
<213> ORGANISM: Artificial Sequence
<220> FEATURE:
<223> OTHER INFORMATION: pNOP676234

<400> SEQUENCE: 102

Arg Pro Ser Asp His Leu Arg Gly Gln Arg Val
1               5                   10

<210> SEQ ID NO 103
<211> LENGTH: 11
<212> TYPE: PRT
<213> ORGANISM: Artificial Sequence
<220> FEATURE:
<223> OTHER INFORMATION: pNOP684840

<400> SEQUENCE: 103

Trp Arg Ser Gln Pro Gln Thr Arg Thr Met Met
1               5                   10

<210> SEQ ID NO 104
<211> LENGTH: 10
<212> TYPE: PRT
<213> ORGANISM: Artificial Sequence
<220> FEATURE:
<223> OTHER INFORMATION: pNOP709338

<400> SEQUENCE: 104

Gln Gln Ala Arg Ile His Pro Gly Gly Leu
1               5                   10

<210> SEQ ID NO 105
<211> LENGTH: 10
<212> TYPE: PRT
<213> ORGANISM: Artificial Sequence
<220> FEATURE:
<223> OTHER INFORMATION: pNOP712539

<400> SEQUENCE: 105

Arg Arg Arg Arg Arg Arg Gly Pro Gly Leu
1               5                   10

<210> SEQ ID NO 106
<211> LENGTH: 10
<212> TYPE: PRT
<213> ORGANISM: Artificial Sequence
<220> FEATURE:
```

<223> OTHER INFORMATION: pNOP714207

<400> SEQUENCE: 106

Ser Gly His Trp Cys His Phe His Ser Gly
1               5                   10

<210> SEQ ID NO 107
<211> LENGTH: 66
<212> TYPE: PRT
<213> ORGANISM: Artificial Sequence
<220> FEATURE:
<223> OTHER INFORMATION: pNOP85108

<400> SEQUENCE: 107

Thr Asn Gly Ala Ile Ala Ser Arg Ser Trp Leu Thr Cys Thr Glu Ala
1               5                   10                  15

Ala Arg Thr Thr Arg Gly Leu Glu Arg Gly Pro Gln Thr His Val
            20                  25                  30

Leu Gly Asn Ala Glu Ile Thr Leu Leu Val Val Phe Gln Leu Pro Ser
        35                  40                  45

Leu Glu Met Ser Phe Trp Gly Lys Lys Arg Asp Trp Leu Val Met Gln
    50                  55                  60

Leu Val
65

<210> SEQ ID NO 108
<211> LENGTH: 68
<212> TYPE: PRT
<213> ORGANISM: Artificial Sequence
<220> FEATURE:
<223> OTHER INFORMATION: pNOP80315

<400> SEQUENCE: 108

Val Ser Arg Arg Gly Pro Gly Lys Cys Gly Phe Thr Ser Phe Gln Arg
1               5                   10                  15

Pro Thr Gln Ser Phe Ser Trp Gln Leu Pro Ile Arg Ser His Ser Glu
            20                  25                  30

Ile Arg Ile Ser Arg Ser Lys Glu Lys Lys Ser Phe Pro Ser Ala Phe
        35                  40                  45

Ser Glu Trp Gln Asn His Thr Thr Pro Lys Ser Pro Phe Thr Arg Trp
    50                  55                  60

Leu Leu Thr Ile
65

<210> SEQ ID NO 109
<211> LENGTH: 40
<212> TYPE: PRT
<213> ORGANISM: Artificial Sequence
<220> FEATURE:
<223> OTHER INFORMATION: pNOP197571

<400> SEQUENCE: 109

Gln His Trp Ser Glu Thr Lys Asn Cys Arg Phe Trp Ser Cys Ser Gln
1               5                   10                  15

Val Gly Ile Lys Arg Asn Trp Cys Arg Arg Val Ser Gly Thr Ile Thr
            20                  25                  30

Gly Asp Asn Cys Ile Tyr Gly Thr
        35                  40

<210> SEQ ID NO 110
<211> LENGTH: 102

```
<212> TYPE: PRT
<213> ORGANISM: Artificial Sequence
<220> FEATURE:
<223> OTHER INFORMATION: pNOP31404

<400> SEQUENCE: 110

Cys Phe Gln Pro Cys Gln Pro Leu Leu Leu Pro His Leu Tyr Gln
1               5                   10                  15

Leu Ala Leu Gln Gln Met Ser Leu Ser Ile Asp Phe Arg Asp Ser Phe
            20                  25                  30

Pro Ala Glu Tyr Leu Leu His Leu Leu Lys His Ser Ala Ser Phe Leu
                35                  40                  45

Tyr Asn Ser Thr Glu Thr Val Leu Lys Thr Lys Thr Gln Ile Asn Phe
50                  55                  60

Pro Gln Ser Leu Leu Ser Gln Asp Pro Cys Pro Pro Val Thr Tyr Thr
65                  70                  75                  80

Gly Gln Ser His Leu Asp Leu Pro Gln Val Ile Gln Val Asn Arg Glu
                85                  90                  95

Ile Pro Gln Lys Ile Ala
            100

<210> SEQ ID NO 111
<211> LENGTH: 36
<212> TYPE: PRT
<213> ORGANISM: Artificial Sequence
<220> FEATURE:
<223> OTHER INFORMATION: pNOP226356

<400> SEQUENCE: 111

Ile Asp Cys Cys Trp Asn Phe Leu Leu Asn Phe Ile Leu Ile Leu Ser
1               5                   10                  15

Val Leu Met Phe His Lys Leu Ser Leu Leu Lys Ser Gly Ile Arg Ser
            20                  25                  30

Cys Cys Pro Ser
            35

<210> SEQ ID NO 112
<211> LENGTH: 54
<212> TYPE: PRT
<213> ORGANISM: Artificial Sequence
<220> FEATURE:
<223> OTHER INFORMATION: pNOP120630

<400> SEQUENCE: 112

Cys Gln Trp Gly Pro Ala Val Gly Lys Trp Gly Glu His Trp Lys Phe
1               5                   10                  15

Trp Gly Gln Gln Trp Lys Gln Pro Glu Trp Gly Ser His Gln Trp Val
            20                  25                  30

Phe Pro Asp Gln Tyr Leu Arg Arg Cys Gly Gly Met Leu Gln Arg
                35                  40                  45

Ser Val Asn Gly Leu Cys
50

<210> SEQ ID NO 113
<211> LENGTH: 39
<212> TYPE: PRT
<213> ORGANISM: Artificial Sequence
<220> FEATURE:
<223> OTHER INFORMATION: pNOP201764
```

-continued

<400> SEQUENCE: 113

Phe Leu Ser Cys Arg Leu Lys Met Glu Lys Ile Ser Ser Leu Phe Asn
1               5                   10                  15

Arg Ile His Gln Arg Leu Tyr Gln Asp Ile Pro Lys Gln Asn Asn Arg
            20                  25                  30

Ile Glu Lys Thr Leu Asn Gly
        35

<210> SEQ ID NO 114
<211> LENGTH: 24
<212> TYPE: PRT
<213> ORGANISM: Artificial Sequence
<220> FEATURE:
<223> OTHER INFORMATION: pNOP360358

<400> SEQUENCE: 114

Ala Arg Arg Ser Ser Arg Ser Thr Lys Arg Arg Asp Lys Asn Asp Glu
1               5                   10                  15

Pro Ser Glu Ser Ser Lys His His
            20

<210> SEQ ID NO 115
<211> LENGTH: 54
<212> TYPE: PRT
<213> ORGANISM: Artificial Sequence
<220> FEATURE:
<223> OTHER INFORMATION: pNOP122927

<400> SEQUENCE: 115

Arg Ile Leu Arg Leu Arg Val Cys Ser Arg Asn Ile Thr Val Gly Val
1               5                   10                  15

Ala Gln Gly Ser Lys Leu His Leu Val Thr Pro Ser Arg Ser Leu Phe
            20                  25                  30

His Ala Cys Gln Ile Leu Ile His Cys His His Leu Val Leu Leu Arg
        35                  40                  45

Leu Val Gln Lys Thr Ala
    50

<210> SEQ ID NO 116
<211> LENGTH: 50
<212> TYPE: PRT
<213> ORGANISM: Artificial Sequence
<220> FEATURE:
<223> OTHER INFORMATION: pNOP139478

<400> SEQUENCE: 116

Pro Cys Leu Gln Ser Val Arg Cys Cys Phe Lys Asn Ile Glu Ser His
1               5                   10                  15

Ala Gly Ile Tyr Ser Leu Pro Gln Phe Ser Gly Lys Asn Gln Thr Ser
            20                  25                  30

Glu Thr Ser Pro Ala Ser Cys Arg His His Pro Ser Gln Met Cys Arg
        35                  40                  45

Cys Gln
    50

<210> SEQ ID NO 117
<211> LENGTH: 40
<212> TYPE: PRT
<213> ORGANISM: Artificial Sequence
<220> FEATURE:
<223> OTHER INFORMATION: pNOP194698

```
<400> SEQUENCE: 117

Gly Gly Asn Cys Arg Ser His Pro Val Gly Arg Arg His Phe Gly
1               5                   10                  15

Trp Ser Thr Gly Gln Leu Leu Ala Gly Ile Cys Ser Gln Gln Leu Ser
            20                  25                  30

Gly Asn His Arg Glu Gln Phe Pro
        35                  40

<210> SEQ ID NO 118
<211> LENGTH: 36
<212> TYPE: PRT
<213> ORGANISM: Artificial Sequence
<220> FEATURE:
<223> OTHER INFORMATION: pNOP224982

<400> SEQUENCE: 118

Glu Leu Gln Ile Leu Glu Leu Gln Pro Gly Trp His Gln Lys Glu Leu
1               5                   10                  15

Val Gln Glu Ser Phe Arg Asp Asn Tyr Trp Gly Gln Leu His Leu Trp
            20                  25                  30

His Leu Arg Tyr
        35

<210> SEQ ID NO 119
<211> LENGTH: 26
<212> TYPE: PRT
<213> ORGANISM: Artificial Sequence
<220> FEATURE:
<223> OTHER INFORMATION: pNOP336754

<400> SEQUENCE: 119

Lys Trp Arg Arg Tyr His His Tyr Ser Thr Gly Tyr Thr Arg Asp Ser
1               5                   10                  15

Thr Arg Thr Tyr Gln Ser Lys Thr Thr Val
            20                  25

<210> SEQ ID NO 120
<211> LENGTH: 24
<212> TYPE: PRT
<213> ORGANISM: Artificial Sequence
<220> FEATURE:
<223> OTHER INFORMATION: pNOP367569

<400> SEQUENCE: 120

Met Ser Ile Gln Ser Ser Thr Pro Val Leu Arg Thr Phe Leu Lys His
1               5                   10                  15

Leu Cys Leu Gln Val Ile Gln Gln
            20

<210> SEQ ID NO 121
<211> LENGTH: 69
<212> TYPE: PRT
<213> ORGANISM: Artificial Sequence
<220> FEATURE:
<223> OTHER INFORMATION: pNOP78143

<400> SEQUENCE: 121

Tyr Val Pro Phe Val Asp Leu Ser Gly Asp Leu Met Ile Ser Thr Ala
1               5                   10                  15

Thr Ser Cys Gln Val Leu Trp Ile Pro Leu Leu Pro Ser Glu Leu His
            20                  25                  30
```

```
Ser Ser Lys Pro Tyr Ser Ser Leu Trp Leu Asp His Glu Gly Ile
         35                  40                  45

Lys Arg Ala Ile Leu Thr Leu Leu Ile Met Glu Leu Ser Lys Ser Leu
 50                  55                  60

Leu Leu Thr Lys Ile
 65

<210> SEQ ID NO 122
<211> LENGTH: 55
<212> TYPE: PRT
<213> ORGANISM: Artificial Sequence
<220> FEATURE:
<223> OTHER INFORMATION: pNOP116733

<400> SEQUENCE: 122

Cys Asn Tyr Cys Ser Ile Asp Pro Phe Thr Phe Val Ser Trp Phe Thr
 1               5                  10                  15

Arg Cys Gly Ser Ser Leu Phe Arg Thr Ser Thr Ser Gly Gln Thr Ser
             20                  25                  30

Ile Lys Arg Ala Thr Glu Ala Ser Ser Leu Ser Tyr Tyr Met Val Ala
         35                  40                  45

Asn Tyr Ala Asp Gln Leu Gln
 50                  55

<210> SEQ ID NO 123
<211> LENGTH: 54
<212> TYPE: PRT
<213> ORGANISM: Artificial Sequence
<220> FEATURE:
<223> OTHER INFORMATION: pNOP121052

<400> SEQUENCE: 123

Phe Pro Leu Asn Gly Trp Gln Thr Phe Gln Lys Asp Leu Leu Glu Phe
 1               5                  10                  15

Cys Lys Asn Gly Tyr Tyr Ser Thr Pro Cys Val Phe Lys Thr Val Arg
             20                  25                  30

Asn Ala Glu Cys Phe Gln Phe His Ser Leu His Gln Asp Ala Ser Pro
         35                  40                  45

Phe Asp Gly Tyr Cys Arg
     50

<210> SEQ ID NO 124
<211> LENGTH: 41
<212> TYPE: PRT
<213> ORGANISM: Artificial Sequence
<220> FEATURE:
<223> OTHER INFORMATION: pNOP187727

<400> SEQUENCE: 124

Gly Glu Lys Glu Phe Pro Gln Cys Leu Phe Arg Val Ala Glu Ser His
 1               5                  10                  15

His Pro Glu Glu Pro Leu His Gln Met Ala Ser His His Ile Ala Leu
             20                  25                  30

Arg Lys Gln Thr Ala Val Leu Thr Lys
         35                  40

<210> SEQ ID NO 125
<211> LENGTH: 40
<212> TYPE: PRT
<213> ORGANISM: Artificial Sequence
<220> FEATURE:
<223> OTHER INFORMATION: pNOP194503
```

<400> SEQUENCE: 125

Phe Leu Gln Pro Arg Val Val Lys Ser Cys Gly Phe Pro Phe Pro
1               5                   10                  15

Gln Ser Cys Thr Ala Ala Asn Arg Thr Ala Ala Ala Phe Gly Trp Ile
            20                  25                  30

Thr Lys Glu Ser Arg Glu Gln Phe
        35                  40

<210> SEQ ID NO 126
<211> LENGTH: 38
<212> TYPE: PRT
<213> ORGANISM: Artificial Sequence
<220> FEATURE:
<223> OTHER INFORMATION: pNOP212034

<400> SEQUENCE: 126

Pro His Lys Ser Ala Val His Ile Asn Thr Val Gly Thr Val Gln Arg
1               5                   10                  15

Pro Ser Arg Arg Val Gly Ser Trp Gln Arg Asn Thr Lys Ser Trp Ile
            20                  25                  30

His Trp Tyr Trp Trp Cys
        35

<210> SEQ ID NO 127
<211> LENGTH: 33
<212> TYPE: PRT
<213> ORGANISM: Artificial Sequence
<220> FEATURE:
<223> OTHER INFORMATION: pNOP256729

<400> SEQUENCE: 127

Gln Leu Ser Leu Gln Glu Arg Ser Arg Gln Val Arg Leu His Gln Leu
1               5                   10                  15

Pro Lys Ala Asp Ala Val Leu Leu Leu Ala Thr Pro His Gln Val Ala
            20                  25                  30

Gln

<210> SEQ ID NO 128
<211> LENGTH: 32
<212> TYPE: PRT
<213> ORGANISM: Artificial Sequence
<220> FEATURE:
<223> OTHER INFORMATION: pNOP264595

<400> SEQUENCE: 128

Leu Glu Glu Thr Ala Gln Thr Ile Asn Thr Gly Cys Leu Leu Gly Leu
1               5                   10                  15

Arg Thr Ala Ala Val His Val Glu His Ser Val Phe Ile Cys Tyr Leu
            20                  25                  30

<210> SEQ ID NO 129
<211> LENGTH: 28
<212> TYPE: PRT
<213> ORGANISM: Artificial Sequence
<220> FEATURE:
<223> OTHER INFORMATION: pNOP316970

<400> SEQUENCE: 129

Tyr Leu Arg Leu Leu Val Gln Leu Leu Leu His Arg Ser Leu His Ile
1               5                   10                  15

```
Cys Leu Leu Val Tyr Glu Met Trp Leu Phe Val Val
            20                  25

<210> SEQ ID NO 130
<211> LENGTH: 75
<212> TYPE: PRT
<213> ORGANISM: Artificial Sequence
<220> FEATURE:
<223> OTHER INFORMATION: pNOP64417

<400> SEQUENCE: 130

Glu Arg Trp Pro Ser Gly Val Phe Pro Met Met Ser Val Gly Pro Cys
1               5                   10                  15

Cys Trp Gln Met Gly Arg Ala Leu Glu Ile Leu Gly Ala Ala Val Glu
            20                  25                  30

Ala Ala Arg Val Gly Glu Pro Pro Val Gly Leu Pro Arg Pro Val Ser
        35                  40                  45

Gln Glu Met Trp Trp Arg His Ala Ala Ala Phe Cys Gln Trp Ser Val
    50                  55                  60

Leu Thr Leu Ser Thr Lys Cys Thr Leu Leu Leu
65                  70                  75

<210> SEQ ID NO 131
<211> LENGTH: 37
<212> TYPE: PRT
<213> ORGANISM: Artificial Sequence
<220> FEATURE:
<223> OTHER INFORMATION: pNOP223009

<400> SEQUENCE: 131

Val Val Glu Lys Lys Ile Met Ser Ala Gln Ala Val Ser Val Val Val
1               5                   10                  15

Arg Trp Arg Ile Lys Lys Leu Ser Lys Gly Cys Thr Arg Trp Met Ile
            20                  25                  30

Val Gln Arg Asn Glu
        35

<210> SEQ ID NO 132
<211> LENGTH: 35
<212> TYPE: PRT
<213> ORGANISM: Artificial Sequence
<220> FEATURE:
<223> OTHER INFORMATION: pNOP239116

<400> SEQUENCE: 132

Ser Asn Val Gln Met Pro Ile Ala Ala Gln Val Ser Cys Pro Tyr Gln
1               5                   10                  15

His Cys Trp Asn Cys Ala Lys Ala Lys Gln Glu Ser Trp Gln Leu Ala
            20                  25                  30

Glu Lys Tyr
        35

<210> SEQ ID NO 133
<211> LENGTH: 34
<212> TYPE: PRT
<213> ORGANISM: Artificial Sequence
<220> FEATURE:
<223> OTHER INFORMATION: pNOP244756

<400> SEQUENCE: 133

Lys Thr Leu Trp Met Val Asn Arg Thr Ala Ser Cys Arg His Leu Phe
1               5                   10                  15
```

```
Pro Thr Thr Ile Trp Lys Pro Gln Arg Thr Val Pro Leu Ser Ala Gln
            20                  25                  30

Ser Ile

<210> SEQ ID NO 134
<211> LENGTH: 33
<212> TYPE: PRT
<213> ORGANISM: Artificial Sequence
<220> FEATURE:
<223> OTHER INFORMATION: pNOP253661

<400> SEQUENCE: 134

Ile Ile Gln Thr Ser Leu Gly Cys Trp Glu Pro Arg Val Arg Arg Ala
1               5                   10                  15

Ile Thr Ile Ser Ser Leu Asn Gly Trp Gln Gly Asp Arg Trp Leu Ile
            20                  25                  30

Cys

<210> SEQ ID NO 135
<211> LENGTH: 31
<212> TYPE: PRT
<213> ORGANISM: Artificial Sequence
<220> FEATURE:
<223> OTHER INFORMATION: pNOP271334

<400> SEQUENCE: 135

Cys Met Glu Cys Trp Leu Cys Tyr Tyr Arg Asn Gly Leu Cys Lys Thr
1               5                   10                  15

Thr Met Glu Cys Arg Lys Thr Leu Gln Ser Ser Cys Phe Asp Ile
            20                  25                  30

<210> SEQ ID NO 136
<211> LENGTH: 30
<212> TYPE: PRT
<213> ORGANISM: Artificial Sequence
<220> FEATURE:
<223> OTHER INFORMATION: pNOP291483

<400> SEQUENCE: 136

Thr Val Val Pro Asn Val Met Thr Ala Leu Ala Val Ala Ala Ile Val
1               5                   10                  15

Val Met Leu Leu Tyr Pro Val Thr Arg Gln Cys Ser Pro Gln
            20                  25                  30

<210> SEQ ID NO 137
<211> LENGTH: 29
<212> TYPE: PRT
<213> ORGANISM: Artificial Sequence
<220> FEATURE:
<223> OTHER INFORMATION: pNOP298479

<400> SEQUENCE: 137

Met Ala Glu Arg Ser Thr Asp Arg Pro Trp Ser Ile Phe Phe Leu Leu
1               5                   10                  15

Ser Gly Ser Arg Cys Gly Asn Trp Asn Phe Asn Gly Cys
            20                  25

<210> SEQ ID NO 138
<211> LENGTH: 23
<212> TYPE: PRT
<213> ORGANISM: Artificial Sequence
<220> FEATURE:
<223> OTHER INFORMATION: pNOP382700
```

<400> SEQUENCE: 138

Leu Leu Ser Gln Lys Leu Leu Ser Cys Leu Leu Lys Arg Leu Lys Met
1               5                   10                  15

Met Ile Pro Thr Lys Met Met
            20

<210> SEQ ID NO 139
<211> LENGTH: 22
<212> TYPE: PRT
<213> ORGANISM: Artificial Sequence
<220> FEATURE:
<223> OTHER INFORMATION: pNOP397851

<400> SEQUENCE: 139

Ile Val Phe Leu Glu Thr Lys Leu Asn Gln Thr Ile Gly Lys Asn Phe
1               5                   10                  15

Leu Ala Ala Phe Val Leu
            20

<210> SEQ ID NO 140
<211> LENGTH: 22
<212> TYPE: PRT
<213> ORGANISM: Artificial Sequence
<220> FEATURE:
<223> OTHER INFORMATION: pNOP401956

<400> SEQUENCE: 140

Pro Leu Leu Cys Ser Pro Leu Ile Ile Pro Thr Gln Trp Leu Ala Asn
1               5                   10                  15

Phe Pro Glu Gly Ser Thr
            20

<210> SEQ ID NO 141
<211> LENGTH: 18
<212> TYPE: PRT
<213> ORGANISM: Artificial Sequence
<220> FEATURE:
<223> OTHER INFORMATION: pNOP468088

<400> SEQUENCE: 141

Ala Leu Glu His Phe Leu Leu Val Ile Arg Leu Lys Met Trp Glu Leu
1               5                   10                  15

Glu Leu

<210> SEQ ID NO 142
<211> LENGTH: 16
<212> TYPE: PRT
<213> ORGANISM: Artificial Sequence
<220> FEATURE:
<223> OTHER INFORMATION: pNOP535310

<400> SEQUENCE: 142

Trp Leu Leu Gln Met Arg Trp Lys Leu Pro Lys Pro Ser Ser Trp Ala
1               5                   10                  15

<210> SEQ ID NO 143
<211> LENGTH: 13
<212> TYPE: PRT
<213> ORGANISM: Artificial Sequence
<220> FEATURE:
<223> OTHER INFORMATION: pNOP594196

-continued

<400> SEQUENCE: 143

Glu Ala Ala Val Pro Leu Asn Leu Cys Phe Ala Val His
1               5                   10

<210> SEQ ID NO 144
<211> LENGTH: 13
<212> TYPE: PRT
<213> ORGANISM: Artificial Sequence
<220> FEATURE:
<223> OTHER INFORMATION: pNOP605820

<400> SEQUENCE: 144

Asn Phe Asn Leu Arg Thr Asp Leu His Gln Glu Ser Tyr
1               5                   10

<210> SEQ ID NO 145
<211> LENGTH: 13
<212> TYPE: PRT
<213> ORGANISM: Artificial Sequence
<220> FEATURE:
<223> OTHER INFORMATION: pNOP611013

<400> SEQUENCE: 145

Arg Lys Glu Ser Asn Phe Arg Asp Phe Ser Ser Gln Leu
1               5                   10

<210> SEQ ID NO 146
<211> LENGTH: 11
<212> TYPE: PRT
<213> ORGANISM: Artificial Sequence
<220> FEATURE:
<223> OTHER INFORMATION: pNOP670032

<400> SEQUENCE: 146

Asn Leu Gln Thr Gln Cys Tyr Gly Glu Lys Leu
1               5                   10

<210> SEQ ID NO 147
<211> LENGTH: 10
<212> TYPE: PRT
<213> ORGANISM: Artificial Sequence
<220> FEATURE:
<223> OTHER INFORMATION: pNOP692020

<400> SEQUENCE: 147

Glu Thr Gly Gln His Phe Ser Arg Thr Phe
1               5                   10

<210> SEQ ID NO 148
<211> LENGTH: 62
<212> TYPE: PRT
<213> ORGANISM: Artificial Sequence
<220> FEATURE:
<223> OTHER INFORMATION: pNOP94080

<400> SEQUENCE: 148

Phe Asn Asn Asn Asn Asn Asn Asn Arg Ala Thr Lys Ala Asn Gly
1               5                   10                  15

Ser Asn Lys Arg Gln Thr Pro Gln Ser Val Phe Glu Leu Leu Ser Phe
            20                  25                  30

Ile Ser Ser Phe Pro Ile Asn Val Ser Leu Val Asn Pro Phe Phe
        35                  40                  45

Phe Tyr Pro Ile Cys Thr Ser Trp His Cys Asn Arg Cys Leu
    50                  55                  60

```
<210> SEQ ID NO 149
<211> LENGTH: 55
<212> TYPE: PRT
<213> ORGANISM: Artificial Sequence
<220> FEATURE:
<223> OTHER INFORMATION: pNOP119437

<400> SEQUENCE: 149

Ser Ile Gln Ser Phe Val Leu His Gly Ser Gln Leu Cys Arg Ser Thr
1               5                   10                  15

Thr Val Glu Thr Gly Cys Ser Thr Arg Glu Lys Lys Leu Val Gly Asn
            20                  25                  30

His Ile Asp Ile Leu Leu Ala Met Met Pro Leu Asn Ser Tyr Glu Arg
        35                  40                  45

Gly Gln Trp Gly Thr Leu Thr
    50                  55

<210> SEQ ID NO 150
<211> LENGTH: 51
<212> TYPE: PRT
<213> ORGANISM: Artificial Sequence
<220> FEATURE:
<223> OTHER INFORMATION: pNOP133585

<400> SEQUENCE: 150

Gly Arg Arg Arg Arg Ser Pro Gln Gly Glu Gln Arg Ala Arg Gly
1               5                   10                  15

Cys Arg Gly Thr Ala Ala Gly Gly Gly Gln Arg Gly Pro Arg Ala Gly
            20                  25                  30

Gly Leu Ala Ala Ala Ala Ala Ala Gln Ser Ala Glu Cys Gly Ala Gly
        35                  40                  45

Pro Ala Ala
    50

<210> SEQ ID NO 151
<211> LENGTH: 50
<212> TYPE: PRT
<213> ORGANISM: Artificial Sequence
<220> FEATURE:
<223> OTHER INFORMATION: pNOP140186

<400> SEQUENCE: 151

Arg Met Lys Arg Asn Arg Cys Val Leu Phe Ala Cys Trp Ala Cys Leu
1               5                   10                  15

Met Lys Lys Val Leu Gln Cys Val Lys Thr Ala Ala Gly Thr Ser Cys
            20                  25                  30

Thr Thr Thr Ala Cys Gln Phe Gly Gln Lys Ser Val Glu Glu Ile Glu
        35                  40                  45

Asn Leu
    50

<210> SEQ ID NO 152
<211> LENGTH: 46
<212> TYPE: PRT
<213> ORGANISM: Artificial Sequence
<220> FEATURE:
<223> OTHER INFORMATION: pNOP158520

<400> SEQUENCE: 152

Ile Pro Gly Val Tyr Trp Ala Ser Glu Leu Gln Leu Cys Thr Trp Asn
1               5                   10                  15
```

```
Ile Leu Tyr Ser Ser Ala Ile Cys Asp Ala Pro Gly Val Ser Thr Arg
            20                  25                  30

Thr Phe Arg Pro Asn Val Met Glu Lys Asn Phe Lys Glu Phe
            35                  40                  45
```

<210> SEQ ID NO 153
<211> LENGTH: 30
<212> TYPE: PRT
<213> ORGANISM: Artificial Sequence
<220> FEATURE:
<223> OTHER INFORMATION: pNOP282791

<400> SEQUENCE: 153

```
Asp Leu Leu Val Gln Gln Gln Gln Gln Gln Gln Gln Ser Asn Gln
1               5                   10                  15

Ser Gln Trp Phe Lys Gln Lys Ala Asp Pro Thr Val Ser Val
            20                  25                  30
```

<210> SEQ ID NO 154
<211> LENGTH: 30
<212> TYPE: PRT
<213> ORGANISM: Artificial Sequence
<220> FEATURE:
<223> OTHER INFORMATION: pNOP286430

<400> SEQUENCE: 154

```
Leu Leu Thr Thr Leu Asn Ser Tyr Ser Val Ala Phe Arg Ile Ser Met
1               5                   10                  15

Lys Thr Lys Ser Phe Thr Glu Met Ser Lys Val Pro Ile Cys
            20                  25                  30
```

<210> SEQ ID NO 155
<211> LENGTH: 29
<212> TYPE: PRT
<213> ORGANISM: Artificial Sequence
<220> FEATURE:
<223> OTHER INFORMATION: pNOP303263

<400> SEQUENCE: 155

```
Thr Ser Gly Ile His Ser Leu Gln Asn Thr Phe Cys Ile Ser Ser Asn
1               5                   10                  15

Thr Ala Gln Val Phe Ser Thr Ile Pro Gln Lys Leu Ser
            20                  25
```

<210> SEQ ID NO 156
<211> LENGTH: 28
<212> TYPE: PRT
<213> ORGANISM: Artificial Sequence
<220> FEATURE:
<223> OTHER INFORMATION: pNOP314934

<400> SEQUENCE: 156

```
Ser Ser Arg Gly Thr Asn Asp Gln Gly Glu Thr Glu Gly Asn Leu Tyr
1               5                   10                  15

Ala Ser Leu Glu Ala Arg Met Val Gly Lys Glu Lys
            20                  25
```

<210> SEQ ID NO 157
<211> LENGTH: 26
<212> TYPE: PRT
<213> ORGANISM: Artificial Sequence
<220> FEATURE:
<223> OTHER INFORMATION: pNOP341052

```
<400> SEQUENCE: 157

Arg Arg Arg Ser Phe Ser Asn Cys His Gly Asn Val Ser Val Ser Gly
1               5                   10                  15

Cys Pro Pro His Ser Ser Ser Ala Ala Gly
            20                  25

<210> SEQ ID NO 158
<211> LENGTH: 25
<212> TYPE: PRT
<213> ORGANISM: Artificial Sequence
<220> FEATURE:
<223> OTHER INFORMATION: pNOP358464

<400> SEQUENCE: 158

Val His Ser Pro Phe Arg Glu Asn Trp Lys Arg Ile Met Cys Tyr Lys
1               5                   10                  15

Ile Glu Cys Gln Phe Arg Gly His Phe
            20                  25

<210> SEQ ID NO 159
<211> LENGTH: 23
<212> TYPE: PRT
<213> ORGANISM: Artificial Sequence
<220> FEATURE:
<223> OTHER INFORMATION: pNOP386384

<400> SEQUENCE: 159

Arg Asp Ser Val His Pro Ser Arg Gly Glu Met Gln Ile Arg Cys Gln
1               5                   10                  15

Tyr Arg Ala Gln Leu Gln Tyr
            20

<210> SEQ ID NO 160
<211> LENGTH: 23
<212> TYPE: PRT
<213> ORGANISM: Artificial Sequence
<220> FEATURE:
<223> OTHER INFORMATION: pNOP387248

<400> SEQUENCE: 160

Arg Gln Pro Val Cys Gln Pro Gly Ser Thr Asn Gly Trp Lys Gly Glu
1               5                   10                  15

Ile Gly Glu Gly Leu Trp Trp
            20

<210> SEQ ID NO 161
<211> LENGTH: 22
<212> TYPE: PRT
<213> ORGANISM: Artificial Sequence
<220> FEATURE:
<223> OTHER INFORMATION: pNOP400051

<400> SEQUENCE: 161

Leu Ser His Gly Phe Arg Cys Leu Glu Trp Asn Ser Leu Ala Ala Tyr
1               5                   10                  15

Phe Leu Glu Thr Gly Met
            20

<210> SEQ ID NO 162
<211> LENGTH: 22
<212> TYPE: PRT
<213> ORGANISM: Artificial Sequence
<220> FEATURE:
<223> OTHER INFORMATION: pNOP400858
```

<400> SEQUENCE: 162

Asn Gly Gly Gly Gly Glu Ser Arg Leu Val Val Gly Ile Pro Gly
1               5                   10                  15

Arg Gln Gly Tyr Glu Pro
            20

<210> SEQ ID NO 163
<211> LENGTH: 20
<212> TYPE: PRT
<213> ORGANISM: Artificial Sequence
<220> FEATURE:
<223> OTHER INFORMATION: pNOP446688

<400> SEQUENCE: 163

Trp Arg Ile Lys Lys Leu Ser Lys Gly Cys Thr Arg Trp Met Ile Val
1               5                   10                  15

Gln Arg Asn Glu
            20

<210> SEQ ID NO 164
<211> LENGTH: 19
<212> TYPE: PRT
<213> ORGANISM: Artificial Sequence
<220> FEATURE:
<223> OTHER INFORMATION: pNOP455806

<400> SEQUENCE: 164

Lys Trp Leu Val Gln Asn His His Gly Met Gln Lys Asn Thr Pro Ile
1               5                   10                  15

Ile Leu Leu

<210> SEQ ID NO 165
<211> LENGTH: 87
<212> TYPE: PRT
<213> ORGANISM: Artificial Sequence
<220> FEATURE:
<223> OTHER INFORMATION: pNOP45906

<400> SEQUENCE: 165

Ala Ala Ala Leu Pro Cys Arg Leu Thr Ala Gly Leu Leu Asp Phe Pro
1               5                   10                  15

Val Ala Gly Ala Arg Gly Arg Ser Gly Glu Trp Asp Arg Leu Pro Ala
            20                  25                  30

Cys Gly Gly Ala Ala Ala Pro Arg Ser Arg Glu Pro Arg Arg Arg Pro
        35                  40                  45

Pro Tyr Arg Val Gly Gly Gly Ala Gly Gln Arg Leu Glu Ser Arg
    50                  55                  60

Ser Gly Arg Ala Arg Gly Glu Ala Gly Ala Arg Arg Ala Val Ser
65                  70                  75                  80

Cys Ser Gly Pro Arg Arg Ser
                85

<210> SEQ ID NO 166
<211> LENGTH: 19
<212> TYPE: PRT
<213> ORGANISM: Artificial Sequence
<220> FEATURE:
<223> OTHER INFORMATION: pNOP462198

-continued

```
<400> SEQUENCE: 166

Arg Arg Leu Gln Glu Gln Ala Ala Pro Pro Leu His Val Asn Leu Gly
1               5                   10                  15

Arg Arg Val

<210> SEQ ID NO 167
<211> LENGTH: 18
<212> TYPE: PRT
<213> ORGANISM: Artificial Sequence
<220> FEATURE:
<223> OTHER INFORMATION: pNOP471366

<400> SEQUENCE: 167

Glu Val Asn Ser Met Glu Gly Ala Val Met Tyr Gly Val Leu Ala Val
1               5                   10                  15

Leu Leu

<210> SEQ ID NO 168
<211> LENGTH: 18
<212> TYPE: PRT
<213> ORGANISM: Artificial Sequence
<220> FEATURE:
<223> OTHER INFORMATION: pNOP473845

<400> SEQUENCE: 168

His His Pro Glu Val Cys Phe Thr His Val Lys Phe Ser Tyr Ile Val
1               5                   10                  15

Ile Ile

<210> SEQ ID NO 169
<211> LENGTH: 17
<212> TYPE: PRT
<213> ORGANISM: Artificial Sequence
<220> FEATURE:
<223> OTHER INFORMATION: pNOP496746

<400> SEQUENCE: 169

Ile Ile Ile Lys Ser Ala Lys Arg Arg Trp Lys Leu Lys Lys Lys Lys
1               5                   10                  15

Leu

<210> SEQ ID NO 170
<211> LENGTH: 17
<212> TYPE: PRT
<213> ORGANISM: Artificial Sequence
<220> FEATURE:
<223> OTHER INFORMATION: pNOP503554

<400> SEQUENCE: 170

Pro Tyr Ser Leu Trp Asn Ser Ala Asn Pro Ser Cys Leu Gln Arg Phe
1               5                   10                  15

Ser

<210> SEQ ID NO 171
<211> LENGTH: 16
<212> TYPE: PRT
<213> ORGANISM: Artificial Sequence
<220> FEATURE:
<223> OTHER INFORMATION: pNOP512752
```

<400> SEQUENCE: 171

Ala Met Asp Ser Gly Val Trp Asn Gly Thr Arg Trp Leu Leu Ile Phe
1               5                   10                  15

<210> SEQ ID NO 172
<211> LENGTH: 16
<212> TYPE: PRT
<213> ORGANISM: Artificial Sequence
<220> FEATURE:
<223> OTHER INFORMATION: pNOP534454

<400> SEQUENCE: 172

Val Leu Gln Glu Trp Leu Leu Gln Tyr Pro Met Cys Phe Gln Asn Cys
1               5                   10                  15

<210> SEQ ID NO 173
<211> LENGTH: 16
<212> TYPE: PRT
<213> ORGANISM: Artificial Sequence
<220> FEATURE:
<223> OTHER INFORMATION: pNOP535898

<400> SEQUENCE: 173

Tyr Glu Leu Leu Gln Gly Gly Gly Leu Glu Trp Trp Arg Lys Arg Ser
1               5                   10                  15

<210> SEQ ID NO 174
<211> LENGTH: 15
<212> TYPE: PRT
<213> ORGANISM: Artificial Sequence
<220> FEATURE:
<223> OTHER INFORMATION: pNOP544644

<400> SEQUENCE: 174

Ile Lys Gln Leu Ala Arg Thr Ser Trp Pro Pro Leu Ser Tyr Arg
1               5                   10                  15

<210> SEQ ID NO 175
<211> LENGTH: 15
<212> TYPE: PRT
<213> ORGANISM: Artificial Sequence
<220> FEATURE:
<223> OTHER INFORMATION: pNOP546490

<400> SEQUENCE: 175

Lys Pro Asn His Ser Gln Arg Cys Gln Arg Cys Gln Phe Ala Asn
1               5                   10                  15

<210> SEQ ID NO 176
<211> LENGTH: 15
<212> TYPE: PRT
<213> ORGANISM: Artificial Sequence
<220> FEATURE:
<223> OTHER INFORMATION: pNOP553311

<400> SEQUENCE: 176

Gln Ser Asp Ala Gly Gln Thr Val Leu Thr Ala Ala Asp Arg Ala
1               5                   10                  15

<210> SEQ ID NO 177
<211> LENGTH: 15
<212> TYPE: PRT
<213> ORGANISM: Artificial Sequence
<220> FEATURE:
<223> OTHER INFORMATION: pNOP560491

<400> SEQUENCE: 177

Val Pro Val Gln Arg Thr Phe Leu Arg Asp Trp Pro Ala Phe Gln
1               5                   10                  15

<210> SEQ ID NO 178
<211> LENGTH: 14
<212> TYPE: PRT
<213> ORGANISM: Artificial Sequence
<220> FEATURE:
<223> OTHER INFORMATION: pNOP572874

<400> SEQUENCE: 178

Lys Leu Glu Cys Glu Arg Asp Gly Pro Gln Ala Ser Phe Pro
1               5                   10

<210> SEQ ID NO 179
<211> LENGTH: 183
<212> TYPE: PRT
<213> ORGANISM: Artificial Sequence
<220> FEATURE:
<223> OTHER INFORMATION: pNOP5767

<400> SEQUENCE: 179

Trp Arg Arg Arg Arg Gly Ile Ala Pro Arg Arg Asp Ser Arg Ala
1               5                   10                  15

Pro Gly Leu Arg Ala Leu Arg Gln Ala Ala Glu Glu Pro Ser Arg
                20                  25                  30

Arg Ala Ala Arg Pro Arg Leu Pro Arg Asp Cys Cys Gly Arg Ala
            35                  40                  45

Ala Gly Ala Ala Ser Gly Arg Thr Gly Gly Gly Ser Cys Ala Lys
        50                  55                  60

Cys Gly Val Trp Ser Trp Thr Ser Cys Leu Ser Ser Arg Ser Leu
65                  70                  75                  80

Pro Pro His Arg Arg Pro Arg Leu Pro Arg Arg Ser Pro Arg
                85                  90                  95

Thr Gln Arg Gly Val Gly Pro Ala Ser Ser Leu Trp Arg Cys Arg Arg
                100                 105                 110

Pro Thr Glu Pro Arg Ala Ala Ala Ala Pro Thr Leu Pro Ser Arg Trp
            115                 120                 125

Arg Arg Arg Thr Ala Ala Pro Arg Val Pro Gln Arg Pro Ser Pro Gly
        130                 135                 140

Arg Ser Gly Arg Pro Pro Ser Arg Leu Leu Gln Arg Pro Pro
145                 150                 155                 160

Val Val Arg Trp Arg Ile Lys Lys Leu Ser Lys Gly Cys Thr Arg Trp
                165                 170                 175

Met Ile Val Gln Arg Asn Glu
            180

<210> SEQ ID NO 180
<211> LENGTH: 14
<212> TYPE: PRT
<213> ORGANISM: Artificial Sequence
<220> FEATURE:
<223> OTHER INFORMATION: pNOP580223

<400> SEQUENCE: 180

Gln Leu Pro Trp Gln Cys Gln Arg Leu Arg Met Pro Ser Pro
1               5                   10

<210> SEQ ID NO 181

```
<211> LENGTH: 14
<212> TYPE: PRT
<213> ORGANISM: Artificial Sequence
<220> FEATURE:
<223> OTHER INFORMATION: pNOP586366

<400> SEQUENCE: 181

Thr Phe Pro Ser Leu Tyr Ser Val Lys Thr Leu Ala Leu Gln
1               5                   10

<210> SEQ ID NO 182
<211> LENGTH: 14
<212> TYPE: PRT
<213> ORGANISM: Artificial Sequence
<220> FEATURE:
<223> OTHER INFORMATION: pNOP587861

<400> SEQUENCE: 182

Val Phe Pro Val Pro Leu Thr Ser Pro Gly Cys Val Ala Val
1               5                   10

<210> SEQ ID NO 183
<211> LENGTH: 13
<212> TYPE: PRT
<213> ORGANISM: Artificial Sequence
<220> FEATURE:
<223> OTHER INFORMATION: pNOP601588

<400> SEQUENCE: 183

Lys Leu Asp Pro Leu Val Leu Val Val Leu Ile Met Ser
1               5                   10

<210> SEQ ID NO 184
<211> LENGTH: 13
<212> TYPE: PRT
<213> ORGANISM: Artificial Sequence
<220> FEATURE:
<223> OTHER INFORMATION: pNOP610732

<400> SEQUENCE: 184

Arg Gly Thr Asp Val Ser Tyr Leu Leu Val Gly His Ala
1               5                   10

<210> SEQ ID NO 185
<211> LENGTH: 12
<212> TYPE: PRT
<213> ORGANISM: Artificial Sequence
<220> FEATURE:
<223> OTHER INFORMATION: pNOP634633

<400> SEQUENCE: 185

Leu Met Ser Glu Thr His Leu Leu Ser Lys Lys Lys
1               5                   10

<210> SEQ ID NO 186
<211> LENGTH: 12
<212> TYPE: PRT
<213> ORGANISM: Artificial Sequence
<220> FEATURE:
<223> OTHER INFORMATION: pNOP635798

<400> SEQUENCE: 186

Met Asp Gly Arg Gly Ile Gly Gly Ser Phe Ala Glu
1               5                   10

<210> SEQ ID NO 187
<211> LENGTH: 11
```

```
<212> TYPE: PRT
<213> ORGANISM: Artificial Sequence
<220> FEATURE:
<223> OTHER INFORMATION: pNOP652895

<400> SEQUENCE: 187

Ala Arg Ala Cys Gly Gly Lys Thr Asn Pro Ser
1               5                   10

<210> SEQ ID NO 188
<211> LENGTH: 11
<212> TYPE: PRT
<213> ORGANISM: Artificial Sequence
<220> FEATURE:
<223> OTHER INFORMATION: pNOP657154

<400> SEQUENCE: 188

Glu Pro Cys Trp Tyr Ile Leu Leu Ala Thr Val
1               5                   10

<210> SEQ ID NO 189
<211> LENGTH: 11
<212> TYPE: PRT
<213> ORGANISM: Artificial Sequence
<220> FEATURE:
<223> OTHER INFORMATION: pNOP660722

<400> SEQUENCE: 189

Gly Thr Lys Arg Ser Thr Val Trp Lys Glu Leu
1               5                   10

<210> SEQ ID NO 190
<211> LENGTH: 11
<212> TYPE: PRT
<213> ORGANISM: Artificial Sequence
<220> FEATURE:
<223> OTHER INFORMATION: pNOP666179

<400> SEQUENCE: 190

Leu Cys Leu Lys Leu Tyr Ser Trp Lys Pro Asn
1               5                   10

<210> SEQ ID NO 191
<211> LENGTH: 11
<212> TYPE: PRT
<213> ORGANISM: Artificial Sequence
<220> FEATURE:
<223> OTHER INFORMATION: pNOP666458

<400> SEQUENCE: 191

Leu Phe Pro Asp Trp Arg Arg Gln Pro Arg Gln
1               5                   10

<210> SEQ ID NO 192
<211> LENGTH: 11
<212> TYPE: PRT
<213> ORGANISM: Artificial Sequence
<220> FEATURE:
<223> OTHER INFORMATION: pNOP670307

<400> SEQUENCE: 192

Asn Gln Ser Gln Leu Lys Glu Met Asp Leu Lys
1               5                   10

<210> SEQ ID NO 193
<211> LENGTH: 11
<212> TYPE: PRT
```

```
<213> ORGANISM: Artificial Sequence
<220> FEATURE:
<223> OTHER INFORMATION: pNOP675489

<400> SEQUENCE: 193

Arg Lys Leu Glu Lys Asp Tyr Val Leu Gln Asn
1               5                   10

<210> SEQ ID NO 194
<211> LENGTH: 10
<212> TYPE: PRT
<213> ORGANISM: Artificial Sequence
<220> FEATURE:
<223> OTHER INFORMATION: pNOP688134

<400> SEQUENCE: 194

Cys Gly Pro Asp Cys Thr Tyr Cys Ser Arg
1               5                   10

<210> SEQ ID NO 195
<211> LENGTH: 10
<212> TYPE: PRT
<213> ORGANISM: Artificial Sequence
<220> FEATURE:
<223> OTHER INFORMATION: pNOP698339

<400> SEQUENCE: 195

Ile Trp Ser Leu Gln Arg Ile Ser Ser Tyr
1               5                   10

<210> SEQ ID NO 196
<211> LENGTH: 10
<212> TYPE: PRT
<213> ORGANISM: Artificial Sequence
<220> FEATURE:
<223> OTHER INFORMATION: pNOP711852

<400> SEQUENCE: 196

Arg Asn Ser Gln Arg Val Ala Gln Asp Gly
1               5                   10

<210> SEQ ID NO 197
<211> LENGTH: 10
<212> TYPE: PRT
<213> ORGANISM: Artificial Sequence
<220> FEATURE:
<223> OTHER INFORMATION: pNOP717177

<400> SEQUENCE: 197

Thr Gly Asp Leu Cys Gln Lys His Ile Phe
1               5                   10

<210> SEQ ID NO 198
<211> LENGTH: 10
<212> TYPE: PRT
<213> ORGANISM: Artificial Sequence
<220> FEATURE:
<223> OTHER INFORMATION: pNOP717868

<400> SEQUENCE: 198

Thr Pro Leu Leu Tyr Leu Ile Ile Pro Asn
1               5                   10

<210> SEQ ID NO 199
<211> LENGTH: 10
<212> TYPE: PRT
<213> ORGANISM: Artificial Sequence
```

<220> FEATURE:
<223> OTHER INFORMATION: pNOP718723

<400> SEQUENCE: 199

Thr Val Thr Pro Trp Pro Phe Val Ser Pro
1               5                   10

<210> SEQ ID NO 200
<211> LENGTH: 338
<212> TYPE: PRT
<213> ORGANISM: Artificial Sequence
<220> FEATURE:
<223> OTHER INFORMATION: pNOP685 alt splice g

<400> SEQUENCE: 200

Pro Ser Ala Ser Glu Ser Asp Ala Gly Tyr Lys Ala Asp Pro Thr Ile
1               5                   10                  15

Pro Thr Val Val Leu Arg Ser Val Leu Pro Ile Pro Gly Ile His Cys
                20                  25                  30

Leu Ser Phe Cys Ala Pro Ser Asn Ala His Phe Thr Trp Thr Cys Gln
            35                  40                  45

Arg His Asp Asn Pro Leu Cys Arg Thr Phe Gln Ser Thr Leu Asn Gly
        50                  55                  60

Thr Arg Pro Asp Ser Val Gln Arg Pro Ala Pro Val Pro Arg Ala Ala
65                  70                  75                  80

Leu His Leu Arg Pro Pro His Ala Leu Ser Arg Arg Leu His Leu Leu
                85                  90                  95

Pro Asp Ala Gly His Leu Gly His Arg His Arg His Val Gly His Gly
            100                 105                 110

Leu Gly His Ala Leu Pro His Leu Pro Ala Ala Ala Leu Pro Arg Leu
        115                 120                 125

Val Ala Ser Ala Gly Arg Pro Val Pro Ser Gln Leu Ala Leu Leu Pro
130                 135                 140

Pro Val Leu Arg Arg Leu Gly Arg Leu Leu Pro Val Leu His Gly Gly
145                 150                 155                 160

Arg Arg Ala Leu Ala Ala His Pro Ala Leu His Gln Arg Leu
                165                 170                 175

His Arg Leu Arg Ala Ala Gln Pro Gln Pro Glu Pro Glu Arg Arg
            180                 185                 190

Gly Gly Gly Arg Gly Gln Pro Gln Gln Leu Pro His Gln His Gly Ala
        195                 200                 205

Leu Arg Ala Pro Gly Gly Gly Arg Val Glu Ala Leu Leu Arg Arg Gln
    210                 215                 220

Ala Trp Pro Gly Trp Ala Pro Arg Ala Ala Ala Phe Ala Ser Gly Arg
225                 230                 235                 240

Ala Gly Leu Leu Phe Ala Thr Ser Pro Gly Ser Arg Ala Leu Gly
                245                 250                 255

Pro Ala Thr Val Leu Gly Pro Arg Ala Pro Asp Gly Gln Asp Leu Ala
            260                 265                 270

Val Gly Gln Ala Arg Ala Ala Ser Cys Ala Gln Lys Pro Thr Pro Pro
        275                 280                 285

Pro Ser Ala Gly Ala Pro Ala Leu Ala Glu Val Ser Glu Ala Thr His
    290                 295                 300

Leu Glu Gly Val Arg Arg Pro Gln His Pro Gly Asp Ala Leu Glu Ser
305                 310                 315                 320

```
Lys Gln Glu Asp Ser Arg Arg Glu Thr Val Asn Ala Ser Asp Leu Ala
                325                 330                 335
Met Leu

<210> SEQ ID NO 201
<211> LENGTH: 107
<212> TYPE: PRT
<213> ORGANISM: Artificial Sequence
<220> FEATURE:
<223> OTHER INFORMATION: pNOP28179

<400> SEQUENCE: 201

Arg Arg Pro Arg Cys Gln His Glu Pro Pro Leu His Ala Ala Phe His
1               5                   10                  15

Arg Ala Glu Pro Arg Gln Asp Glu Arg Gly Val Ala Gly Arg Pro
            20                  25                  30

Gly Arg Arg Cys Pro Gly Arg Gln Ala Glu Glu Arg Pro Gln
        35                  40                  45

His Gly Gly Ala Gly Arg Pro Gly Arg Ala Gly Ala His Arg
    50                  55                  60

Gln Pro Gln Leu Pro Leu Leu Arg Ala Ala Tyr Ala Leu Ala Leu Gln
65                  70                  75                  80

Gln Asp Pro Ala His Arg Phe Gln Gly Gly Pro Arg Gly Cys Ser
                85                  90                  95

Arg Trp His Ser Gly His Cys Asp Gly Trp Gln
            100                 105

<210> SEQ ID NO 202
<211> LENGTH: 51
<212> TYPE: PRT
<213> ORGANISM: Artificial Sequence
<220> FEATURE:
<223> OTHER INFORMATION: pNOP135011

<400> SEQUENCE: 202

Pro Gln Val Cys Arg Ser Lys Trp Lys Arg Glu Lys Leu His Ser Asp
1               5                   10                  15

His His Cys Leu His Lys Pro Thr Ala Ser Arg His Leu Pro Gln Ser
                20                  25                  30

His Gln Asn His Ser Gly Trp Ala Pro Arg Thr Ser Lys Thr Ser Ala
            35                  40                  45

Glu Thr Arg
    50

<210> SEQ ID NO 203
<211> LENGTH: 25
<212> TYPE: PRT
<213> ORGANISM: Artificial Sequence
<220> FEATURE:
<223> OTHER INFORMATION: pNOP352298

<400> SEQUENCE: 203

Met Ile Arg Pro Ser Pro Gly Ala Cys Pro Phe Pro Ser Gly Ser Val
1               5                   10                  15

Asn Trp Ser Ser Cys Gly Ala Gln Pro
                20                  25

<210> SEQ ID NO 204
<211> LENGTH: 56
<212> TYPE: PRT
```

```
<213> ORGANISM: Artificial Sequence
<220> FEATURE:
<223> OTHER INFORMATION: pNOP115907 alt splice h

<400> SEQUENCE: 204

Thr Thr Pro Leu Pro Leu Thr Leu Ser Leu Arg Val Arg Cys Arg Ile
1               5                   10                  15

Gln Gly Arg Ser Asn His Pro His Arg Gly Pro Thr Ile Ser Pro Thr
            20                  25                  30

Asn Thr Trp Asp Pro Leu Pro Leu Leu Cys Thr Gln Gln Arg Pro
        35                  40                  45

Phe His Leu Asp Val Pro Ala Ala
    50                  55

<210> SEQ ID NO 205
<211> LENGTH: 49
<212> TYPE: PRT
<213> ORGANISM: Artificial Sequence
<220> FEATURE:
<223> OTHER INFORMATION: pNOP142572

<400> SEQUENCE: 205

Gly Ala Ala Thr Ala Ala Trp Trp Arg Cys Trp Pro Thr Thr Arg Ala
1               5                   10                  15

Ser Trp Cys Ala Pro Thr Ala Pro Thr Ser Ser Ala Pro Cys Cys Leu
            20                  25                  30

Arg Thr Gly Ala Ala Thr Arg Pro Cys Pro Ser Leu Ser Arg Trp Trp
        35                  40                  45

Pro

<210> SEQ ID NO 206
<211> LENGTH: 265
<212> TYPE: PRT
<213> ORGANISM: Artificial Sequence
<220> FEATURE:
<223> OTHER INFORMATION: pNOP1630

<400> SEQUENCE: 206

Gln Arg Ser Ala Thr Arg Ala Ser Ser Pro Arg Cys Pro Pro Ser Pro
1               5                   10                  15

Thr Pro Ala Cys Thr Ile Gln Ala Pro Ser Pro Thr Pro Arg Arg Arg
            20                  25                  30

Ser Pro Arg Ala Ser Ala Ser Ala Cys Arg Pro Trp Ala Arg Pro Arg
        35                  40                  45

Ala Thr Thr Pro Thr Cys Arg Arg Pro Thr Pro Ala Arg Arg Lys Arg
    50                  55                  60

Arg Glu Ala Arg Ser Lys Pro Arg Pro Pro Thr Thr Cys Thr Thr
65              70                  75                  80

Ala Pro Arg Pro Ala Pro Thr Ser Ser Pro Trp Trp Ala Ala Ser Ala
                85                  90                  95

Arg Arg Arg Ala Ser Cys Arg Pro Ala Pro Thr Pro Pro Ala Pro
            100                 105                 110

Arg Cys Ser Thr Pro Ala Ser Arg Thr Arg Ala Thr Trp Trp Arg Pro
        115                 120                 125

Arg Ala Ala Thr Ala Thr Pro Pro Thr Trp Arg Pro Pro Arg Ala
    130                 135                 140

Trp Arg Arg Pro Cys Gly Gly Pro Thr Glu Ala Pro Gly Leu Ala Arg
145                 150                 155                 160
```

```
Leu Gly Pro Ala Gly Arg Arg Leu Arg Leu Arg Ala Arg Gly Pro Pro
            165                 170                 175

Val Arg Asp Lys Pro Ala Gly Ile Pro Gly Pro Gly Pro Gly His Arg
        180                 185                 190

Pro Gly Ala Glu Gly Ala Arg Arg Pro Gly Ser Arg Cys Arg Ser Gly
    195                 200                 205

Pro Arg Ser Leu Leu Arg Pro Glu Ala His Ala Ala Val Cys Trp
210                 215                 220

Arg Pro Gly Pro Arg Gly Gly Val Arg Gly Asp Ala Pro Arg Gly Cys
225                 230                 235                 240

Pro Pro Ala Pro Ala Pro Arg Gly Arg Ala Gly Lys Gln Thr Gly Arg
                245                 250                 255

Phe Pro Glu Gly Asn Cys Glu Cys Phe
            260                 265

<210> SEQ ID NO 207
<211> LENGTH: 34
<212> TYPE: PRT
<213> ORGANISM: Artificial Sequence
<220> FEATURE:
<223> OTHER INFORMATION: pNOP246619 alt splice j

<400> SEQUENCE: 207

Pro Ser Leu Ser Ser Gln Thr His Arg Lys Ser Pro Pro Thr Thr Glu
1               5                   10                  15

Pro Ser Lys Ser Gln Trp Met Gly Pro Glu Asn Leu Glu Asp Ile Gly
            20                  25                  30

Arg Asn

<210> SEQ ID NO 208
<211> LENGTH: 32
<212> TYPE: PRT
<213> ORGANISM: Artificial Sequence
<220> FEATURE:
<223> OTHER INFORMATION: pNOP269003

<400> SEQUENCE: 208

Thr Gly Ala Ala Ala Ala His Ser His Glu Gly Gln Pro Thr Pro Pro
1               5                   10                  15

Ser Pro His Ala Gln Pro Ser Cys Leu Pro Glu Pro Leu His Cys Leu
            20                  25                  30

<210> SEQ ID NO 209
<211> LENGTH: 78
<212> TYPE: PRT
<213> ORGANISM: Artificial Sequence
<220> FEATURE:
<223> OTHER INFORMATION: pNOP59911 alt splice g

<400> SEQUENCE: 209

Pro Ser Ala Ser Glu Ser Asp Ala Gly Gly Arg His Ser Thr Leu Glu
1               5                   10                  15

Met Leu Arg Gln Lys Ser Val Leu Leu Ser Ile Pro Leu Pro Ser Gln
            20                  25                  30

Asp Arg Ala Ile Phe Ser Ile Ser Ser Glu Glu Thr Gln Lys Lys
        35                  40                  45

Asp Asp Ser Pro Gln Asn Ala Arg Tyr Glu Glu Gly Arg Met Trp Val
    50                  55                  60

Cys Asn Ser Ser Val Ser Leu Leu Pro Leu Cys Lys Pro Ser
65                  70                  75
```

<210> SEQ ID NO 210
<211> LENGTH: 124
<212> TYPE: PRT
<213> ORGANISM: Artificial Sequence
<220> FEATURE:
<223> OTHER INFORMATION: pNOP18884

<400> SEQUENCE: 210

Asn Ala Arg Ser Thr Ala Gly Thr Gly Ala Gly Gly Ser Gly Arg Pro
1               5                   10                  15

His Ala Lys Pro Gly Cys Gln His Glu Pro Pro Leu His Ala Ala Phe
            20                  25                  30

His Arg Ala Glu Pro Arg Gln Asp Glu Arg Gly Val Ala Ala Gly Arg
        35                  40                  45

Pro Gly Arg Arg Arg Cys Pro Gly Arg Gln Ala Glu Glu Arg Arg Pro
    50                  55                  60

Gln His Gly Gly Gly Ala Gly Arg Pro Pro Gly Arg Ala Gly Ala His
65                  70                  75                  80

Arg Gln Pro Gln Leu Pro Leu Leu Arg Ala Ala Tyr Ala Leu Ala Leu
                85                  90                  95

Gln Gln Asp Pro Ala His Arg Phe Gln Gly Gly Pro Arg Gly Cys
            100                 105                 110

Ser Arg Trp His Ser Gly His Cys Asp Gly Trp Gln
        115                 120

<210> SEQ ID NO 211
<211> LENGTH: 39
<212> TYPE: PRT
<213> ORGANISM: Artificial Sequence
<220> FEATURE:
<223> OTHER INFORMATION: pNOP206880 alt splice h

<400> SEQUENCE: 211

Thr Thr Pro Leu Pro Leu Thr Leu Ser Leu Arg Val Arg Cys Arg Arg
1               5                   10                  15

Lys Thr Gln His Pro Gly Asp Val Lys Ala Glu Val Ser Ser Ser Val
            20                  25                  30

His Pro Ser Pro Gln Pro Gly
        35

<210> SEQ ID NO 212
<211> LENGTH: 115
<212> TYPE: PRT
<213> ORGANISM: Artificial Sequence
<220> FEATURE:
<223> OTHER INFORMATION: pNOP23436 alt splice i

<400> SEQUENCE: 212

Val Ile Ser Phe Val Pro Thr Val Leu His Glu Arg Cys Gln His Glu
1               5                   10                  15

Pro Pro Leu His Ala Ala Phe His Arg Ala Glu Pro Arg Gln Asp Glu
            20                  25                  30

Arg Gly Val Ala Ala Gly Arg Pro Gly Arg Arg Cys Pro Gly Arg
        35                  40                  45

Gln Ala Glu Glu Arg Arg Pro Gln His Gly Gly Gly Ala Gly Arg Pro
    50                  55                  60

Pro Gly Arg Ala Gly Ala His Arg Gln Pro Gln Leu Pro Leu Leu Arg
65                  70                  75                  80

Ala Ala Tyr Ala Leu Ala Leu Gln Gln Asp Pro Ala His Arg Phe Gln
                85                  90                  95

Gly Gly Gly Pro Arg Gly Cys Ser Arg Trp His Ser Gly His Cys Asp
            100                 105                 110

Gly Trp Gln
        115

<210> SEQ ID NO 213
<211> LENGTH: 34
<212> TYPE: PRT
<213> ORGANISM: Artificial Sequence
<220> FEATURE:
<223> OTHER INFORMATION: pNOP241712

<400> SEQUENCE: 213

Cys Pro Gln His Arg Gly Asp Arg Arg Gly Lys Arg Pro Pro Ala
1               5                   10                  15

Arg Glu Ala Gly Met Pro Ala Arg Ala Ala Ser Arg Arg Leu Pro
                20                  25                  30

Pro Arg

<210> SEQ ID NO 214
<211> LENGTH: 109
<212> TYPE: PRT
<213> ORGANISM: Artificial Sequence
<220> FEATURE:
<223> OTHER INFORMATION: pNOP26418

<400> SEQUENCE: 214

Asp Ala Tyr Pro Arg Arg Cys Gln His Glu Pro Leu His Ala Ala
1               5                   10                  15

Phe His Arg Ala Glu Pro Arg Gln Asp Glu Arg Gly Val Ala Ala Gly
                20                  25                  30

Arg Pro Gly Arg Arg Arg Cys Pro Gly Arg Gln Ala Glu Glu Arg Arg
            35                  40                  45

Pro Gln His Gly Gly Gly Ala Gly Arg Pro Pro Gly Arg Ala Gly Ala
        50                  55                  60

His Arg Gln Pro Gln Leu Pro Leu Leu Arg Ala Ala Tyr Ala Leu Ala
65                  70                  75                  80

Leu Gln Gln Asp Pro Ala His Arg Phe Gln Gly Gly Gly Pro Arg Gly
                85                  90                  95

Cys Ser Arg Trp His Ser Gly His Cys Asp Gly Trp Gln
            100                 105

<210> SEQ ID NO 215
<211> LENGTH: 23
<212> TYPE: PRT
<213> ORGANISM: Artificial Sequence
<220> FEATURE:
<223> OTHER INFORMATION: pNOP387672

<400> SEQUENCE: 215

Arg Thr Arg Leu Gln Asp Leu Met Thr Ser Gly Leu Ser Val Glu Val
1               5                   10                  15

Glu Glu Gly Lys Ala Ser Leu
            20

<210> SEQ ID NO 216
<211> LENGTH: 21
<212> TYPE: PRT
<213> ORGANISM: Artificial Sequence

```
<220> FEATURE:
<223> OTHER INFORMATION: pNOP415291

<400> SEQUENCE: 216

Ile Leu Leu Glu Thr Ser Thr Met Pro Ala Arg Ala Ala Ala Ser Arg
1               5                   10                  15

Arg Leu Pro Pro Arg
            20

<210> SEQ ID NO 217
<211> LENGTH: 20
<212> TYPE: PRT
<213> ORGANISM: Artificial Sequence
<220> FEATURE:
<223> OTHER INFORMATION: pNOP445668 alt splice i

<400> SEQUENCE: 217

Val Ile Ser Phe Val Pro Thr Val Leu His Glu Arg Met His Thr Trp
1               5                   10                  15

Asn Glu Ser Phe
            20

<210> SEQ ID NO 218
<211> LENGTH: 374
<212> TYPE: PRT
<213> ORGANISM: Artificial Sequence
<220> FEATURE:
<223> OTHER INFORMATION: pNOP458

<400> SEQUENCE: 218

Pro Gln Val Cys Arg Ser Lys Trp Lys Arg Glu Lys Leu His Ser Asp
1               5                   10                  15

His His Cys Leu His Lys Pro Thr Ala Ser Arg His Leu Pro Gln Ser
            20                  25                  30

His Gln Asn His Ser Gly Trp Ala Pro Arg Thr Ser Lys Tyr Lys Ala
        35                  40                  45

Asp Pro Thr Ile Pro Thr Val Val Leu Arg Ser Val Leu Pro Ile Pro
    50                  55                  60

Gly Ile His Cys Leu Ser Phe Cys Ala Pro Ser Asn Ala His Phe Thr
65                  70                  75                  80

Trp Thr Cys Gln Arg His Asp Asn Pro Leu Cys Arg Thr Phe Gln Ser
                85                  90                  95

Thr Leu Asn Gly Thr Arg Pro Asp Ser Val Gln Arg Pro Ala Pro Val
            100                 105                 110

Pro Arg Ala Ala Leu His Leu Arg Pro His Ala Leu Ser Arg Arg
        115                 120                 125

Leu His Leu Leu Pro Asp Ala Gly His Leu Gly His Arg His Arg His
    130                 135                 140

Val Gly His Gly Leu Gly His Ala Leu Pro His Leu Pro Ala Ala Ala
145                 150                 155                 160

Leu Pro Arg Leu Val Ala Ser Ala Gly Arg Pro Val Pro Ser Gln Leu
                165                 170                 175

Ala Leu Leu Pro Pro Val Leu Arg Arg Leu Gly Arg Leu Leu Pro Val
            180                 185                 190

Leu His Gly Gly Arg Arg Ala Leu Ala Ala His Pro Ala Ala Leu
        195                 200                 205

His Gln Arg Leu His Arg Leu Arg Ala Ala Gln Pro Gln Pro Pro Glu
    210                 215                 220
```

```
Pro Glu Arg Arg Gly Gly Gly Arg Gly Gln Pro Gln Gln Leu Pro His
225                 230                 235                 240

Gln His Gly Ala Leu Arg Ala Pro Gly Gly Arg Val Glu Ala Leu
            245                 250                 255

Leu Arg Arg Gln Ala Trp Pro Gly Trp Ala Pro Arg Ala Ala Phe
        260                 265                 270

Ala Ser Gly Arg Ala Gly Leu Leu Phe Ala Thr Ser Pro Gly Ser
    275                 280                 285

Arg Ala Leu Gly Pro Ala Thr Val Leu Gly Pro Arg Ala Pro Asp Gly
290                 295                 300

Gln Asp Leu Ala Val Gly Gln Ala Arg Ala Ala Ser Cys Ala Gln Lys
305                 310                 315                 320

Pro Thr Pro Pro Ser Ala Gly Ala Pro Ala Leu Ala Glu Val Ser
            325                 330                 335

Glu Ala Thr His Leu Glu Gly Val Arg Arg Pro Gln His Pro Gly Asp
                340                 345                 350

Ala Leu Glu Ser Lys Gln Glu Asp Ser Arg Arg Glu Thr Val Asn Ala
        355                 360                 365

Ser Asp Leu Ala Met Leu
    370
```

```
<210> SEQ ID NO 219
<211> LENGTH: 18
<212> TYPE: PRT
<213> ORGANISM: Artificial Sequence
<220> FEATURE:
<223> OTHER INFORMATION: pNOP468446

<400> SEQUENCE: 219

Ala Arg Arg Cys Arg Trp Ala Pro Arg Thr Pro Ala Leu Pro Trp Pro
1               5                   10                  15

Ala Ser
```

```
<210> SEQ ID NO 220
<211> LENGTH: 85
<212> TYPE: PRT
<213> ORGANISM: Artificial Sequence
<220> FEATURE:
<223> OTHER INFORMATION: pNOP48701

<400> SEQUENCE: 220

Asp Glu Arg Gly Val Ala Ala Gly Arg Pro Gly Arg Arg Cys Pro
1               5                   10                  15

Gly Arg Gln Ala Glu Glu Arg Arg Pro Gln His Gly Gly Ala Gly
            20                  25                  30

Arg Pro Pro Gly Arg Ala Gly Ala His Arg Gln Pro Gln Leu Pro Leu
        35                  40                  45

Leu Arg Ala Ala Tyr Ala Leu Ala Leu Gln Gln Asp Pro Ala His Arg
    50                  55                  60

Phe Gln Gly Gly Gly Pro Arg Gly Cys Ser Arg Trp His Ser Gly His
65                  70                  75                  80

Cys Asp Gly Trp Gln
                85
```

```
<210> SEQ ID NO 221
<211> LENGTH: 17
<212> TYPE: PRT
<213> ORGANISM: Artificial Sequence
<220> FEATURE:
```

<223> OTHER INFORMATION: pNOP511171

<400> SEQUENCE: 221

Trp Leu Gln Thr Ala Tyr Leu Ser His Phe Leu Arg Thr His Ser Ala
1               5                   10                  15
Ser

<210> SEQ ID NO 222
<211> LENGTH: 16
<212> TYPE: PRT
<213> ORGANISM: Artificial Sequence
<220> FEATURE:
<223> OTHER INFORMATION: pNOP518241

<400> SEQUENCE: 222

Gly Ser Ala His Thr Thr Gln Pro Pro Arg Pro Thr Leu Val Pro Pro
1               5                   10                  15

<210> SEQ ID NO 223
<211> LENGTH: 16
<212> TYPE: PRT
<213> ORGANISM: Artificial Sequence
<220> FEATURE:
<223> OTHER INFORMATION: pNOP527804

<400> SEQUENCE: 223

Gln Pro Ser Leu Gln Asn Phe Pro Val Asp Ser Gln Arg His Pro Thr
1               5                   10                  15

<210> SEQ ID NO 224
<211> LENGTH: 15
<212> TYPE: PRT
<213> ORGANISM: Artificial Sequence
<220> FEATURE:
<223> OTHER INFORMATION: pNOP536626

<400> SEQUENCE: 224

Ala Glu Lys Cys Tyr Arg Ser His Glu Glu Pro Gly Cys Lys Ile
1               5                   10                  15

<210> SEQ ID NO 225
<211> LENGTH: 15
<212> TYPE: PRT
<213> ORGANISM: Artificial Sequence
<220> FEATURE:
<223> OTHER INFORMATION: pNOP540378

<400> SEQUENCE: 225

Glu Met Pro Ala Arg Ala Ala Ala Ser Arg Arg Leu Pro Pro Arg
1               5                   10                  15

<210> SEQ ID NO 226
<211> LENGTH: 14
<212> TYPE: PRT
<213> ORGANISM: Artificial Sequence
<220> FEATURE:
<223> OTHER INFORMATION: pNOP576438

<400> SEQUENCE: 226

Met Pro Ala Arg Ala Ala Ala Ser Arg Arg Leu Pro Pro Arg
1               5                   10

<210> SEQ ID NO 227
<211> LENGTH: 14
<212> TYPE: PRT
<213> ORGANISM: Artificial Sequence -continued
<220> FEATURE:
<223> OTHER INFORMATION: pNOP583929

<400> SEQUENCE: 227

Ser Asp Gln Ala Arg Glu Leu Val Leu Phe Arg Ala Ala Gln
1               5                   10

<210> SEQ ID NO 228
<211> LENGTH: 11
<212> TYPE: PRT
<213> ORGANISM: Artificial Sequence
<220> FEATURE:
<223> OTHER INFORMATION: pNOP684423

<400> SEQUENCE: 228

Trp Leu Ala Met Met Lys Thr Thr Arg Leu Ser
1               5                   10

<210> SEQ ID NO 229
<211> LENGTH: 10
<212> TYPE: PRT
<213> ORGANISM: Artificial Sequence
<220> FEATURE:
<223> OTHER INFORMATION: pNOP694394

<400> SEQUENCE: 229

Gly Met Phe Gln Met Ala Leu Trp Ser Leu
1               5                   10

<210> SEQ ID NO 230
<211> LENGTH: 70
<212> TYPE: PRT
<213> ORGANISM: Artificial Sequence
<220> FEATURE:
<223> OTHER INFORMATION: pNOP74999 alt splice j

<400> SEQUENCE: 230

Pro Ser Leu Ser Ser Gln Thr His Arg Lys Ser Pro Thr Thr Glu
1               5                   10                  15

Pro Ser Lys Ser Gln Trp Met Gly Pro Glu Asn Leu Glu Ile Gln Gly
                20                  25                  30

Arg Ser Asn His Pro His Arg Gly Pro Thr Ile Ser Pro Thr Asn Thr
            35                  40                  45

Trp Asp Pro Leu Pro Leu Leu Leu Cys Thr Gln Gln Arg Pro Phe His
        50                  55                  60

Leu Asp Val Pro Ala Ala
65                  70

<210> SEQ ID NO 231
<211> LENGTH: 71
<212> TYPE: PRT
<213> ORGANISM: Artificial Sequence
<220> FEATURE:
<223> OTHER INFORMATION: pNOP GATA3_17

<400> SEQUENCE: 231

Pro Leu Gln His Gly His Arg His Gly Leu Glu Pro Cys Ser Met Leu
1               5                   10                  15

Thr Gly Pro Pro Ala Arg Val Pro Ala Val Pro Phe Asp Leu His Phe
                20                  25                  30

Cys Arg Ser Ser Ile Met Lys Pro Lys Arg Asp Gly Tyr Met Phe Leu
            35                  40                  45

Lys Ala Glu Ser Lys Ile Met Phe Ala Thr Leu Gln Arg Ser Ser Leu
50                  55                  60

Trp Cys Leu Cys Ser Asn His
65                  70

<210> SEQ ID NO 232
<211> LENGTH: 37
<212> TYPE: PRT
<213> ORGANISM: Artificial Sequence
<220> FEATURE:
<223> OTHER INFORMATION: pNOP GATA3_18

<400> SEQUENCE: 232

Arg Asp Val Leu Cys Glu Leu Ser Asp His His Asn His Thr Leu Glu
1               5                   10                  15

Glu Glu Cys Gln Trp Gly Pro Cys Leu Gln Cys Leu Trp Ala Leu Leu
            20                  25                  30

Gln Ala Ser Gln Tyr
        35

<210> SEQ ID NO 233
<211> LENGTH: 51
<212> TYPE: PRT
<213> ORGANISM: Artificial Sequence
<220> FEATURE:
<223> OTHER INFORMATION: pNOP_GATA3_19

<400> SEQUENCE: 233

Thr Arg His Pro Ala Cys Pro Leu Asp His Thr Thr Pro Pro Ala Trp
1               5                   10                  15

Ser Pro Pro Trp Val Arg Ala Leu Leu Asp Ala His Arg Ala Pro Ser
            20                  25                  30

Glu Ser Pro Cys Ser Pro Phe Arg Leu Ala Phe Leu Gln Glu Gln Tyr
        35                  40                  45

His Glu Ala
        50

<210> SEQ ID NO 234
<211> LENGTH: 40
<212> TYPE: PRT
<213> ORGANISM: Artificial Sequence
<220> FEATURE:
<223> OTHER INFORMATION: pNOP_GATA3_20

<400> SEQUENCE: 234

Gly Arg Pro Val Arg Thr Val Arg Pro Pro Gln Pro His Ser Gly Gly
1               5                   10                  15

Gly Met Pro Met Gly Thr Leu Ser Ala Met Pro Val Gly Ser Thr Thr
            20                  25                  30

Ser Phe Thr Ile Leu Thr Asp Pro
        35                  40

<210> SEQ ID NO 235
<211> LENGTH: 23
<212> TYPE: DNA
<213> ORGANISM: Artificial Sequence
<220> FEATURE:
<223> OTHER INFORMATION: sequence comprising a linker amino acid
      encoding sequence
<220> FEATURE:
<221> NAME/KEY: CDS
<222> LOCATION: (1)..(21)

```
<400> SEQUENCE: 235 cta tac agg cga atg aga tta tg                                          23
  Leu Tyr Arg Arg Met Arg Leu
  1               5

<210> SEQ ID NO 236
<211> LENGTH: 7
<212> TYPE: PRT
<213> ORGANISM: Artificial Sequence
<220> FEATURE:
<223> OTHER INFORMATION: Synthetic Construct

<400> SEQUENCE: 236

Leu Tyr Arg Arg Met Arg Leu
1               5

<210> SEQ ID NO 237
<211> LENGTH: 23
<212> TYPE: DNA
<213> ORGANISM: Artificial Sequence
<220> FEATURE:
<223> OTHER INFORMATION: sequence comprising a linker amino acid
      encoding sequence
<220> FEATURE:
<221> NAME/KEY: CDS
<222> LOCATION: (2)..(22)

<400> SEQUENCE: 237 c tat aca ggc gaa tga gat tat g                                         23
  Tyr Thr Gly Glu     Asp Tyr
  1               5

<210> SEQ ID NO 238
<211> LENGTH: 4
<212> TYPE: PRT
<213> ORGANISM: Artificial Sequence
<220> FEATURE:
<223> OTHER INFORMATION: Synthetic Construct

<400> SEQUENCE: 238

Tyr Thr Gly Glu
1

<210> SEQ ID NO 239
<211> LENGTH: 66
<212> TYPE: DNA
<213> ORGANISM: Artificial Sequence
<220> FEATURE:
<223> OTHER INFORMATION: p21.3 seq
<220> FEATURE:
<221> NAME/KEY: CDS
<222> LOCATION: (1)..(66)

<400> SEQUENCE: 239 gca gtt ggg ctc cgc gcc gtg gag cag cag cag ctc cgc cac tcg ggc         48
Ala Val Gly Leu Arg Ala Val Glu Gln Gln Gln Leu Arg His Ser Gly
1               5                   10                  15 gct gcc cat cat cat gac                                                 66
Ala Ala His His His Asp
            20

<210> SEQ ID NO 240
<211> LENGTH: 22
<212> TYPE: PRT
<213> ORGANISM: Artificial Sequence
<220> FEATURE:
<223> OTHER INFORMATION: Synthetic Construct
```

```
<400> SEQUENCE: 240

Ala Val Gly Leu Arg Ala Val Glu Gln Gln Gln Leu Arg His Ser Gly
1               5                   10                  15

Ala Ala His His His Asp
            20

<210> SEQ ID NO 241
<211> LENGTH: 63
<212> TYPE: DNA
<213> ORGANISM: Artificial Sequence
<220> FEATURE:
<223> OTHER INFORMATION: frameshift
<220> FEATURE:
<221> NAME/KEY: CDS
<222> LOCATION: (1)..(63)

<400> SEQUENCE: 241 cag ttg ggc tcc gcg ccg tgg agc agc agc agc tcc gcc act cgg gcg      48
Gln Leu Gly Ser Ala Pro Trp Ser Ser Ser Ser Ser Ala Thr Arg Ala
1               5                   10                  15 ctg ccc atc atc atg                                                  63
Leu Pro Ile Ile Met
            20

<210> SEQ ID NO 242
<211> LENGTH: 21
<212> TYPE: PRT
<213> ORGANISM: Artificial Sequence
<220> FEATURE:
<223> OTHER INFORMATION: Synthetic Construct

<400> SEQUENCE: 242

Gln Leu Gly Ser Ala Pro Trp Ser Ser Ser Ser Ser Ala Thr Arg Ala
1               5                   10                  15

Leu Pro Ile Ile Met
            20
```